(12) United States Patent  
Marukawa

(10) Patent No.: US 7,120,861 B1
(45) Date of Patent: Oct. 10, 2006

(54) DOCUMENT PROCESSING SYSTEM

(75) Inventor: Kazuyuki Marukawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 1298 days.

(21) Appl. No.: 09/706,170

(22) Filed: Nov. 3, 2000

(30) Foreign Application Priority Data

Nov. 18, 1999 (JP) ............................... P11-328728

(51) Int. Cl.
*G06F 17/27* (2006.01)
(52) U.S. Cl. ........................... 715/501.1; 707/5; 707/10
(58) Field of Classification Search ............ 715/501.1, 715/713; 707/5, 10; 705/39
See application file for complete search history.

(56) References Cited

U.S. PATENT DOCUMENTS

| | | | | |
|---|---|---|---|---|
| 5,404,514 A | * | 4/1995 | Kageneck et al. ............. | 707/5 |
| 5,754,939 A | * | 5/1998 | Herz et al. ................ | 715/501.1 |
| 5,819,092 A | * | 10/1998 | Ferguson et al. ............. | 705/39 |
| 6,029,195 A | * | 2/2000 | Herz ............................ | 707/10 |
| 6,460,036 B1 | * | 10/2002 | Herz ............................ | 707/10 |

* cited by examiner

*Primary Examiner*—Doug Hutton
(74) *Attorney, Agent, or Firm*—Bell, Boyd & Lloyd LLC

(57) ABSTRACT

A document processing system and method are disclosed which are capable of performing inverse retrieval in response to a request issued by a user and providing retrieved document data to the user. Characteristic information indicating a specified electronic document or category is transmitted from a terminal device to a document providing device. The document providing device retrieves electronic documents related to the characteristic information from electronic documents stored in a database. Information about the retrieved electronic documents, such as electronic documents themselves or a list of the retrieved electronic documents, is transmitted from the document providing device to the terminal device.

17 Claims, 64 Drawing Sheets

FIG. 12A

| DATE AND TIME OF UPDATING | 1999 : 12 : 10 : 19 : 56 : 10 | | | | | |
|---|---|---|---|---|---|---|
| CATEGORY | SPORT | COMPANY | COMPUTER | PLANT | ART | EVENT |
| INDEX | IDX1<br>IDX7<br>IDX13<br>IDX15 | IDX2<br>IDX8 | IDX3<br>IDX9<br>IDX14 | IDX4<br>IDX10 | IDX5<br>IDX11 | IDX6<br>IDX12 |

FIG. 12B

| DATE AND TIME OF UPDATING | 1999 : 12 : 10 : 19 : 56 : 10 | | | | | |
|---|---|---|---|---|---|---|
| CATEGORY | SPORT | COMPANY | COMPUTER | PLANT | ART | EVENT |
| PROPER NOUN | MR. A<br>.... | B COMPANY<br>.... | C COMPANY<br>G COMPANY<br>.... | D SPECIES<br>.... | MR. E<br>.... | MR. F<br>.... |
| WORD SENSE | BASEBALL (4546)<br>GROUND (2343)<br>.... | LABOR (3112)<br>EMPLOYMENT (9821)<br>.... | MOBILE (2102)<br>.... | CHERRY-1 (1111)<br>ORANGE-1 (9911)<br>.... | CHERRY-2 (1112)<br>ORANGE-2 (9912)<br>.... | CHERRY-3 (1113)<br>.... |
| DOCUMENT ADDRESS | SP1<br>SP2<br>SP3<br>... | SO1<br>SO2<br>SO3<br>... | CO1<br>CO2<br>CO3<br>... | PL1<br>PL2<br>PL3<br>... | AR1<br>AR2<br>AR3<br>... | EV1<br>EV2<br>EV3<br>... |

FIG. 16

|  | COMPUTER | TELEVISION |  |
|---|---|---|---|
| COMPUTER |  | 0.55 |  |
| TELEVISION | 0.55 |  |  |
| VTR | 0.25 | 0.60 |  |

FIG. 22A

<document><head><sentence>[<noun phrase><adjective phrase: word sense = "3cf072"> 素敵に </adjective phrase><noun: identifier = "a200"> エイジング </noun></noun phrase>/8</sentence><sentence><verb phrase: identifier = "a876"><adverb phrase: relation = "object"><noun phrase: identifier = "a1000"; relation = "subject"; word sense = "3be2c7"> ガン </noun phrase><noun: identifier= "a8"; word sense = "0ff5e7"> 転移 </noun><adverb phrase> 抑え </verb phrase> られる！？ </sentence></head>

FIG. 22B

\<paragraph\>\<sentence\>\<adverb phrase: relation = "subject"\>\<noun phrase: coreference = "a89"\> この転移 \</noun phrase\>, \</adverb phrase\>\<adverb phrase: relation = "condition"\>\<adverb phrase: relation = "subject"\>\<noun phrase: identifier "a15"\>\<noun phrase: coreference = "a1"; relation = "essential"; word sense = "3be2c7"\> がん \</noun phrase\>\<noun; word sense = "0f2e4c"\> 細胞 \</noun\>\</noun phrase\> が \<adverb phrase\> 増えるだけでは \</adverb phrase\> 発生しない。
\</sentence\>\<sentence\>\<adverb phrase: relation = "subject"\>\<noun phrase: identifier = "a18"\>; coreference = "a15"\>\<noun phrase: coreference = "a1"; relation = "essential"\> がん \</noun phrase\>\<noun: word sense = "0f2e4c"\> 細胞 \</noun\>\</noun phrase\> が \</adverb phrase\>\<adverb phrase: relation = "means"\>\<adverb phrase: relation = "means"\>\<adverb phrase: relation = "object"\>\<noun phrase: identifier = "a12"\>\<adverb phrase: relation = "undefined"\>\<adverb phrase: relation = "indirect object"\>\<adverb phrase: relation = "place"\>\<noun phrase: syntax = "parallel"\>\<noun phrase: word sense = "0f2e4c"\> 細胞 \</noun phrase\> と \<noun phrase: word sense = "0f2e4c"\> 細胞 \</noun phrase\>\</noun phrase\> の \</adverb phrase\> 間に \</adverb phrase\> ある \</adverb phrase\> \<noun phrase\>\<noun: syntax = "backward dependency"\> 蛋白 ← EXAMPLE 1
\<exception: relation = "undefined"; pronunciation = "null"\> （たんぱく）
\</exception\>\</noun\> 質 \</noun phrase\> などを \</adverb phrase\> 溶かし、 \</adverb phrase\>\<adverb phrase: relation = "object"\>\<verb phrase: relation = "undefined"\>\<adverb phrase: relation = "subject"\>\<noun phrase: coreference = "a18"; word sense = "0f6fa3"\> 自分 \</noun phrase\> の \</advereb phrase\> 進む \</verb phrase\> 道を \</adverb phrase\> つくって、 \</adverb phrase\>\<adverb phrase: relation = "indirect object"\>\<noun phrase: identifier = "a33"; syntax = "parallel"\>\<noun phrase; word sense = "0ef4e6"\>
血管 \</noun phrase\> や \<noun phrase: pronunciation = " りんぱかん "\> ← EXAMPLE 2
リンパ管 \</noun phrase\>\</noun phrase\> に \</adverb phrase\> 入り込む。
\</sentence\>\<sentence: identifier = "a16"\>\<adverb phrase: relation = " 主語 "\>\<verb phrase: relation = "content"\>\<adverb phrase: relation = "object"\>\<noun phrase\>\<adverb phrase: relation = "content"\>\<adverb phrase\>\<adverb phrase\> 循環しながら \</adverb phrase\>\<verb\>\<verb phrase: relation = "undefined"\>\<adverb phrase: relation = "object"\>\<noun phrase: identifier = "a69"\> 新たな "\<noun: pronunciation = " すみか "\> 住み家 ← EXAMPLE 3
\</noun\>"\</noun phrase\> を \</adverb phrase\> 探して \</verb phrase\> 潜り込む、
\</verb\>\</adverb phrase\> といった \</adverb phrase\>\<adjective phrase: relation = "undefined"; word sense = "3ce6b4"\> 複雑な \</adjective phrase\>
動き \</noun phrase\> を \</adverb phrase\> する \</verb phrase\> ことが、
\</adverb phrase\>\<noun phrase: relation = "time"\> 近年 \</noun phrase\> 解明
されつつある。\</sentence\>\</paragraph\>\</document\>

FIG. 23

```
<document><sentence><adverb phrase: relation="time">During<noun phrase:
relation="essential"><adverb phrase: coreference="wsj">its</adverb phrase><adjective
phrase>centennial</adjective phrase>year</noun phrase>,</adverb phrase><proper
noun phrase: identifier="wsj"relation="subject">The Wall Street Journal</proper noun phrase>
will report<noun phrase: relation="object">events>adverb phrase>of<noun phrase>the past
century</noun phrase></adverb phrase><complementary sentence><noun phrase>that</noun
phrase>stand<adverb phrase: relation="essential">as<noun phrase>milestones<adverb phrase>
of<noun phrase>American business history</noun phrase></adverb phrase></noun phrase>
</adverb phrase></complementary sentence></noun phrase>.</sentence><sentence><noun
phrase: coreference="a3" relation="subject"><cardinal number phrase: type="integer"; value="3";
relation="essential">THREE</cardinal number phrase>COMPUTERS<complementary
sentence>THAT CHANGED<noun phrase: relation="object">the face<adverb phrase>of<noun
phrase>personal computing</noun phrase></adverb phrase></noun phrase></complementary
sentence></noun phrase>were launched<adverb phrase: relation="time">in<date phrase
identifier="a1977">1977</date phrase></adverb phrase></sentence><sentence><date phrase>
That year</date phrase><proper noun phrase: identifier="a3";syntax="parallel"; relation=
"subject">the<proper noun phrase: identifier="a2">Apple<noun phrase: pronunciation="two">
II</noun phrase></proper noun phrase>,<proper noun phrase: identifier="cp">Commodore
Pet</proper noun phrase>and<proper noun phrase: identifier="trs">Tandy TRS</proper noun
phrase></proper noun phrase>came<adverb phrase: relation="essential">to market</adverb
phrase>.</sentence><set of sentences to be read continuously><sentence><noun phrase:
coreference="a3"; relation="subject">The computers</noun phrase>were<adjective phrase:
identifier="a87";relation="essential">crude</adjective phrase><adverb phrase>by<noun
phrase><adverb phrase>today's</adverb phrase>standards</noun phrase></adverbphrase>,
</sentence><sentence: identifier="a222" relation="example"><noun phrase:
dentifier="aonrs" relation="subject"><proper noun phrase:
coreference="a2">Apple<noun: pronunciation="two">II
</noun></proper noun phrase>owners</noun phrase><adjective phrase: relation=
"undefined">,for exampe,</adverb phrase><verb: syntax=
"parallel"><verb phrase>had to use<noun phrase: relation="object"><adverb phrase:
coreference="aonrs">their</adverb phrase>television sets</noun phrase><adverb
phrase>as screens</adverb phrase></verb phrase>and<verb phrase>stored<noun
phrase: relation="object">data</noun phrase><adverb phrase: relation="indirect object">
on audiocassettes</adverb phrase></verb phrase></verb>.</sentence></set of sentences
to be read continuously></document>
```

EXAMPLE 4 (pointing to "Apple<noun: pronunciation="two">II")

FIG. 24A

¥Com=Lang=JPN¥¥Pau=100¥¥Com=begin_s¥ [¥Pau=50¥¥
Com=begin_ph¥ 素敵にエイジング] / 8 ¥Pau=100¥¥
Com=begin_s¥¥Pau=50¥¥Com=begin_ph¥ ガン転移、抑えら
れる！？

FIG. 24B

¥Pau=500¥¥Com=begin_p¥¥Pau=100¥¥Com=begin_s¥¥Pau=50¥¥
Com=begin_ph¥ この転移、¥Pau=50¥¥Com=begin_ph¥ ガン細胞が増
えるだけでは発生しない。¥Pau=100¥¥Com=begin_s¥¥Pau=50¥¥
Com=begin_ph¥ がん細胞が ¥Pau=50¥¥Com=begin_ph¥ 細胞と ¥
Pau=50¥¥Com=begin_ph¥ 細胞の間にある ¥Pau=50¥¥
Com=begin_ph¥ 蛋白質などを溶かし、¥Pau=50¥¥Com=begin_ph¥ 自
分の進む道をつくって、¥Pau=50¥¥Com=begin_ph¥ 血管や ¥
Pau=50¥¥Com=begin_ph¥ りんぱかんに入り込む。¥Pau=100¥¥
Com=begin_s¥¥Pau=50¥¥Com=begin_ph¥ 循環しながら Pau=50¥¥
Com=begin_ph¥¥ 新たな"すみか"を探して潜り込む、といった ¥
Pau=50¥¥Com=begin_ph¥ 複雑な動きをすることが、¥Pau=50¥¥
Com=begin_ph¥ 近年解明されつつある。

FIG. 25

¥Com=Lang=ENG¥¥Pau=100¥¥=Com=begin_s¥¥Com=Vol=0¥¥Pau=50¥
¥Com=begin_ph¥During¥Pau=50¥¥Com=begin_ph¥its ¥Pau=50¥¥
Com=begin_ph¥centennial year, ¥Pau=50¥¥Com=begin_ph¥The
Wall Street Journal will report ¥Pau=50¥¥Com=begin_ph¥
events¥Pau=50¥¥Com=begin_ph¥of ¥Pau=50¥¥Com=begin_ph¥
the past century ¥Pau=50¥¥Com=begin_ph¥that stand ¥
Pau=50¥¥Com=begin_ph¥as ¥Pau=50¥¥Com=begin_ph¥
milestones ¥Pau=50¥¥Com=begin_ph¥of ¥Pau=50¥¥
Com=begin_ph¥American business history.
¥Pau=100¥¥Com=begin_s¥¥Com=Vol=80¥¥Pau=50¥¥
Com=begin_ph¥THREE COMPUTERS THAT CHANGED ¥Pau=50¥¥
Com=begin_ph¥the face ¥Pau=50¥¥Com=begin_ph¥ of ¥Pau=50¥¥
¥Com=begin_ph¥personal computing were launched ¥Pau=50¥
¥Com=begin_ph¥ in ¥Pau=50¥¥Com=begin_ph¥1977.
¥Pau=100¥¥Com=begin_s¥¥Com=Vol=80¥¥Pau=50¥¥
Com=begin_ph¥That year ¥Pau=50¥¥Com=begin_ph¥the ¥
Pau=50¥¥Com=begin_ph¥Apple ¥Pau=50¥¥Com=begin_ph two, ¥
Pau=50¥¥Com=begin_ph¥Commodore Pet and ¥Pau=50¥¥
Com=begin_ph¥Tandy TRS came ¥Pau=50¥¥Com=begin_ph¥to
market.
¥Pau=100¥¥Com=begin_s¥¥Com=Vol=80¥¥Pau=50¥¥
Com=begin_ph¥The computers were ¥Pau=50¥¥Com=begin_ph¥
crude ¥Pau=50¥¥Com=begin_ph¥by ¥Pau=50¥¥Com=begin_ph¥
today's standards. ¥Pau=100¥¥Com=begin_s¥¥Com=Vol=0¥¥
Pau=50¥¥Com=begin_ph¥Apple two owners ¥Pau=50¥¥
Com=begin_ph¥, for example, ¥Pau=50¥¥Com=begin_ph¥had to
use ¥Pau=50¥¥Com=begin_ph¥their television sets ¥
Pau=50¥¥Com=begin_ph¥as screens and ¥Pau=50¥¥
Com=begin_ph¥stored ¥Pau=50¥¥Com=begin_ph¥data ¥Pau=50¥
¥Com=begin_ph¥on audiocassettes.

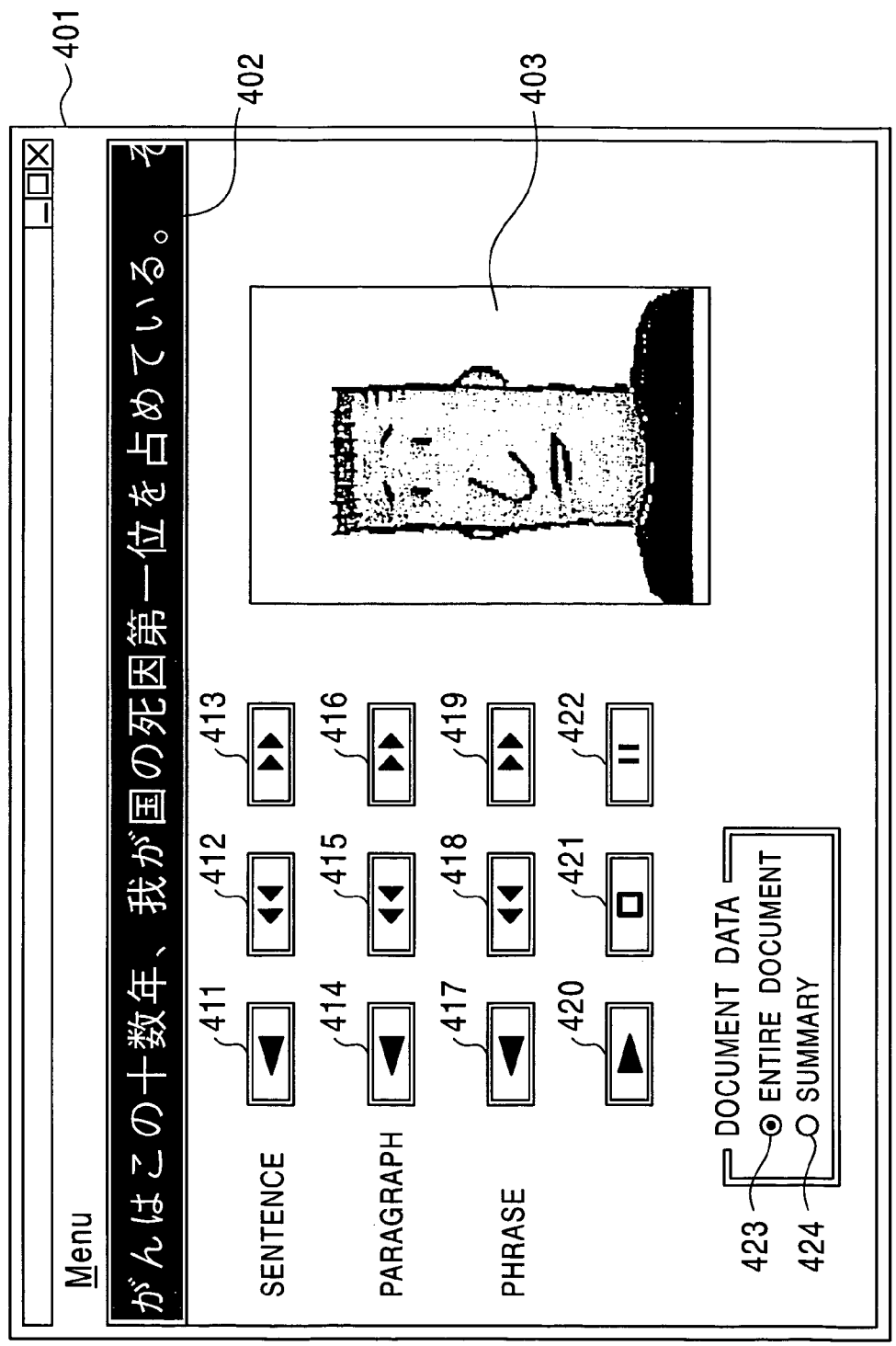

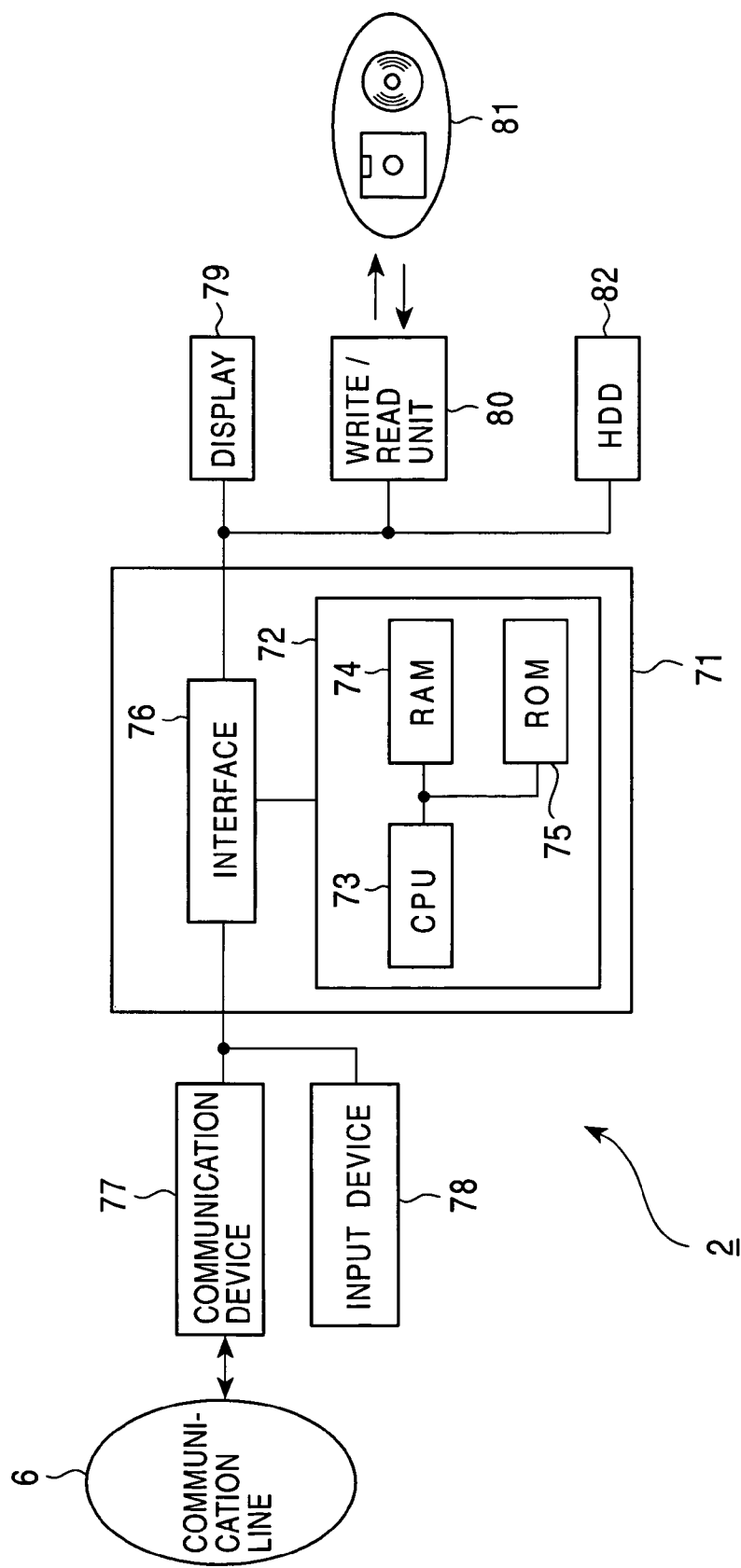

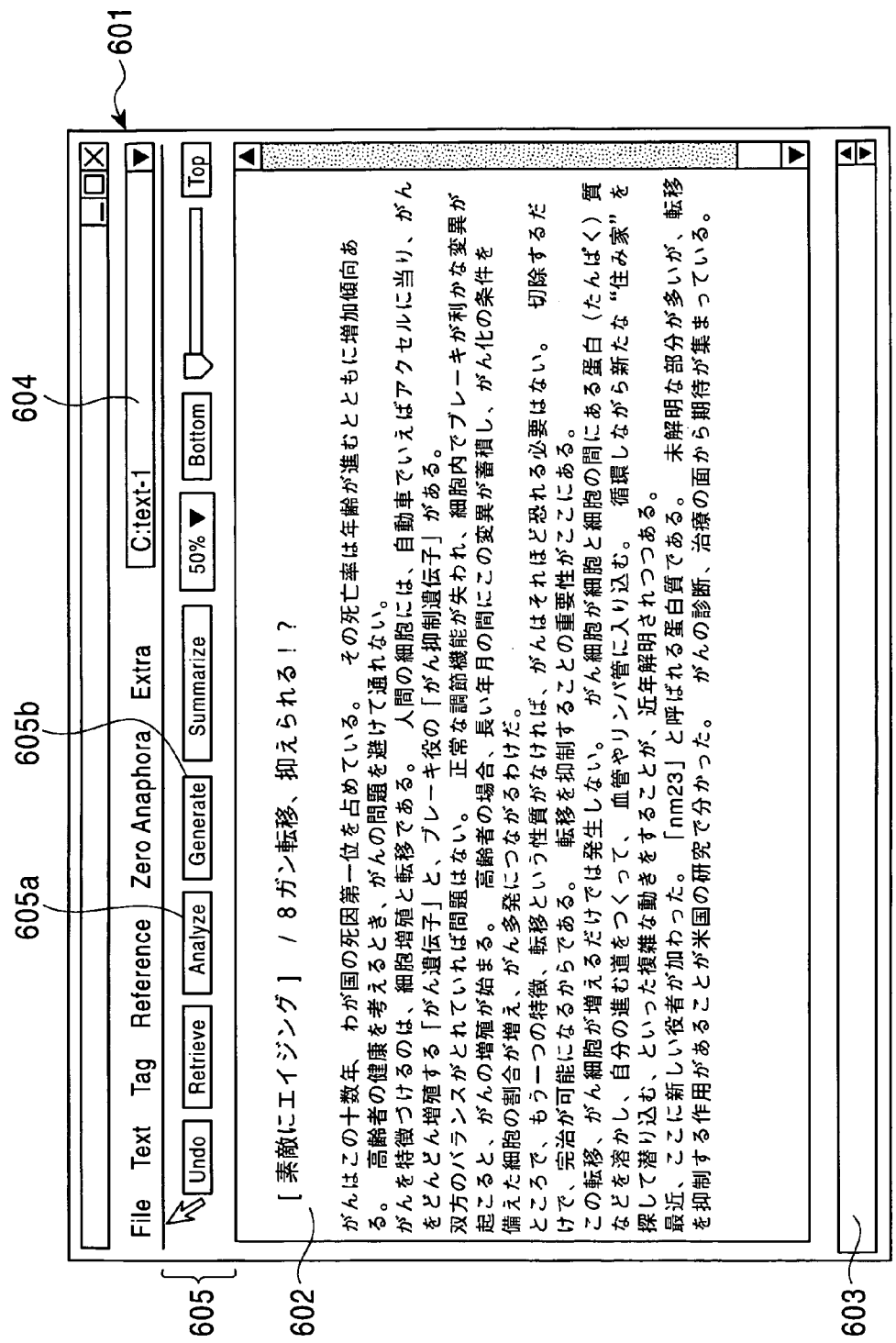

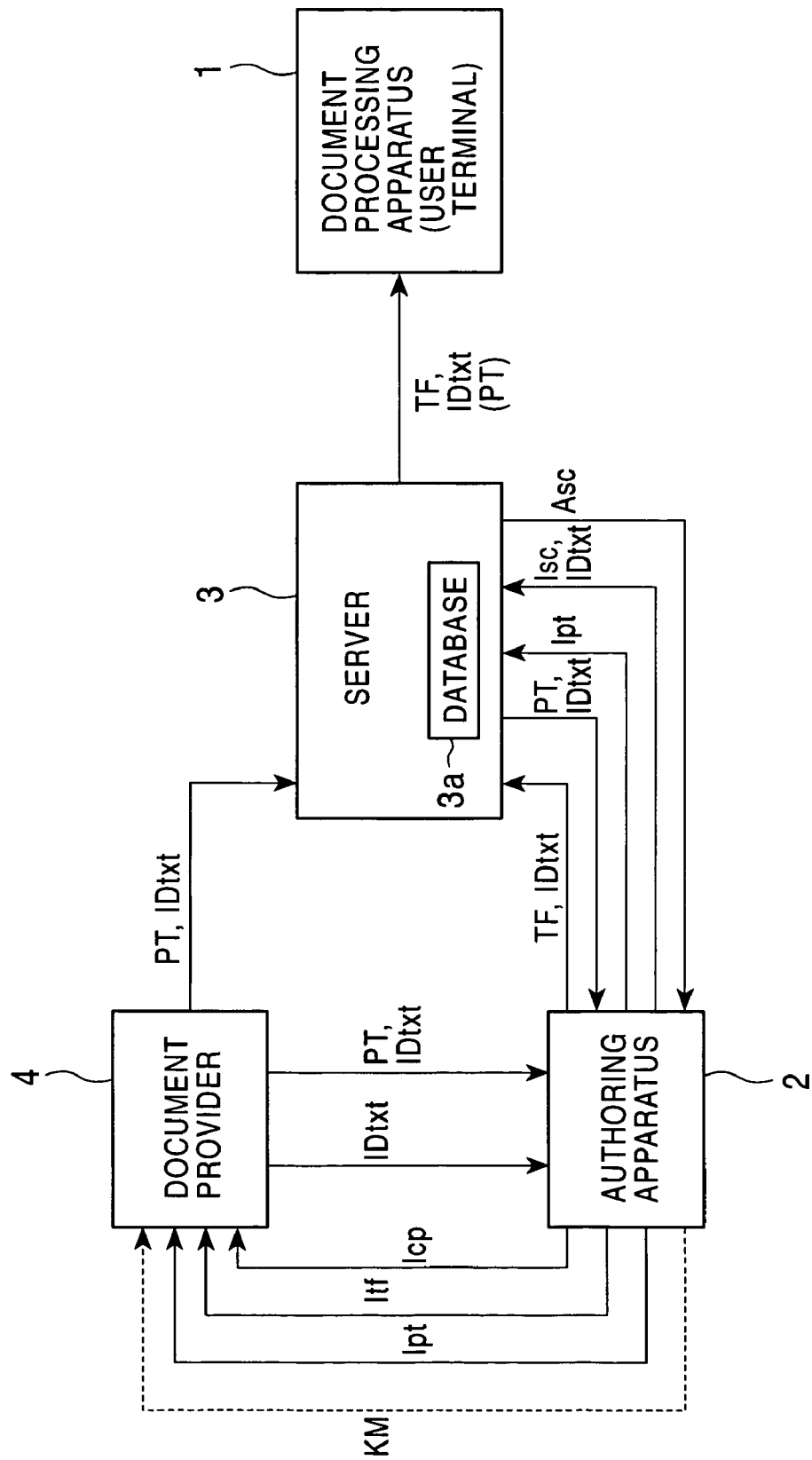

DOCUMENT PROCESSING SYSTEM

BACKGROUND OF THE INVENTION

1. Field of the Invention

The present invention relates to a document processing system.

2. Description of the Related Art

WWW (World Wide Web) is widely used to supply hypertext information via the Internet.

The WWW is a system that allows electronic document to be treated in a new manner, that is, generated, processed, disclosed, and used in common. However, from the point of view of practically using documents, the WWW has a limitation in the capability of processing documents. Thus, there is a need for a higher-level document processing technique such as categorization or summarization of documents. In order to realize such high-level document processing, it is necessary to automatically process the contents of documents.

However, such automatic processing of the contents of documents has difficulties as described below.

Firstly, the HTML (Electronic Markup Language) prescribes the manner of representing documents, but does not prescribe the contents of the documents. Secondly, it is not necessarily easy for users to understand the contents of documents that are linked to one another via a hypertext network. Thirdly, authors usually write documents without bearing in mind the convenience of readers, and no adjustment is made as to the difference in convenience between authors and readers.

Although the WWW is a new electronic documentation system having various advantages, the WWW is not capable of performing high-level document processing which needs additional automatic processing. In other words, in order to realize the high-level document processing, it is required to automatically process documents.

To the above end, stems for assisting in automatically processing a document have been developed on the basis of natural language processing technology. One such method is to automatically process a document according to tags which have been attached, by the author of the document or other person, to the document so as to represent attribute information about the internal structure of the document.

In recent years, computers have become increasingly popular, and many computers are connected to one another via a network. As a result, there occurs a need for a higher-level document processing technique to perform generation of a text document, labeling, and a modification of a text document, in accordance with an index depending upon the content of a document. More specifically, there is a need for a technique to summarize or categorize a document in response to a request issued by a user.

To the above end, document data or a document file supplied to a user should include information required to process the document data. Thus, there is a need for an authoring technique for generating document data including such information. The authoring technique should be easily used not only by users having high-level knowledge but also general users who do not have high-level knowledge.

It is desired to realize a document processing system capable of easily and efficiently providing document data produced by an authoring process to general users.

It is also desired to realize a document providing system capable of providing document data related to a certain document or in a particular category specified by a user.

SUMMARY OF THE INVENTION

In view of the above, it is an object of the present invention to provide a document processing system capable of easily providing document data in a category or of a type specified by a user.

According to an aspect of the present invention, there is provided a document processing system comprising a terminal device and a document providing device, the terminal device comprising: categorizing means for categorizing an electronic document into one of categories according to a characteristic of the electronic document; communication means for communicating with the document providing device; specification information input means for specifying an electronic document categorized in one of the categories or specifying one of the categories; and control means for controlling the communication means so as to transmit, to the document providing device, an electronic document specified by the specification information input means or characteristic information indicating the characteristic of a category specified by the specification information input means, the document providing device comprising: a database for storing a plurality of electronic documents; retrieval means for retrieving a desired electronic document from the electronic documents stored in the database; communication means for communicating with the terminal device; and control means for controlling the communication means and the retrieval means such that when the communication means receives the characteristic information, the retrieval means retrieves an electronic document related to the characteristic information from the electronic documents stored in the database, and the communication means transmits information associated with the retrieved electronic document to the terminal device.

In this document processing system according to the present invention, the control means of the terminal device preferably transmits an electronic document specified by the specification information input means or characteristic information indicating the characteristic of a category specified by the specification information input means together with an identifier of the specified electronic document or category to the document providing device via the communication means.

Preferably, the control means of the document providing device transmits an electronic document itself extracted by retrieval, as the information associated with the retrieved electronic document, to the terminal device via the communication means.

Alternatively, the control means of the document providing device may transmit a list of electronic documents extracted by retrieval, as the information associated with the retrieved electronic document, to the terminal device via the communication means.

Preferably, the terminal device further comprises electronic document specifying means for, when the list is received via the communication means, inputting electronic document specifying information to specify a particular electronic document of those included in the list, and the control means of the terminal device transmits the electronic document specifying information input via the electronic document specifying means to the document providing device via the communication means.

Preferably, the control means of the document providing device transmits an electronic document specified by the electronic document specifying information received from the terminal device to the terminal device via the communication means.

Preferably the control means of the document providing device produces the list such that electronic documents retrieved by the retrieval means from the database are all included in the list, and the control means transmits the list to the terminal device via the communication means.

Alternatively, the control means of the document providing device may produce the list such that electronic documents retrieved by the retrieval means from the database are partially included in the list, and the control means transmits the list to the terminal device via the communication means.

The control means of the document providing device may produce the list such that a full or partial set of electronic documents retrieved by the retrieval means from the database is sorted and the resultant sorted set of electronic documents is included in the list, and the control means transmits the list to the terminal device via the communication means.

Preferably, the categorizing means temporarily determines a category in which the electronic document received from the document providing device is to be categorized, in accordance with the characteristic of the electronic document. If the temporarily-determined category is the same as the category specified by the specification information input means or as the category to which the specified electronic document belongs, the categorizing means categorizes the electronic document received from the document providing device into that category. On the other hand, if the category determined is different from the category specified by the specification information input means or from the category to which the specified electronic document belongs, the categorizing means categorizes the electronic document received from the document providing device into a category in accordance with an instruction given by a user.

Preferably, when the categorizing means categories the electronic document received from the document providing device into a category, the categorizing means updates category information.

Preferably, the document providing device further comprises accounting means for, when the document providing device transmits the electronic document to the terminal device, performing an accounting process associated with the fee to the terminal device.

According to another aspect of the present invention, there is provided a terminal device comprising: categorizing means for categorizing an electronic document into one of categories according to a characteristic of the electronic document; communication means for communicating with a document providing device; specification information input means for specifying an electronic document categorized in one of the categories or specifying one of the categories; and control means for controlling the communication means so as to transmit, to the document providing device, an electronic document specified by the specification information input means or characteristic information indicating the characteristic of a category specified by the specification information input means.

In this terminal device according to the present invention, the control means preferably transmits an electronic document specified by the specification information input means or characteristic information indicating the characteristic of a category specified by the specification information input means together with an identifier of the specified electronic document or category to the document providing device via the communication means.

The terminal device preferably further comprises electronic document specifying means for, when a list of electronic documents retrieved in accordance with the characteristic information is received from the document providing device via the communication means, inputting electronic document specifying information to specify a particular electronic document of those included in the list, and the control means preferably transmits the electronic document specifying information input via the electronic document specifying means to the document providing device via the communication means.

Preferably, the categorizing means temporarily determines a category in which the electronic document received from the document providing device is to be categorized, in accordance with the characteristic of the electronic document, if the category determined is the same as the category specified by the specification information input means or as the category to which the specified electronic document belongs, the categorizing means categorizes the electronic document received from the document providing device into the category, On the other hand, if the category determined is different from the category specified by the specification information input means or from the category to which the specified electronic document belongs, the categorizing means categorizes the electronic document received from the document providing device into a category in accordance with an instruction given by a user.

Preferably, when the categorizing means categories the electronic document received from the document providing device into a category, the categorizing means updates category information.

According to still another aspect of the present invention, there is provide a document providing device comprising: a database for storing a plurality of electronic documents; retrieval means for retrieving a desired electronic document from the electronic documents stored in the database; communication means for communicating with a terminal device; and control means for controlling the communication means and the retrieval means such that when the communication means receives characteristic information from the terminal device, the retrieval means retrieves an electronic document related to the characteristic information from the electronic documents stored in the database, and the communication means transmits information associated with the retrieved electronic document to the terminal device.

In this document providing device according to the invention, the control means preferably transmits an electronic document itself extracted by retrieval, as the information associated with the retrieved electronic document, to the terminal device via the communication means.

Alternatively, the control means may transmit a list of electronic documents extracted by retrieval, as the information associated with the retrieved electronic document, to the terminal device via the communication means.

Preferably, when electronic document specifying information which specifies a particular electronic document of the electronic documents included in the list is received from the terminal device, the control means transmits the electronic document specified by the electronic document specifying information to the terminal device via the communication means.

Preferably, the control means produces the list such that electronic documents retrieved by the retrieval means from the database are all included in the list, and the control means transmits the list to the terminal device via the communication means.

Alternatively, the control means may produce the list such that electronic documents retrieved by the retrieval means from the database are partially included in the list, and the control means transmits the list to the terminal device via the communication means.

The control means may produce the list such that a full or partial set of electronic documents retrieved by the retrieval means from the database is sorted and the resultant sorted set of electronic documents is included in the list, and the control means transmits the list to the terminal device via the communication means.

The document providing device may further comprise accounting means for, when the document providing device transmits the electronic document to the terminal device, performing an accounting process associated with the fee to the terminal device.

According to still another aspect of the present invention, there is provide a document processing method, comprising the steps of: categorizing electronic documents into a plurality of categories in accordance with the characteristic of the respective electronic documents; requesting specifying an electronic document categorized in one of the categories or specifying of one of the categories; and transmitting, to a document providing device, an electronic document or characteristic information indicating the characteristic of a category, specified in response to the request in the requesting step.

In the transmission step of this document processing method according to the present invention, a specified electronic document or characteristic information indicating the characteristic of a specified category is preferably transmitted together with an identifier of the specified electronic document or category to the document providing device.

The document processing method may further comprise the steps of: requesting, when a list of electronic documents retrieved in accordance with the characteristic information is received from the document providing device, inputting of electronic document specifying information which specifies a particular electronic document of those included in the list; and transmitting, to the document providing device, the electronic document specifying information input in response to the request.

Preferably, in the categorizing step, a category, in which the electronic document received from the document providing device is to be categorized, is temporarily determined in accordance with the characteristic of the electronic document, and furthermore, if the temporarily-determined category is the same as the category specified in response to the specifying request or as the category to which the specified electronic document belongs, the electronic document received from the document providing device is categorized into the category, however, if the temporarily-determined category is different from the category specified in response to the specifying request or from the category to which the specified electronic document belongs, the electronic document received from the document providing device is categorized into a category in accordance with an instruction given by a user.

Preferably, in the categorizing step, when the electronic document received from the document providing device is categorized into a category, category information is updated.

According to still another aspect of the present invention, there is provided a document processing method comprising the steps of: when characteristic information of an electronic document or a category is received, retrieving an electronic document related to the characteristic information from a plurality of electronic documents stored in a database; and transmitting information associated with the electronic document retrieved in the retrieving step.

In the transmission step of this document processing method, the electronic document itself extracted by retrieval may be transmitted, as the information associated with the retrieved electronic document, to the terminal device.

Alternatively, in the transmission step, a list of electronic documents extracted by retrieval may be transmitted, as the information associated with the retrieved electronic document, to the terminal device.

Preferably, in the transmission step, when electronic document specifying information which specifies a particular electronic document of the electronic documents included in the list is received from the terminal device, the electronic document specified by the electronic document specifying information is transmitted to the terminal device.

In the transmission step, the list may be produced such that electronic documents retrieved from the database in the retrieving step are all included in the list, and the list is transmitted to the terminal device.

Alternatively, in the transmission step, the list may be produced such that electronic documents retrieved from the database in the retrieving step are partially included in the list, and the list is transmitted to the terminal device.

In the transmission step, the list may be produced such that a full or partial set of electronic documents retrieved from the database in the retrieving step is sorted and the resultant sorted set of electronic documents is included in the list, and the list is transmitted to the terminal device.

The document processing method may further comprise an accounting step for, when the electronic document is transmitted to the terminal device, performing an accounting process associated with the fee to the terminal device.

According to still another aspect of the present invention, there is provided a storage medium including a computer-controllable operation control program stored thereon, the program comprising the steps of: categorizing electronic documents into a plurality of categories in accordance with the characteristic of the respective electronic documents;

requesting specifying an electronic document categorized in one of the categories or specifying of one of the categories; and transmitting, to a document providing device, an electronic document or characteristic information indicating the characteristic of a category, specified in response to the request in the requesting step.

According to still another aspect of the present invention, there is provided a storage medium including a computer-controllable operation control program stored thereon, the program comprising the steps of: when characteristic information of an electronic document or a category is received, retrieving an electronic document related to the characteristic information from a plurality of electronic documents stored in a database; and transmitting information associated with the electronic document retrieved in the retrieving step.

According to still another aspect of the present invention, there is provided a document processing system comprising: a document providing unit for providing an electronic document; an authoring unit; and a document server including a database for storing the electronic document and an identifier of the electronic document, the document providing unit comprising transmission means for transmitting a set of the electronic document and the identifier or only the identifier to the authoring unit, the authoring unit comprising: a receiver; a transmitter; authoring means for adding to the electronic document a tag indicating the structure of the electronic document thereby producing a tagged electronic document; and control means for controlling the authoring means, the transmitter and the receiver such that when the set of the electronic document and the identifier or only the identifier is received via the receiver, the control means controls the authoring means, the transmitter and the receiver depending upon the content of the received data so as to store the tagged electronic document associated with the electronic document in the database of the document server.

In this document processing system according to the present invention, it is preferable that when the receiver receives the set of the electronic document and the identifier, the control means control the authoring means so as to add a tag to the electronic document thereby producing a tagged electronic document and transmits the tagged electronic document to the document server via the transmitter.

Preferably, when the receiver receives only the identifier, the control means determines whether a tagged electronic document indicated by the received identifier is stored in the database, and if the tagged electronic document is stored in the database, the controller transmits, to the document providing unit, data indicating that the tagged electronic document corresponding to the identifier is already present in the database.

Preferably, when the receiver receives only the identifier, the control means determines whether an electronic document or a tagged electronic document indicated by the received identifier is stored in the database, and if neither is stored in the database, the controller transmits data via the transmitter to the document providing unit to request transmission of the electronic document indicated by the identifier.

Preferably, when the receiver receives only the identifier, the control means determines whether an electronic document indicated by the received identifier is stored in the database, and if the electronic document is stored in the database, the controller transmits data via the transmitter to the document server to request transmission of the electronic document indicated by the identifier.

Preferably, the authoring unit further comprises accounting means for, when the authoring means has performed an authoring process, performing an accounting process associated with the fee to the document providing unit.

According to still another aspect of the present invention, there is provided an authoring apparatus comprising: a receiver; a transmitter; authoring means for adding to the electronic document a tag indicating the structure of the electronic document thereby producing a tagged electronic document; and control means for controlling the authoring means, the transmitter and the receiver in such a manner that when a set of an electronic document and an associated identifier or only an identifier is received via the receiver, the control means controls the authoring means, the transmitter and the receiver depending upon the content of the received data such that a tagged electronic document associated with the electronic document is transmitted via the transmitter to a document server having a database and the tagged electronic document is stored in the database.

Preferably, when the receiver receives the set of the electronic document and the identifier, the control means controls the authoring means so as to add a tag to the electronic document thereby producing a tagged electronic document and transmits the tagged electronic document to the document server via the transmitter.

Preferably, when the receiver receives only the identifier, the control means determines whether a tagged electronic document indicated by the received identifier is stored in the database, and if the tagged electronic document is stored in the database, the controller transmits to the document providing unit data indicating that the tagged electronic document corresponding to the identifier is already present in the database.

Preferably, when the receiver receives only the identifier, the control means determines whether an electronic document or a tagged electronic document indicated by the received identifier is stored in the database, and if neither is stored in the database, the controller transmits data via the transmitter to the document providing unit to request transmission of the electronic document indicated by the identifier.

Preferably, when the receiver receives only the identifier, the control means determines whether an electronic document indicated by the received identifier is stored in the database, and if the electronic document is stored in the database, the controller transmits data via the transmitter to the document server to request transmission of the electronic document indicated by the identifier.

Preferably, the authoring unit further comprises accounting means for, when the authoring means has performed an authoring process, performing an accounting process associated with the fee to the document providing unit.

According to still another aspect of the present invention, there is provided a document processing method for a document processing system comprising a document providing unit for providing an electronic document, an authoring unit, and a document server including a database for storing the electronic document and an identifier of the electronic document, the method comprising the steps of: transmitting a set of the electronic document and the identifier or only the identifier to the authoring unit from the document providing unit; when the set of the electronic document and the identifier or only the identifier is transmitted to the authoring unit in the transmission step, performing, in the authoring unit, an authoring process depending upon the content of the data transmitted to the authoring unit such that a tagged electronic document associated with the electronic document is stored in the database of the document server.

Preferably, when a set of the electronic document and the identifier is transmitted to the authoring unit in the transmission step, the authoring step adds a tag to the received electronic document thereby producing a tagged electronic document and transmits the produced tagged electronic document to the document server.

Preferably, when only the identifier is transmitted to the authoring unit in the transmission step, the authoring step determines whether a tagged electronic document indicated by the received identifier is stored in the database, and if the tagged electronic document is stored in the database, data indicating that the tagged electronic document corresponding to the identifier is already present in the database is transmitted to the document providing unit.

Preferably, when only the identifier is transmitted to the authoring unit in the transmission step, the authoring step determines whether an electronic document or a tagged electronic document indicated by the received identifier is stored in the database, and if neither is stored in the database, data is transmitted to the document providing unit to request transmission of the electronic document indicated by the identifier.

Preferably, when only the identifier is transmitted to the authoring unit in the transmission step, the authoring step determines whether an electronic document indicated by the received identifier is stored in the database, and if the electronic document is stored in the database, data is transmitted to the document server to request transmission of the electronic document indicated by the identifier.

The document processing method may further comprise the step of, when the authoring step has been performed the authoring process and the tagged electronic document associated with the electronic document of interest has been stored in the database of the document server, performing an accounting process associated with the fee to the document providing unit.

According to still another aspect of the present invention, there is provided a storage medium including a computer-controllable program stored thereon, the program comprising the steps of: adding to an electronic document a tag indicating the structure of the electronic document thereby producing a tagged electronic document; and when a set of an electronic document and an associated identifier or only an identifier is received from a document providing unit, performing an authoring process depending upon the content of the received data such that a tagged electronic document associated with the electronic document is transmitted to a document server having a database and the tagged electronic document is stored in the database.

According to still another aspect of the present invention, there is provided a document processing system comprising a user terminal, an authoring unit for producing a tagged electronic document by adding to an electronic document a tag indicating the structure of the electronic document, and a service providing unit including a database for storing an electronic document or a tagged electronic document, the user terminal comprising: a transmitter; control means for transmitting, to the service providing unit via the transmitter, specification information specifying an electronic document and request information indicating a request for a tagged electronic document including a tag indicating the structure of the electronic document specified by the request information; and a receiver for receiving the tagged electronic document transmitted from the service providing unit; the service providing unit comprising: a receiver; a transmitter; data presence detecting means for determining, when the receiver receives the request information, whether the database includes the tagged electronic document of the electronic document specified by the specification information; and control means for, when the data presence detecting means has determined that the database includes the tagged electronic document of the electronic document specified by the specification information, reading the tagged electronic document from the database and transmitting it to the user terminal via the transmitter.

Preferably, when the data presence detecting means determines that the database includes the electronic document specified by the specification information, the control means of the service providing unit requests via the transmitter the authoring unit to produce a tagged electronic document of the electronic document, and when the tagged electronic document is received from the authoring unit via the receiver, the control means of the service providing unit transmits the tagged electronic document to the user terminal via the transmitter.

Preferably, when the data presence detecting means determines that the database includes neither the electronic document specified by the specification information nor the tagged electronic document of the electronic document, the control means of the service providing unit transmits an error notification to the user terminal via the transmitter.

Preferably, the database includes electronic documents or tagged electronic documents together with their associated identifiers, and the control means of the user terminal transmits the identifier as the specification information specifying an electronic document to the service providing unit via the transmitter.

Preferably, the control means of the user terminal transmits a keyword included in an electronic document as the specification information specifying an electronic document to the service providing unit via the transmitter, and the data presence detecting means determines whether the database includes an electronic document or a tagged electronic document including the keyword.

Preferably, the control means of the user terminal is capable of transmitting an electronic document together with the request information to the service providing unit via the transmitter, and the control means of the service providing unit requests via the transmitter the authoring unit to produce an tagged electronic document of the electronic document received via the receiver, and when the tagged electronic document is received from the authoring unit via the receiver, the control means of the service providing unit transmits the tagged electronic document to the user terminal via the transmitter.

Preferably, the control means of the user terminal transmits, as the specification information specifying an electronic document, an identifier indicating an electronic document transmitted to the service providing unit from the user terminal, to the terminal providing unit via the transmitter.

Preferably, the service providing unit further comprises accounting means for, when the service providing unit transmits the tagged electronic document to the user terminal, performing an accounting process associated with the fee to the user terminal.

Preferably, the service providing unit further comprises accounting means for, when the service providing unit transmits the tagged electronic document to the user terminal, performing an accounting process associated with the fee to the user terminal, and when the tagged electronic document is transmitted, the accounting means charges to the user terminal the fee depending upon whether the authoring unit has performed an authoring process associated with the tagged electronic document.

Preferably, the database includes, together with the electronic documents, authoring permission/prohibition information indicating whether authoring of the respective electronic documents is permitted or prohibited.

According to still another aspect of the present invention, there is provided a terminal device comprising: a transmitter for transmitting information to a service providing device; control means for transmitting, to the service providing device via the transmitter, specification information specifying an electronic document and request information indicating a request for a tagged electronic document including a tag indicating the structure of the electronic document specified by the request information; and a receiver for receiving the tagged electronic document which is transmitted from the service providing device in response to the request information and the specification information.

Preferably, the control means transmits an identifier of an electronic document as the specification information specifying an electronic document to the service providing unit via the transmitter.

Preferably, the control means transmits a keyword included in an electronic document as the specification information specifying an electronic document to the service providing unit via the transmitter.

Preferably, the control means is capable of transmitting an electronic document together with the request information to the service providing device via the transmitter.

Preferably, the control means transmits, as the specification information specifying an electronic document, an identifier indicating an electronic document transmitted to the service providing device to the terminal providing device via the transmitter. According to still another aspect of the present invention, there is provided a service providing device comprising: a database for storing electronic documents or tagged electronic documents; a receiver for receiving, from a terminal device, specification information specifying an electronic document and request information indicating a request for a tagged electronic document including a tag indicating the structure of the electronic document specified by the request information; a transmitter; data presence detecting means for determining, when the receiver receives the request information, whether the database includes the tagged electronic document of the electronic document specified by the specification information; and control means for, when the data presence detecting means has determined that the database includes the tagged electronic document of the electronic document specified by the specification information, reading the tagged electronic document from the database and transmitting it to the terminal device via the transmitter.

Preferably, the transmitter and the receiver are capable of transmitting and receiving information to and from an authoring device, and when the data presence detecting means determines that the database includes the electronic document specified by the specification information, the control means requests via the transmitter the authoring device to produce a tagged electronic document of the electronic document, and when the tagged electronic document is received from the authoring device via the receiver, the control means transmits the tagged electronic document to the terminal device via the transmitter.

Preferably, when the data presence detecting means determines that the database includes neither the electronic document specified by the specification information nor the tagged electronic document of the electronic document, the control means transmits an error notification to the terminal device via the transmitter.

Preferably, the database includes electronic documents or tagged electronic documents together with their associated identifiers, and the data presence detecting means determines whether the database includes an electronic document or a tagged electronic document in accordance with an identifier transmitted as the specification information.

Preferably, the data presence detecting means determines whether the database includes an electronic document or a tagged electronic document in accordance with a keyword transmitted as the specification information.

Preferably, the transmitter and the receiver are capable of transmitting and receiving information to and from an authoring device, and the control means requests via the transmitter the authoring device to produce an tagged electronic document of an electronic document received from the terminal device via the receiver, and when the tagged electronic document is received from the authoring device via the receiver, the control means transmits the tagged electronic document to the terminal device via the transmitter.

The service providing device preferably further comprises accounting means for, when the tagged electronic document is transmitted to the terminal device, performing an accounting process associated with the fee to the terminal device.

Preferably, accounting means for, when the tagged electronic document is transmitted to the terminal device, performing an accounting process associated with the fee to the terminal device, and when the tagged electronic document is transmitted, the accounting means charges to the terminal device the fee depending upon whether the authoring unit has performed an authoring process associated with the tagged electronic document.

Preferably, the database includes, together with the electronic documents, authoring permission/prohibition information indicating whether authoring of the respective electronic documents is permitted or prohibited.

According to still another aspect of the present invention, there is provided a document processing method comprising the steps of: setting specification information to specify an electronic document; transmitting, to a service providing device, specification information set in the specification information setting step and request information indicating a request for a tagged electronic document including a tag indicating the structure of the electronic document specified by the request information; and receiving the tagged electronic document which is transmitted from the service providing device in response to the request information and the specification information.

Preferably, in the specification information setting step, the specification information is set using an identifier of an electronic document.

Preferably, in the specification information setting step, the specification information is set using a keyword included in an electronic document.

Preferably, in the transmission step, an electronic document is transmitted together with the request information to the service providing device.

Preferably, in the specification information setting step, the specification information is set using an identifier indicating an electronic document to be transmitted to the service providing device.

According to still another aspect of the present invention, there is provided a document processing method comprising the steps of: receiving, from a terminal device, specification information specifying an electronic document and request information indicating a request for a tagged electronic document including a tag indicating the structure of the electronic document specified by the request information; determining whether a database includes the tagged electronic document of the electronic document specified by the specification information received in the receiving step; and when it is determined in the determining step that the database includes the tagged electronic document of the electronic document specified by the specification information, reading the tagged electronic document from the database and transmitting it to the terminal device.

The document processing method preferably further comprises the steps of: when it is determined in the determining step that the database includes the electronic document specified by the specification information, requesting an authoring device to produce a tagged electronic document of the electronic document; and when the tagged electronic document is received from the authoring unit, transmitting the tagged electronic document to the terminal device.

The document processing method preferably further comprises the step of, when it is determined in the determining step that the database includes neither the electronic document specified by the specification information nor the tagged electronic document of the electronic document, transmitting an error notification to the terminal device.

Preferably, the database includes electronic documents or tagged electronic documents together with their associated identifiers, and furthermore, in the determining step, it is determined whether the database includes an electronic document or a tagged electronic document in accordance with an identifier received as the specification information.

Preferably, in the determining step, it is determined whether the database includes an electronic document or a tagged electronic document in accordance with a keyword received as the specification information.

The document processing method may further comprise the steps of: when an electronic document is received, in the receiving step, from the terminal device, requesting an authoring device to produce a tagged electronic document of the electronic document; and when the tagged electronic document is received from the authoring unit, transmitting the tagged electronic document to the terminal device.

The document processing method may further comprise the step of, when the tagged electronic document is transmitted to the terminal device, performing an accounting process associated with the fee to the terminal device.

The document processing method may further comprising the step of, when the tagged electronic document is transmitted, performing an accounting process associated with the fee to the terminal device depending upon whether the authoring unit has performed an authoring process associated with the tagged electronic document.

Preferably, the database includes, together with the electronic documents, authoring permission/prohibition information indicating whether authoring of the respective electronic documents is permitted or prohibited, and in the determining step, the authoring permission/prohibition information is used to determine whether an electronic document is included in the database.

According to still another aspect of the present invention, there is provided a storage medium including a computer-controllable program stored thereon, the program comprising the steps of: setting specification information to specify an electronic document; transmitting, to a service providing device, specification information set in the specification information setting step and request information indicating a request for a tagged electronic document including a tag indicating the structure of the electronic document specified by the request information; and receiving the tagged electronic document which is transmitted from the service providing device in response to the request information and the specification information.

According to still another aspect of the present invention, there is provided a storage medium including a computer-controllable program stored thereon, the program comprising the steps of: receiving, from a terminal device, specification information specifying an electronic document and request information indicating a request for a tagged electronic document including a tag indicating the structure of the electronic document specified by the request information; determining whether a database includes the tagged electronic document of the electronic document specified by the specification information received in the receiving step; and when it is determined in the determining step that the database includes the tagged electronic document of the electronic document specified by the specification information, reading the tagged electronic document from the database and transmitting it to the terminal device.

BRIEF DESCRIPTION OF THE DRAWINGS

FIGS. 12A and 12B are tables illustrating a categorization model according to the embodiment of the invention;

FIG. 16 is a table illustrating word sense relevance values according to the embodiment of the invention;

FIGS. 22A and 22B are schematic diagrams illustrating an example of a tag file according to the embodiment of the invention;

FIG. 23 is a schematic diagram illustrating an example of a tag file according to the embodiment of the invention;

FIGS. 24A and 24B are schematic diagrams illustrating an example of a reading-aloud file according to the embodiment of the invention;

FIG. 25 is a schematic diagram illustrating an example of a reading-aloud file according to the embodiment of the invention;

FIG. 26 is a schematic diagram illustrating a reading-aloud window according to the embodiment of the invention;

FIG. 27 is a block diagram illustrating an embodiment of an authoring apparatus according to the present invention;

FIGS. 29A and 29B are schematic diagrams illustrating an example of a plain text that is displayed on a display and that is to be subjected to the authoring process according to the embodiment of the invention;

FIG. 44 is a schematic diagram illustrating communication data transmitted in the document processing system according to the embodiment of the present invention;

DESCRIPTION OF THE PREFERRED EMBODIMENTS

The present invention is described in further detail below with reference to preferred embodiments.

First, the configuration of a document processing system according to a first embodiment is described. After that, a document processing apparatus is described, which serves, in the document processing system, as a part to which document data is provided. The data structure of document data is then described. Thereafter, described is an authoring apparatus for producing document data to be supplied to the document processing apparatus. The operation of the document processing system is then described.

Second and third embodiments are also be described in a similar manner to the first embodiment.

Specific items which will be described are listed below.

I First Embodiment

1. Configuration of Document Processing System
2. Configuration of Document Processing Apparatus (User Terminal)
3. Document Data Structure
4. Manual Categorization of Document Data
   4.1 Procedure
   4.2 Indexing
   4.3 Browsing, Generation of Categories, and Categorization
   4.4 Creation/Registration of the Categorization Model
5. Automatic Categorization of Document Data
   5.1 Procedure
   5.2 Automatic Categorization
6. Generation of Summary
7. Reading-aloud Process
8. Configuration of the Authoring Apparatus
9. Authoring Process
10. Operation of the Document Processing System (Authoring Request from the Document Provider)

II Second Embodiment

11. Configuration of Document Processing System
12. Operation of the Document Processing System (Authoring Process Performed In Response to a Request from the Document Processing Apparatus)

III Third Embodiment

13. Configuration of Document Processing System
14. Operation of the Document Processing System (Inverse Retrieving Process Performed In Response to a Request from the Document Processing Apparatus (#1))
15. Categorization after Inverse Retrieval
16. Operation of the Document Processing System (Inverse Retrieving Process Performed In Response to a Request from the Document Processing Apparatus (#2))

I First Embodiment

1. Configuration of Document Processing System

Figure 1:
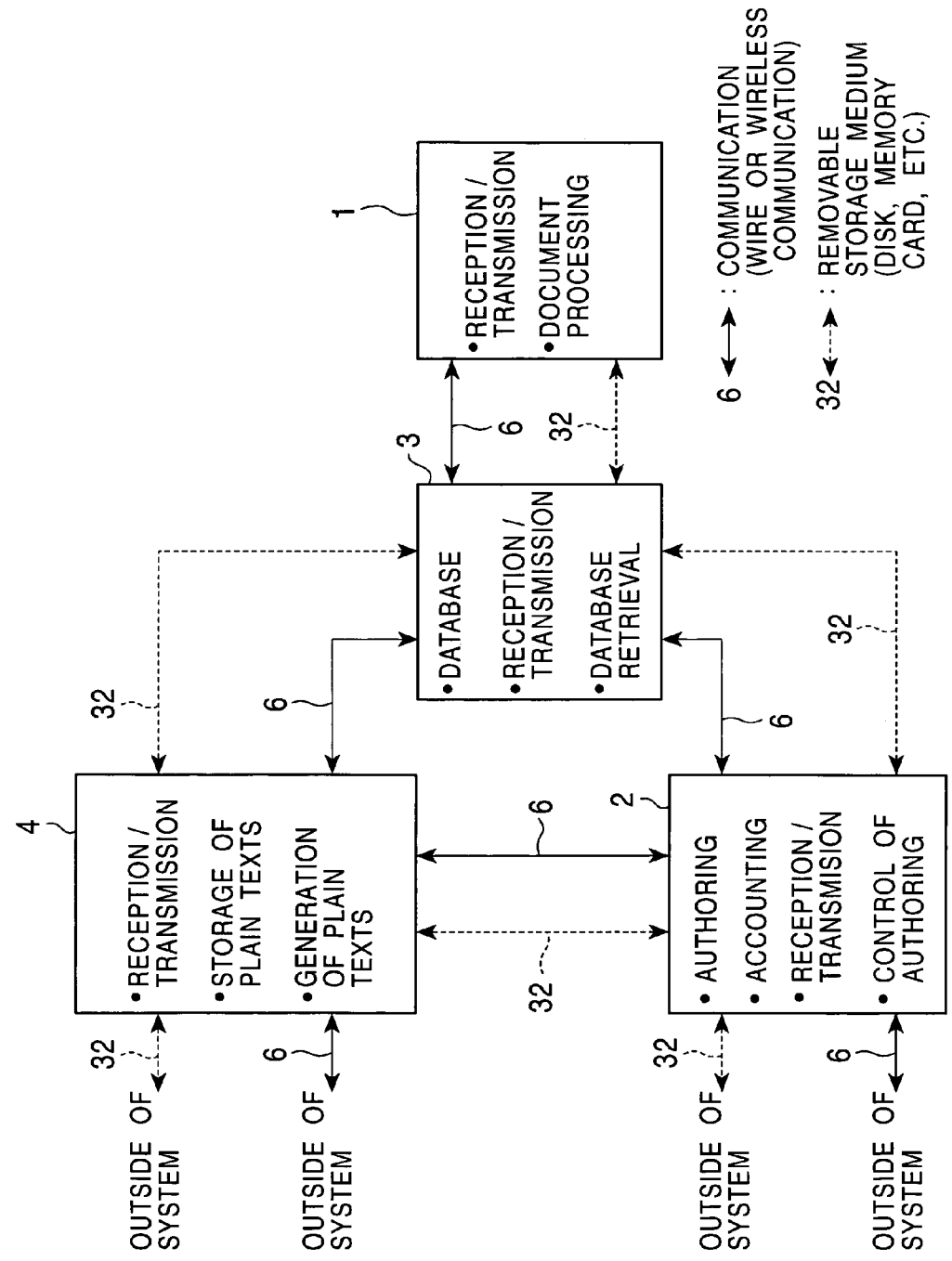
FIG. 1 is a block diagram illustrating an embodiment of a document processing system according to the present invention.

FIG. 1 illustrates an example of the configuration of a document processing system according to a first embodiment.

The document processing system of the present embodiment includes mainly a document processing apparatus 1, an authoring apparatus 2, a server 3, and a document provider 4.

The functions of the respective parts of the document processing system are shown in FIG. 1. As shown in FIG. 1, the document processing apparatus 1, the authoring apparatus 2, the server 3, and the document provider 4 all has the reception/transmission capability. As represented by solid lines or broken lines in FIG. 1, these parts are capable of transmitting and receiving information to and from each other.

Communication lines 6 represented by the solid lines in FIG. 1 may be a cable communication line (such as a public communication line, a private communication line, or the Internet) or a wireless communication line (such as a satellite communication line or a wireless telephone line).

The broken lines in FIG. 1 represent transmission of information via a removable storage medium 32. Specific examples of the storage medium 32 include a disk-shaped storage medium such as an optical disk, a magentooptical disk, and a magnetic disk, and other types of storage media such as a memory card including a flash memory and a tape medium.

Via the communication lines 6 or the storage media 32, the respective parts of the document processing system transmit electronic documents, tagged electronic documents, identifiers, and other various control data to each other.

In this embodiment, the authoring apparatus 2 produces a tagged electronic document by adding a tag to an electronic document. Herein, original documents including no tags are referred to as "plain texts", and the tagged electronic documents are referred to as "tag files".

The document provider 4 serves as a part for providing plain texts, that is, usual document data including no tags which will be described in detail later.

The document provider 4 has the capability of storing plain texts and transmitting a plain text to the server 3 or the authoring apparatus 2 via the communication line 6 or the storage medium 32.

The document provider 4 also has the capability of producing a document or a plain text. However, the document provider 4 is not necessarily required to have the capability of producing documents. That is, the essential role of the document provider 4 is to provide plain texts, and thus, the document provider 4 may provide plain texts which have been received from document producers outside the system via the communication line 6 or the storage medium 32.

The authoring apparatus 2 serves as a part for producing a tag file by performing an authoring process upon a plain text supplied from the document provider 4 or the server 3 via the communication line 6 or the storage medium 32.

The produced tag file is transmitted to the server 3 via the communication line 6 or the storage medium 32. The tag file received by the server 3 is stored in a database of the server 3.

In addition to the authoring process, the authoring apparatus 2 also issues a request for transmission of a plain text to be authored, receives the plain text, and issues a database retrieval request to the serer 3, as will be described in detail later. The authoring apparatus 2 also controls the transmission of the produced tag file to the server 3. These capabilities of the authoring apparatus 2 allow the authoring apparatus 2 to efficiently perform the authoring process.

Furthermore, the authoring apparatus 2 has the accounting capability so that when the authoring apparatus 2 has performed an authoring process, the authoring fee is charged to the document provider 4.

Although not shown in FIG. 1, the authoring apparatus 2 may have the capability of producing a document so that the authoring apparatus 2 can also produce a plain text instead of receiving the plain text from the document provider 4 and can produce a tag file by authoring the produced plain text.

The authoring apparatus 2 includes an operation control program for implementing the authoring, accounting, receiving/transmitting, and authoring controlling capabilities. The operation control program may be installed in advance in the authoring apparatus 2 or may be downloaded from the outside of the system via the communication line 7 or the storage medium 32.

In the case where the operation control program is supplied from the outside of the system, a general-purpose computer may be employed as the authoring apparatus.

The hardware configuration and the operation of the authoring apparatus 2 will be described later.

The server 3 has a database for storing plain texts received from the document provider 4 and also storing tag files received from the authoring apparatus 2.

The document data (tag files or plain texts) stored in the database is provided, under the control of the server 3, to the document processing apparatus 1 at a general user via a storage medium 32 such as a floppy disk or an optical disk or via the communication line 6.

The server 3 also has the capability of searching the database.

At the general user site, the document processing apparatus 1 having the capability of processing documents is used to perform various kinds of processing upon the document data provided from the server 3. This allows the user to obtain various kinds of high-level document information.

Note that FIG. 1 shows only one example of the system configuration, and a practical system may be configured in various different manners.

For example, the system may include a large number of document providers 4, authoring apparatus 2, and servers 3. Another example of the configuration is that the authoring apparatus 2 is built in the server 3.

2. Configuration of Document Processing Apparatus (User Terminal)

The document processing apparatus 1, which serves, in the document processing system, as a part to which document data is provided, is described in further detail below.

Figure 2:
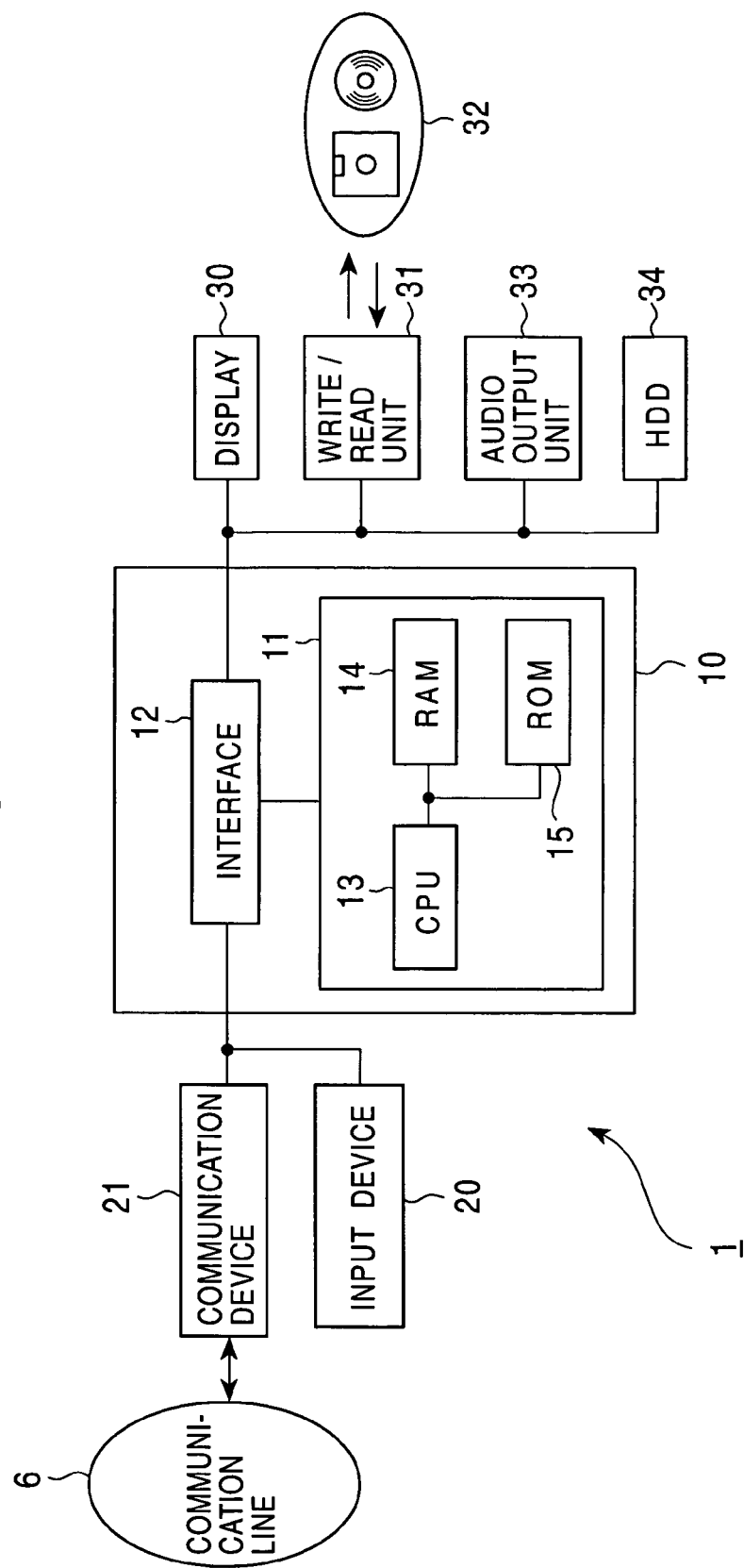
FIG. 2 is a block diagram illustrating an embodiment of a document processing apparatus according to the present invention.

As shown in FIG. 2, a document processing apparatus 1 includes a main unit 10 including a controller 11 and an interface 12, an input unit 20 used by a user to input data or a command to the main unit 10, a communication device 21 for transmitting and receiving a signal to or from an external device, a display unit 30 for displaying an output from the main unit 10, a write/read unit 31 for writing and reading information onto and from a recording medium 32, an audio output unit 33, and an HDD (hard disk drive) 34.

The main unit 10 including the controller 11 and the interface 12 serves as the core of the document processing apparatus 1.

The controller 11 includes a CPU 13 for processing a document, a RAM 14 serving as a volatile memory, and a ROM 15 serving as a nonvolatile memory.

The CPU 13 executes a program in accordance with a procedure stored in the ROM 15, wherein the CPU 13 temporarily stores data in the RAM 14 if necessary.

Operations performed by the controller 11 include, as will be described in detail later, categorization of given document data, summarization, generation of a file used to output data by voice, and document analysis required in the above operations. Programs and application software required for the above operations are stored in the ROM 15, the HDD 34, or the storage medium 32.

As described above, the document processing program used by the controller 11 may be stored in advance in the ROM 15 or may be loaded from the storage medium 32 or the HDD 34. Alternatively, the document processing program may be downloaded from an external server via the communication device 21 (communication line 6) and a network such as the Internet.

The interface 12 is connected to the controller 11, the input unit 20, the communication device 21, the display 30, the write/read unit 31, the audio output unit 33, and the HDD 34.

Under the control of the controller 11, the interface 12 inputs data via the input unit 20, inputs and outputs data from and to the communication device 21, outputs data to the display 30, inputs and outputs data from and to the write/read unit 31, output data to the audio output unit 33, and inputs and outputs data from and to the HDD 34. In the above operation, the interface 12 adjusts timing of inputting or outputting data between various parts described above and also converts data format as required.

The input unit 20 is used by a user to input data or a command to the document processing apparatus 1. The input unit 20 may include a keyboard and a mouse. Using the input unit 20, the user may enter a keyword via the keyboard. The user may also select, using the mouse, an element of an electronic document displayed on the display 30.

Hereinafter, electronic documents handled by the document processing apparatus 1 are also referred to simply as documents. Furthermore, the term "element" is used to describe various elements of a document. Elements include a document itself, a sentence, and a word.

The communication device 21 serves to receive a signal that is transmitted by an external apparatus to the document processing apparatus 1 via a communication line 6. The communication device 21 also serves to transmit a signal over the communication line 6.

If the communication device 21 receives one or more document data from an external apparatus such as a server 3, the communication device 21 transfers the received document data to the main unit 10. The communication device 21 also transmits data to an external apparatus via the communication line 6.

The display 30 serves as an output device of the document processing apparatus 1, for displaying characters and/or image information. The display 30 may include a cathode ray tube (CRT) or a liquid crystal display (LCD). The display 30 may display one or more windows in which characters and/or graphic images are displayed.

The write/read unit 31 serves to write and read data to and from a storage medium 32 such as a floppy disk or an optical disk.

Although in the present embodiment, a floppy disk (magnetic disk) or an optical disk is employed as the storage medium 32, other types of removable storage media such as a magnetooptical disk, a memory card, and a magnetic tape may also be employed. As for the write/read unit 31, a device (such as a disk drive or a card drive) adapted to writing/reading data to and from an employed medium may be used.

In the case where a document processing program to be used to process a document is stored on the storage medium 32, the write/read unit 31 may read the document processing program from the storage medium 32 and transfer it to the controller 11.

When document data is stored on the storage medium 32, the write/read unit 31 may read such a data from the storage medium 32 and transfer it to the controller 11. This provides another way for the document processing apparatus 1 to acquire document data.

Furthermore, after processing document data by the document processing apparatus 1, the controller 11 may store the resultant document data on the storage medium 32 using the write/read unit 31.

The audio output unit 33 serves as an output device of the document processing apparatus 1, for providing a voice output corresponding to a document.

More specifically, the audio output unit 33 outputs a voice signal synthesized by the controller 11 in accordance with document information (reading-aloud file) which will be described later. Thus, the audio output unit 33 forms together with the display 30 the output means of the document processing apparatus 2.

The HDD 34 serves as a mass storage device used by the document processing apparatus 1 to store a large amount of data. The HDD 34 writes and reads information under the control of the controller 11.

The HDD 34 is used to store various application programs such as a voice synthesis program executed by the controller 11. The HDD 34 may also be used to store document data input to the document processing apparatus 1.

3. Document Data Structure

The data structure of document data is described below. In the present embodiment, a document is processed in accordance with attribute information described by a tag attached to a document. Tags used in the present embodiment include a syntactic tag and a semantic/pragmatic tag wherein the syntactic tag indicates the structure of a document and the semantic/pragmatic tag makes it possible for a machine to understand the contents of documents written in various languages.

A syntactic tag may be used to described the internal structure of a document.

Figure 3:
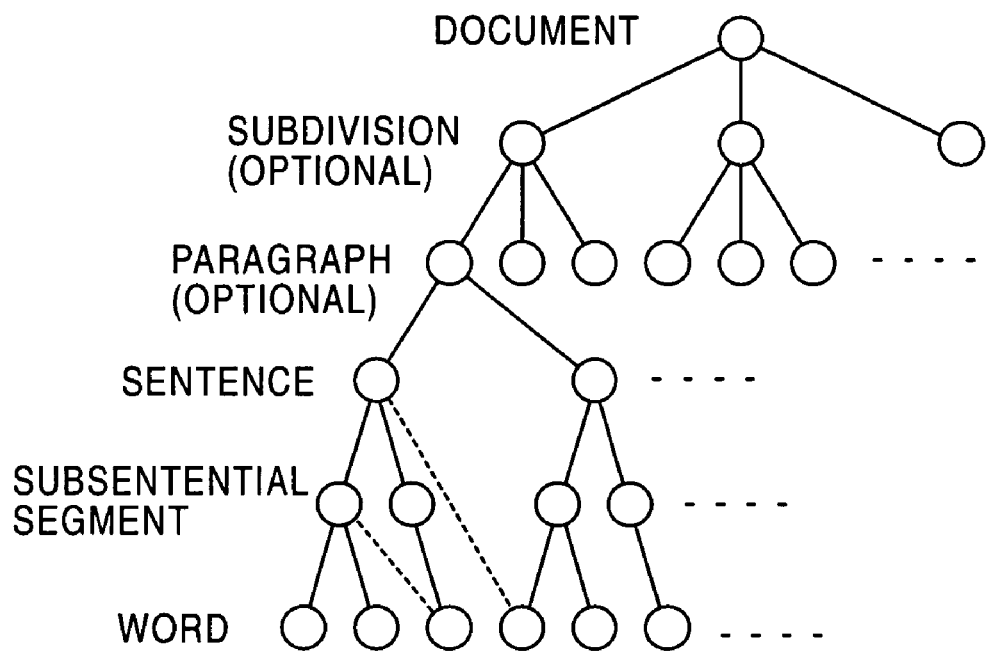
FIG. 3 is a schematic diagram illustrating a document structure employed in the embodiment of the invention.

The internal structure, to be represented by tags, includes elements such as a document, sentences, and words which are linked to one another by normal links or reference links, as shown in FIG. 3.

In FIG. 2, open circles represent elements. Open circles at the bottom represent elements in the lowest level in a document. Solid lines represent normal links indicating direct connections between elements such as sentences or words. Broken lines represent reference links indicating dependence between elements.

The internal structure of a document is composed of, in order from the highest level to the lowest level, a document, a subdivision, a paragraph, a sentence, a subsentential segment, . . . , and a word element, wherein the subdivision and the paragraph are optional.

Tags may also be used for the semantic purpose. For example, when a word has a plurality of senses (meanings), a tag may be used to specify a particular sense.

In the present embodiment, tagging is performed according to XML (Extensible Markup Language) similar to HTML (Hyper Text Markup Language).

Some examples of tagging are described below. In these examples, tags are described within brackets "<" and ">". Two specific examples of documents including tags are shown below, where one of the example is written in English and the other is written in Japanese. Note that internal structures of documents written in other languages can also be described using tags.

When a sentence "Time flies like an arrow," is given, tagging may be performed as follows. In the following example, tags added to the sentence are represented by expressions enclosed by brackets "<" and ">".

<sentence><noun phrase: word sense="time0">time</noun phrase><verb phrase><verb: word sense="fly1>flies</verb><adverb phrase><adverb: word sense=like0>like</adverb><noun phrase>an<noun: word sense="arrow1">arrow</noun></noun phrase></adverb phrase></verb phrase>.</sentence>

In the above example, <sentence>, <noun phrase>, <verb>, <verb phrase>, <adverb>, and <adverb phrase> are used to indicate a sentence, a noun, a noun phrase, a verb, a verb phrase, an adjective/adverb (including preposition and postposition phrases), and an adjective/adverb phrase, respectively. That is, the syntactic structure of the sentence is described by those tags.

A start tag is placed immediately before an element and a corresponding end tag is placed immediately after that element. Herein, end tags placed immediately after the respective elements include a symbol "/" to indicate that the tags are end tags. The term "element" is used herein to describe a syntactic element such as a phrase, a paragraph, or a sentence.

The expression, word sense="time0", indicates that word "time" is used herein to describe the 0th sense of a plurality of senses of word "time". More specifically, although "time" has senses as a noun, an adjective, and a verb, "time" is used herein as a noun (first sense). Similarly, word "orange" has three senses, namely, the name of a plant, one of colors, and one of fruits, which can be distinguished from each other by specifying a word sense.

Figure 4:
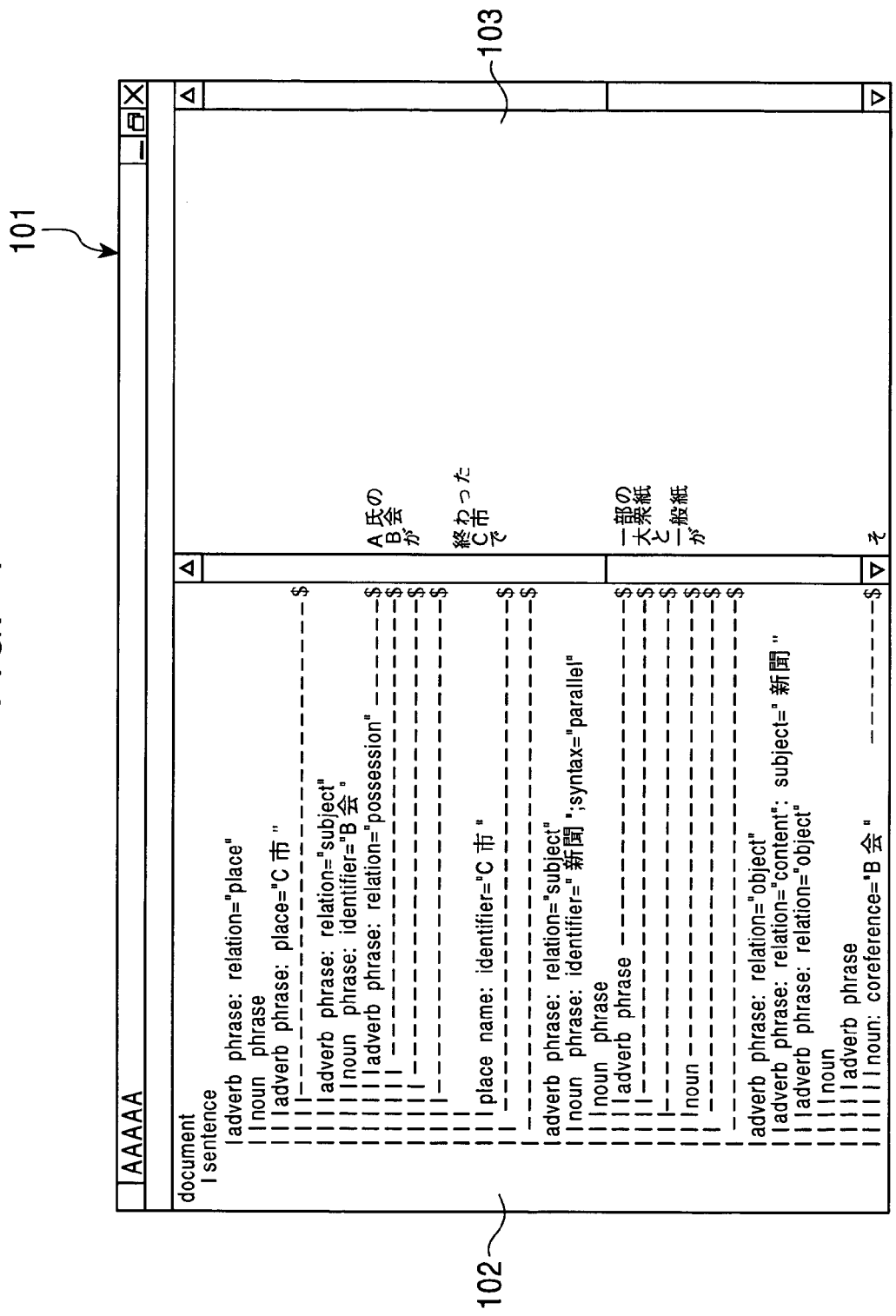
FIG. 4 is a schematic diagram illustrating a window for displaying a sentence structure according to the embodiment of the invention.

In the present embodiment, the syntactic structure of document data may be displayed in a window 101 on the display 30, as shown in FIG. 4. In the window 101, word elements are displayed in a subwindow 103 on the right side, and the internal structure of a sentence is displayed in a subwindow on the left side.

In this specific example in FIG. 3, a part of a sentence "A氏のB会が終わったC市で、一部の大衆紙と一般紙がその写真報道を自主規制する方針を紙面で明らかにした。" (Convention B was held in C City under the leadership of Mr. A. Some of newspaper companies, including usual and popular newspaper companies, have announced, on their papers that they will restrict themselves in terms of insertion of photographs of Mr. A.) is shown in the window 101. This document may be tagged, for example, as follows.

<document><sentence><ladverb phrase: relation="place"><noun phrase>< adverb phrase: place="C市">

<document><sentence><adverb phrase: relation="place"><noun phrase><adverb phrase: place="C市"><adverb phrase: relation=" subject"><noun phrase: identifier="B会"><adverb phrase: relation="position"><person name: identifier="A氏">A A氏</person name></adverb phrase>< organization name: identifier="B会">B会</organization name></noun phrase>が</adverb phrase>終わった</adverb phrase><place name: identifier="C市">C市</place name></noun phrase>で、</adverb phrase><adverb phrase: relation="subject"><noun phrase: identifier="press"; syntax="parallel"><noun phrase><adverb phrase>一部の</adverb phrase>大衆紙</noun phrase>と<noun>一般紙</noun></noun phrase>が</adverb phrase><adverb phrase: relation="object"><adverb phrase: relation="content"; subject="press"><adverb phrase: relation="object"><noun phrase><adverb phrase><noun: coreference="B会">そ</noun>の</adverb phrase>写真報道</noun phrase>を</adverb phrase>自主規 制する</adverb phrase>方針を</adverb phrase><adverb phrase: relation="location">紙面で</adverb phrase>明らかにした。</sentence> </document>

As can be seen, the structure of the document is described by pairs of tags <*> and </*>.

For example, a pair of tags <document> and </document> indicates the range of a document, and a pair of tags <sentence> and </sentence> indicates the range of a sentence. A pair of tag <noun phrase: identifier="B会"> and </noun phrase> is used to describe a noun phrase "A 氏のB氏のB会" with an identifier "B会".

Thus, the internal structure of the sentence is described by tags as shown in the subwindow on the left side of FIG. 4.

In the above sentence, syntax="parallel" indicates that "一部の大衆紙" and "一般紙" are parallel in relation. Herein, "parallel" elements are such elements having the same dependency. When no particular dependency is specified, "<noun phrase: relation=x><noun>A</noun><noun>B</noun></noun phrase>" indicates that A depends on B. Expression, relation=x, indicates a relational attribute.

A relational attribute describes a relation between elements in terms of syntax, meaning, and rhetoric. More specifically, a relation attribute describes a grammatical function such as a subject, an object, and an indirect object, a theme/role such as an acting person, a person receiving an action, and a beneficiary, and a rhetorical relation such as a reason and a result.

In the present example, relatively simple syntactic functions such as a subject, object, and indirect object are described by relational attributes.

Furthermore, in the present example, the attributes of proper nouns such as "A氏", "B会", and "C市" ("Mr. A", "Convention B", "City C") are described by tags <place name>, <person name>, and <organization name>. By attaching a tag <place name>, <person name>, or <organization name>, it is possible to indicate that a tagged word is a proper noun.

4. Manual Categorization of Document Data 4.1 Procedure

In the document processing apparatus 1 of the present embodiment, when document data is input from the outside via the communication device 21 (or via the write/read unit 31), the document data is categorized in accordance with the content thereof. Although in the following description, document data is assumed to be input from the outside via the communication device 21, the categorization may also be performed in a similar manner when document data stored on a removable medium such as a floppy disk is input via the write/read unit 31.

In general, categorization is performed either in a manual fashion by a user in accordance with the content of given document data or in an automatic fashion by the document processing apparatus 1.

Categorization is performed on the basis of a categorization model that will be described later. In the initial state, the document processing apparatus 1 has no categorization model. Therefore, when the document processing apparatus 1 is in the initial state, it is required to manually generate a categorization model and perform categorization. If a categorization model has been generated, it becomes possible to automatically categorize given document data.

First, the manual categorization process to be performed initially is described. That is, when the document processing apparatus in the initial state receives document data from the outside, the manual categorization process is performed by the controller 11 in accordance with an operation performed by a user so as to generate a categorization model and categorize the document data.

Figure 5:
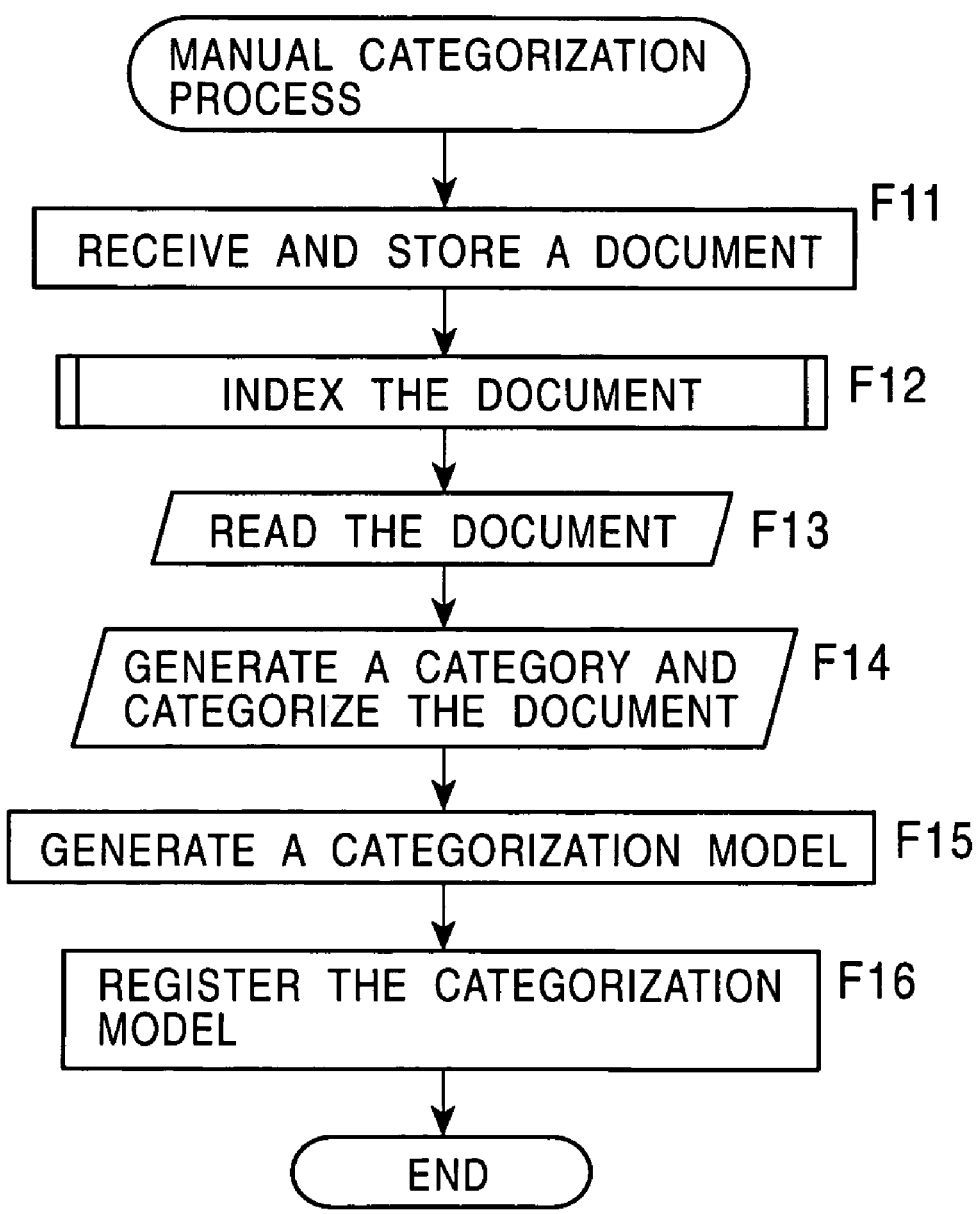
FIG. 5 is a flow chart illustrating a manual categorization process according to the embodiment of the invention.

The outline of the manual categorization process is shown in FIG. 5. Each step in this process will be described in further detail later.

In step F11 in FIG. 5, the receiver 21 of the document processing apparatus 1 receives a document. In this step F11, the receiver 21 receives one or more documents via, for example, a communication line. The received one or more documents are transferred to the main unit 10 of the document processing apparatus 1. The controller 11 stores the one or more documents into RAM 14 or the HDD 34.

In step F12, the controller 11 of the document processing apparatus 1 extracts words characterizing the plurality of documents received via the receiver 21 and generates an index for each document. The controller 11 stores the generated index 11 in the RAM 14 or the HDD 34.

As will be described later, the index of each document includes a proper noun and/or other words that characterize the document. Therefore, categorization or retrieval can be performed using an index.

In step F13, a user reads a document as required. In this step, the document processing apparatus 1 performs an operation in response to a command issued by the user. The next step F14 is also performed in response to an operation of the user.

The document data input to the document processing apparatus 1 is displayed on the screen of the display 30 in response to a command issued by the user so that the user can read it.

When the user reads a document, the user may issue various commands by clicking an icon or the like on the screen so as to perform various processes such as summarization that will be described later. When the user reads a document in the manual categorization process, step F14 is performed to generate categories and categorize the document.

In step F14, the controller 11 generates and displays categories in accordance with an operation performed by the user. The user then specifies a category for each document data. In response, the controller 11 categorizes and displays document data.

In step F15, the controller 11 generates a categorization model on the basis of categories generated by the user in step F14 and also on the basis of categorization performed by the user for each document data.

The categorization model includes data that represents correspondence between categories and elements of indexes (generated in step F12) of respective documents. That is, the categorization model represents how documents are categorized.

In step F16, the resultant categorization model is registered. The registration is performed by the controller 11 by storing the categorization model in the RAM 14.

By performing the process shown in FIG. 5 in the above-described manner, one or more document data input to the document processing apparatus 1 in the initial state are manually categorized, and a categorization model is generated.

The respective steps in the process shown ion FIG. 5 are described in further detail below.

4.2 Indexing

In step F14, the controller 11 generates an index for each document data input.

A specific example of an index generated for certain document data is shown below.

```
<index: date="AAAA/BB/CC"; time=DD:EE:FF"; document address=" 1234">
<user's operation history: maximum summary size="100">
<selection: number of elements="10"> PictureTel</選択></selection>
</user's operation history>
<summary> Primary Minister X did not tell a specific amount of tax reduction, in a press conference.</summary>
<word: word sense="0003"; central activation value="140.6"> not tell</word>
<word: word sense="0105"; identifier "X"; central activation value="67.2"> Prime Minister</word>.
<person name: identifier "X"; word: word sense="6103"; central activation value="150.2"> Prime Minister X</word></word/person name>
<word: word sense="5301"; central activation value="120.6">ask</word>
<word: word sense="2350"; identifier "X"; central activation value="31.4">Prime Minister</word>
<word: word sense="9582"; central activation value="182.31">emphasize</word>
<word: word sense="2595"; central activation value="193.6">tell</word>
<word: word sense="9472"; central activation value="12.01">noticed</word>
<word: word sense="4934"; central activation value="46.7">did not tell</word>
<word: word sense="0178"; central activation value="175.71">excuse</word>
<word: word sense="7248"; identifier "X"; central activation value="130.6">I</word>
<word: word sense="3684"; identifier "X"; central activation value="121.9">Prime Minister</word>
<word: word sense="1824"; central activation value="144.41">appeal</word>
<word: word sense="7289"; central activation value="176.8">show</word>
</index>
```

In the above example, <index> and </index> indicate the start and end positions, respectively, of the index. <date> and <time> indicate the date and the time, respectively, at which the index was generated. <summary> and </summary> indicate the start and the end, respectively, of the summary.

<word> and </word> indicate the start and end of a word. word sense="0003", indicates the third word sense of a word. The other tags are used in a similar manner. As described earlier, in order to distinguish a plurality of word senses of a word, numbers are assigned in advance to the respective word senses, and a particular word sense is specified by the number assigned to that word sense.

<user's operation history> and </user's operation history> indicate the start and end of a user's operation history. <selection> and </selection> indicate the start and end of a selected element. maximum summary size="100" indicates that the maximum summary size is set to 100 characters. number of elements="10" indicates that the number of selected elements is 10.

As can be seen from the above example, the index of a document includes one or more proper nouns and/or word senses that characterize the document.

Figure 6:
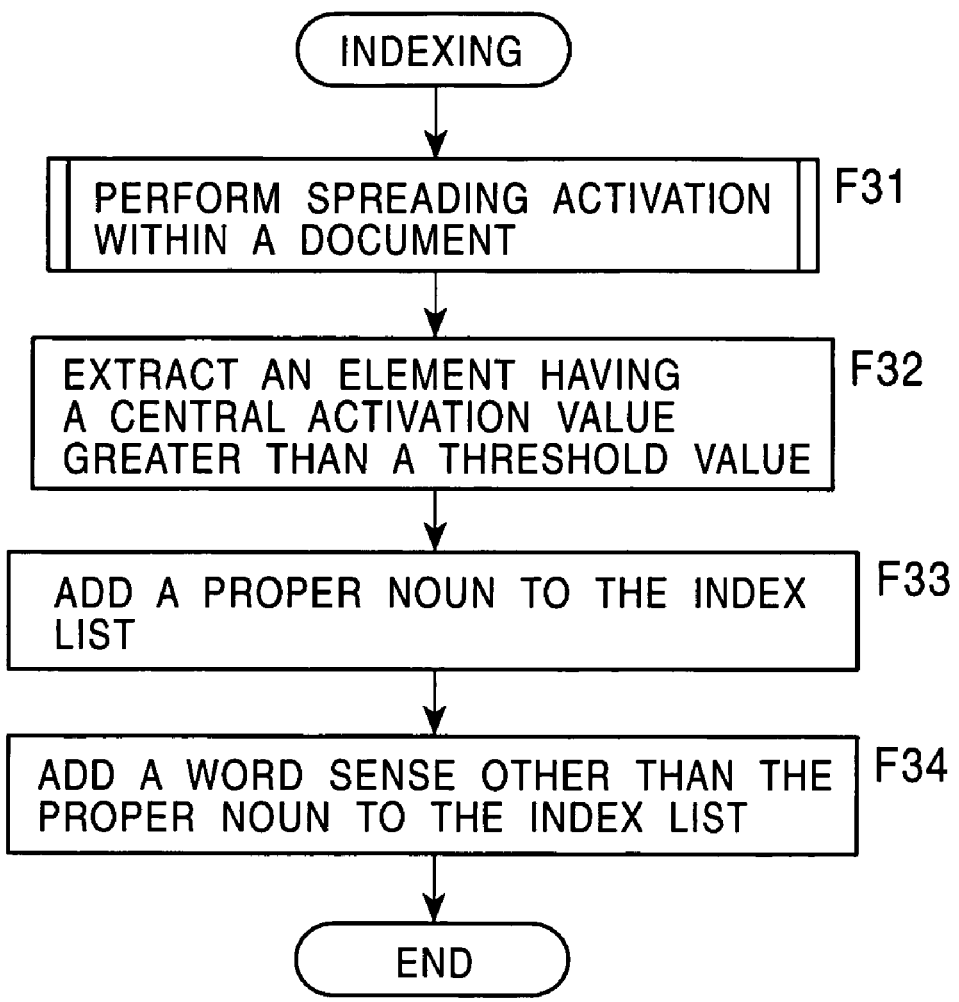
FIG. 6 is a flow chart illustrating an indexing process according to the embodiment of the invention.

The indexing process in step F12 is described in further detail below with reference to FIGS. 6 to 9. Note that FIG. 6 illustrates the indexing process for one document data. When indexing is performed for a plurality of document data, it is required to perform the process shown in FIG. 6 for each document data.

Figure 8:
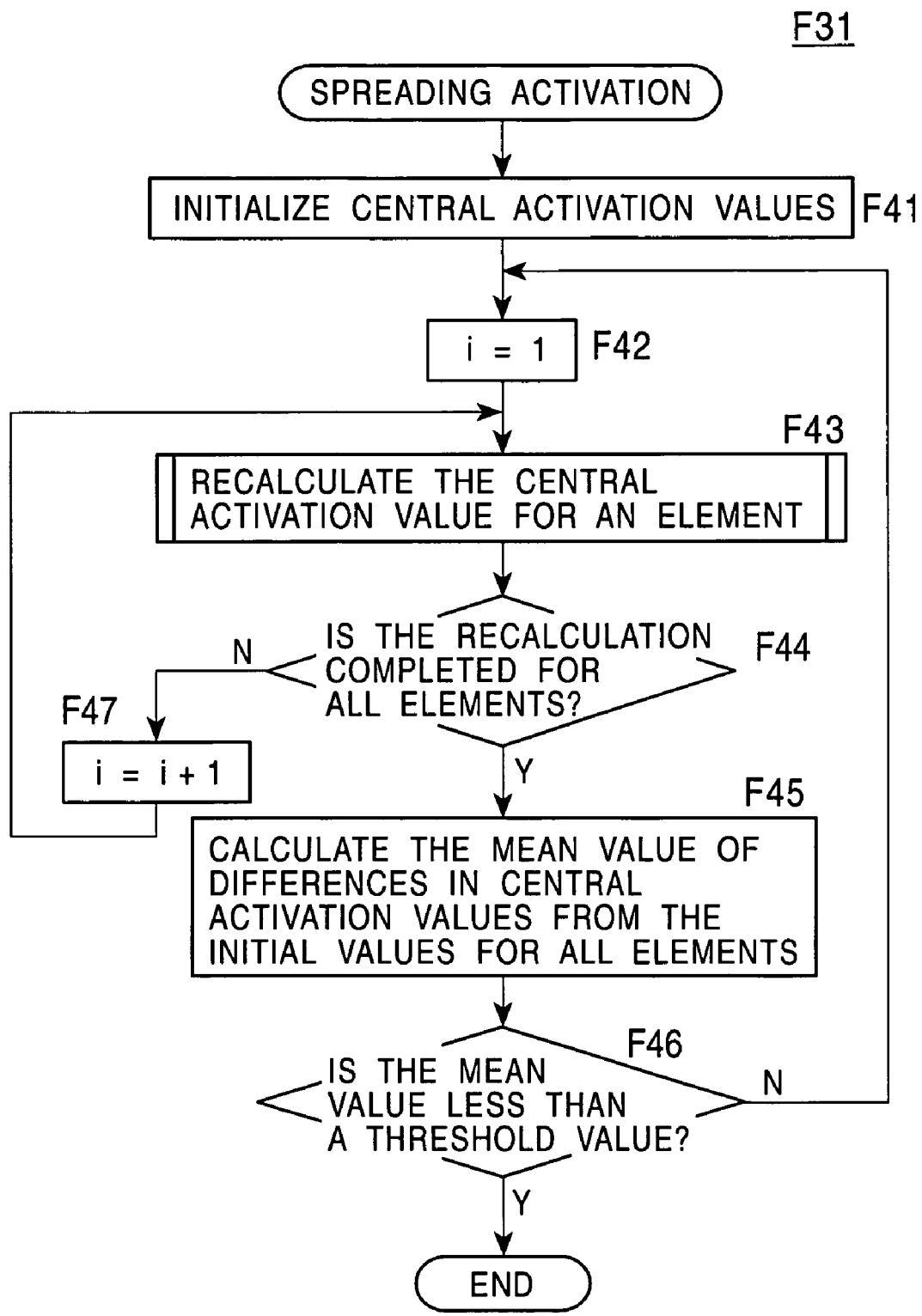
FIG. 8 is a flow chart illustrating an activation value spreading process according to the embodiment of the invention.
Figure 9:
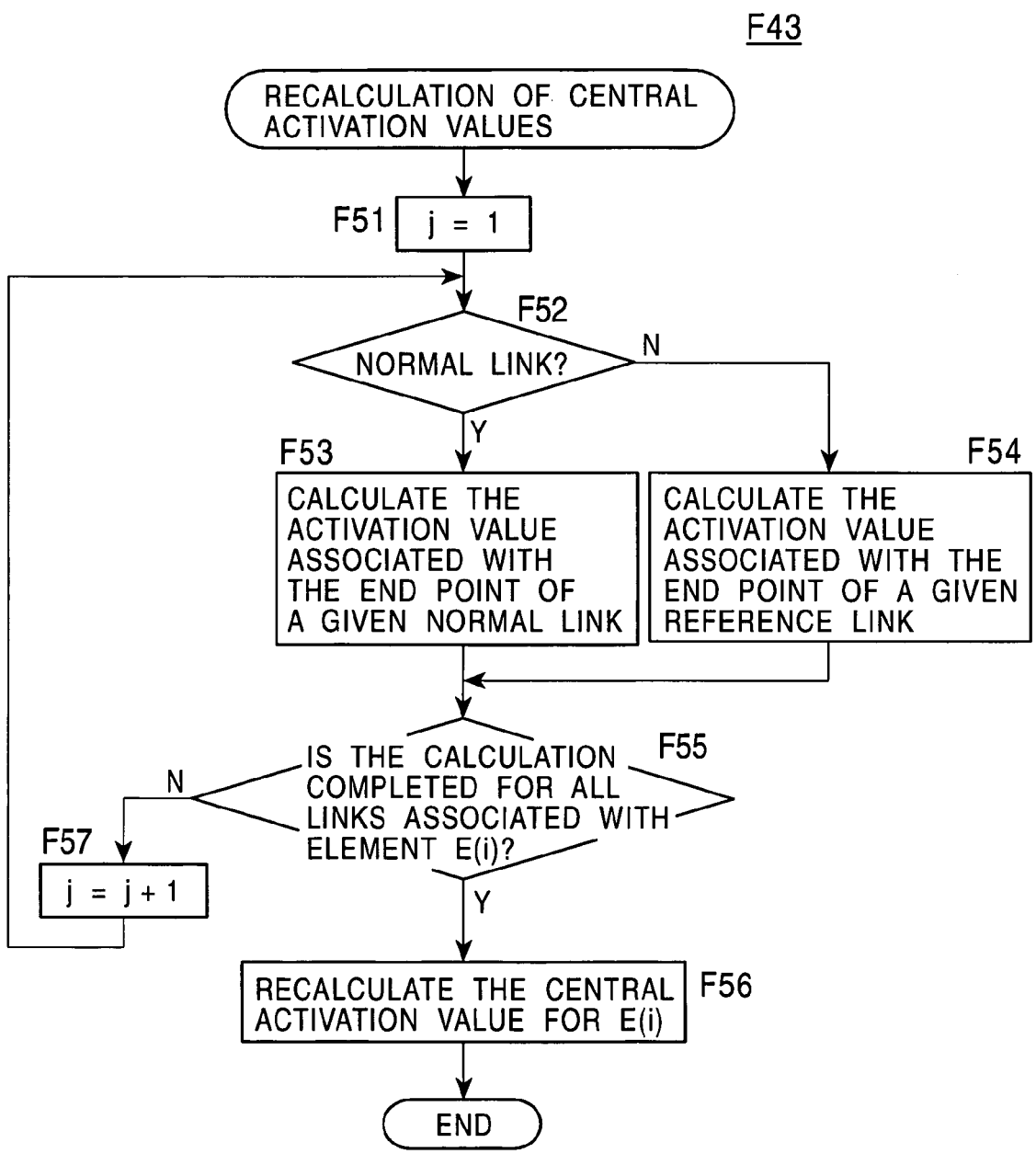
FIG. 9 is a flow chart illustrating a process of updating an activation value according to the embodiment of the invention.

FIG. 8 illustrates the details of step F31 shown in FIG. 6, and the details of step F43 are shown in FIG. 9.

In the indexing process shown in FIG. 5, spreading of activation values is first performed in step F31 in FIG. 6.

The spreading activation is a process in which the central activation values associated with elements in document data are spread depending on the internal structure of a document such that high central activation values are given to elements having significant relations with elements having high central activation values.

More specifically, initial central activation values are first given to the respective elements of a document, the central activation values are then spread depending upon the internal structure, that is, the link structure, of the document.

The central activation values are determined depending upon the internal structure represented by tags, and they can be used to extract distinctive words characterizing the document.

The controller 11 performs the spreading of activation values in step F31 and stores the resultant central activation values associated with the respective elements into the RAM 14.

The spreading of activation values in step F31 is described in further detail below with reference to FIGS. 7 to 9.

Figure 7:
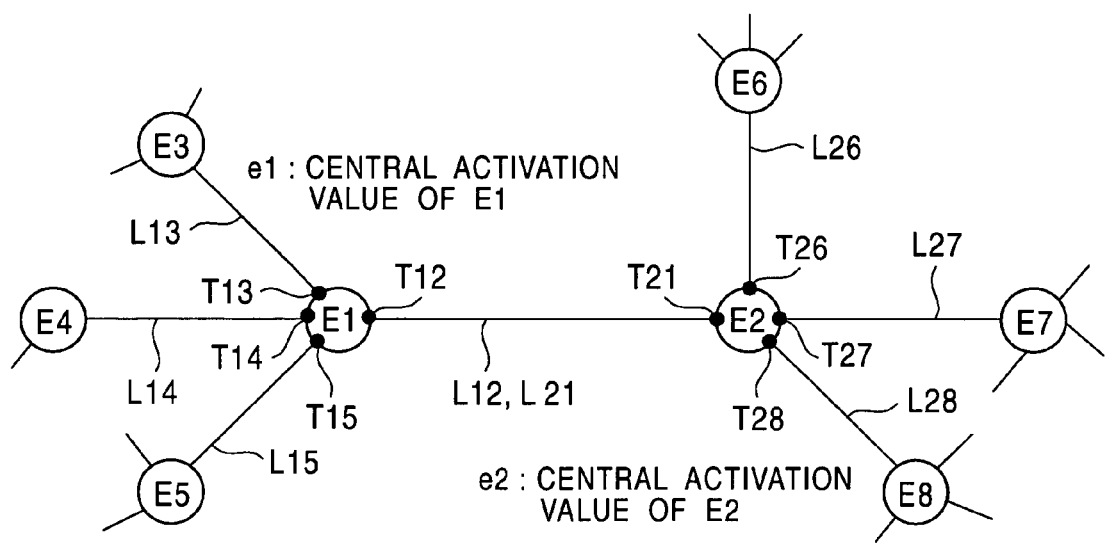
FIG. 7 is a schematic diagram illustrating activation values of elements used in the embodiment of the invention.

FIG. 7 illustrates an example of a link structure associated with some elements.

Note that FIG. 7 does not illustrate all elements of a document and the entire link structure associated therewith but illustrates a part of the link structure in the vicinity of elements E1 and E2. Of elements E1–E8 shown in FIG. 6, E1 and E2 are taken as examples in the following description.

Herein, we assume that the element E1 has a central activation value equal to e1 and the element E2 has a central activation value equal to e2.

These two elements E1 and E2 are connected to each other by a link L12 (normal link or reference link).

The link L12 has an end point T12 connected with the element E1 and also has an end point T21 connected with the element E2.

The element E1 is also connected with elements E3, E4, and E5, via links L13, L14, and L15, respectively. The links L13, L14, and L15 have end points T13, T14, and T15, respectively, connected with the element E1.

Similarly, the element E2 is also connected with elements E6, E7, and E8, via links L26, L27, and L28, respectively. The links L26, L27, and L28 have end points T26, T27, and T28, respectively, connected with the element E2.

The spreading of activation values over such a link structure is described below with reference to FIGS. 8 and 9.

In step F41 in FIG. 8, before starting the spreading of activation values associated with the document data, an index of which is to be produced, initial central activation values are defined for all elements included in the document.

The initial central activation values are determined such that, for example, a proper noun and other elements selected by a user have high values.

The controller 11 sets to zero the end-point activation values of end points T(xx) of reference links and those of normal links via which elements are connected to one another. The controller 11 stores the resultant initial end-point activation values in the RAM 14.

In step F42, the controller 11 initializes a counter for counting the number of elements E1 of the document. More specifically, the controller 11 sets the counter value i of the element counter to 1. When i=1, the counter points to a first element (for example, element E1 in FIG. 8).

In step F43, the controller 11 recalculates the central activation value for an element pointed to by the counter.

By way of example, the recalculation of the central activation value for the element E1 is described in detail with reference to FIG. 9.

In the recalculation of the central activation value, end-point activation values of the element are first recalculated, and a new central activation value is determined using the current central activation value and the recalculated end-point activation values.

In step F51 in FIG. 9, the controller 11 initializes the counter for counting the number of links connected at one end thereof with an element Ei (E1 in this specific example) of a document. More specifically, the controller 11 sets the counter value j of the link counter to 1. When j=1, the link counter points to a first link (Lyy) connected with an element Ei. In the specific example shown in FIG. 7, a link L12 is pointed to as a first link associated with the element E1.

In step F52, the controller 11 determines, by referring to a relational attribute tag, whether or not the link pointed to by the link counter, that is, the link L12 between elements E1 and E2, is a normal link. If the link L12 is a normal link, the controller 11 advances the process to step F53. However, the controller 11 advances the process to step F54 if the link L12 is a reference link.

In the case where the link L12 is a normal link and thus the process goes to step F53, the controller 11 calculates a new end-point activation value for the end point T12 at which the element E1 is connected to the normal link L12.

The end-point activation value t12 of the end point T12 is obtained by adding the central activation value e2 of the element E2 and the end-point activation values (t26, t27, t28) of all end points (T26, T27, T28) of the element E2 linked to the element E1 except for the end point connected to the link L12 and then dividing the resultant sum by the total number of elements included in the document.

The controller 11 determines the new end-point activation value of the end point connected the normal link by performing the above-described calculation using end-point activation values and the central activation value read from the RAM 14. The determined end-point activation value is stored in the RAM 14. Thus, the end-point activation value t12 for the end point T12 is updated.

On the other hand, in the case where it is determined in step F52 that the link L12 is a reference link and thus the process goes to step F54, the controller 11 calculates a new end-point activation value of the end point T12 at which the element E1 is connected to the link L12. In this case, the calculation is performed as follows.

The end-point activation value t12 of the end point T12 is obtained by adding the central activation value e2 of the element E2 and the end-point activation values (t26, t27, t28) of all end points (T26, T27, T28) of the element E2 linked to the element E1 except for the end point connected to the link L12. (In this case, unlike the calculation for normal links, the resultant sum is not divided.)

The controller 11 determines the new end-point activation value of the end point connected the reference link by performing the above-described calculation using end-point activation values and the central activation value read from the RAM 14. The determined end-point activation value is stored in the RAM 14. Thus, the end-point activation value t12 for the end point T12 is updated.

After performing step F53 or F54, the controller 11 determines, in step F55, whether to go to step F57. That is, the process goes to step F57 if it is determined in step F55 that the calculation is not completed for all links. In step F55, the counter value j is incremented, and the process returns to step F52.

Thus, the counter value becomes j=2, and the counter points to the second link (for example, L13) connected to the element E1. The end-point activation value t13 of the end point T13 at which the element E1 is connected to the link L13 is calculated, in a similar manner as described above, by performing step F52 and the following steps.

In step F55, the controller 11 determines whether the new end-point activation value has been calculated for all links connected to an element Ei (E1 in this specific example) pointed to by the current counter value i, and the controller 11 performs the calculation until the new end-point activation value has been determined for all end points of the current element Ei.

That is, the above-process is performed repeatedly while incrementing the counter value j in step F57 thereby determining new end-point activation values t12, t13, t14, and t15 of end points T12, T13, T14, and T15 of the element E1. When all end-point activation values have been determined, the process goes from step F55 to F56.

In step F56, the new central activation value ei for the element Ei is determined using the new end-point activation values determined in the above process.

The new central activation value is determined by adding the sum of new end-point activation values of the element Ei to the current central activation value of the element Ei.

For example, in the case of the element E1 shown in FIG. 7, the new central activation value e1(new) is given by $$e1(\text{new}) = e1 + t12 + t13 + t14 + t15$$

After determining the central activation value ei of the element Ei pointed to by the current counter value i, the controller 11 stores the resultant central activation value ei in the RAM 14. Thus, the central activation value ei of the element Ei is updated. (The old central activation value is further held for use in step F45 that will be described later.)

After updating the central activation values in step F43 shown in FIG. 8 in the manner described above with reference to FIG. 9, the controller 11 advances the process to step F44 shown in FIG. 8. In step F44, the controller 11 determines whether the central activation values have been updated for all elements of the document. More specifically, the controller 11 determines whether the counter value i has become equal to the total number of elements included in the document.

If the updating of the central activation value is not completed for all elements, the controller 11 advances the process to step F47. In step F47, the controller 11 increments the counter value i and returns the process to step F43.

For example, at the time when the process for the element E1 is completed, the counter value i is incremented to i=2 so as to point to the element E2.

Thus, step F43 (that is, the process shown in FIG. 9) is repeated to calculate the central activation value for the element E2.

Although a further detailed description is not given herein because step F43 is performed in a similar manner, the end-point activation values t21, t26, t27, and t28 of the end points T21, T26, T27, and T28 of the element E2 are updated, and then the new central activation value e2(new) is determined in accordance with the following equation:

$$e2(new)=e2+t21+t26+t27+t28$$

In the process shown in FIG. 8, step F43 is performed repeatedly to calculate the central activation value while incrementing the counter value i in step F47 so as to change the element pointed to by the counter value, until the central activation value has been updated for all elements included in the document.

When the updating of the central activation value is completed for all elements included in the document, the process goes from step F44 to F45.

In step F45, the controller 11 calculates the mean value of variations in the central activation value of all elements contained in the document. That is, the mean value of differences between the new and old central activation values of all elements is calculated.

More specifically, the controller 11 reads from the RAM 14 the old central activation values and the updated new central activation values for all elements. The controller 11 then calculates the differences between the new and old central activation values and divides the sum of differences by the total number of elements thereby determining the mean value of variations in central activation values of all elements.

The controller 11 then stores into the RAM 14 the mean value of the variations in the central activation values of all elements.

In the following step F46, the controller 11 determines whether the mean value calculated in step F45 is less than a predetermined threshold value.

If the mean value is less than the threshold value, the controller 11 terminates the process of spreading activation values. However, the mean value is not less than the threshold value, the process returns to step F42 to repeat the above-described process.

As a result of spreading activation values, the central activation values of elements related to elements having high central activation values become high.

However, if the spreading of activation values is performed only once, there is a possibility that the central activation value of an element, which should be increased to achieve the purpose of the indexing process, is not increased to a sufficiently high level. More specifically, although the central activation values of elements directly linked to an element having a high initial central activation value are increased to sufficiently high levels by one execution of the activation spreading process, the central activation values of elements that are not directly linked to an element having a high initial value are not increased to sufficiently high levels even when those elements are important to create the index.

To avoid the above problem, the spreading of activation values is performed as many times as required to satisfy the condition in step F46. That is, the spreading of activation values is performed repeatedly until the central activation values for all elements have substantially converged, thereby ensuring that the central activation values of all important elements are increased. The central activation values of all elements can converge via the iterations of spreading activation values, because the central activation values of the respective elements are updated using central activation values calculated in the previous iteration. However, if the number of iterations is too great, the calculations are continued uselessly after the central activation values for all elements have converged.

To avoid the above problem, the mean value of variations in the central activation values between two successive iterations is calculated in step F45, and it is determined in step F46 whether the mean value have fallen within a predetermined small range. Thus, the calculation is terminated when the central activation values have substantially converged.

After completion of the spreading of activation values in FIGS. 8 and 9 (step F31 in FIG. 6), the controller 11 advances the process to step F32 shown in FIG. 6.

In step F32, the controller 11 evaluates the central activation values determined in step F31 for the respective elements and extracts elements having central activation values greater than a predetermined threshold value. The controller 11 stores the extracted elements in the RAM 14.

In the next step F33, the controller 11 reads the extracted elements from the RAM 14. The controller 11 then extracts all proper nouns included in the extracted elements and adds the extracted proper nouns to the index. Proper nouns have no word sense and they are not described in a dictionary. Thus, proper nouns are handled separately from the other words. Herein, as described earlier, a "word sense" refers to a particular meaning of a word having a plurality of meanings.

It is possible to determine whether each element is a proper noun, by checking an associated tag described in a document. For example, in the internal structure represented by tags as shown in FIG. 3, relational attributes represented by tags indicate that "A氏", "B会", and "C市" (("Mr. A", "Convention B", "City C") are "person name", "organization name", and "place name", respectively, and thus they are proper nouns. The controller 11 adds the extracted proper nouns to the index and stores the result in RAM 14.

In the next step F34, the controller 11 extracts, from the elements extracted in step F32, word senses other than the proper nouns and adds the extracted word senses to the index. The result is stored in the RAM 14.

By performing the above process, an index such as that described above in the specific example is obtained. That is, words characterizing a document including tags are detected, and an index is generated by listing the detected words. The significance of words included in a document is evaluated on the basis of the central activation values determined by means of spreading activation values depending upon the internal structure of the document.

Because indexes generated in the above-described manner include word senses and proper nouns that characterize documents, indexes can be used to retrieve a desired document.

In addition to the word senses and the proper nouns that characterize the document, the index also includes the document address representing the storage location of the RAM 14 (or the HDD 34) where the document is stored.

4.3 Browsing, Generation of Categories, and Categorization

The process of generating the index described above with reference to FIGS. 6 to 9 is performed in step F12 shown in FIG. 5. When the manual categorization process shown in FIG. 5 is performed, after the completion of generating the index, a user reads a document and manually categorizing the document, in steps F13 and F14.

In step F13 in FIG. 5, as described earlier, the user can read a document displayed on the display 30.

In step F14, the user generates categories and categorizes document data into categories generated.

The operations in steps F13 and F14 and other related operations performed by the controller 11 are described below with reference to specific examples.

Figure 10:
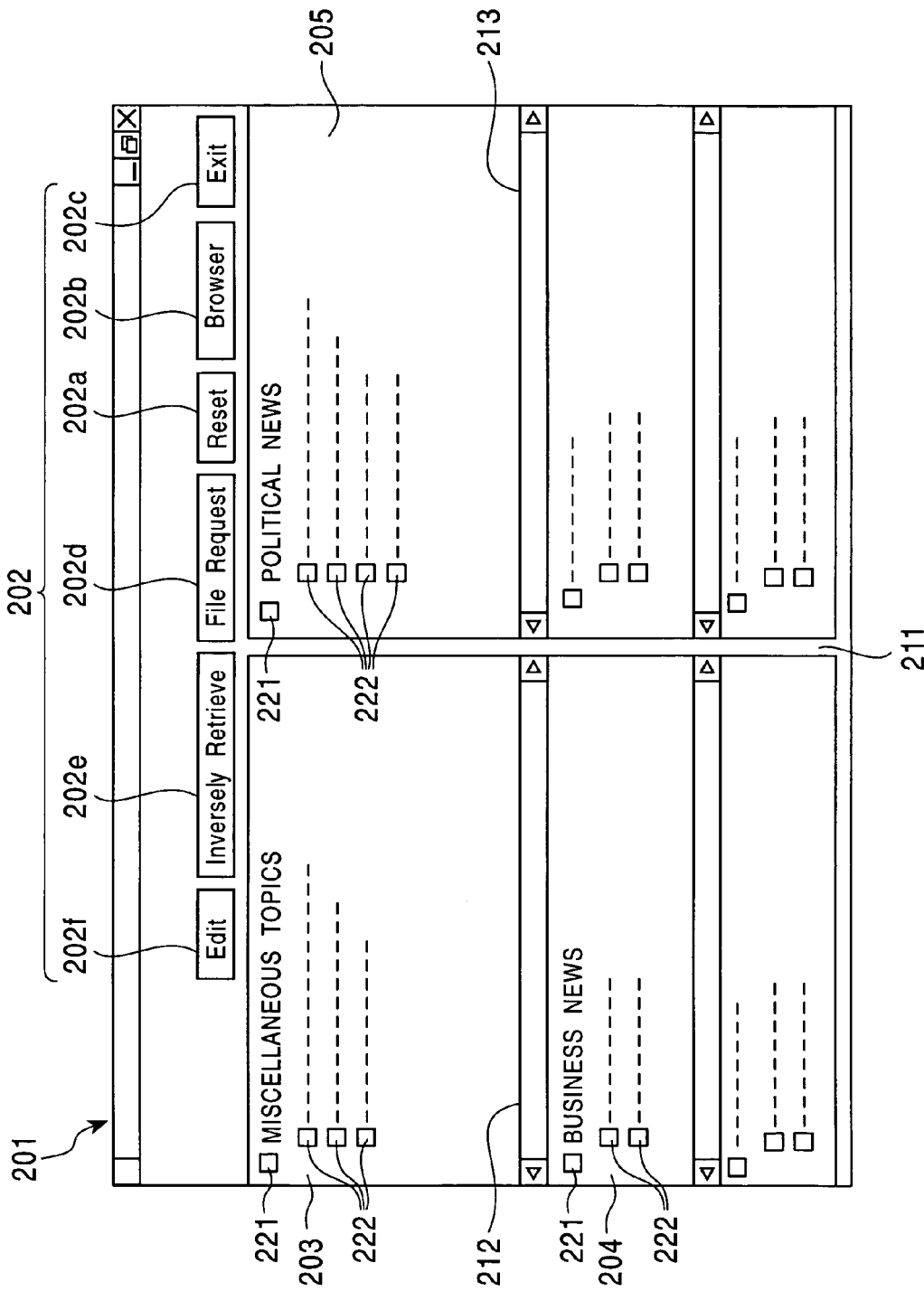
FIG. 10 is a schematic diagram illustrating a categorization window according to the embodiment of the invention.
Figure 11:
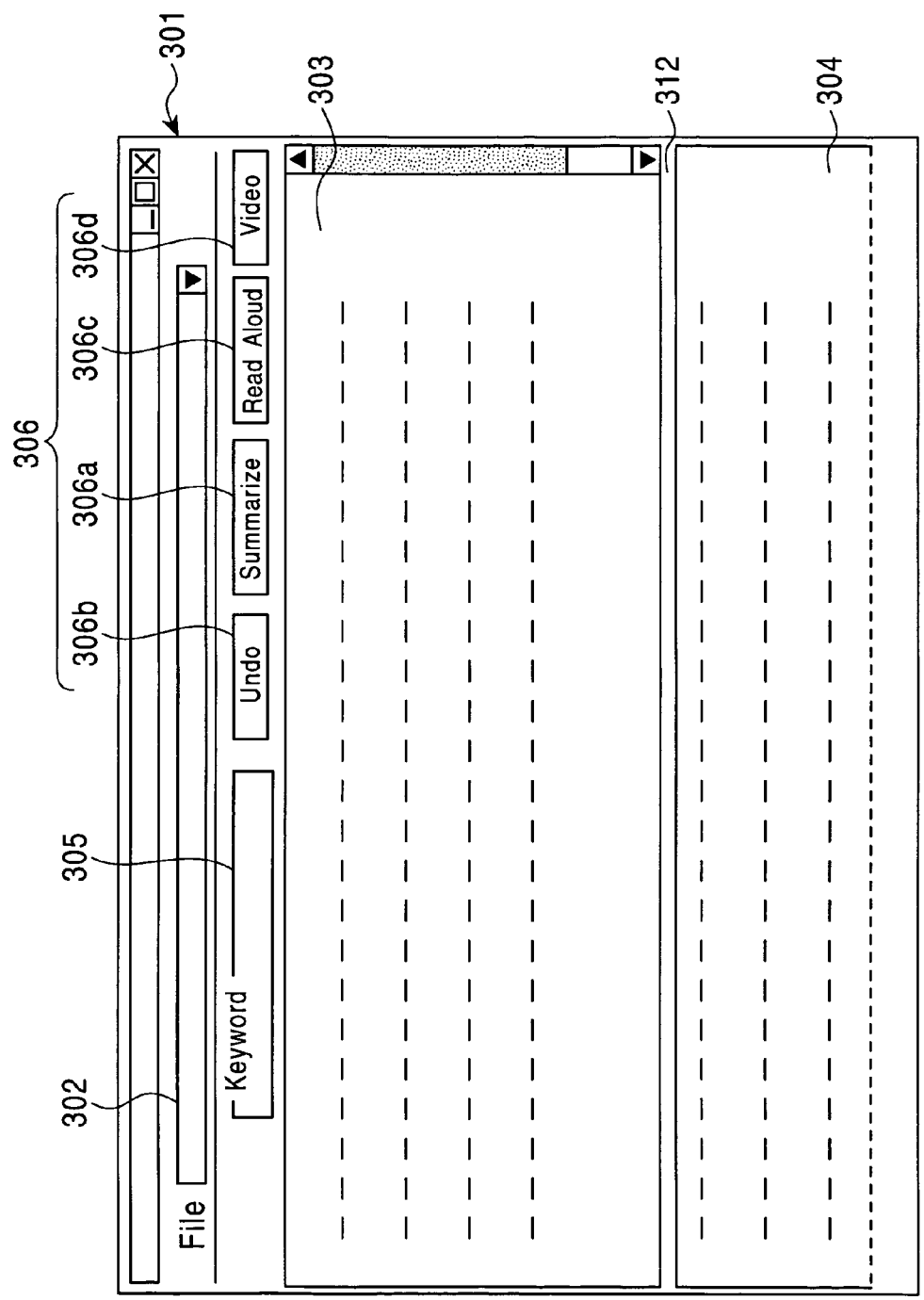
FIG. 11 is a schematic diagram illustrating a browser window according to the embodiment of the invention.

FIGS. 10 and 11 illustrate specific examples of documents displayed on the display 30.

FIG. 10 shows a categorization window 201 used to categorize documents in accordance with a categorization model that will be described in detail later. In this specific example, the document categorization window 201 serves as a graphic user interface (GUI) for categorization of documents.

The categorization window 201 includes operation control buttons 202 such as a position reset button 202a used to reset the window into an initial state, a browser button 202b used to browse documents, and an exit button 202c used to exit from the window 201.

A file request button 202d used by the user to issue a database retrieval request to acquire desired document data (tag file) from the server 3, an inversely retrieve button 202e used to perform inverse retrieval, and an edit button 202f used to open an editor screen for producing a document (plain text) are also displayed, as will be described in detail later with reference to second and third embodiments.

In the inverse retrieval, as will be described later, the user selects a category or document data. For this purpose, a category check boxes 221 are document data check boxes 222 are also displayed in correspondence with the respective categories and document data.

The categorization window 201 includes subwindows serving as document category displaying areas 203, 204, 205, etc., corresponding to categories based on the categorization model.

The document category displaying area 203 is used to display miscellaneous topics. That is, documents that have not been categorized yet are indicated in the document category displaying area 203. For example, documents that are received in step F11 in FIG. 5 (and that are to be categorized) are indicated in the document category displaying area 203 entitled "miscellaneous topics".

On the other hand, the document category displaying area 204 is used to indicate documents categorized in, for example, "business news".

The document category displaying area 205 is used to indicate documents categorized in, for example, "political news".

The other document category displaying areas having no reference numerals in FIG. 9 may also be used to indicate documents categorized in particular categories.

When documents are categorized in particular categories, document icons and document titles of documents are displayed in corresponding document category displaying areas 203, 204, etc. When a document has no title, a sentence representing the summary of the document is displayed.

The size of each document category displaying area 203, 204, etc., is not fixed. That is, the size of each document category display area can be changed to a desired size by moving the subwindow frames 211, 212, 213, etc., by means of dragging or the like. The number of document category displaying areas can be changed by a user to an arbitrary value.

The title (such as "political News") of each document category displaying area 203, 204, etc., may be arbitrarily set and changed by a user.

The number of document category displaying areas and the titles thereof correspond to the number of categories and categories, respectively, defined in the categorization model that will be descried later. That is, the number of categories and the titles of the categories of the categorization model are set when a user sets the document category displaying areas or the title thereof in the categorization window 201 by using the mouse or the keyboard of the input unit 20.

FIG. 11 illustrates an example of a browser window 301 used by a user to browse documents.

For example, if a user clicks the browser button 202b in the categorization window 201 after selecting a document by clicking the corresponding icon or the like in the categorization window 201 shown in FIG. 10, then the controller 11 opens the browser window 301 as shown in FIG. 11 and displays the selected document therein.

The browser window 301 includes a file name displaying area 302 for displaying the file name of a selected document data file, a document displaying area 303 for displaying document data corresponding to the file name displayed in the file name displaying area 302, a summary displaying area 304 for displaying a summary of the document displayed in the document displaying area 303, and a keyword displaying area 305 used to input and display a keyword. Furthermore, the browser window 301 includes operation control buttons 306 such as a Summarize button 306a used to start summarization, an undo button 306b used to cancel an operation, and a read-out button 306c used to execute a read-aloud operation.

In the browser window 301, a user can read a document displayed in the document displaying area 303. When the entire document is not displayed at a time in the document displaying area 303, a part of the document is displayed. In this case, the use can read the entire document by scrolling the document.

If the user clicks the summarization button 306a, a summary of the document displayed in the document displaying area 303 is generated and displayed in the summary displaying area 304.

The operation performed by the controller 11 to generate a summary text will be described later.

On the other hand, if the user clicks the read-out button 306c, the document displayed in the document displaying area 303 or the summary thereof is read aloud.

The process of reading-aloud a document will be described later.

The categorization window 201 and the browser window 301 are displayed on the display 30 not only during the manual categorization process shown in FIG. 5 but also during other processes in response to a request issued by the user. For example, in the manual categorization process shown in FIG. 5, information about the types and the contents of received documents are displayed in the categorization window 201 or the browser window 301, and thus the user can acquire such information via the categorization window 201 or the browser window 301.

More specifically, if one or more documents are received in step F11 shown in FIG. 5, an index is generated in step F12 for the received documents. After that, the titles of the received documents are displayed in the document category displaying area 203 entitled "Miscellaneous Topics" in the categorization window 201 shown in FIG. 10.

Using the categorization window 201, the user manually categorizes the documents displayed in the document category displaying area 203. If the user cannot guess the content of a document from the title thereof, the user may display the document in the browser window 301 shown in FIG. 11 and read the content thereof. That is, in step F13 shown in FIG. 5, the user reads a document if reading is required for the above purpose.

In step F14, using the categorization window 201, the user may add, update, and delete a category, as required. In response to an operation performed by the user, the controller 11 changes the manner in which the document category displaying areas 203, 204, etc., are displayed (that is, the number, the size, and the title of document category displaying areas are modified).

If the user creates or modifies a category (the title of a document category displaying area), the creation or modification is reflected in the categorization model that will be described later.

After creating a category as required, the user categorize the respective documents displayed in the document category displaying area 203 into proper categories corresponding to document category displaying areas. Thus, documents are manually categorized by the user.

More specifically, the user drags, using the mouse of the input unit 20, the icons of documents displayed in the document category displaying area 203 entitled "Miscellaneous Topics" into document category displaying areas corresponding to desired categories.

For example, the user may create a document category displaying area entitled "Sports" and may drag the icon of a document on a sport displayed in the document category displaying area entitled "Miscellaneous Topics" into the document category displaying area entitled "Sports".

After being dragged, the icons and the titles of the respective documents are displayed in document category displaying areas into which the documents have been dragged.

4.4 Creation/Registration of the Categorization Model

In step F15 shown in FIG. 5, after completion of the manual categorization, the controller 11 creates a categorization model including a plurality of categories on the basis of the categorization that has been manually performed by the user. More specifically, the controller 11 creates a categorization model by gathering indexes of a plurality of documents categorized in categories. After that, the controller 11 categorizes the plurality of documents into corresponding categories defined in the categorization model.

The categorization model consists of a plurality of categories in which documents are categorized, and the categorization model represents the correspondence between each category and documents.

As described above, an index is generated for each document in step F12. The categorization model has a data structure in which the indexes of the respective documents are related to the corresponding categories in which the documents are categorized. An example of such a categorization model is shown in FIG. 12A.

In the example shown in FIG. 12A, the categorization model includes categories "sport", "company", "computer", etc., which have been created by the user using the categorization window 201. Note that the categorization model may include a category that is not given by a user but that has been predefined. A document category displaying area corresponding to such a predefined category may also be displayed in the categorization window.

In the categorization model, correspondence between each category and indexes IDX1, IDX2, . . . . is described. That is, the indexes of the respective documents are related to the corresponding categories in which the documents are categorized.

The indexes related to the respective categories are the same as those of documents displayed in the document category displaying areas corresponding to the respective categories in the categorization window 201.

For example, index IDX1 is related to category "sport" because a user has created a document category displaying area entitled "sport" in the categorization window 201 and dragged the icons of a document having index IDX1 into the document category displaying area entitled "sport".

As described earlier, each index includes one or more proper noun and word senses other than the proper nouns, and also includes a document address.

As shown in FIG. 12A, one or more indexes are related to each category. Because each index includes one or more proper nouns and word senses other than the proper nouns and also includes a document address, the categorization model may also be represented as shown in FIG. 12B.

In the example shown in FIG. 12B, the categorization model has index fields for describing proper nouns, word senses other than proper nouns, and document addresses.

In this categorization model, proper nouns "Mr. A", etc., are related to category "sport", "Mr. B", etc., to "company", C Company", "G Company", etc., to "computer", "D species", etc., to "plant", "Mr. E", etc., to "art", and "Mr. F", etc., to "event".

Similarly, word senses such as "base ball (4546)", "grand (2343)", "labor (3112)", "employment (9821)", "mobile (2102)", "cherry-1 (11111)", "orange–1 (9911)"1, "cherry-2 (11112)", "orange-2 (9912)", and "cherry-3 (11113)" are related to the corresponding categories.

Furthermore, document addresses such as "SP1", "SP2", "SP3,", . . . , "S01", "S02", "S03", . . . , "C01", "C021", "C03", . . . "PL1", "PL2", "PL3,", . . . , "AR1", "AR2", "AR3", . . . , and "EV1", EV2", "EV3", . . . are also related to the corresponding categories.

Herein, "cherry-1", "cherry-2", and "cherry-3" represent the first word sense (11111), the second word sense (11112), and the third second word sense (11113), respectively, of "cherry". Similarly, "orange-1", and "orange-2" represent the first word sense (9911) and the second word sense (9912), respectively, of "orange". More specifically, for example, "orange-1" represents an orange that is one of plants, and "orange-2" represents an orange color.

For general nouns other than proper nouns, not words but word senses are used because a word can have a plurality of meanings.

In step F15 shown in FIG. 5, a categorization model is generated in the above-described manner on the basis of manual categorization performed by a user. In the next step F16, the generated categorization model is registered, that is, stored in the RAM 14 (or the HDD 34).

Thus, by generating and registering the categorization model, documents are categorized.

After generating and registering the categorization model steps F15 and F16 shown in FIG. 5, the categorization model is updated via an automatic categorization process that will be described later, or via a modification of a category or a further manual categorization process performed by a user.

If the categorization model is updated, the date and time of update is written in the categorization model. In the example shown in FIG. 12, the date and time of update is written as "1998:12:10:19:56:10".

5. Automatic Categorization of Document Data 5.1 Procedure

In the document processing apparatus 1 according to the present embodiment, once a categorization model is generated, it becomes possible to perform an automatic categorization process to automatically categorize document data input from the outside via the communication device 21 or the like.

That is, when the document processing apparatus 1 receives document data from the outside, the automatic categorization process is performed to categorize the received document data, as is described in detail below.

In the following description, it is assumed that the automatic categorization process is performed each time one document is received. However, the automatic categorization process may be performed each time a predetermined number of documents have been received. Alternatively, the automatic categorization process may be performed when the window shown in FIG. 9 is opened. In this case, the automatic categorization process may be performed for all documents that have been received at that time.

Figure 13:
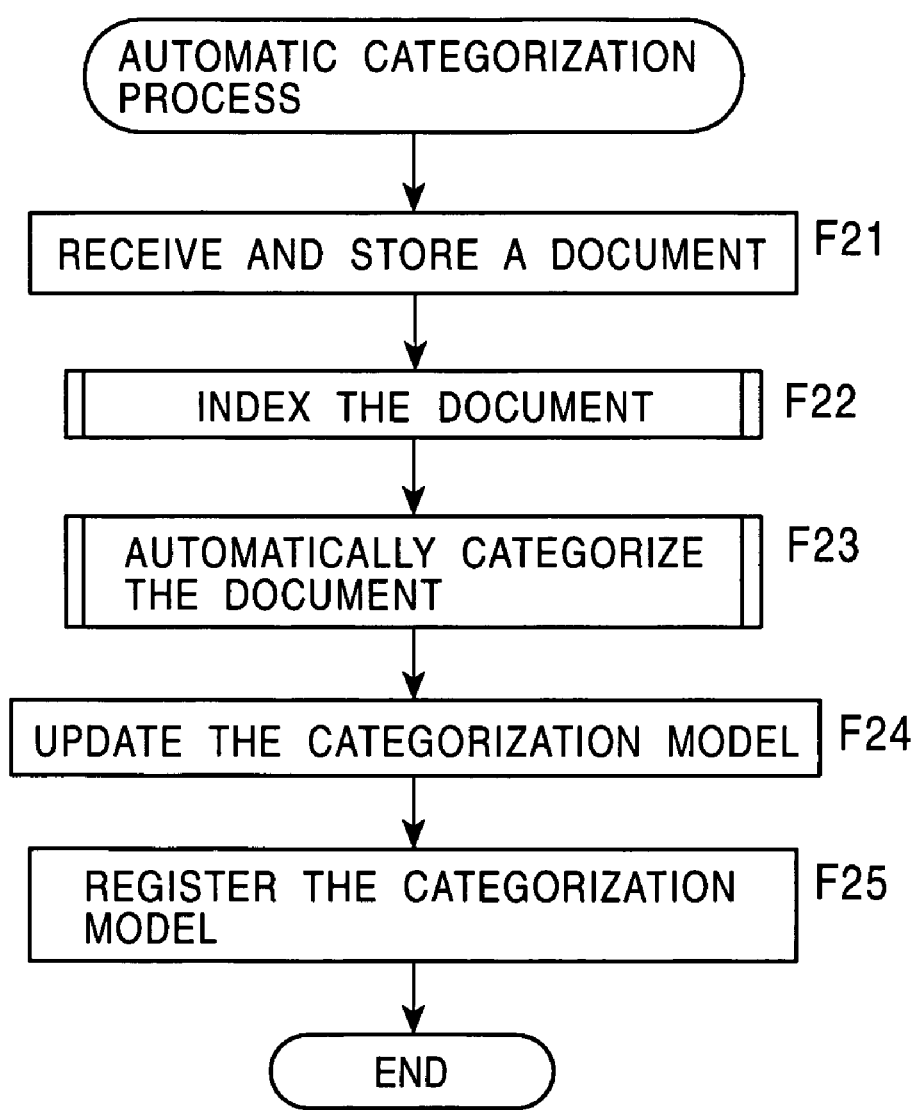
FIG. 13 is a flow chart illustrating an automatic categorization process according to the embodiment of the invention.

The outline of the automatic categorization process is shown in FIG. 13.

In step F21 in FIG. 13, the receiver 21 of the document processing apparatus 1 receives a document. In this step F21, the receiver 21 receives one or more documents via, for example, a communication line. The received one or more documents are transferred to the main unit 10 of the document processing apparatus 1. The controller 11 stores the one or more documents into RAM 14 or the HDD 34.

In the next step F22, the controller 11 generates an index for each document data received in step F21.

In step F23, the controller 11 automatically categorizes each document with an index into one of categories of the categorization model. The controller 11 stores the categorization result in the RAM 14. Each step in the automatic categorization process will be described in further detail later.

In step F24, the controller 11 updates the categorization model on the basis of the result of automatic categorization performed upon the new document in step F23.

In step F25, the controller 11 registers the resultant categorization model updated in step F24, by storing it in the RAM 14.

Thus, by performing the process shown in FIG. 13 in the above-described manner, the document data input to the document processing apparatus 1 is automatically categorized in accordance with the categorization model.

That is, in the automatic categorization process, an index is first generated for a received document, and then the document is automatically categorized. Furthermore, proper nouns, word senses, and the document address described in the index are related to a category on the categorization model as shown in FIG. 12 (thereby updating the categorization model).

Steps F21 and F22 are performed in a similar manner to steps F11 and F12 in the manual categorization process described above. That is, the indexing process in step F22 is performed in a similar manner as described above with reference to FIGS. 6 to 9, and thus it is not described in further detail herein.

In step F24, the categorization model is updated on the basis of the result of the automatic categorization performed in step F23.

The automatic categorization in step F23 is performed in a different manner from the manual categorization process, as will be described below.

5.2 Automatic Categorization

Figure 14:
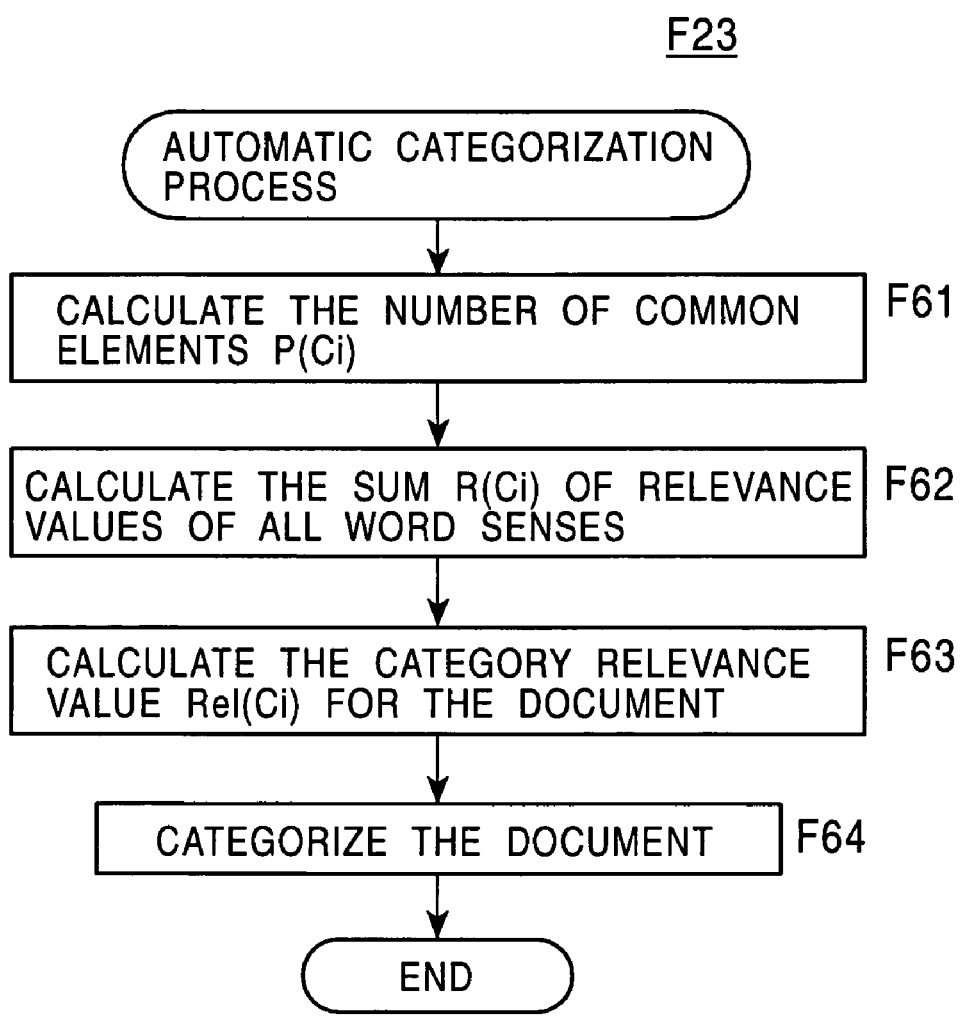
FIG. 14 is a flow chart illustrating an automatic categorization step according to the embodiment of the invention.

FIG. 14 illustrates details of the automatic categorization process in step F23 shown in FIG. 13.

In step F61 in FIG. 14, the controller 11 determines the number P(Ci) of proper nouns that are included in both the set of proper nouns belonging to the category Ci defined in the categorization model and the set of words extracted from the document received in step F21 and employed as elements of the index of the document. The controller 11 stores the calculated number P(Ci) into the RAM 14.

In step F62, the controller 11 determines the word sense relevance values between all word senses included in the index of the document and all word senses included in each category Ci by referring to a word sense relevance table in FIG. 16 that will be described later. The controller 11 then calculates the sum R(Ci) of the word sense relevance values.

That is, the controller calculates the sum R(Ci) of word sense relevance values for words on the categorization model other than proper nouns. The controller 11 stores the calculated sum of word sense relevance values into the RAM 14.

The word sense relevance value is described below.

The word sense relevance value is calculated in advance for each word sense contained in an electronic dictionary provided in the document processing apparatus 1, and the calculated word sense relevance values are stored as shown in FIG. 16. That is, if the controller 11 performs the process shown in FIG. 15 once, the obtained relevance values can be used in the automatic categorization process shown in FIG. 14.

Figure 15:
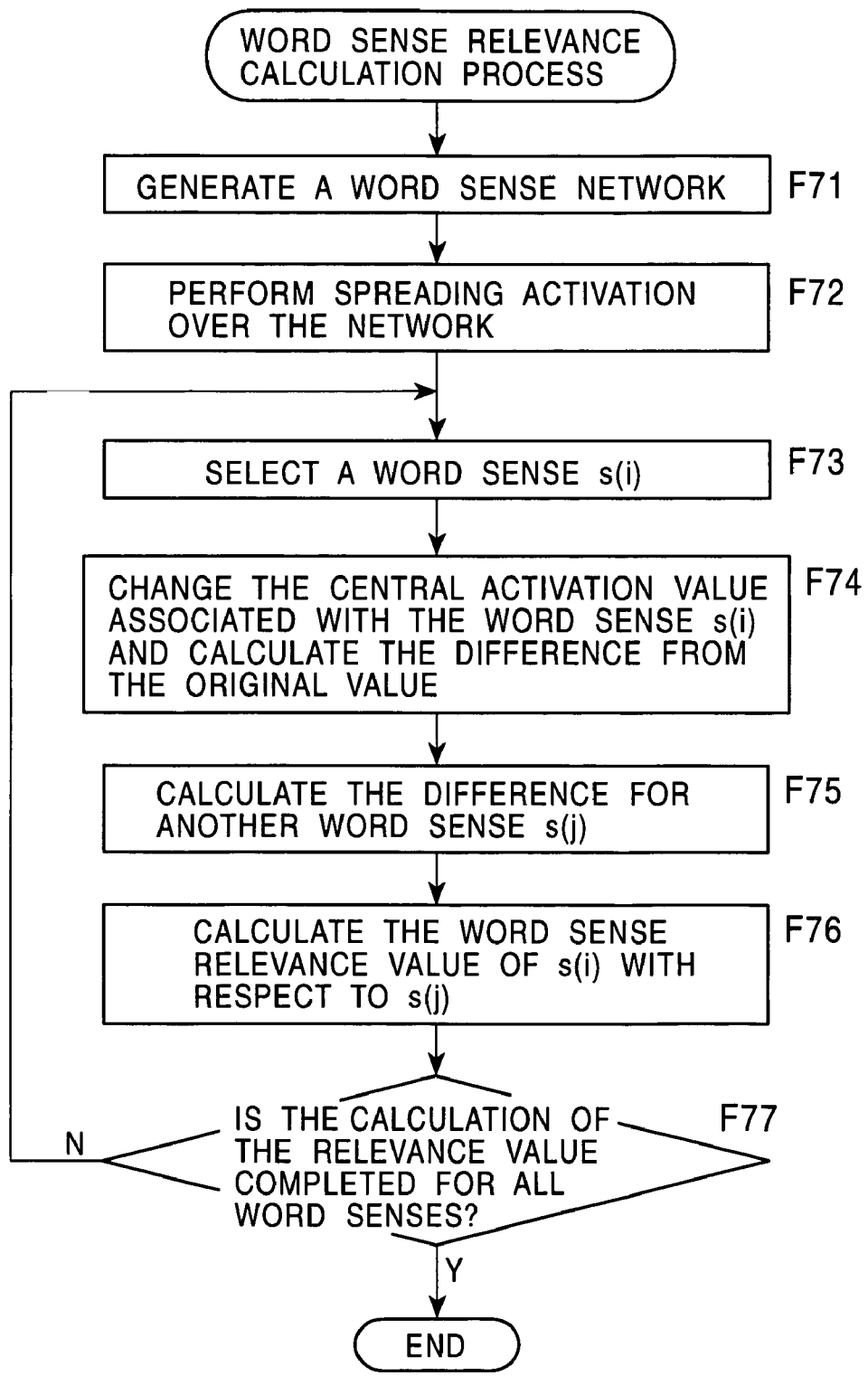
FIG. 15 is a flow chart illustrating a process of calculating a word sense relevance values according to the embodiment of the invention.

More specifically, the process shown in FIG. 15 is performed by the controller 11 as described below.

First, in step F71, the controller 11 generates a word sense network in accordance with explanations of word senses described in the electronic dictionary.

More specifically, the word sense network is generated in accordance with the explanations of the respective word senses described in the dictionary and the referential relations of word senses appearing in the explanations.

The internal structure of the network is described by tags such as those described above. The controller 11 of the document processing apparatus 1 sequentially reads word senses and explanations thereof described in the electronic dictionary stored in the RAM 14 and generates a network.

The controller 14 stores the generated word sense network in the RAM 14.

Instead of generating a network by the controller 11 of the document processing apparatus 1 using the dictionary, a network may also be obtained by receiving from the outside via the receiver 21 or by installing from the storage medium 32 via the write/read unit 31.

Similarly, the electronic dictionary may also be obtained by receiving from the outside via the receiver 21 or by installing from the storage medium 32 via the write/read unit 31.

In step F72, spreading of central activation values of elements of the respective word senses is performed over the word sense network generated in step F71. In this activation spreading process, the central activation values associated with the respective word senses are given in accordance with the internal structure described by tags using the dictionary. The process of spreading activation values is performed in the manner described above with reference to FIG. 8.

In step F73, one word sense Si is selected from elements constituting the word sense network generated in step F71. In the next step F74, the initial central activation value ei of the element Ei corresponding to the word sense Si is changed, and the change $\Delta ei$ in the central activation value from the initial value is calculated.

In the next step F75, the change Δej in the central activation value ej of an element Ej corresponding to another word sense Sj in response to the change Δei in the central activation value of the element Ei is determined.

In step F76, the difference Δej obtained in step F75 is divided by Δei obtained in step F74. The resultant ratio Δej/Δei is employed as the word sense relevance value of the word sense Si with respect to the word sense Sj.

In step F77, it is determined whether the word sense relevance values have been calculated for all possible combinations between one word sense Si and all other word senses Sj.

If word sense relevance values have not been calculated for all possible combinations, the process returns to step F73 to calculate the word sense relevance value for a remaining combination.

In the loop from step F73 to F77, the controller 11 sequentially reads values required for the calculation from the RAM 14 and calculates the word sense relevance values in the above-described manner. The controller 11 sequentially stores the calculated word sense relevance values into the RAM 14.

If it is determined in step F77 that the word sense relevance values have been calculated for all possible combinations of two word senses, the process is terminated.

In the calculation of word sense relevance values, as can be seen from the above description, when the central activation value of a certain word sense is changed, if the central activation value of some other word sense changes to a great degree, then that word sense is regarded as having a high relevance.

That is, if the central activation value of a certain word sense is changed in step F74, this change results in changes in the central activation values of word senses related (linked) to that word sense. Therefore, the relevance of word senses with respect to a certain word sense can be determined from the relative changes. (As described earlier, the central activation value of an element Ei is given by the sum of the current central activation value and the end-point activation values associated with that element Ei. Herein, the end-point activation values of the element Ei depend upon the central activation value and end-point activation values of elements linked to the element Ei. Therefore, if an element Ej has a high degree of relevance to the element Ei, a change in the central activation value of the element Ei generates a large change in the central activation value of the element Ej.)

By performing the above-described process for all possible combinations of two word senses, the relevance values are obtained for all possible combinations of two word senses.

A word sense relevance value is defined between each word sense and another word sense, as shown in FIG. 16. In the example of the word sense relevance table shown in FIG. 16, word sense relevance values are normalized such that they take a value within the range from 0 to 1. In the example shown in FIG. 16, the word sense relevance values among "computer", "television", and "VTR" are described in the table. Herein, the relevance value between "computer" and "television" is 0.55, and that between "computer" and "VTR" is 0.25. The relevance value between "television" and "VTR" is 0.60.

Referring again to FIG. 14, after performing step F62 using the word sense relevance values which have been calculated in advance in the above-described manner, the controller 11 performs step F63 to calculate the document category relevance value Rel(Ci) of a document with respect to category Ci according to the following equation:

$$Rel(Ci) = ml \cdot P(Ci) + nl \cdot R(Ci)$$

where coefficients ml and nl are constants representing the degrees of contributions of the respective values to the document category relevance.

In the above process, the controller 11 calculates, according to the above equation, the document category relevance value Rel(Ci) using the number P(Ci) of common elements calculated in step F61 and the sum R(Ci) of word sense relevance values calculated in step F62.

The controller 11 stores the calculated document category relevance value Rel(Ci) into the RAM 14.

The coefficients ml and nl may be set to, for example, 10 and 1, respectively.

The values of coefficients ml and nl may also be determined statistically. In this case, the controller 11 calculates the document category relevance value Rel(Ci) using various values of ml and nl, and employs optimum values.

In step F64, the controller 11 categorizes the document into category Ci if the document category relevance value of the document becomes highest for category Ci and if the document category relevance value Rel(Ci) is greater than a threshold value.

That is, the controller 11 calculates document category relevance values with respect to a plurality of categories, and selects a category corresponding to the highest document category relevance value. If the document category relevance value corresponding to the selected category is greater than the threshold value, the controller 11 categorizes the document into the selected category. Thus, the document is automatically categorized into a correct category.

If the highest document category relevance value is not greater than the threshold value, the document is not categorized into any category.

After performing the automatic categorization in step F23 in FIG. 14, which is described in further detail in FIG. 14, the categorization model is updated and registered in steps F24 and F25, respectively, in accordance with the result of the automatic categorization. Thus, the entire process associated with the automatic categorization is completed.

In this way, the document data input to the document processing apparatus 1 is automatically categorized, and displayed in a corresponding document category displaying area in the document categorization window 201 shown in FIG. 10, thereby informing the user of the reception of the document.

6. Generation of Summary

Now, the process of generating a summary of document data is described.

As described earlier, a user can select a document and read the selected document displayed in the browser window 301 shown in FIG. 11. The browser window 301 can be opened from the categorization window 201 shown in FIG. 10 when the above-described manual categorization process is performed in step F13 or at any other time.

Figure 17:
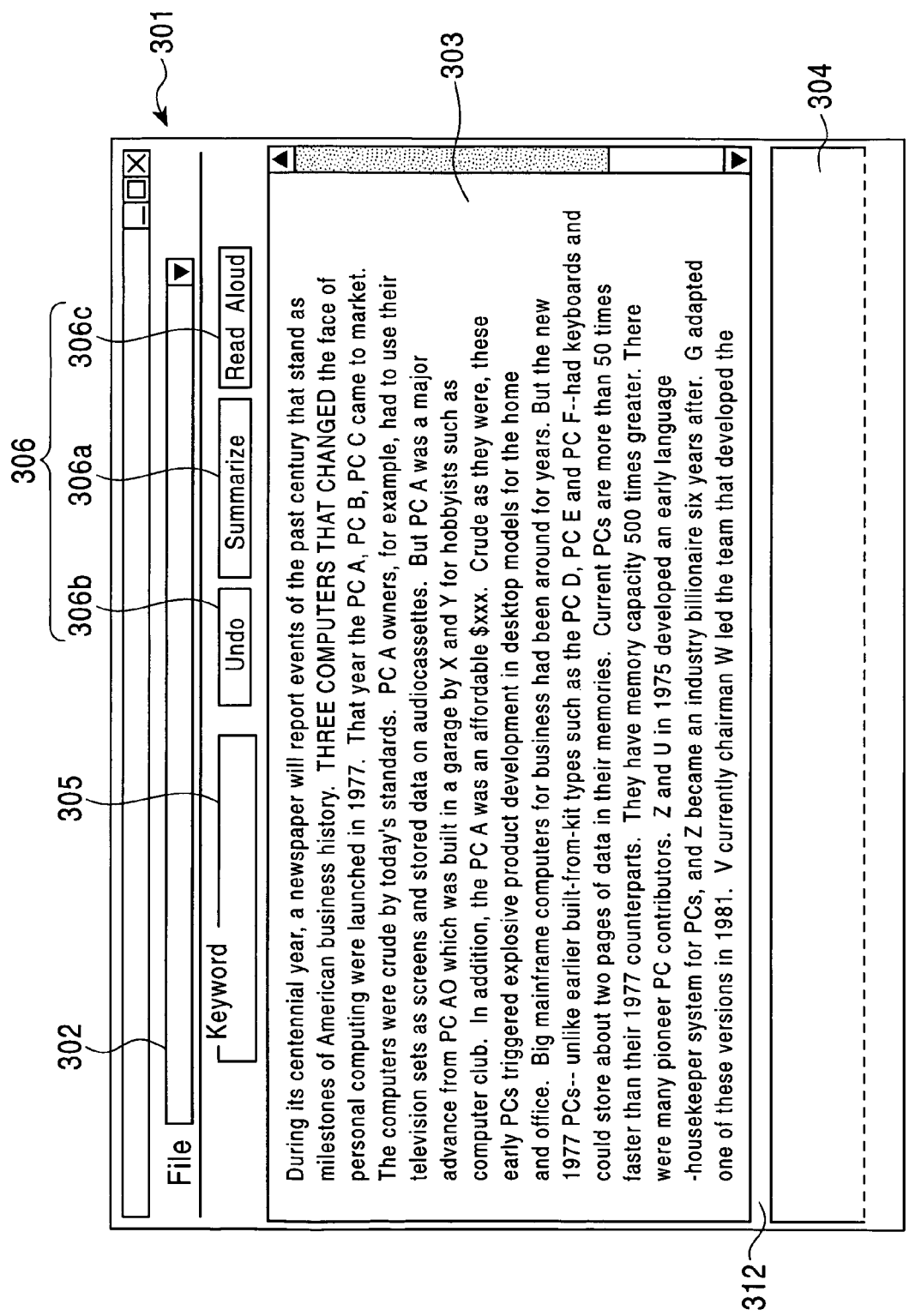
FIG. 17 is a schematic diagram illustrating an example of a browser window according to the embodiment of the invention.

For example, if the user clicks the browser button 202b in the categorization window 201 after selecting a document, the browser window 301 is opened and the selected document is displayed in the document displaying area 303 as shown in FIG. 17.

When the entire document is not displayed at a time in the document displaying area 303, a part of the document is displayed.

When a summary has not been generated yet, nothing is displayed in the summary displaying area 304 as shown in FIG. 17.

Figure 18:
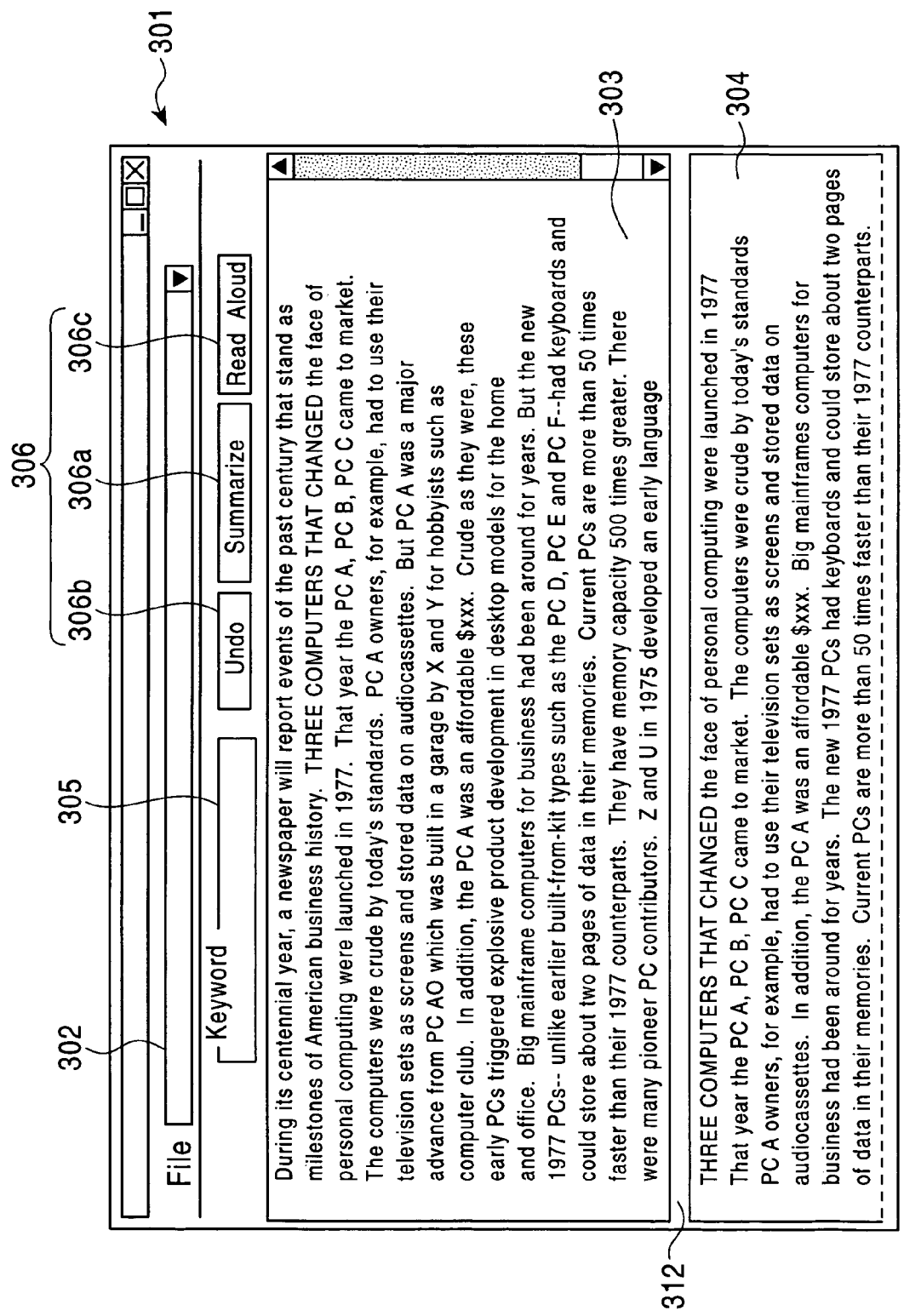
FIG. 18 is a schematic diagram illustrating an example of a browser window in which a summary is displayed, according to the embodiment of the invention.

If the summarize button 306a in the browser window 301 is clicked, a summary of the document displayed in the document displaying area 303 is generated and displayed in the summary displaying area 304 as shown in FIG. 18.

More specifically, in response to the Summarize button 306a being clicked by the user, the controller 11 performs a summarization process for generating a summary text and the displays the generated summary text as described below.

The process of generating a summary from a given document is performed on the basis of the internal structure, represented by tags, of the document.

The summary is generated depending on the size of the summary displaying area 304. The sizes of the document displaying area 303 and the summary displaying area 304 can be changed by moving the boundary 312.

That is, the summary is generated such that the resultant summary has a size (document length) corresponding to the size of the summary displaying area 304 at the time when a summarization command is issued.

FIG. 18 illustrates the process performed by the controller 11 to generate a summary text in response to the Summarize button 306a being clicked.

Figure 19:
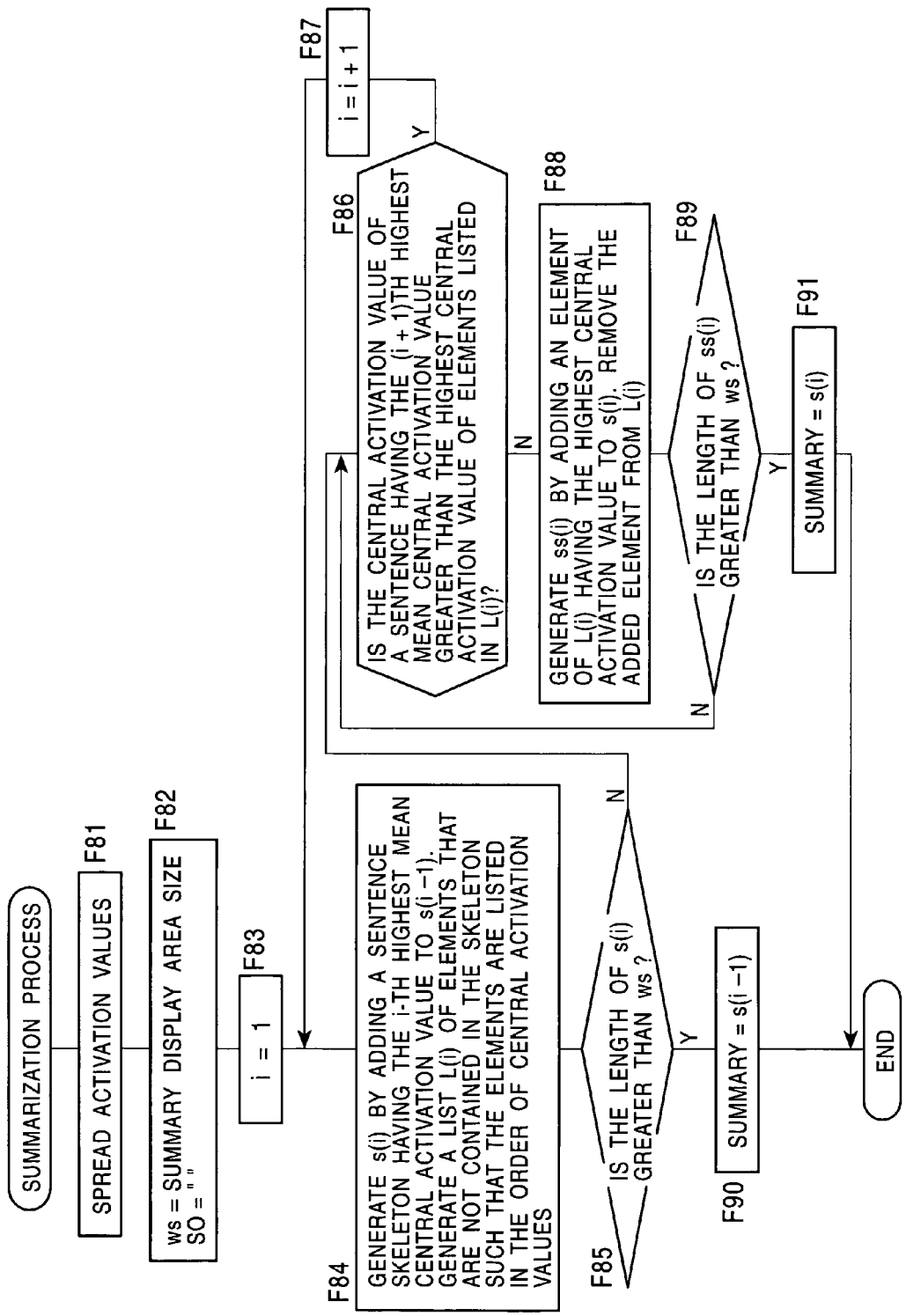
FIG. 19 is a flow chart illustrating a process of generating a summary according to the embodiment of the invention.

In step F81 in FIG. 19, the controller 11 spreads activation values. In the present embodiment, a summary is generated by employing elements having high degrees of significance represented by the central activation values obtained by means of spreading activation. When a given document includes tags representing the internal structure, central activation values determined by means of spreading activation in accordance with the internal structure described by tags can be assigned to the respective elements.

The process of spreading activation in step F81 is performed in a similar manner to the process described earlier with reference to FIGS. 7–9. As described earlier, the spreading activation is a process in which the central activation values associated with elements are spread such that if an element has significant relation with an element having a high central activation value, then a high central activation value is given to the former element. The activation spreading process causes both an anaphoric (coreferential) expression and an antecedent thereof to have the same central activation value. On the other hand, the central activation values of the other elements decrease. The central activation values are determined in accordance with the internal structure represented by tags, and they are used to extract keywords characterizing the document.

In the next step F82, the controller 11 sets a parameter ws such that ws represents the current size of the summary displaying area 304 in the browser window 301 displayed on the display 30. That is, the parameter ws represents the maximum allowable number of characters that can be displayed in the summary displaying area 304 such that The controller 11 then initializes a summary string s (stored in an internal register) such that s(0)=" ". The controller 11 stores the maximum allowable number ws of characters and the initial value s(0) of the string s into the RAM 14.

In step F83, the controller 11 sets the counter value i of a counter for counting the number of iterations.

Then in step F84, the controller 11 extracts a skeleton of a sentence having an ith greatest mean central activation value from the document.

Herein, the mean central activation value refers to the mean value of central activation values of elements included in a sentence.

The controller 11 reads a string s(i-1) from the RAM 14 and adds the string of the extracted sentence skeleton to the string s(i-1) thereby generating a string s(i). The controller 11 stores the resultant string s(i) into the RAM 14.

In the first iteration, because the string s(i-1) has an initial value s(0), the sentence skeleton extracted in this first operation is employed as the string s(i) and stored into the RAM 14.

When step F84 is performed in the following iterations, a newly extracted sentence skeleton is added to the current string s(i) (that is, string s(i-1) at that time).

Furthermore, in step F84, the controller 11 generates a list L(i) of elements that are not included in the sentence skeleton, wherein elements are listed in the order of descending central activation values. The controller 11 stores the resultant list L(i) into the RAM 14.

The summarization algorithm employed in step F84 is to select sentences in the order of central activation values from the highest value to the lowest value on the basis of the result of spreading of activation values and extract sentence skeletons of selected sentences. The skeleton of a sentence is made up of essential elements extracted from the sentence. Elements that can be essential include a head, a subject, an object, an indirect object, and an element having a relational attribute as to possessor, cause, condition, or comparison. When a coordination structure is essential, elements included directly in the coordination structure are employed as essential elements. The controller 11 generates a sentence skeleton by joining essential elements of a selected sentence and adds it to the summary.

In step F85, the controller 11 determines whether the length of the string s(i) is greater than the maximum allowable number ws of characters that can be displayed in the summary displaying area 304 of the browser window 301.

This step F85 is necessary to generate the summary such that the summary has a length corresponding to the size of the summary displaying area 304.

If the length of the string s(i) is less than the maximum allowable number ws of characters, the controller 11 advances the process to step F86.

In step F86, the controller 11 compares the central activation values of elements of a sentence having an (i+1)th highest mean central activation value of sentences included in the document with the highest central activation value among those of elements included in the list L(i) generated in step F84.

That is, a sentence (a candidate having highest priority among the remaining sentences) whose mean central activation value is next in magnitude to that of a sentence that has been employed in step F84 as a part of the summary is compared with the central activation values of elements that have been regarded as being not essential and omitted from the skeletons of sentences employed in step F84 to generate the summary.

Thus, in step F86, it is determined whether an element omitted from the sentence skeleton employed in the previous step F84 should be now added to the summary or an element of another sentence should be added.

If the highest central activation value among those of elements in the list L(i) is higher than those of elements of the sentence having the (i+1)th highest mean central activation value, an element is selected from the elements that were not employed in the sentence skeleton in the previous step F84 and the selected element is added to the summary string.

In this case, the controller 11 advance the process to step F88 and selects an element having the highest central activation value from the list L(i) and adds the selected element to the current string s(i) thereby generating a string ss(i).

The controller 11 then removes the selected element from the list L(i).

In step F89, the controller 11 determines whether the length of the string ss(i) is greater than the maximum allowable value ws. If not, the process returns to step F86.

On the other hand, if it is determined in step F86 that the sentence having the (i+1)th highest mean central activation value includes an element having a higher central activation value than the highest central activation value among those of elements in the list L(i), it is determined that an element to be further added to the summary string should be selected from a sentence other than the sentence employed in the previous step F84. In this case, the process goes to step F87, and the counter value i is incremented. Then, the process returns to step F84.

That is, a skeleton is extracted from the sentence that have been determined, in step F84, to have the (i+1)th highest mean central activation value, and the extracted skeleton is added to the string s(i).

Thus, elements having high central activation values are selected in step F84 or F88, and the selected elements 6 are added to the summary string. On the other hand, in step F85 or F89, the length of the string s(i) or ss(i) is compared with the maximum allowable number ws of characters, thereby ensuring that the number of characters included in the string becomes closest to but not greater than the maximum allowable number ws.

If it is determined in step F85 that the length of the string s(i) is greater than the maximum allowable value ws, then the controller 11 advances the process to step F90 and employs the previous string s(i-1) instead of the new string s(i) that includes a skeleton selected and added in the previous step F84.

That is, when a sentence skeleton is added to the summary string in step F84, if the resultant summary string includes a greater number of characters than the maximum allowable number ws, it is determined that the previous string s(i-1), which does not include the sentence skeleton employed in the immediately previous step F84 to form the current string s(i), includes as many characters as possible below the limit ws. Thus, the previous string s(i-1) is employed as a final summary string.

When the string s(i) is generated for the first time in step F84 (i=1, in this case), if it is determined in step F85 that the number of characters included in the string s(i) is greater than the maximum allowable number ws, the string s(i-1) becomes identical to the initial string s(0) (null string) given in step F82, and thus no summary string is generated.

This can occur when the size of the summary displaying area 304 is too small. In this case, the user may expand the size of the summary displaying area 304 on the screen and click the Summarize button 306*a* to start the process shown in FIG. 19.

If it is determined in step F85 that the number of characters included in the string s(i) is not greater than the maximum allowable number ws, the controller 11 advances the process to step F86 as described above and selects an element to be further added to the summary string.

In step F89, it is determined whether the number of characters included in the string ss(i) is greater than the maximum allowable number ws.

If yes, the controller 11 advances the process to step F91 and employs, as the summary string, the previous string s(i) that does not include an element added in the immediately previous step F88 to form the current string.

That is, when an element is added to the string in step F88, if the resultant summary string includes a greater number of characters than the maximum allowable number ws, it is determined that the previous string s(i), which does not include the above-described element, includes as many characters as possible below the limit ws. Thus, the previous string s(i) is employed as a final summary string.

If wsy=ws, it is determined that a summary has been generated in the summarization process such that the length of the summary matches the size of the summary displaying area 304. The content of the summary is made up of a skeleton of one or more sentences having high mean central activation values and one or more elements that are not included in skeletons but have high central activation values.

The resultant summary is stored in the RAM 14 and the entire summary is displayed in the summary displaying area 304 in a fixed fashion as shown in FIG. 18.

When the user reads the summary displayed in the summary displaying area 304, if the user wants a longer or shorter summary, the user may click the summarization button 306*a* after increasing or decreasing the size of the summary displaying area 304 in the browser window 301.

In response, the process shown in FIG. 19 is performed, and a summary having a length matching the specified size of the summary displaying area 304 is generated and displayed.

7. Reading-aloud Process

As described above, when the document processing apparatus 1 receives a document including a tag, the Ug document or a summary thereof is displayed so that a user can read it. Furthermore, the document processing apparatus 1 is capable of outputting a voice that reads aloud the received document.

Figure 20:
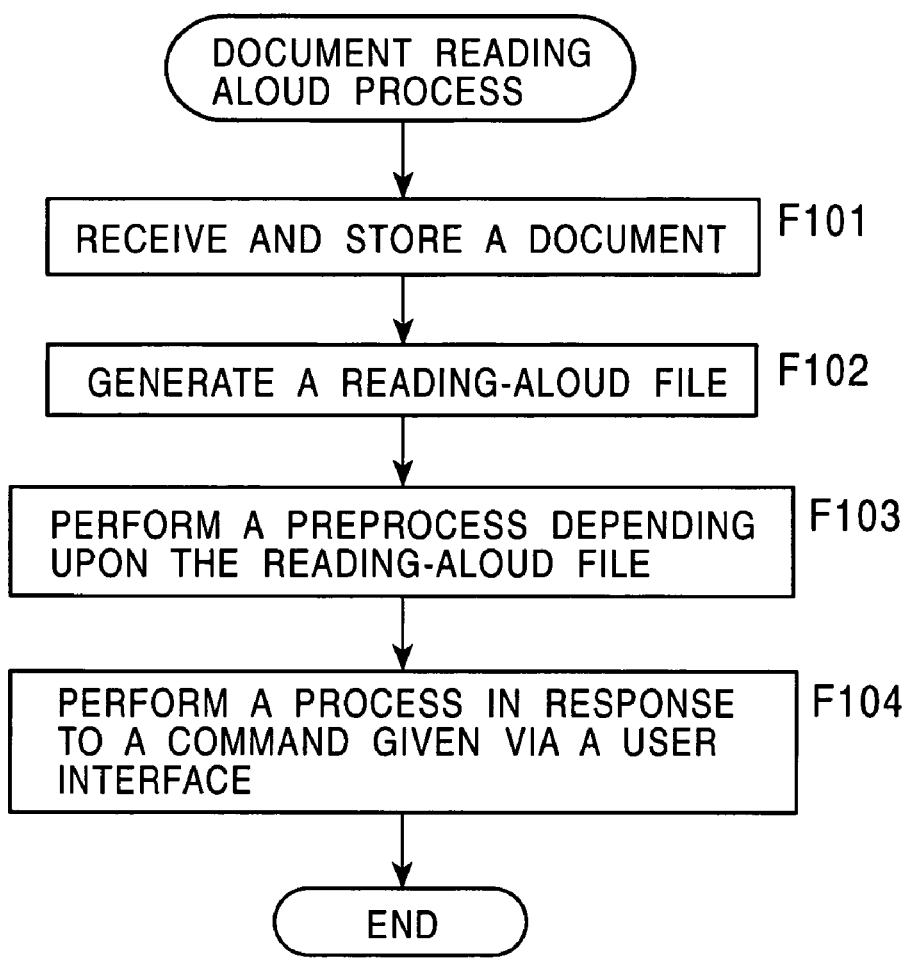
FIG. 20 is a flow chart of a process of reading aloud a document according to the embodiment of the invention.

In this case, a read-aloud program stored in the ROM 15 or the HDD 34, in which other various electronic document processing programs are also stored, is started to perform the process shown in FIG. 20 thereby reading aloud a document.

The outline of the read-aloud process is descried first, and then various steps of the read-aloud process are described in detail with reference to specific examples of documents.

In step F101 shown in FIG. 20, the controller 11 performs reception and storage of a document in a similar manner to step F11 shown in FIG. 5 (or step F21 in FIG. 13). As described earlier, when a document (tag file) is received, the document is categorized manually or automatically. If desired, the document received in step F101 may be subjected to a reading-aloud process. Note that the read-aloud processing may be performed either after or before step F101.

In order to perform the read-aloud processing, the document has to include a tag required to control voice synthesizing operation.

As described earlier with reference to FIG. 1, document data (tag file) including tags is generated by the authoring apparatus 2. In order to realize voice synthesis, the authoring apparatus 2 describes tags for controlling voice synthesis operation in the document data.

Note that after receiving a document including a tag, the document processing apparatus 1 may attach to the document an additional tag for controlling the voice synthesizing operation. That is, it is not necessarily required to use the authoring apparatus 2 to describe tags for controlling voice synthesis.

In the next step F101 in the read-aloud processing, the document processing apparatus 1 generates a reading-aloud file on the basis of the tag file, under the control of the CPU 13. The reading-aloud file is generated by extracting read-aloud attribute information from a tag described in the tag file and embedding attribute information, as will be described in detail later.

In the next step F103, under the control of the CPU 13, the document processing apparatus 1 performs optimization associated with the voice synthesis engine using the reading-aloud file.

The voice synthesis engine may be implemented with hardware or software. When the voice synthesis engine is implemented with software, the voice synthesis engine program is stored in advance in the ROM 15 or the HDD 34.

In the next step F104, the document processing apparatus 1 performs various processes in response to a command issued by a user via the user interface that will be described later.

One of such processes performed by the document processing apparatus 1 is to read aloud a document. Each step of the reading-aloud process is described in detail below.

First, reception and/or generation of a document in step F101 is described.

The document processing apparatus 1 receives a document (including a tag required to control the voice synthesis operation) via, for example, the communication device 21.

Alternatively, the document processing apparatus 1 may generate a document by inserting an additional tag for controlling voice synthesis into the received document.

By way of example, we assume herein that the document processing apparatus 1 has received or generated a document written in Japanese and also a document written in English, wherein both documents include a tag.

The content of the Japanese document is shown below.

素敵にエイジング/8 ガン転移、抑えられる！？

がんはこの十数年、わが国の死因第一位を占めている。その死亡率は年齢が進むとともに増加傾向にある。高齢者の健康を考えるとき、がんの問題を避けて通れない。

がんを特徴づけるのは、細胞増殖と転移である。人間の細胞には、自動車でいえばアクセルに当たり、がんをどんどん増殖する「がん遺伝子」と、ブレーキ役の「がん抑制遺伝子」がある。

双方のバランスが取れていれば問題はない。正常な調節機能が失われ、細胞内でブレーキが利かない変異が起こると、がんの増殖が始まる。高齢者の場合、長い年月の間にこの変異が蓄積し、がん化の条件を備えた細胞の割合が増え、がん多発につながるわけだ。

ところで、もう一つの特徴、転移という性質がなければ、がんはそれほど恐れる必要はない。転移を抑制することの重要性がここにある。切除するだけで、完治が可能になるからである。

この転移、がん細胞が増えるだけでは発生しない。がん細胞が細胞と細胞の間にある蛋白(たんぱく)質などを溶かし、自分の進む道をつくって、血管やリンパ管に入り込む。循環しながら新たな"住み家"を探して潜り込む、といった複雑な動きをすることが、近年解明されつつある。

A translation of the above document into English is shown below. In Japan, cancer has caused the most deaths over the last ten or more years. The rate of death caused by cancer increases with increasing age. Therefore, cancer is a very significant problem for old persons to maintain their health. The cancer is characterized by cell multiplication and metastasis. Human cells each include an "oncogene" and a "tumor suppressor gene". The oncogene corresponds to an accelerator of a car and the tumor suppressor gene corresponds to a brake. When the functions of these two genes are balanced, no problems occur. However, if a genetic defect occurs, the balance is broken and cancer cells start to proliferate. Older persons have genetic defects accumulated over a long period of years and thus have a large number of cells that are apt to become cancer cells. If cancer had not the other property, that is, metastasis, cancer would not be a fearful disease, because cancer would be cured completely by cutting away a cancerous part. In this sense, it is very important to suppress metastasis. A simple increase in the number of cancer cells does not cause metastasis. Recent investigations have revealed that metastasis occurs via a complicated process in which cancer cells dissolve a protein or the like between cells thereby creating a path through which to invade a blood vessel or a lymph vessel. After invading a blood or lymph vessel, cancer cells circulate in the blood vessel to find a new "habitation". A new actor has recently appeared on the stage. The actor is a protein called "nm23". An investigation performed in the USA has revealed that nm23 has a capability of suppressing metastasis, although the detailed mechanism has not been revealed yet. Protein nm23 is expected to be useful for diagnosis and curing of cancer.

The content of the English document is shown below.

"During its centennial year, The Wall Street Journal will report events of the past century that stand as milestones of American business history. THREE COMPUTERS THAT CHANGED the face of personal computing were launched in 1977. That year the Apple II, Commodore Pet and Tandy TRS came to market. The computers were crude by today's standards. Apple II owners, for example, had to use their television sets as screens and store data on audio cassettes."

When the document processing apparatus 1 receives such a document that is written in Japanese or English and that includes tags, the document processing apparatus 1 may categorize it and display the content of the document or a summary thereof, as shown in FIG. 17 or 18.

The above documents written in Japanese and English are described in the form of tag files as shown in FIGS. 22A, 22B and 23, respectively.

Some parts of the tag file of the Japanese document described above are illustrated in FIGS. 22A and 22B. The heading part "素敵にエイジング]/8ガン転移、抑えられる!?" is shown in 22A, and the last paragraph "この転移、がん細胞が . . . 近年解明されつつある。" is shown in FIG. 22B. The other parts are not shown.

Note that the tag file actually includes the entire part from the title to the end of the last paragraph.

In FIG. 22A, a tag <title> is used to indicate that the part following this tag is the title.

In the tag file shown in FIGS. 22A and 22B, tags are inserted in a similar manner to tags used to describe the document data structure as described earlier with reference to FIG. 3. Although all tags are not described here, a plurality of tags for controlling voice synthesis are put at various locations.

An example of a voice synthesis control tag is that which is attached when a document includes information representing the pronunciation of a word, as is the case with Example 1 shown in FIG. 18B. In this example, pronunciation="null" is described as attribute information in a tag to prevent pronunciation characters "(たんぱく)" representing the pronunciation of a word "蛋白" located before the pronunciation characters from being read aloud. Herein, "蛋白" is a Japanese word corresponding to "protein" and "たんぱく" represents its pronunciation. If pronunciation="null" is not specified, the Japanese word "蛋白" corresponding to "protein" will be pronounced twice because of the presence of the pronunciation characters.

Another tag for controlling voice synthesis is that used to represent the pronunciation of a word which is difficult to pronounce. In Examples 2 in FIG. 18B, attribute information, pronunciation="りんぱかん", is described in a tag to indicate the correct pronunciation of a word "りんぱ管". Similarly, in Example 3 in FIG. 18B, attribute information pronunciation="すみか" is described in a tag to indicate the correct pronunciation of a word "住み家". Herein, "りんぱ管" is a Japanese word corresponding to "lymph vessel", and "住み家" corresponds to "habitation".

In the example shown in FIG. 23, the tag file also includes tags for controlling voice synthesis. In Example 4 in FIG. 23, pronunciation="two" is described in a tag to indicate the correct pronunciation of "II". This ensures that "II" is correctly pronounced as "two".

In the case where a document includes a quotation, a tag is put in the document to indicate that a sentence is a quotation. Similarly, a tag for indicating an interrogative sentence may be inserted in a document.

In step F101 described above with reference to FIG. 20, the document processing apparatus 1 receives or generates a document including a tag for controlling voice synthesis, wherein the tag may be described in various manners as explained above.

Now, the process of generating a reading-aloud file in step F102 shown in FIG. 20 is described.

The document processing apparatus 1 analyzes attribute information described in tags in a tag file and detects attributes required for the reading-aloud operation. The document processing apparatus 1 then generates a reading-aloud file by embedding attribute information in the tag file.

More specifically, the document processing apparatus 1 detects tags that indicate start positions of paragraphs, sentences, and phrases in the document and embeds attribute information corresponding to these tags into the tag file so as to represent reading-aloud attributes. When there is a summary generated from a document, the document processing apparatus 1 detects the start position of a part corresponding to the summary from the document and embeds attribute information indicating that the specified part of the document includes the same expression as that included in the summary and that the specified part should be read aloud with a greater output level.

For example, the document processing apparatus 1 generates reading-aloud files shown in FIGS. 24 and 25 from the tag files shown in FIGS. 22 and 23, respectively. Herein, FIGS. 24A and 24B correspond to FIGS. 22A and 22B. Note that in actual reading-aloud files, each file includes the entire expression starting from the title and the end of the last paragraph.

In the example shown in FIGS. 24A and 24B, the reading-aloud file includes attribute information, Com=Lang***, embedded at the beginning of the document. This attribute information indicates the language in which the document is written. In this specific example, Com=Lang=JPN is used to indicate that the document is written in Japanese. The document processing apparatus 1 analyzes this attribute information and selects a suitable voice synthesis engine depending upon the language.

The reading-aloud file also includes attribute information, Com=begin_p, Com=begin_s, and Com=begin_ph, embedded at various locations to indicate the start positions of paragraphs, sentences, and phrases, respectively, in the document. The document processing apparatus 1 detects the start positions of phrases, sentences, and phrases by analyzing tags described in the tag files.

In the case where a plurality of tags such as <adjective verb phrase><noun phrase> representing syntactic structures in the same level appear successively in a tag file, only a single attribute data Com=begin_ph is embedded in a reading-aloud file instead of embedding as many attribute data as there are successive tags in the same level.

In the reading-aloud file, attribute information Pau=500, Pau=100, and Pau 50 are embedded at locations corresponding to Com=begin_p, Com=begin_s, and Com=begin_ph, respectively, to indicate that pauses with periods of 500 msec, 100 msec, and 50 msec, respectively, should be inserted in the read-aloud operation.

More specifically, in accordance with these attribute codes, the document processing apparatus 1 inserts pauses with periods of 500 msec, 100 msec, and 50 msec, at the starts of paragraphs, sentences, and phrases, respectively, when the document is read aloud using the voice synthesis engine.

These attribute codes are embedded at locations corresponding to attribute codes Com=begin_p, Com=begin_s, and Com=begin_ph, respectively. Therefore, when a plurality of tags representing syntactic structures in the same level appear successively in a tag file, such as <adverb phrase><noun phrase>, these tags can be regarded as being associated with a single phrase, and only one attribute code Pau=50 is embedded for each phrase without embedding as many attribute codes as there are tags associated with one phrase.

On the other hand, when a plurality of tags representing syntactic structures in different levels appear successively in a tag file, as is the case with <phrase><sentence><noun phrase>, attribute codes Pau=*** are embedded in correspondence with the respective tags. As a result, when the document processing apparatus 1 reads aloud such a part, a pause with a period equal to the sum of pause periods for a phrase, a sentence, and a phrase, that is, a pause with a period of 650 msec is made.

By making pauses for paragraphs, sentences, and phrases, the document processing apparatus 1 can read aloud a document in a natural manner. The lengths of pauses at the starts of paragraphs, sentences, and phrases are not limited to 600 msec, 100 msec, and 50 msec, but they may be set to arbitrary desired values.

In the present example, in response to pronunciation attribute information, pronunciation="null", attached to "(たんぱく)" in the tag file, "(たんぱく)" is omitted from the reading-aloud file generated from the tag file. On the other hand, in response to attribute information, pronunciation="りんぱかん" and pronunciation="すみか" described in the tag file, "リンパ管" and "住み家" are replaced with "りんぱかん" and "すみか" respectively. By embedding such pronunciation attribute information, the document processing apparatus 1 can prevent a word from being pronounced incorrectly due to an incorrect description in the dictionary which is referred to by the voice synthesis engine.

When a tag file includes a tag indicating a quotation, attribute information may be embedded to a corresponding reading-aloud file to indicate that a voice synthesis engine different from the current voice synthesis engine should be used for the quotation.

When a tag indicating an interrogative sentence is included in a tag file, attribute information may be embedded to indicate that the end of the interrogative sentence should be read aloud with a rising intonation.

Furthermore, attribute information may be embedded to indicate that a literary expression should be converted to a colloquial expression. This type of attribute information is useful particularly for a document written in Japanese. In this case, instead of embedding such attribute information in a reading-aloud file, the document processing apparatus 1 may convert a literary expression to a colloquial expression in a tag file.

The reading-aloud file shown in FIG. 25 includes attribute information, Com=Lang=ENG, described at the start of the document to indicate that the document is written in English.

Furthermore, in the reading-aloud file, attribute information, Com=Vol=* is embedded to specify the volume level of the voice that reads aloud the document. For example, Com=Vol=0 indicates that the document should be read aloud at a default volume level. Com=Vol=80 indicates that the document should be read aloud at a volume level greater than the default level by 80%. Attribute information Com=Vol=* is effective until another attribute information Com=Vol=*** appears.

In response to the attribute information, pronunciation="two", described in the tag file, "II" in the tag file is converted to "two" in the reading-aloud file".

Figure 21:
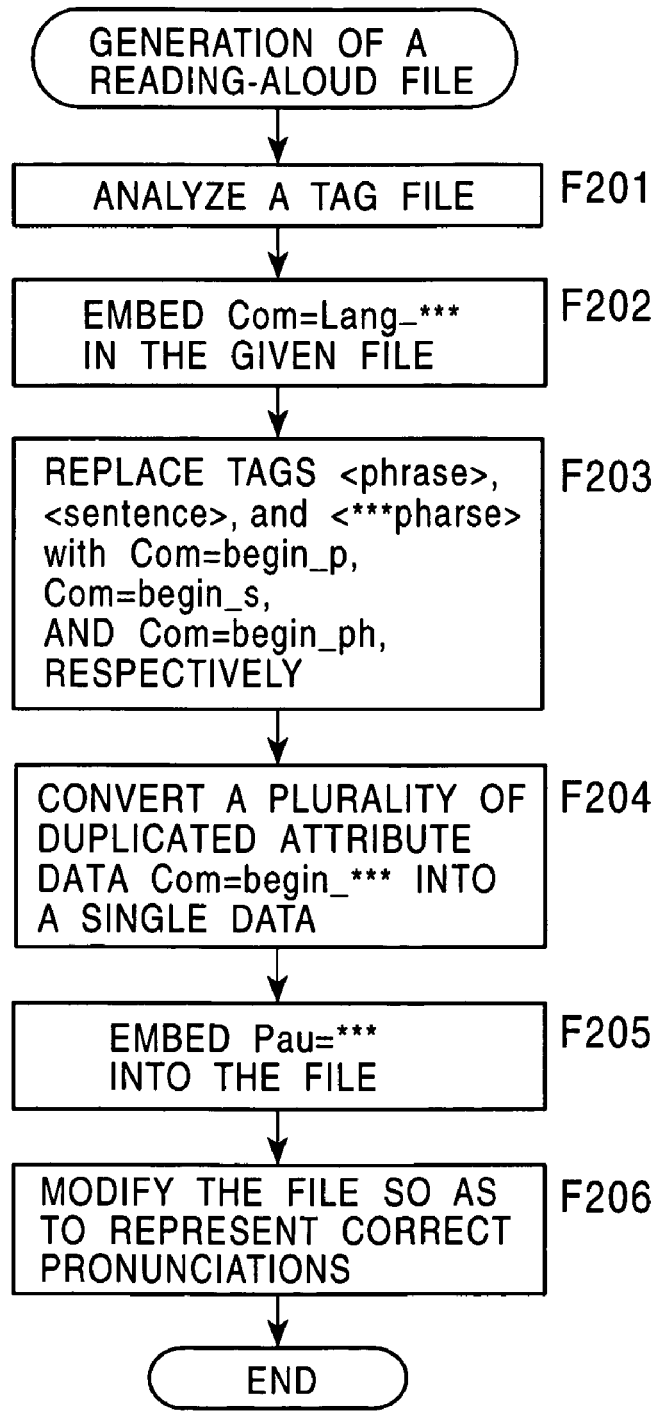
FIG. 21 is a flow chart illustrating a process of generating a reading-aloud file according to the embodiment of the invention.

The document processing apparatus 1 generates a reading-aloud file by performing the process shown in FIG. 21.

That is, in step F201, the document processing apparatus 1 analyzes, using the CPU 13, a tag file received from the outside or generated by the document processing apparatus 1. In this step, the document processing apparatus 1 detects the language in which the document is written and also detects the start positions of paragraphs, sentences, and phrases, and pronunciation attribute information by analyzing tags.

Subsequently, in step F202, the document processing apparatus embeds, using th CPU 13, attribute information Com=Lang=*** at the start of the document, depending upon the language in which the document is written.

In the next step F203, the document processing apparatus 1 replaces, using the CPU 13, tags indicating the starts of paragraphs, sentences, and phrases of the document with corresponding attribute information in the reading-aloud file. More specifically, tags <paragraph>, <sentence>, and <***phrase> in the tag file are replaced with Com=begin_p, Com=begin_s, and Com=begin_ph.

In the next step F204, the document processing apparatus 1 simplifies duplicated expressions, Com=begin_*, corresponding to a plurality of tags representing syntactic structures in the same level, into a single expression of Com=begin_*.

In the next step F205, the document processing apparatus 1 embeds, using the CPU 13, Pau=* at locations before respective attribute information Com=being_*. More specifically, the document processing apparatus embeds Pau=500 before Com=begin_p, Pau=100 before Com=begin-s, and Pau=50 before Com=begin_ph.

Subsequently, in step F206, the document processing apparatus modifies, using the CPU 13, the content of the document so that the document will be read aloud with correct pronunciations. More specifically, in response to the pronunciation attribute information, pronunciation="null", "(たんぱく)" is removed. On the other hand, in response to pronunciation attribute information, pronunciation= "りんぱかん" and pronunciation= "すみかリンパ管" and "住み家" are replaced with "りんぱかん" and pronunciation= "すみか", respectively.

In step F102 shown in FIG. 20, the document processing apparatus 1 automatically generates a reading-aloud file by performing the process shown in FIG. 21. The controller 11 stores the extracted elements in the RAM 14.

In step F103 shown in FIG. 20, a process is performed using the reading-aloud file as described below.

Under the control of the CPU 13, the document processing apparatus 1 performs optimization in accordance with the information described in the reading-aloud file so that the voice synthesis engine stored in the ROM 15 or the HDD 34 can properly work.

More specifically, the document processing apparatus 1 selects a voice synthesis engine to be used, in accordance with attribute information Com=Lang=*** embedded in the reading-aloud file.

Each voice synthesis engine has an identifier determined depending upon the language and also depending upon whether to select a male or female voice, and such information is described in an initial setting file and stored on the HDD 34. The document processing apparatus 1 examines the initial setting file and selects a voice synthesis engine having an identifier matching the language of the document.

Furthermore, the document processing apparatus 1 converts expressions Com=begin_**** embedded in the reading-aloud file to expressions in a form suited for the selected voice synthesis engine.

For example, the document processing apparatus 1 marks each expression Com=begin_ph with a number in the range from 10000 to 99999. More specifically, an expression, Com=begin_ph, may be marked such as Mark=10000. On the other hand, each expression, Com=begin_s, is marked with a number with the range from 1000 to 9999, such as Mark=1000. Each expression, Com=begin_p, is marked with a number with the range from 100 to 999, such as Mark=100.

Thus, the start positions of phrases, sentences, and paragraphs are indicated by numbers in the ranges from 10000 to 99999, from 1000 to 9999, and 100 to 999, respectively. Therefore, it is possible to detect the start positions of phrases, sentences, and paragraphs using these marks.

As described above, volume attribute information, Vol=***, representing the volume level by a percentage as compared with the default volume level, and the document processing apparatus 1 determines the absolute volume level from the value described by the percentage.

The document processing apparatus 1 performs the above-described process in step F103 shown in FIG. 20 using the reading-aloud file thereby converting the reading-aloud file into a form which can be read aloud by the voice synthesis engine.

In step F104 shown in FIG. 20, an operation is performed in response to a command issued by a user via the user interface as described below.

If a user clicks the read-out button 306c shown in FIG. 17 or 18 using the mouse or the like of the input unit 20, the document processing apparatus 1 activates the voice synthesis engine.

Furthermore, the document processing apparatus 1 displays the reading-aloud window 401 serving as the user interface such as that shown in FIG. 25 on the display 30.

As shown in FIGS. 22A and 22B, the reading-aloud window 401 includes a play button 420 used to start the read-out operation, a stop button 421 used to stop the read-out operation, and the pause button 422 used to temporarily stop the read-out operation.

The reading-aloud window 401 further includes a search button 411, a fast reverse button 412, and a fast forward button 413, for controlling the read-aloud position in units of sentences. Similarly, a search button 414, a fast reverse button 415, and a fast forward button 416 are provided for controlling the read-aloud position in units of paragraphs. Furthermore, a search button 417, a fast reverse button 418, and a fast forward button 419 are provided for controlling the read-aloud position in units of phrases, The reading-aloud window 401 also includes selection switches 423 and 423 for selecting the entire document or a summary generated from the document, as a text to be read aloud.

Furthermore, the reading-aloud window 401 includes an image displaying area 403 for displaying, for example, a human image reading aloud the text. Furthermore, there is provided a telop displaying area 402 for displaying the text in the form of a telop in synchronization with the operation of reading aloud the text.

Although not shown in FIGS. 22A and 22B, the reading-aloud window 401 may include a volume control button for controlling the output level of the voice, a speed control button for controlling the speed at which the text is read aloud, and a selection button for selecting a male or female voice.

If a user issues a command by clicking or selecting one of these buttons/switches using the mouse of the input unit 20, the document processing apparatus 1 performs a read-aloud operation using the voice synthesis engine in accordance with the command.

For example, when the user clicks the play but ton 420, the document processing apparatus 1 starts reading aloud the text. More specifically, the controller 11 supplies a voice signal generated by means of voice synthesis to the audio output unit 22. The audio output unit 22 outputs a voice in accordance with the received voice signal.

On the other hand, if the stop button 421 or the pause button 422 is clicked. the document processing apparatus 1 terminates the reading-aloud operation or temporarily stops the operation.

If the user presses the search button 411 when the text is being read aloud, the reading-aloud operation jumps to the beginning of the current sentence being read aloud, and the reading-aloud operation is restarted from the beginning of that sentence. Similarly, if the search button 414 or 416 is pressed, the reading-aloud operation jumps to the beginning of the current paragraph or phrase being read aloud, and the reading-aloud operation is restarted from the beginning of that paragraph or phrase.

In the operations performed in response of the search buttons 411, 414, or 417 being clicked, the controller 11 detects the jumping destination on the basis of the marks described above. More specifically, when the sentence search button 411 is clicked, the controller 11 searches the current sentence backward for a first mark having a number in the range from 1000 to 9999. If a mark having such a number is detected, the reading-aloud operation is restarted from the position where the mark has been detected. In the case of the paragraph searching or the phrase searching, a mark having a number in the range from 100 to 999 or the range from 10000 to 99999 is searched for, and the reading-aloud operation is restarted from the position where the mark is detected.

The above-described capability is useful when a desired part of a document is reproduced in response to a request issued by the user.

In step F104 shown in FIG. 20, as described above, the document processing apparatus 1 reads aloud a document using the voice synthesis engine in response to a command issued by a user via the user interface.

Thus, the document processing apparatus 1 has the capability of reading aloud a desired document in a natural fashion using the voice synthesis engine.

The text to be read aloud may be a document or a summary generated from the original document. By clicking the selection switch 423 or 424, it is possible to select a document or a summary as a text to be read aloud. In any case, a selected document or summary is read aloud via the voice synthesis engine by performing steps F102 and F103 shown in FIG. 20 in accordance with a tag file associated with the selected document or summary.

Although in the present embodiment, a reading-aloud file is generated from a tag file that has been internally generated or received from the outside, it is also possible to directly read aloud a tag file without generating a reading-aloud file.

In this case, after receiving or generating a tag file, the document processing apparatus 1 detects the start positions of paragraphs, sentences, and phrases from tags attached to the tag file and reads aloud the tag file using the voice synthesis engine such that pauses are inserted at detected start positions. This allows the document processing apparatus to directly read aloud a tag file without having to generate a reading-aloud file.

8. Configuration of the Authoring Apparatus

As described above, the document processing apparatus 1 is capable of categorizing received document data in accordance with a categorization model, displaying an original document or a summary thereof, generating a summary text having a length corresponding to the current window size, and reading aloud an original document or a summary thereof. Thus, a user can view or listen to received document data using the document processing apparatus 1.

However, in order for the document processing apparatus 1 to perform the above-described processes, the document data should be written in the form of a tag file. To this end, an authoring apparatus 2 shown in FIG. 1 is used to perform an authoring process thereby converting a given original document in the form of a plain text into document data in the form of a tag file.

The configuration of the authoring apparatus 2 and operations thereof are described in detail below.

FIG. 27 illustrates the configuration of the authoring apparatus 2.

As shown in FIG. 27, the authoring apparatus 2 includes a main unit 71 including a controller 72 and an interface 76, an input unit 78 used by a user (that is, a human operator doing an authoring work using the authoring apparatus 2) to input data or a command to the main unit 71, a communication device 77 for transmitting and receiving a signal to or from an external device, a display unit 79 for displaying an output from the main unit 71, a write/read unit 80 for writing and reading information onto and from a recording medium 81, and an HDD (hard disk drive) 82.

The main unit 71 including the controller 72 and the interface 76 serves as the core of the authoring apparatus 2.

The controller 72 includes a CPU 73 for controlling various processes performed by the authoring apparatus 2, a RAM 74 serving as a volatile memory, and a ROM 75 serving as a nonvolatile memory. Herein, the processes performed by the controller 72 include authoring of a plain text, inputting of a plain text from an external device, outputting of document data to an external device after completion of the authoring process, interfacing for displaying and inputting data during the above-described processes, and accounting.

That is, the controller 72 performs various operation for realizing the functions of the authoring, accounting, reception/transmission, and control of authoring, described earlier with reference to FIG. 1. Furthermore, the controller 72 may further have the capability of producing data in the form of a plain text.

The CPU 73 performs the above-described processes in accordance with various programs stored in, for example, the ROM 75. During execution of programs, the CPU 73 temporarily stores data in the RAM 74 as required.

The authoring process performed under the control of the controller 72 will be described later. The authoring program for executing the authoring process or the control program for controlling the authoring process are stored in the ROM 75 or the HDD 82.

Alternatively, an authoring program may be supplied from the external to the authoring apparatus 2 via a storage medium 81 or via a communication line 6 and stored in the ROM 75 or the HDD 82. Instead of storing the ROM 75 or the HDD 82, the authoring program received via the storage medium 32 or the communication line 6 may be stored directly into the RAM 74, and the authoring program stored therein may be used.

The interface 76 is connected to the controller 72, the input unit 78, the communication device 77, the display 79, the write/read unit 80, and the HDD 82.

Under the control of the controller 72, the interface 76 inputs data via the input unit 78, inputs and outputs data from and to the communication device 77, outputs data to the display 79, inputs and outputs data from and to the write/read unit 80, and inputs and outputs data from and to the HDD 82. More specifically, in the above interfacing operations, the interface 72 adjusts timing of inputting or outputting data between various parts described above and also converts data format as required.

The input unit 78 is used by an authoring operator to input data or a command to the authoring apparatus 2. The input unit 78 may include a keyboard and a mouse. Using the keyboard of the input unit 78, the authoring operator may input characters to the authoring apparatus 2. The user may also click, using the mouse, a desired operation control button or icon displayed on the display 79. The mouse may also be used by the user to select document element.

The communication device 77 serves to receive a signal that is transmitted by an external apparatus to the authoring apparatus 2 via the communication line 6. The communication device 77 also serves to transmit a signal over the communication line 6.

More specifically, the communication device 77 receives one or more plain texts (documents including no tags)

transmitted from a document provider 4 shown in FIG. 1. The communication device 77 also receives an authoring program or a control program. The received data or program is transferred to the main unit 71.

Furthermore, the communication device 77 also transmits data to an external apparatus via the communication line 6. More specifically, the communication device 77 transmits a tag file generated by means of the authoring process to the server 3.

The display 79 serves to display information such as characters and/or images that are output during the authoring process performed by the authoring apparatus 2. The display 79 may be formed of a cathode ray tube or a liquid crystal display. The display 79 may display one or more windows in which characters and/or graphic images are displayed.

The write/read unit 80 serves to write and read data to and from a storage medium 32 such as a floppy disk or an optical disk. The storage medium 32 is not limited to the floppy disk or the As for the write/read unit 80, a device (such as a disk drive or a card drive) adapted to writing/reading data to and from an employed medium may be used.

In the case where an authoring program or a control program is stored on the storage medium 32, the write/read unit 80 may read the authoring program or the control program from the storage medium 32 and transfer it to the controller 72.

When a plain text is stored on the storage medium 32, the write/read unit 80 may read it from the storage medium 32 and transfer it to the controller 72. This provides another way for the authoring apparatus 2 to acquire a plain text.

The controller 72 of the authoring apparatus 2 may also supply document data generated through the authoring process to the server 3 by supplying a storage medium 32 on which the document data is stored using the write/read unit 80.

The HDD 82 serves as a mass storage device used by the authoring apparatus 2 to store a large amount of data. The HDD 82 writes and reads information under the control of the controller 72.

The HDD 82 is used to store various application programs such as an authoring program executed by the controller 72. The HDD 82 may also be used to store a plain text input to the authoring apparatus 2 or a tag file produced through the authoring process.

9. Authoring Process

The authoring process performed by the authoring apparatus 2 is descried below with reference to a flow chart shown in FIG. 28. The flow chart in FIG. 28 illustrates the process performed by the controller 72 in accordance with the authoring program.

FIGS. 29 to 43 illustrate some examples of the authoring window 601 displayed on the display 79 in the authoring process. These figures will also be referred to in the following description.

Figure 28:
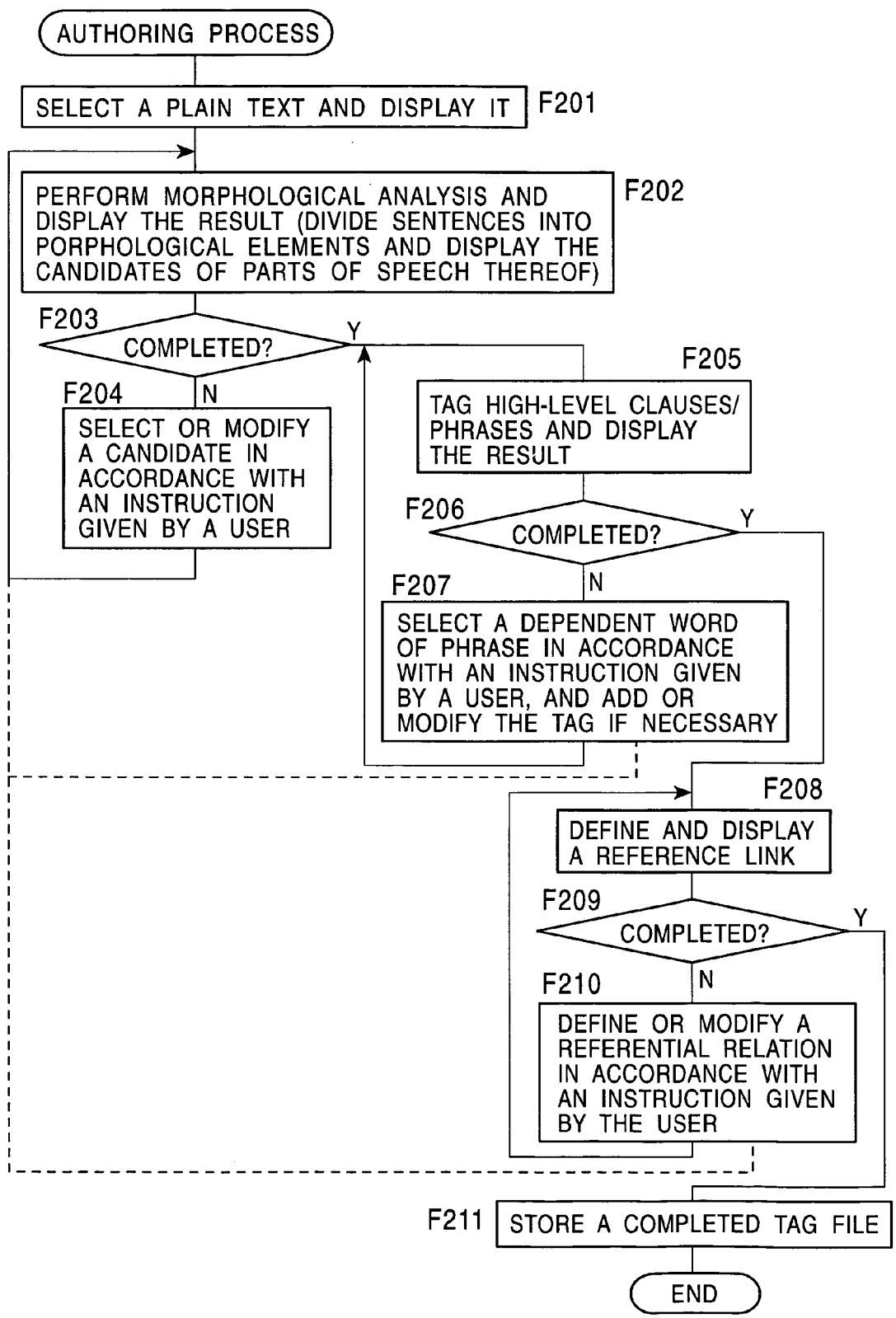
FIG. 28 is a flow chart illustrating an authoring process according to an embodiment of the invention.

To start the authoring process shown in FIG. 28, the controller 72 first starts the authoring process.

In step F301, the controller 72 selects a plain text to be subjected to the authoring process.

More specifically, the controller 72 displays, on the display 79, a list of one or more plain texts which are stored in the RAM 74, the HDD 82, or the storage medium 81 after being received from the document provider 4 so that the authoring operator can make a selection. If the user designates one of plain texts from the list, the controller 72 selects the designated plain text.

The controller 72 displays the selected plain text on the display 79.

Figure 29B:
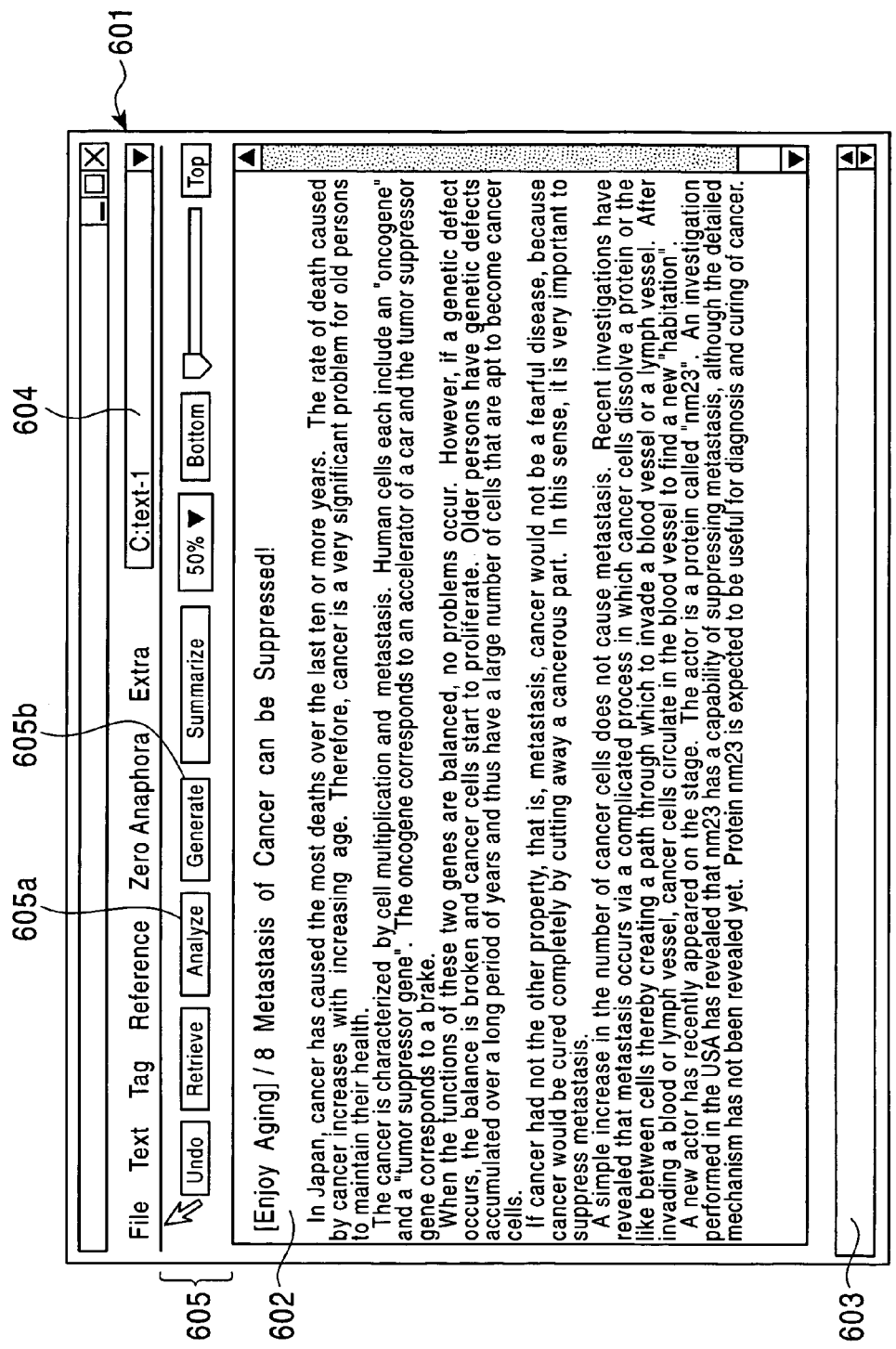

More specifically, the plain text is displayed in the authoring window 601 on the display 79, for example, in such a manner as shown in FIG. 29.

The authoring window 601 includes a first document displaying area 602, a second document displaying area, a file name displaying area 604, and various operation control buttons 605.

The file name of the selected plain text is displayed in the file name displaying area 604 in the authoring window 601, and the plain text is displayed in the document displaying area 602.

The authoring operator can arbitrarily change the sizes of the document displaying areas 602 and 603 by moving the boundary between them. The sizes of the document displaying area 602 and 603 may also be changed automatically as required during the authoring process.

When the plain text is being displayed, if the authoring operator clicks the analyze button 605*a*, the controller 72 advances the process to step F302.

In step F302, the controller 72 performs the morphological analysis upon the plain text.

More specifically, the controller 72 divides sentences in the plain text into morphological elements such as words or phrases and determines parts of speech of the respective morphological elements. However, the controller 72 does not always correctly divide the sentences into words and does not always correctly determine parts of speech. In the case where the controller 72 cannot determine delimitations or parts of speech, the controller 72 displays possible candidates.

Figure 30:
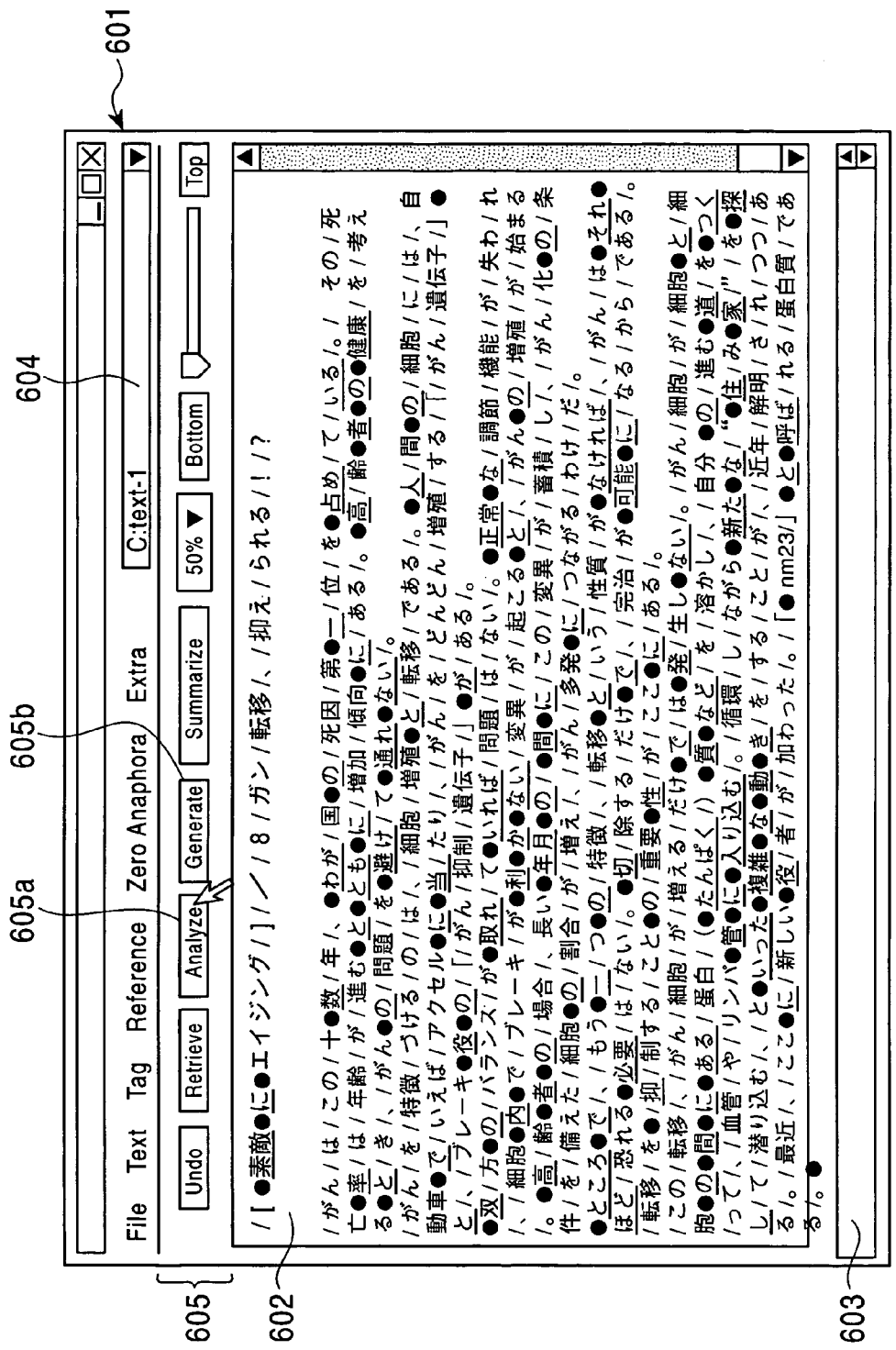
FIG. 30 is a schematic diagram illustrating an example of a text displayed on the display after being subjected to morphological analysis in the authoring process according to the embodiment of the invention.

The result of the morphological analysis is displayed in the document displaying area 602 in the authoring window 601. FIG. 30 shows an example of the result displayed in the document displaying area 602.

In this specific example, boundaries between morphological elements are represented by slashes "/", wherein determined and undetermined portions are distinguished by the color of slashes.

Because it is not allowed to use various colors in FIGS. 30–43, slashes "/" with a normal color (the same color as that used to display characters) are used to represent determined boundaries, and undetermined boundaries are represented by marks "●" that will be represented by red slashes if red color is allowed to be used. Hereinafter, "/" is called simply a slash, and "●" is called a red slash.

Green slashes will also be used later. To represent green slashes, marks "♦" will be used, and marks "♦" will be called green slashes.

Those elements that have been definitely separated and determined as to the parts of speech, boundaries of the elements are represented by slashes "/" in the document displaying area 602 as shown in FIG. 30.

If an element has a plurality of candidates, the element is underlined and the boundary is represented by a red slash "●".

When the part of speech for an element is undefined, the boundary thereof is represented by a red slash "●" without being underlined.

When the authoring operator views the analysis result, he/she may determine the undetermined boundaries and/or parts of speech using the mouse or keyboard of the input unit 78. The user may also modify sentences as required.

In step F304, the controller 72 performs a process such as selection of a part of speech from a plurality of candidates and modification of a sentence in response to an inputting operation performed by the authoring operator. Each time the controller 72 performs such a process, the result is displayed in step F302. Morphological analysis may be performed again if necessary. More specifically, if a sentence is added, morphological analysis may be performed for the added sentence.

Figure 31:
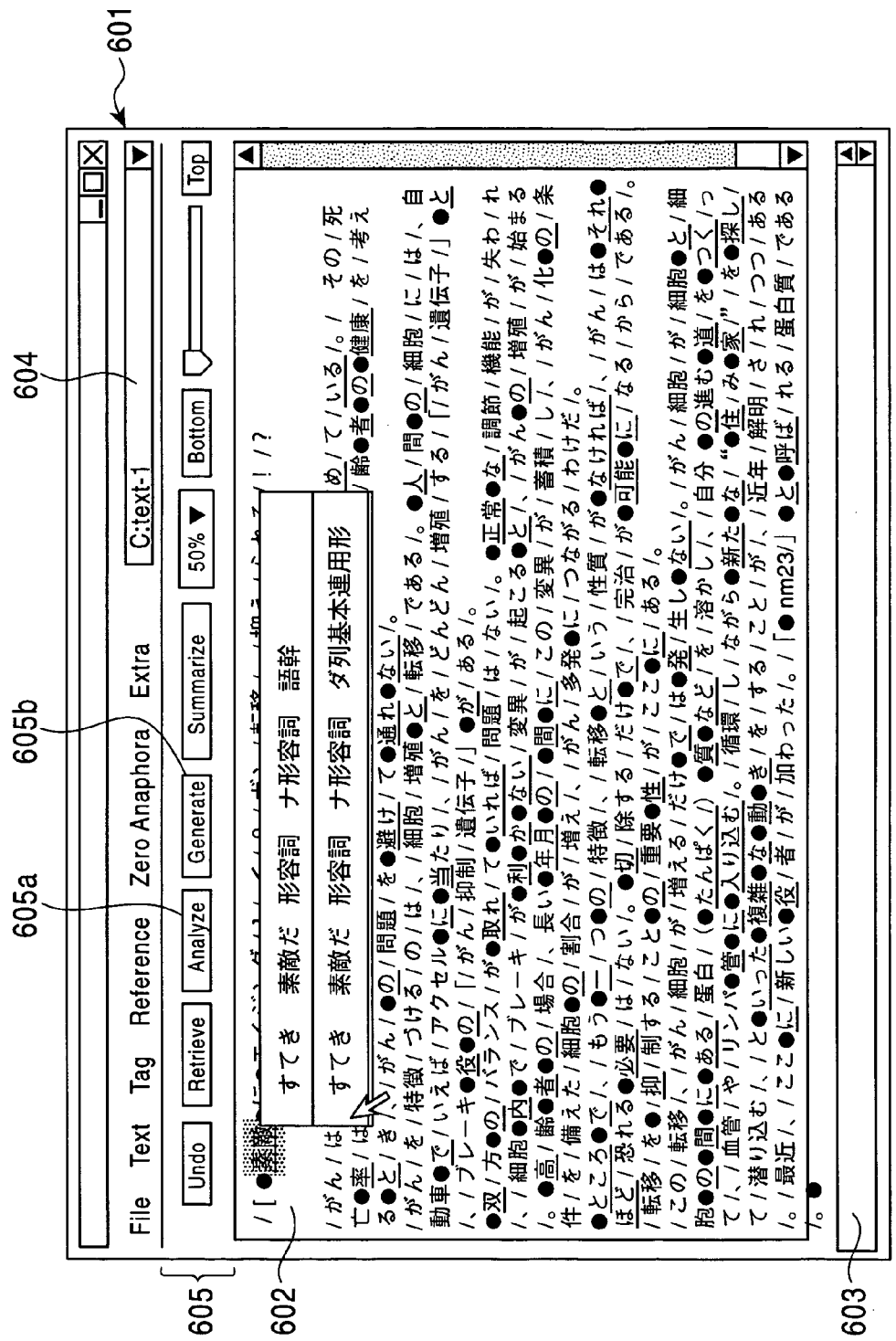
FIG. 31 is a schematic diagram illustrating an example of a manner of displaying candidates in terms of morphological elements during the authoring process according to the embodiment of the invention.

If the user clicks an undetermined element indicated by a red slash "●" and an underline, candidates regarding morphemes and parts of speech thereof are displayed. FIG. 31 illustrates a specific example in which the controller 72 displays, in step F304, candidates regarding morphemes and parts of speech for "素敵" that has been clicked by the user. Herein "素敵" is a Japanese word corresponding to an English word "wonderful". In FIG. 31, a selected portion is represented in a reversed fashion. Alternatively, a selected portion may also be represented by colored characters. In other figures, a selected portion may be represented in either fashion.

The authoring operator may select (click) a correct candidate thereby determining the undetermined portion.

Figure 32:
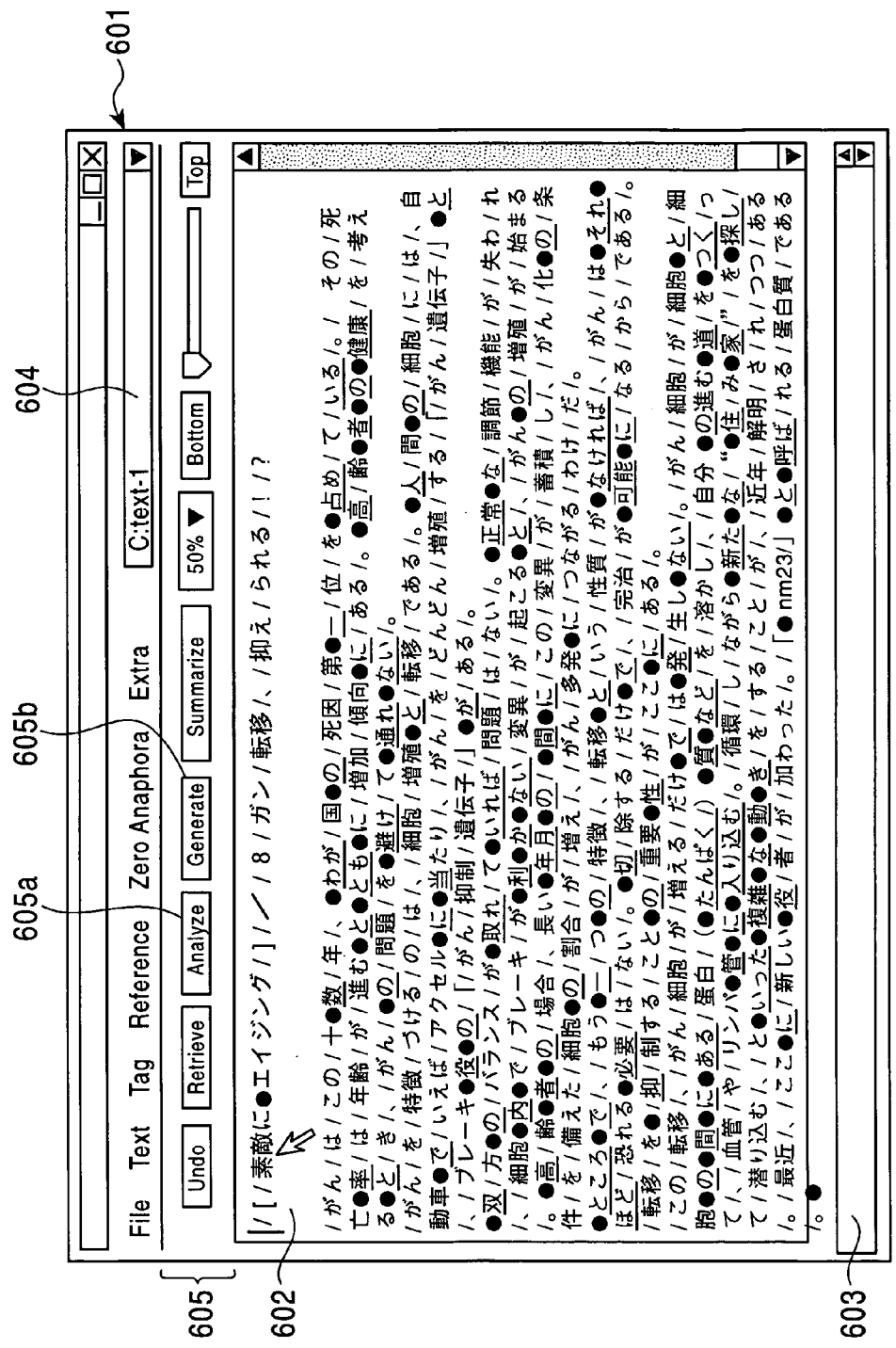
FIG. 32 is a schematic diagram illustrating an example of a text displayed on the display after being determined in terms of morphological elements during the authoring process according to the embodiment of the invention.

In FIG. 31, if the authoring operator selects a candidate on the second row in the selection window in which two candidates are displayed, the boundary and the part of speech of the undetermined portion are determined. As a result, the text is displayed in the document displaying area 602 in the manner in which "素敵に" is indicated by a slash "/" as a determined morphological element, as shown in FIG. 32.

Figure 33:
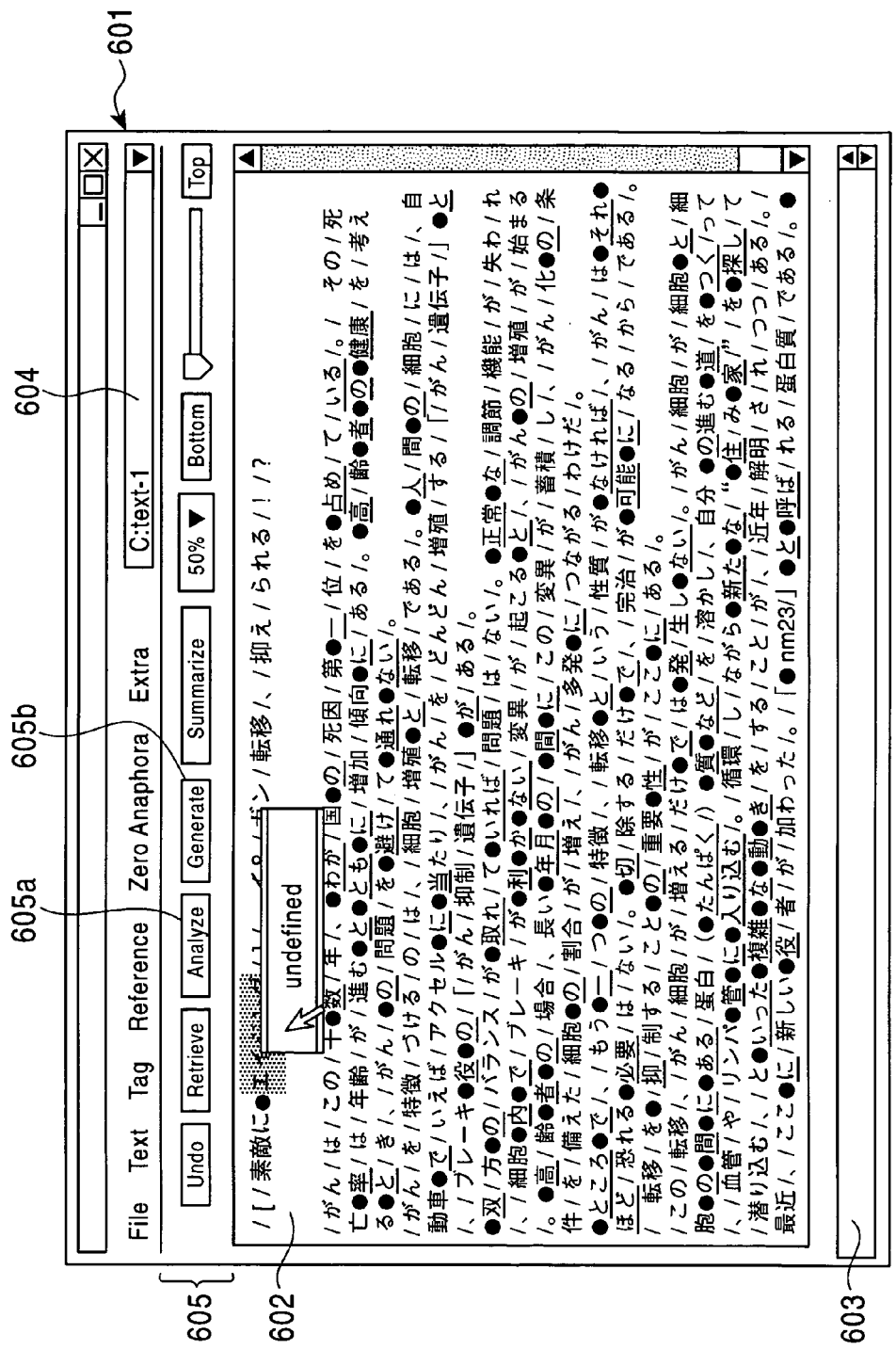
FIG. 33 is a schematic diagram illustrating an example of a manner of displaying an undefined word during the authoring process according to the embodiment of the invention.

If the authoring operator designates a portion whose part of speech is undefined and that is delimited by a red slash "●" without being underlined, a message window appears, as shown in FIG. 33, to indicate that the part of speech is undefined. In the specific example shown in FIG. 33, the controller 72 displays, in step F304, a message to notify the user that a portion "エイジング" (aging) clicked by the authoring operator is undefined.

The authoring operator may define such an undefined word. If the authoring operator again clicks the same portion, the controller 72 opens an editor window 620, as shown in FIG. 34, to prompt the authoring operator to input data.

The editor window 620 includes a tag name box 621, a tag attribute box 622, an OK button 623, and a cancel button 624.

Figure 34:
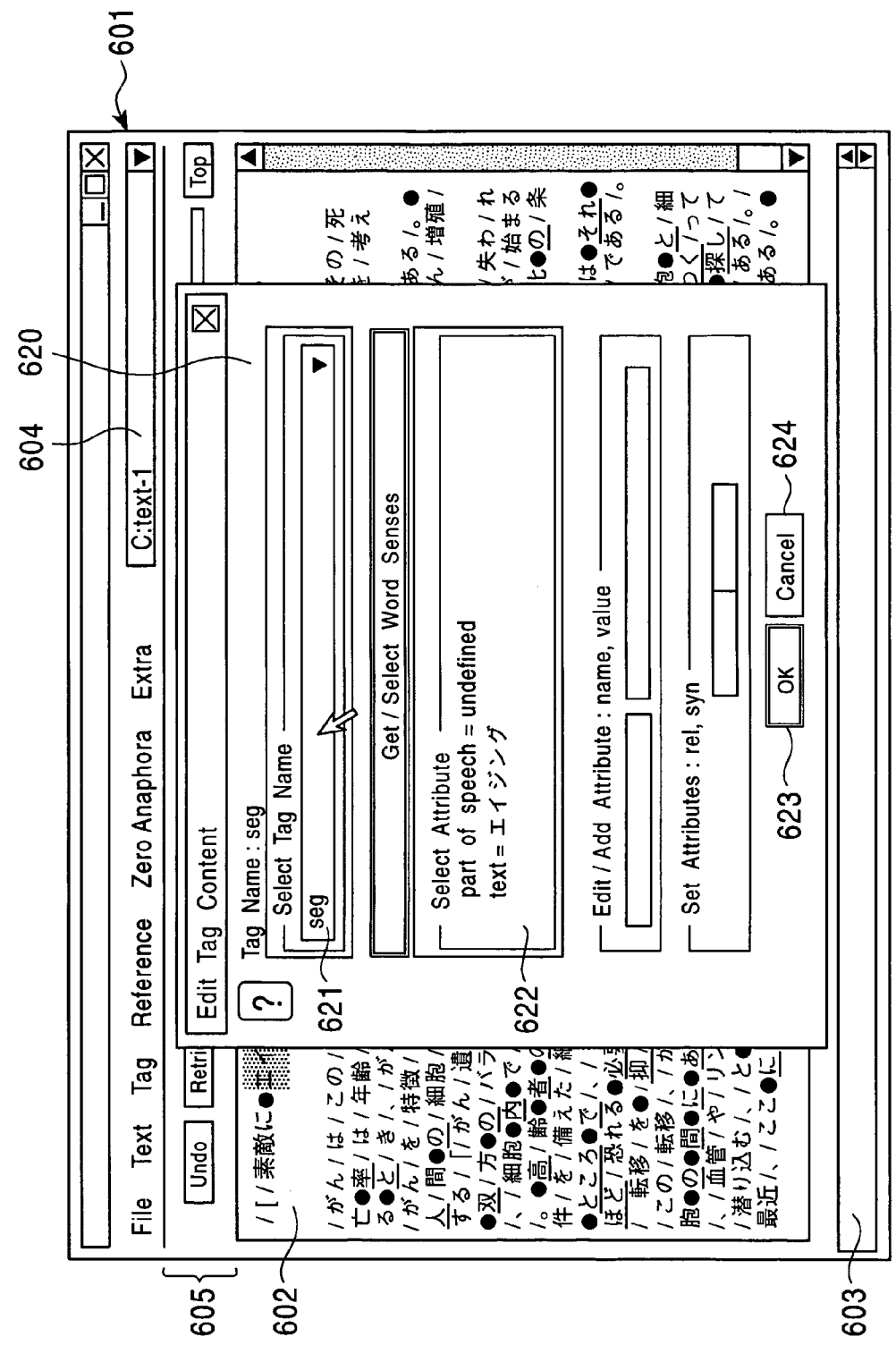
FIG. 34 is a schematic diagram illustrating an example of a manner of presenting a subwindow for processing an undefined word during the authoring process according to the embodiment of the invention.

When a word is undefined, "seg" is displayed in the tag name box 621, as shown in FIG. 34, to indicate that a given word is an undefined element. In the specific example shown in FIG. 34, "エイジング" (aging) is displayed as an undefined word in the tag attribute box 622.

Figure 35:
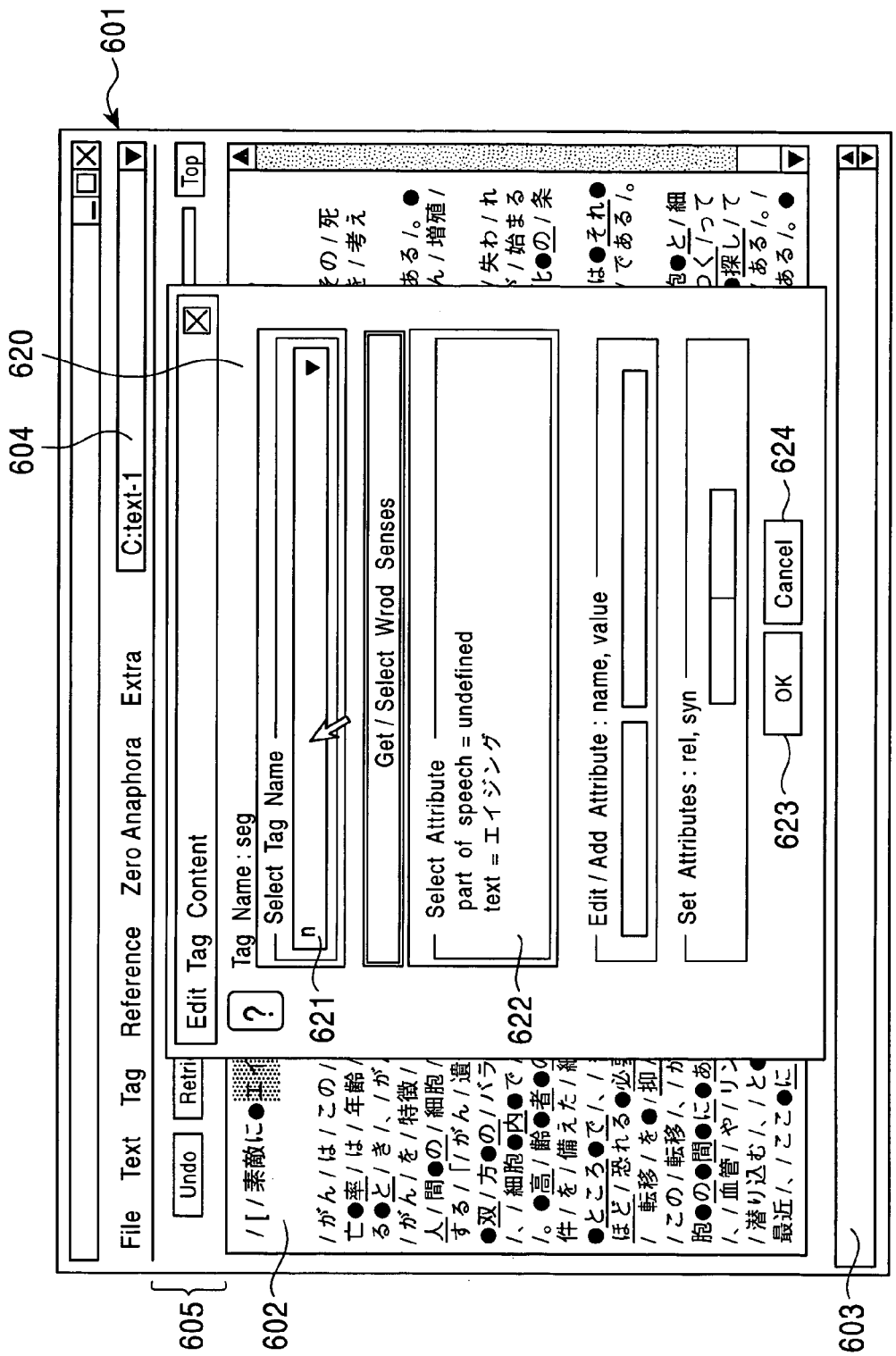
FIG. 35 is a schematic diagram illustrating an example of a manner of processing an undefined word in the subwindow during the authoring process according to the embodiment of the invention.
Figure 36:
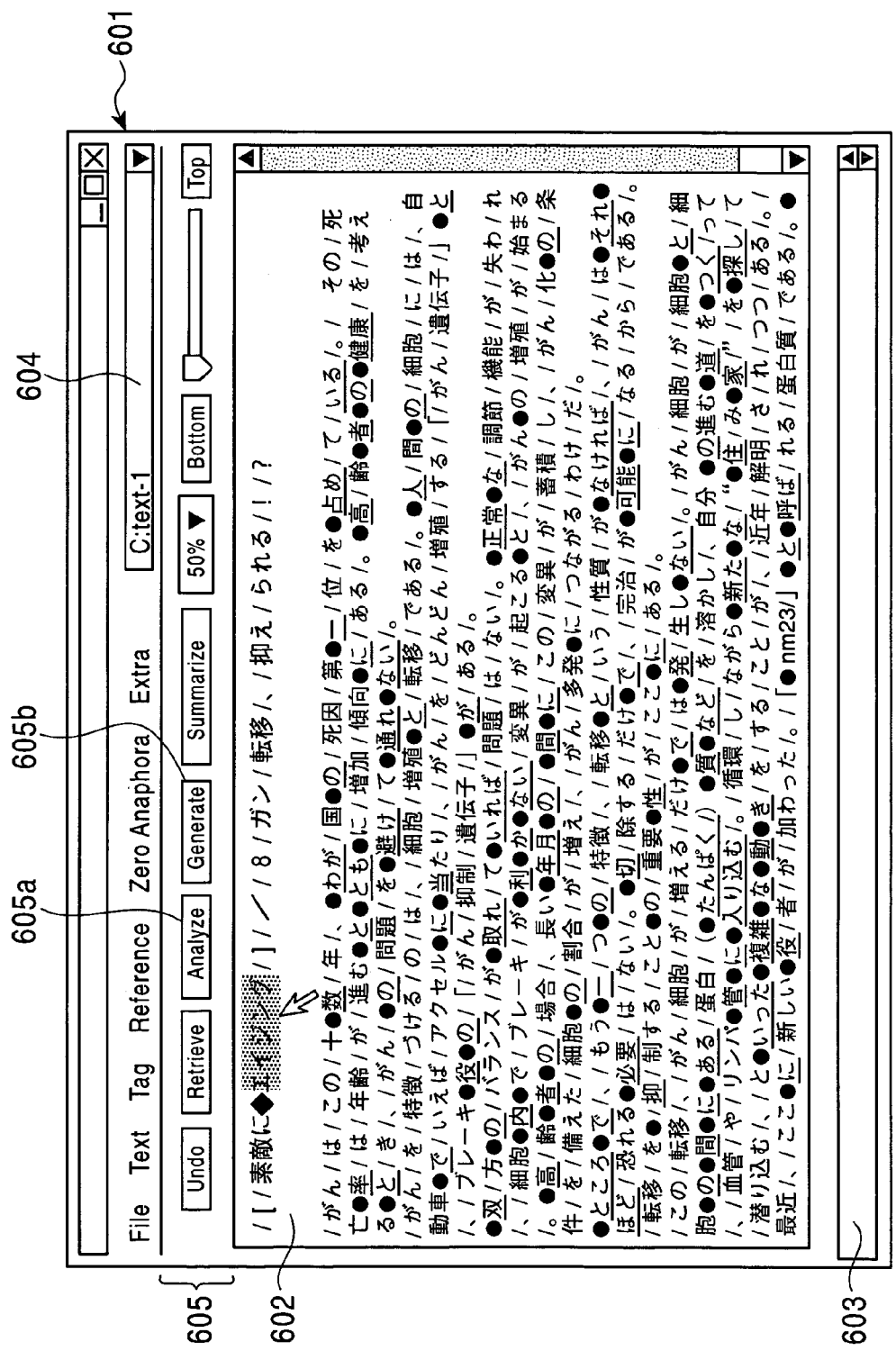
FIG. 36 is a schematic diagram illustrating an example of a text displayed after defining an undefined word during the authoring process according to the embodiment of the invention.

In the tag attribute box 622, the authoring operator may define the part of speech. For example, if selects "n" from a pull-down menu of the tag name box 621, then "n" is displayed in the tab name box 622 as shown in FIG. 35. Herein, "n" represents "noun".

In this state, if the authoring operator clicks the OK button 623, the controller 72 sets the element "エイジング" (aging) to be a noun.

In response to the change in the tag name, the slash displayed in the document displaying area 602 is changed to a green slash "♦".

As described above, when an analysis result is presented to the authoring operator, the authoring operator may determine delimitation and the parts of speech of undetermined portions indicated by red slashes "●" and may also define undefined words. Furthermore, if the authoring operator adds or modifies a sentence, the controller 72 performs morphological analysis upon the added or modified sentence and displays the analysis result using slashes "/", red slashes "●" and underlines, as required. If the analysis result includes a red slash "●", the authoring operator may determine delimitation and the parts of speech of undetermined portions or may define undefined words indicated by red slashes "●".

The authoring operator performs the above-described operation until the document displayed in the document displaying area 602 includes no red slashes "●".

Figure 37:
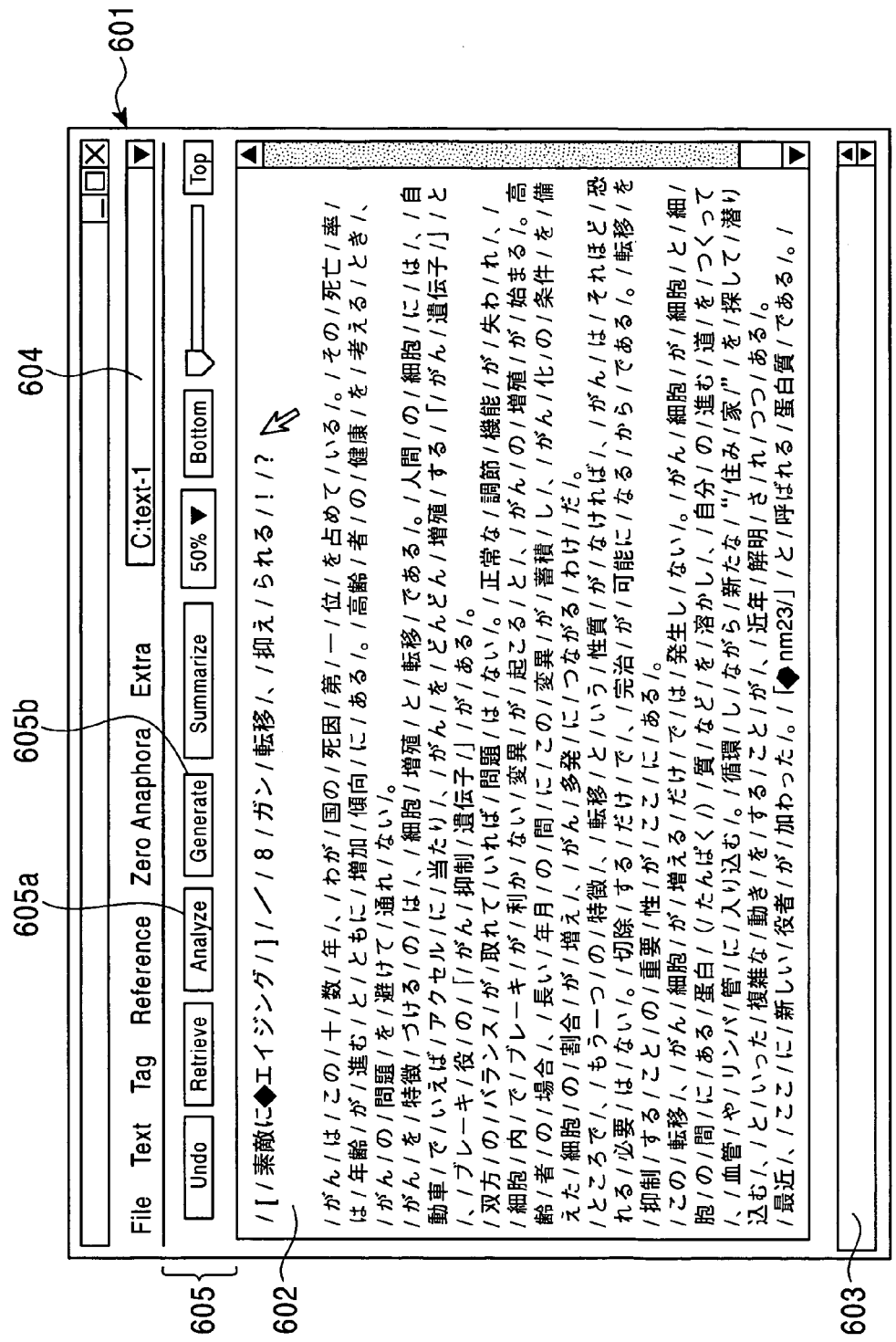
FIG. 37 is a schematic diagram illustrating an example of a text displayed after completion of morphological analysis during the authoring process according to the embodiment of the invention.

If all morphological elements have been determined in terms of delimitation and parts of speech and all undefined words have been defined, the document is displayed, for example, as shown in FIG. 37.

At this stage, it is determined in step F303 that the morphological process has been completed. That is, at this stage, all words in the lowest layer of the document data structure described earlier with reference to FIG. 3 have been determined in terms of delimitation and parts of speech. In other words, tags have been attached in units of words.

Subsequently, in step F305, the controller 72 automatically generates tags representing higher-level sentence structures from the data including tags determined for the respective morphological elements.

More specifically, the controller 72 attaches tags to the text so as to indicate a hierarchical structures including words, subsentential segments, and sentences in accordance with morphemes and the parts of speech thereof, as shown in FIG. 3.

Figure 38:
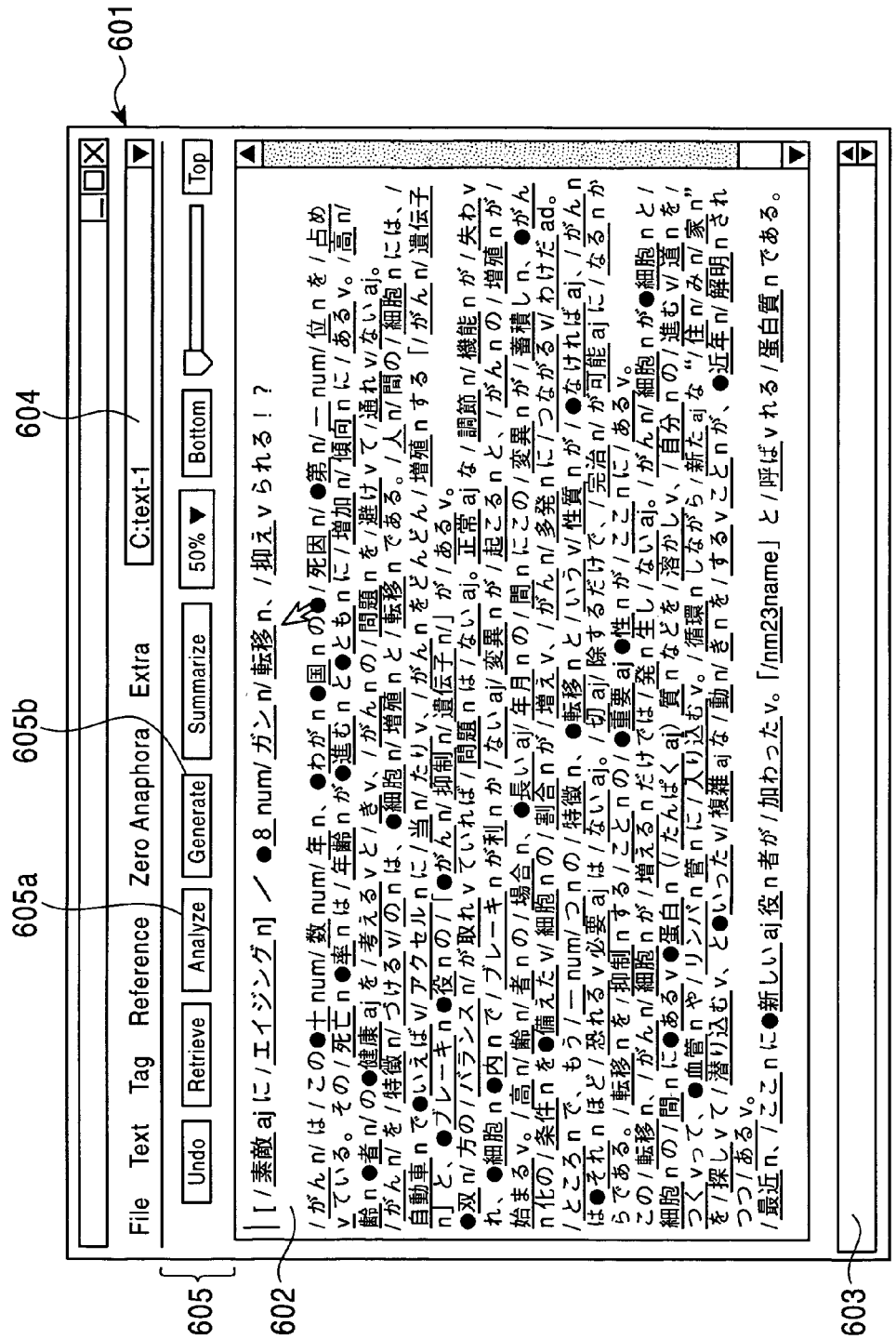
FIG. 38 is a schematic diagram illustrating an example of a text including tags representing document structures added during the authoring process according to the embodiment of the invention.

The result is displayed in the document displaying area 602, as shown in FIG. 38.

In the specific example shown in FIG. 38, one tag is indicated by a combination of a slash, an underline, and a tag name.

In FIG. 38, each read slash "●" is used to indicate that an element having a red slash "●" has a plurality of candidates modified by that element.

Tag names used herein include
n (noun), np (noun phrase),
v (verb), vp (verb phrase),
aj (adjective), ajp (adjective phrase),
ad (adverb), adp (adverb phrase),
ij (interjection),
time (time), timep (time phrase),
name (proper noun), namep (proper noun phrase),
persname (person name), persnamep (person name phrase),
orgname (organization name), orgnamep (organization name phrase),
geoname (geographical name), geognamep (geographical name phrase),
num (numeral), and nump (numeral phrase).

The tag names described above are some examples, and tag names may be given in many different manners, and there may be additional various tags. Furthermore, the manner in which tags are represented is not limited to the above-described example.

In the document displaying area 602 shown in FIG. 38, slashes "/", red slashes "●" underlines, and tag names are used to indicate higher-level document structures and portions whose dependency-relation is undetermined.

When the authoring operator views the result of generation of tags associated with higher-level document structure, the authoring operator may determine undetermined portions using the mouse or keyboard of the input unit 78. The authoring operator may also modify sentences as required.

In step F307, the controller 72 performs a process in accordance with an operation such as selection of one of candidates or modification of a sentence performed by the authoring operator. Each time the controller 72 performs such a process, the result is displayed in step F302.

The process may return to step F302 to again perform the morphological analysis, if required. This may occur, for example, when a sentence is added.

Figure 39:
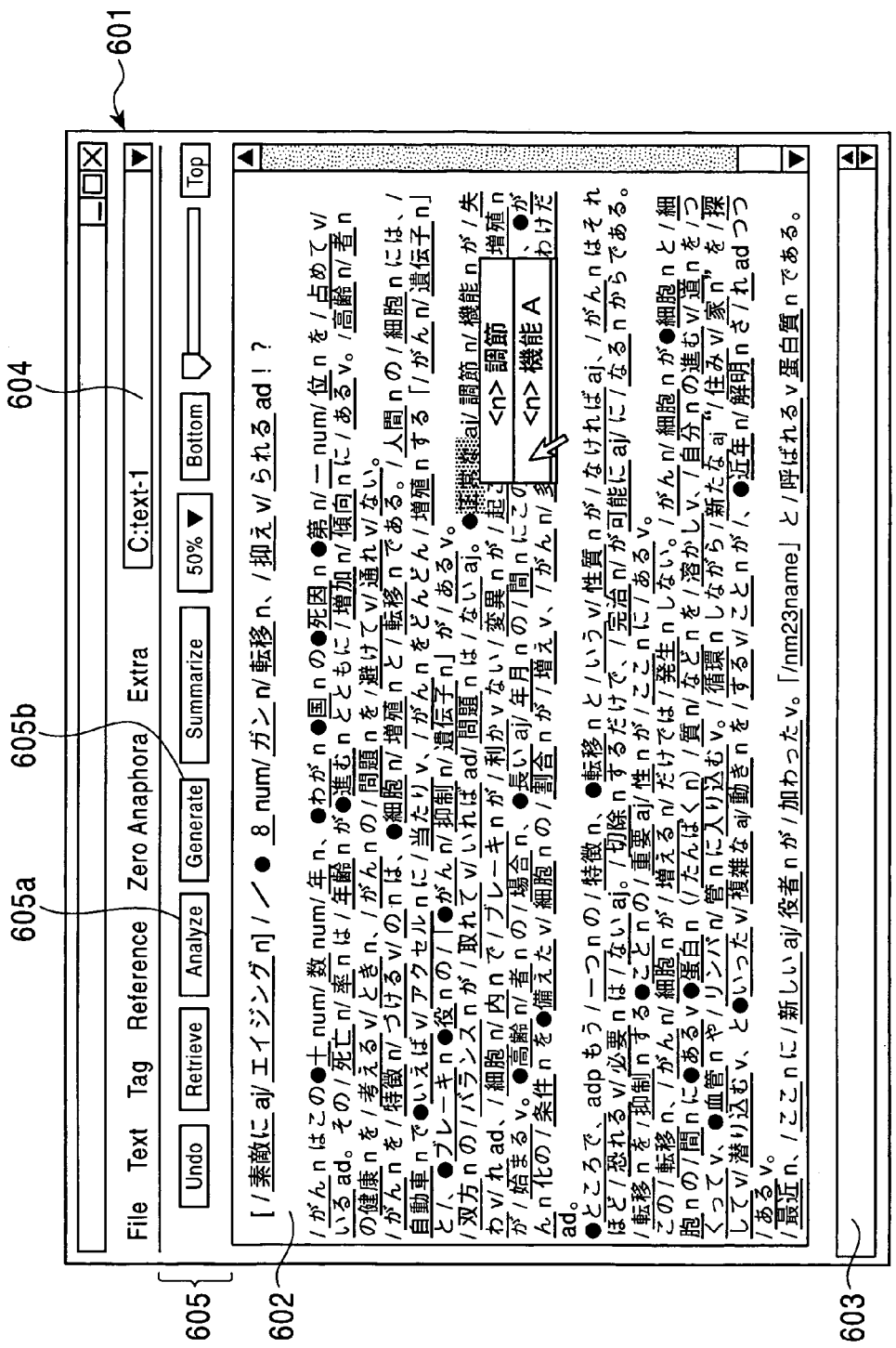
FIG. 39 is a schematic diagram illustrating an example of a manner of displaying candidates for words modified by a modifier, during the authoring process according to the embodiment of the invention.

In the specific example shown in FIG. 39, a word "正常な" (Japanese word corresponding to "normal") is clicked that is indicated, by a red slash "●" and an underline, to be undetermined as to which word to modify. That is, in step F307, if the authoring operator clicks "正常な" (normal), the controller 72 displays candidates for words that are modified by "正常な" (normal).

More specifically, the controller 72 displays two words "調節" (adjustment) and "機能" (function) as candidates.

The authoring operator may select (click) a correct candidate thereby determining the word modified by the modifier.

For example, if the authoring operator clicks "機能" (function), it is determined that "機能" (function) is modified by "正常な" (normal).

The authoring operator performs the above operation to determine all undetermined portions until the document data includes no red slashes "●".

Tags generated in step F305 indicate structures in levels of words, subsentential segments, and sentences shown in FIG. 3. On the other hand, tags for indicating structures in higher levels, such as paragraphs, subdivisions, and a document are described by the authoring operator in step F307.

Figure 40:
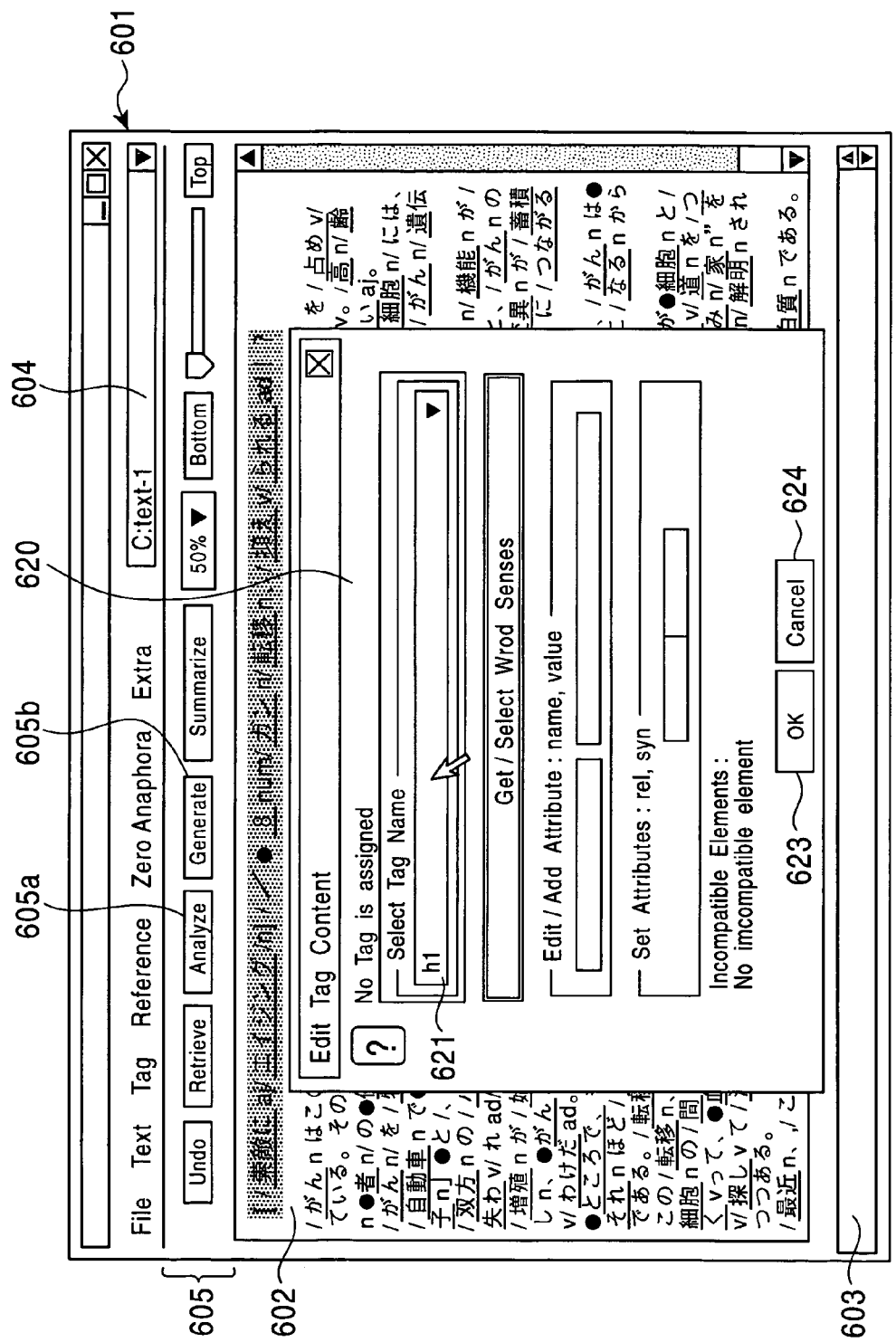
FIG. 40 is a schematic diagram illustrating an example of a manner of adding a tag using a subwindow during the authoring process according to the embodiment of the invention.

For example, if the authoring operator designates "[素敵にエイジング... 抑えられる!?" in the document data, the controller 72 opens the editor window 602 as shown in FIG. 40 so that the authoring operator may describe a tag.

In this specific example shown in FIG. 40, "h1" is selected by the authoring operator from a pull-down menu displayed in the tag name displaying box 621. Herein, "h" (h1, h2, ...) represents a heading.

In this state, if the authoring operator clicks the OK button 623, the controller 72 determines that "素敵にエイジング.....抑えられる... 抑えられる!?" is designated as a heading-1 and attaches a corresponding tag.

Figure 41:
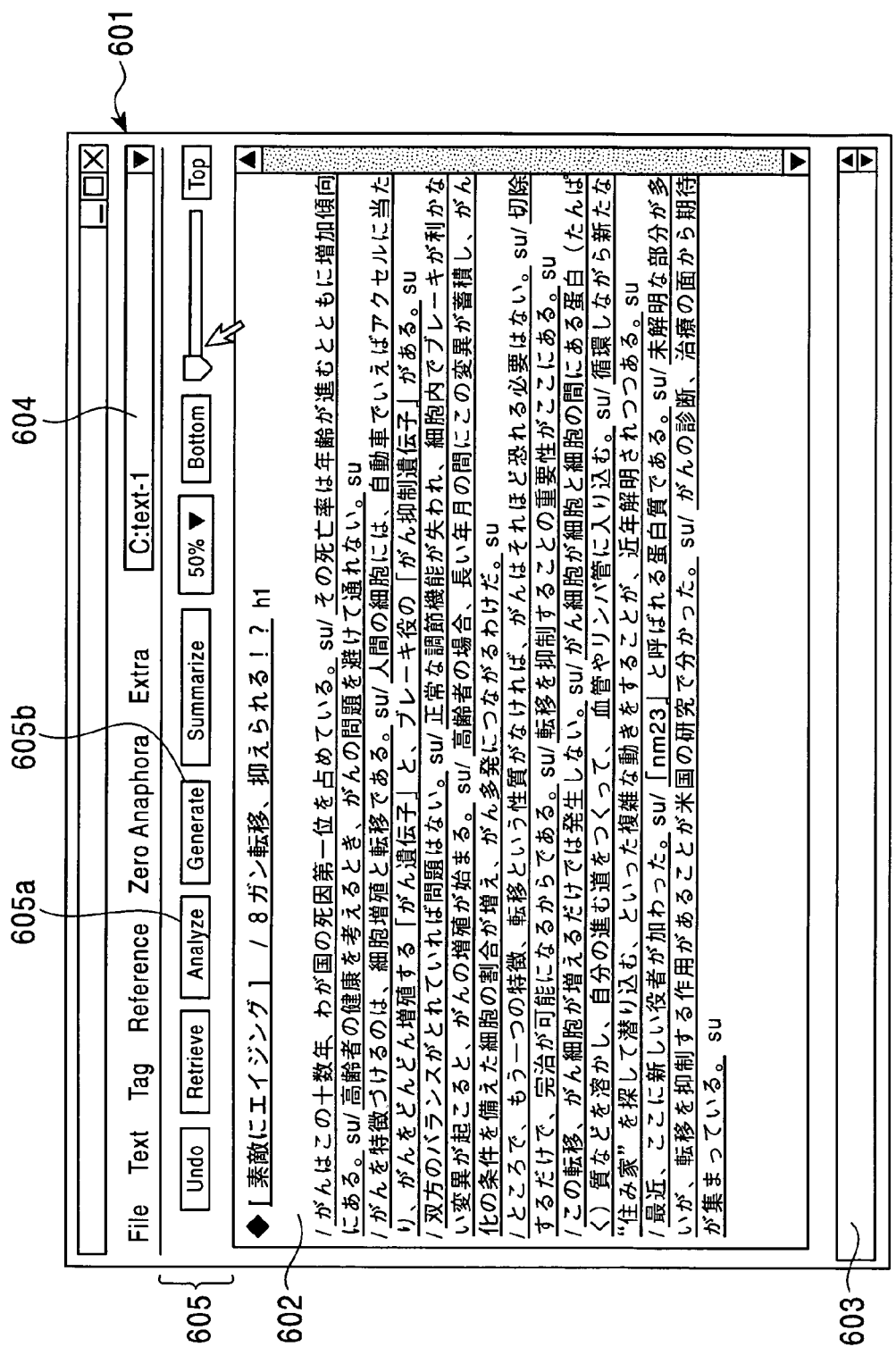
FIG. 41 is a schematic diagram illustrating an example of a manner of displaying a heading and tags associated with sentences during the authoring process according to the embodiment of the invention.

As a result, in the document display area 602, a green slash "◆", an underline, and a tag "h1" are attached to "素敵にエイジング... 抑えられる!?" as shown in FIG. 41.

Tags that were attached in step F305 to each sentence of the document are also shown in FIG. 41. That is, tags shown in FIG. 41 indicate sentence structures in higher levels than those indicating dependency-relations shown in FIG. 39. As can be seen from FIG. 41, tags described in step F305 and being now displayed include slashes "/", underlines, and tags "su" attached to the respective sentences. Herein, tags "su" are used to indicate "sentences".

As described above, the authoring operator may check the tags generated by the controller 72 to indicate document structures in levels higher than words, determine dependency-relations by selecting adequate elements from candidates, and add tags indicating further higher-level structures such as paragraphs and document.

That is, the authoring operator advances his/her job at least until the document data displayed in the document displaying area 602 includes no red slashes "●". During the job, the user may describe tags indicating paragraphs, headings, and the document, as required.

When the above-described process is completed, it is determined in step F306 that the tagging process has been completed. At this stage, tags indicating document structures in the levels from words to sentences and paragraphs, subdivisions, and document described earlier with reference to FIG. 3 have been described.

At any desired time thereafter, the user can view an image of tagged document data (a browser image which would be displayed on, for example, the document processing apparatus 1) to check whether tags have been described correctly.

Figure 42:
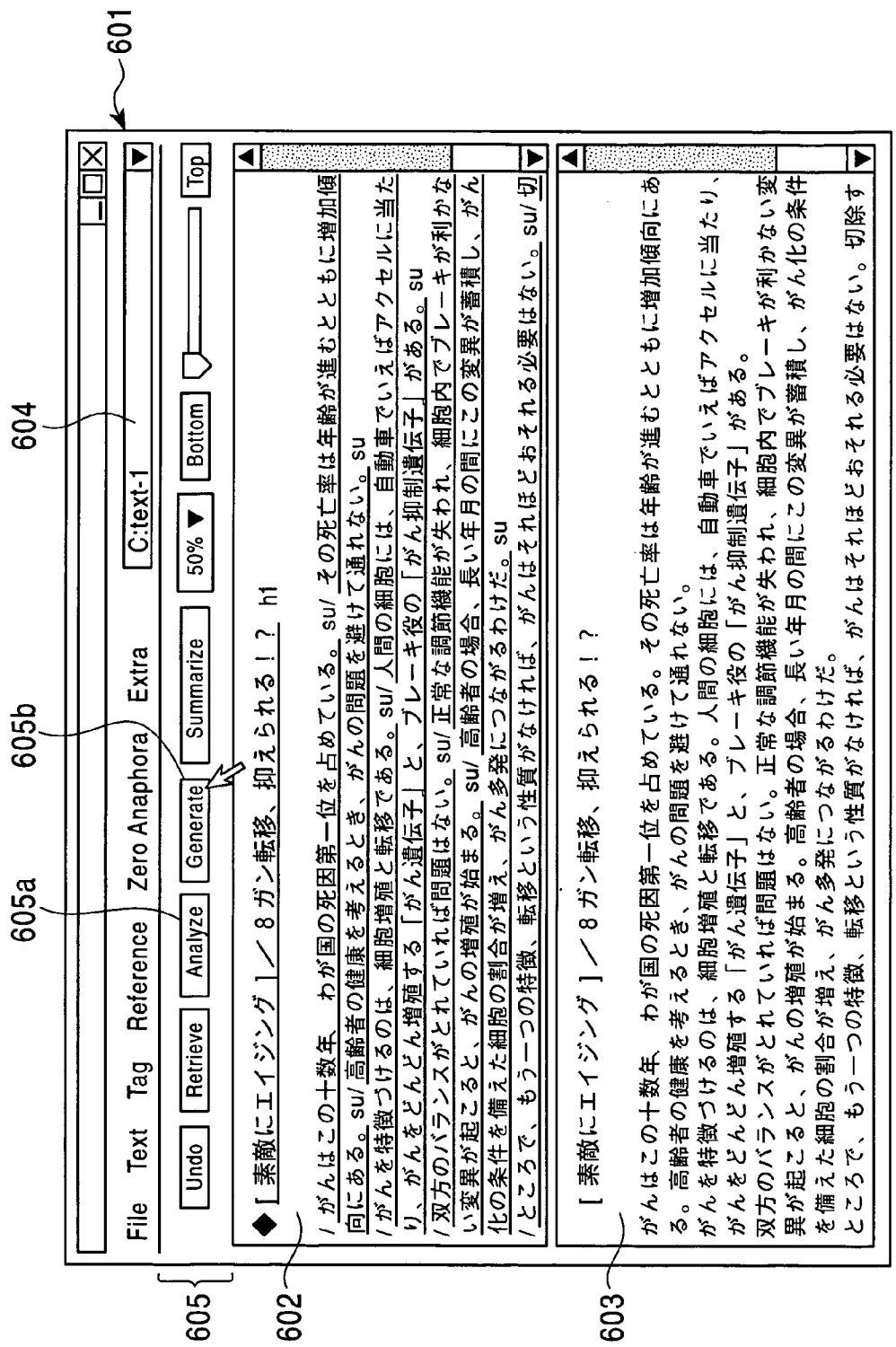
FIG. 42 is a schematic diagram illustrating an example of a manner of displaying a text after being tagged during the authoring process according to the embodiment of the invention.

If the user clicks the Generate button 605b in FIG. 42, a browser image is displayed in the document displaying area 603 in addition to the text including tags displayed in the document displaying area 602, so that the user can view the text in the same manner as that in which the text would be presented to an end user (using the document processing apparatus 1). More specifically, in response to the tag "h1" added in the above process to indicate the heading, the heading portion is displayed in boldface.

Because the authoring operator can view the image of the document data, the user can determine whether tagging has been performed correctly. If an incorrect tag or an incorrect sentence is found, the user may issue a command in step F307 to again perform morphological analysis from step F302.

If it is determined in step F306 that the tagging is completed, the controller 72 advances the process to step F308. In step F308, the controller 72 sets reference links in the manner described earlier with reference to FIG. 3.

Note that normal links have been automatically generated in accordance with the tags that have been generated in the above-described process (that is, normal links have already been generated at the time when it is determined in step F306 that the tagging is completed).

In step F308, the controller 72 performs analysis associated with reference links and displays candidates for possible reference links. More specifically, the controller 72 displays candidates for words referred to by a pronoun or the like.

Figure 43:
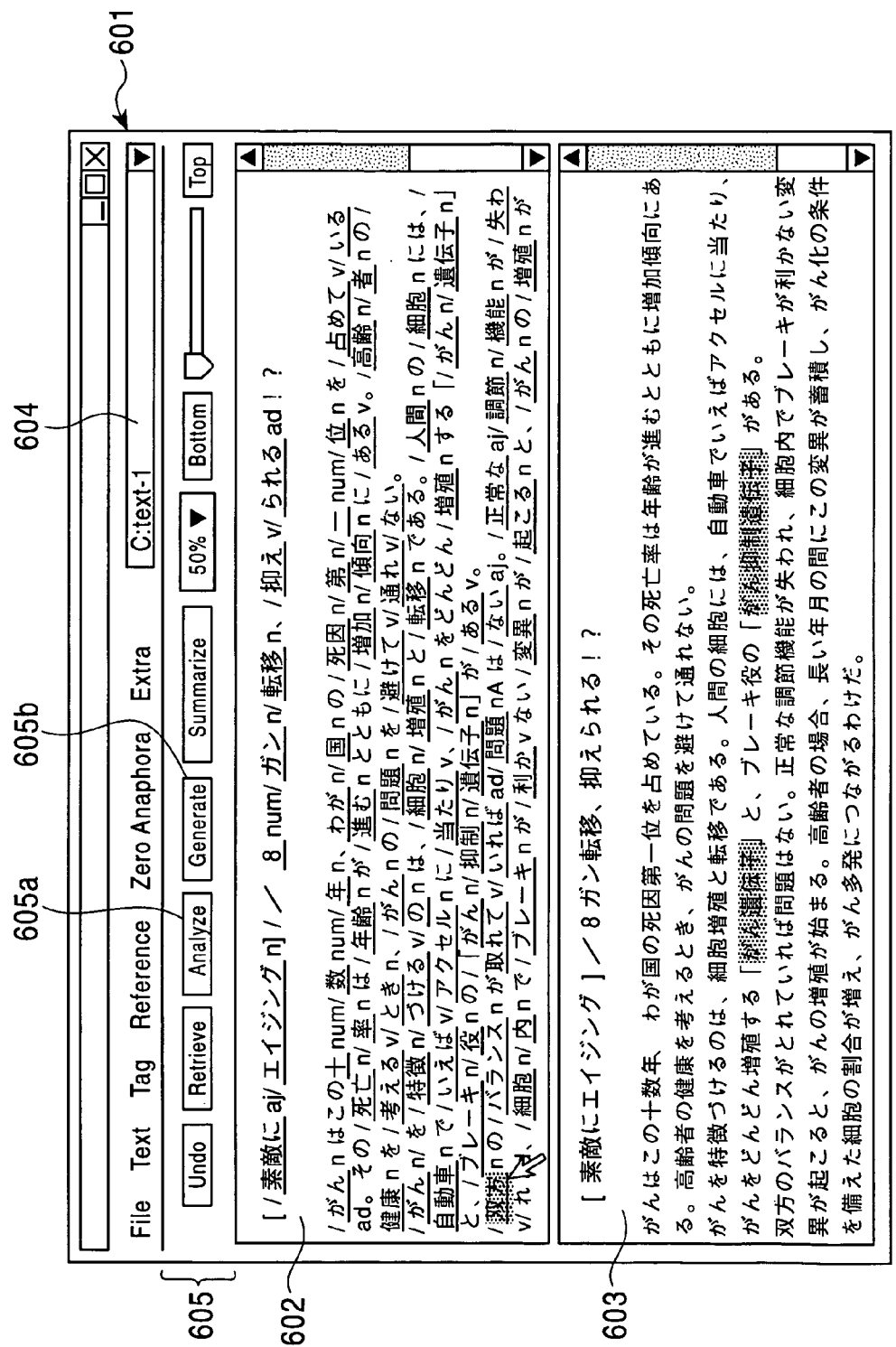
FIG. 43 is a schematic diagram illustrating an example of a manner of displaying words cataphorically referred to by another word, during the authoring process according to the embodiment of the invention.

For example, as shown in FIG. 43, document data is displayed, together with tags included the document data, in the document displaying area 602, and a browser image of the document is displayed in the document displaying area 603.

"双方" (Japanese word corresponding to "both") is highlighted in the document displaying area 602, and "がん遺伝子" (onocogene) and "がん抑制遺伝子" (tumor suppressor gene) are highlighted in the document displaying area 603 thereby indicating that "双方" (both) cataphorically refers to "がん遺伝子" (onocogene) and "がん抑制遺伝子" (tumor suppressor gene). The highlighting may be performed by means of displaying characters in a reverse fashion or using different colors.

When the user views the displayed document, if a wrong referential relation is found, the authoring operator may correct it. The user may also select a word and define a new reference link associated with the selected word.

For example, when a reference link is correct as is the case with the reference link indicating that "双方" (both) cataphorically refers to "がん遺伝子" (onocogene) and "がん抑制遺伝子" (tumor suppressor gene), the user performs no operation for correction. However, if a wrong referent is referred to, the authoring operator designates a correct referent in the document displaying area 603.

When a certain word is selected in the document displaying area 602, if no reference link is defined for that word, no referent is displayed in the document displaying area 603. If necessary, in this case, the authoring operator may define a reference link by designating a referent in the document displaying area 603.

In steps F310 and F308, the controller 72 modifies or adds a reference link in accordance with the operation performed by the authoring operator. Each time such a process is performed, the result is displayed.

During the above process, the authoring operator may also add a new sentence or modify a tag. In response, the controller 72 may return the process to step F302 so as to again perform the process from morphological analysis.

If it is determined in step F309 that all reference links have been determined in accordance with the operation performed by the authoring operator, the process goes to step F311. In step F311, the completed document data including tags is stored as authored document data in the RAM 74 or the HDD 82.

Thereafter, the resultant document data is transmitted to the server 3 via the storage medium 81 or the communication line 6 and stored in the database 3a.

The server 3 supplies the document data stored in the database 3a to an end user's apparatus such as the document processing apparatus 1. Thus, the end user can perform various processes (displaying the document, generating and displaying a summary of the document, reading aloud the document of the summary) upon the document data using the document processing apparatus 1.

As described above, the authoring apparatus 2 divides the original document (plain text) into morphological elements and adds morphological information thereto The authoring apparatus 2 also adds information representing the hierarchical document structures and also adds information indicating referential relations between elements in the original document. Thus, the authoring apparatus 2 generates document data (tag file) in a form that makes it possible to perform desired processing upon the document data.

In the authoring process described above, morphological analysis is first performed, and then the document structure is defined from the lowest level to the highest level. Delimitations, parts of speech, words modified by modifiers, and referents referred to by anaphora or cataphora are determined by a user by selecting one of candidates displayed.

Thus, the user can easily do an authoring job on the authoring apparatus 2 without having to have high-level knowledge about a language and the grammar thereof. This means that the use can correctly attach tags to the document depending on the content thereof, without having to have knowledge about the grammar.

Thus, the authoring operator can do the authoring job quickly and correctly simply by designating a particular portion of the document and selecting a candidate.

In accordance with an input given by the user doing the authoring job, the authoring apparatus 2 determines delimitation of a given document, adds or modifies reference information or information representing document structures, and adds, modifies, or deletes sentences, thereby attaching complicated tags to the document in an adequate fashion that would not be achieved by a simple automatic process. This also makes it possible to generate a tag file as intended by a user.

Furthermore, candidates in terms of separators between adjacent morphemes, morphological information, information about document structures, and reference information are displayed on a display device thereby allowing the authoring operator to easily recognize the status of the authoring process and easily perform the authoring process.

Although the authoring process has been described above with reference to the specific example in conjunction with FIGS. 28 and 29–43, the authoring process may also be performed in many different ways.

For example, instead of performing an authoring process upon a plain text that has already been generated, a user may perform an authoring process while generating a plain text. In this case, each time the user inputs a sentence, morphological analysis is performed upon the input sentence, and the result is displayed using slashes, underlines, and the like. The authoring operator may determine morphological definitions by properly selecting candidates and may modify the sentence as required. After that, the user may input another sentence.

The manner of displaying the status of the authoring process is not limit to use of slashes "/", red slashes "●", green slashes "♦", underlines, and tags. The status of the authoring process may also be displayed in various manners depending on the authoring program, the display device, and fonts employed.

Furthermore, the manners of displaying candidates in various stages during the authoring process are not limited to the examples described above.

10. Operation of the Document Processing System (Authoring Request from the Document Provider)

As described above, a plain text provided from the document provider 4 is converted by the authoring apparatus 2 into a tag file and stored in the database of the server 3. Thus, tag files are provided from the server 3 to the document processing apparatus serving as the user terminal. The user can perform various kinds of processing upon it, such as the categorization, reading, generation/reading of a summary, and reading aloud.

FIG. 44 schematically illustrates various kinds of data, which are transmitted, to achieve the above-described capability of providing documents, among the respective parts of the document processing system shown in FIG. 1.

The document provider 4 has a capability of transmitting a plain text PT to the authoring apparatus 2 or the server 3. When the document provider 4 transmits a plain text PT, it also transmits, together with the plain text PT, an electronic document ID (IDtxt) serving as an identifier uniquely assigned to the plain text. If the server 3 receives a plain text PT and an electronic document ID (IDtxt) from the document provider 4, the server 3 stores the received plain text PT and electronic document ID (IDtxt) into the database 3a.

The transmission of a plain text PT and its electronic document ID (IDtxt) from the document provide 4 to the authoring apparatus 2 is performed when the document provider 4 requests the authoring apparatus 2 to author the plain text PT. In this case, the authoring apparatus 2 produces a tag file TF by authoring the received plain text PT. The authoring apparatus 2 then transmits the resultant tag file TF and the associated electronic document ID (IDtxt) to the server 3. If the serer 3 receives the tag file TF and the electronic document ID (IDtxt) from the authoring apparatus 2, the server 3 stores the received tag file TF and electronic document ID (IDtxt) into the database 3a.

When the provider 4 requests the authoring apparatus 2 to author a plain text PT, the provider 4 may transmit to 5' the authoring apparatus 2 only the electronic document ID (IDtxt) assigned to the plain text PT. In this case, the authoring apparatus 2 transmits a database retrieval request command Isc together with the electronic document ID (IDtxt) to the server 3. Upon reception of the database retrieval request command Isc, the server 3 searches the database 3a to check whether the electronic document (in the form of a plain text or a tag file) specified by the electronic document ID (IDtxt) received together with the database retrieval request command Isc is stored in the database 3a. The server 3 transmits a database retrieval result notification Asc indicating the result of the retrieval to the authoring apparatus 2.

In the case where the received database retrieval result notification Asc indicates that a corresponding electronic document in the form of a tag file TF is stored in the database 3a, the authoring apparatus 2 transmits to the document provider 4 a tag file existence notification Itf to notify that the tag file TF corresponding to the electronic document ID (IDtxt) exists in the database and thus no further authoring is necessary. Thus, the document provider 4 recognizes that the plain text PT has been already authored and is ready to be provided to users.

In the case where the database retrieval result notification Asc transmitted by the server 3 in response to the database retrieval request command Isc indicates that the corresponding electronic document in the form of a plain text PT is stored in the database 3a, the authoring apparatus 2 transmits to the server 3 a plain text request command Ipt to request transmission of the plain text PT corresponding to the electronic document ID (IDtxt). In response, the server 3 transmits the plain text PT (together with the electronic document ID (IDtxt)) to the authoring apparatus 2. The authoring apparatus 2 performs authoring upon the received plain text PT and transmits the resultant tag file TF (together with the electronic document ID (IDtxt)) to the server 3. Upon reception of the tag file TF and the electronic document ID (IDtxt.), the server 3 stores the tag file TF in the database 3a in such a manner that the tag file TF is linked to the corresponding plain text PT according to the electronic document ID (IDtxt).

In the case where the database retrieval result notification Asc transmitted by the server 3 in response to the database retrieval request command Isc indicates that neither a plain text PT nor a tag file TF is stored as the corresponding electronic document in the database 3a, the authoring apparatus 2 transmits to the document provider 4 a plain text request command Ipt to request transmission of the plain text PT corresponding to the electronic document ID (IDtxt). In response, the document provider 4 transmits the plain text PT (together with the electronic document ID (IDtxt)) to the authoring apparatus 2. The authoring apparatus 2 performs authoring upon the received plain text PT and transmits the resultant tag file TF (together with the electronic document ID (IDtxt)) to the server 3. Upon reception of the tag file TF and the electronic document ID (IDtxt), the server 3 stores them in the database 3a.

The document providing process via communication, in which the document provider 4 requests the authoring of a plain text PT, and a tag file TF produced by the authoring apparatus 2 in response to the authoring request issued by the document provider 3 is stored in the database 3a, is performed in one of four manners described below in Cases 1 to 4.

Case 1: The document provider 4 transmits a plain text PT and an electronic document ID (IDtxt) to the authoring apparatus 2.

Step 1: The document provider 4 transmits a plain text PT and an electronic document ID (IDtxt) to the authoring apparatus 2.

Step 2: The authoring apparatus 2 performs authoring upon the received plain text PT and produces a tag file TF.

Step 3: The authoring apparatus 2 transmits the resultant tag file TF and the associated electronic document ID (IDtxt) to the server 3.

Step 4: The server 3 stores the received tag file TF and electronic document ID (IDtxt) into the database 3a.

Case 2: The document provider 4 transmits only an electronic document ID (IDtxt) to the authoring apparatus 2, and a tag file TF corresponding to the electronic document ID (IDtxt) exists in the database 3a.

Step 1: The document provider 4 transmits only an electronic document ID (IDtxt) to the authoring apparatus 2.

Step 2: The authoring apparatus 2 transmits a retrieval request command to the server 3 to request it to check whether an electronic document corresponding to the electronic document ID (IDtxt) exists in the database 3a.

Step 3: The server 3 performs retrieval and informs the authoring apparatus 2 that a tag file TF corresponding to the electronic document ID (IDtxt) exists in the database 3a.

Step 4: The authoring apparatus 2 informs the document provider 4 that the tag file TF exists in the database 3a.

Case 3: The document provider 4 transmits only an electronic document ID (IDtxt) to the authoring apparatus 2, but neither a tag file TF nor a plain text corresponding to the electronic document ID (IDtxt) exists in the database 3a.

Step 1: The document provider 4 transmits only an electronic document ID (IDtxt) to the authoring apparatus 2.

Step 2: The authoring apparatus 2 transmits a retrieval request command to the server 3 to request it to check whether an electronic document corresponding to the electronic document ID (IDtxt) exists in the database 3a.

Step 3: The server 3 performs retrieval and informs the authoring apparatus 2 that neither the tag file TF nor the plain text corresponding to the electronic document ID (IDtxt) exists in the database 3a.

Step 4: The authoring apparatus 2 requests the document provider 4 to transmit a plain text PT corresponding to the electronic document ID (IDtxt).

Step 5: The document provider 4 transmits the plain text PT and the electronic document ID (IDtxt) to the authoring apparatus 2.

Step 6: The authoring apparatus 2 performs authoring upon the received plain text PT and produces a tag file TF.

Step 7: The authoring apparatus 2 transmits the resultant tag file TF and the associated electronic document ID (IDtxt) to the server 3.

Step 8: The server 3 stores the received tag file TF and electronic document ID (IDtxt) in the database 3a.

Case 4: The document provider 4 transmits only an electronic document ID (IDtxt) to the authoring apparatus 2, and a plain text PT corresponding to the electronic document ID (IDtxt) exists in the database 3a.

Step 1: The document provider 4 transmits only an electronic document ID (IDtxt) to the authoring apparatus 2.

Step 2: The authoring apparatus 2 transmits a retrieval request command to the server 3 to request it to check whether an electronic document corresponding to the electronic document ID (IDtxt) exists in the database 3a.

Step 3: The server 3 performs retrieval and informs the authoring apparatus 2 that a plain text PT corresponding to the electronic document ID (IDtxt) exists in the database 3a.

Step 4: The authoring apparatus 2 requests the document provider 4 to transmit a plain text PT corresponding to the electronic document ID (IDtxt).

Step 5: The server 3 transmits the plain text PT and the electronic document ID (IDtxt) to the authoring apparatus 2.

Step 6: The authoring apparatus 2 performs authoring upon the received plain text PT and produces a tag file TF.

Step 7: The authoring apparatus 2 transmits the resultant tag file TF and the associated electronic document ID (IDtxt) to the server 3.

Step 8: The server 3 stores the received tag file TF into the database 3a in such a manner that the tag file TF is linked to the corresponding electronic document ID (IDtxt) and the corresponding plain text PT existing in the database 3a.

After the process in one of the four cases described above, the tag file TF is stored in the database 3a.

In Cases 1, 3, and 4 in which the authoring apparatus 2 performs authoring and transmits the produced tag file TF to the server 3 which in turn stores the received tag file in the database 3a, the authoring apparatus 2 transmits a completion notification Icp to the document provider 4.

In the document processing system of the present embodiment, the authoring apparatus 2 performs accounting associated with the authoring fee to the document provider 4 (accounting process KM in FIG. 44).

That is, in Cases 1, 3, or 4, after transmitting the completion notification Ic to the document provider 4, the authoring apparatus 2 performs the accounting process associated with the authoring fee to the document provider 4.

The processes in Cases 1 to 4 are examples which are performed when the system is configured in the manner shown in FIG. 44. When the document processing system is configured in different fashions, the process may be performed in different manners.

When electronic documents are stored in the database 3a, they have, for example, one of formats shown in FIGS. 45A to 45E.

Figure 45A:
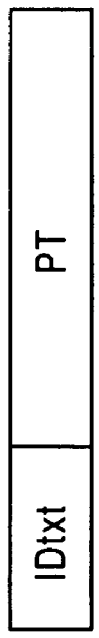
FIGS. 45A, 45B, 45C, 45D and 45E are schematic diagrams illustrating formats in which data is stored in a database of the document processing system according to the embodiment of the present invention.

FIG. 45A illustrates a format in which an electronic document ID (IDtxt) and a plain text PT are stored such that they are linked to each other. For example, when the server 3 receives a plain text PT together with an electronic document ID (IDtxt) from the document provider 4, the plain text PT and the electronic document ID (IDtxt) are stored in the database 3a in the manner shown in FIG. 45A. In Case 4, a plain text of interest can be already present in the database 3a, if the document provider 4 has transmitted the plain text PT together with the associated electronic document ID (IDtxt) to the server 3 and if the server 3 has stored it in the database 3a in the manner shown in FIG. 45A.

Figure 45B:

FIG. 45B illustrates a format in which an electronic document ID (IDtxt) and a tag file TF are stored such that they are linked to each other. For example, when the server 3 receives a tag file TF together with an electronic document ID (IDtxt) from the authoring apparatus 2, the tag file TF and the electronic document ID (IDtxt) are stored in the database 3a in the manner described in FIG. 45B. This format is employed in Step 4 in Case 1 and in Step 8 in Case 3 described above.

Figure 45C:

FIG. 45C illustrates a format in which an electronic document ID (IDtxt), a tag file TF, and a plain text PT are stored such that they are linked to each other. This format is employed, for example, when, in Step 8 in Case 4, a tag file TF is stored in the database 3a such that the tag file TF is linked to the corresponding electronic document ID (IDtxt) and plain text PT already existing in the database 3a.

The format shown in FIG. 45C is also employed when, in Case 1 or 3, the server 3 receives a plain text PT together with a tag file TF and an electronic document ID (IDtxt) from the authoring apparatus 2.

Figure 45D:
Figure 45E:

If an identifier IDtf indicating the presence of a tag file TF is added to the data in the format shown in FIG. 45B or 45C, the resultant data has the format shown in FIG. 45D or 45E.

In the system according to the present embodiment, as described above, tag files TF may be stored in the database 3a so that the stored tag files TF can be provided to the user terminal (document processing apparatus 1). In this case, identifiers Idtf indicating the present of tag files TF of electronic document IDs (IDtxt) may be stored together in the format shown in FIG. 45B or 45C.

In the case of the formats shown in FIGS. 45B and 45C, the tag file TF itself indicates the presence thereof. In Case 2, when the tag file TF is already present in the database 3a, it is in one of formats 45B, 45C, 45D, and 45E.

When an electronic document is stored in one of formats 45B, 45C, 45D, and 45E, it is possible to provide that electronic document to the document processing apparatus 1.

In this case, the server 3 transmits the tag file TF and the associated electronic document ID (IDtxt) to the document processing apparatus 1. In the case of the formats shown in FIGS. 45C and 45E, the plain text PT may be transmitted together.

The process performed by the authoring apparatus 2 is described below with reference to FIG. 46 for each of Cases 1 to 4.

Figure 46:
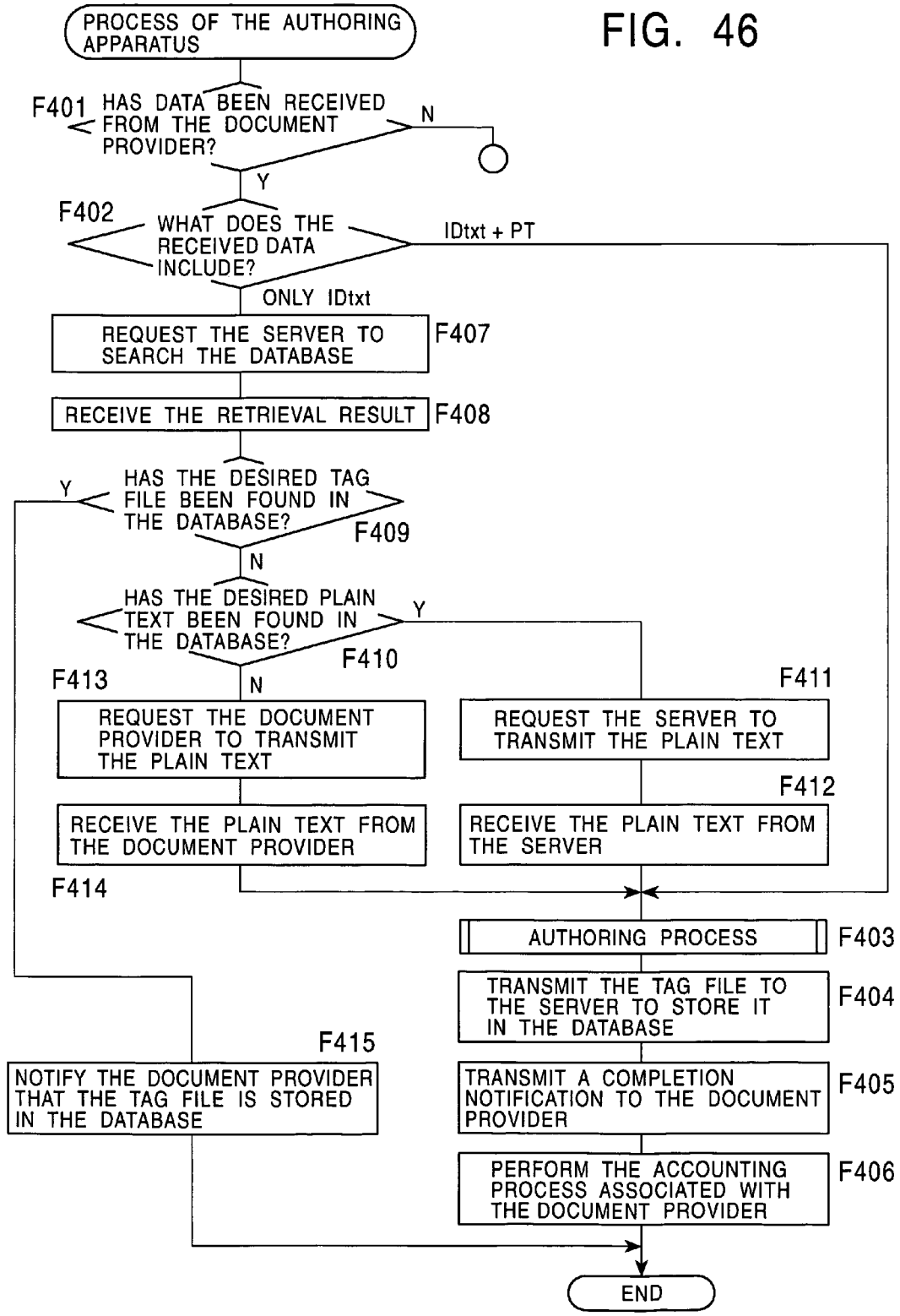
FIG. 46 is a flow chart illustrating the process performed by an authoring apparatus according to the embodiment of the present invention.

FIG. 46 illustrates the process which is performed by the authoring apparatus 2 when the authoring apparatus 2 receives an authoring request from the document provider 4. More specifically, the process shown in FIG. 46 is performed by the controller 72, shown in FIG. 27, of the authoring apparatus 2.

If an authoring request command is received from the document provider 4, the controller 72 advances the process from step F401 to F402 and examines the content of the received data.

More specifically, the controller 72 determines whether the data received from the document provider 4 includes both an electronic document ID (IDtxt) and a plain text PT or includes only an electronic document ID (IDtxt).

In the case where the data received from the document provider 4 includes both an electronic document ID (IDtxt) and a plain text PT, the controller 72 advances the process to step F403 and performs an authoring process upon the received plain text PT. That is, the process described earlier with reference to FIG. 28 is performed and a tag file TF is generated.

After generating the tag file TF, the controller 72 advances the process to step F404 and transmits the tag file TF (together with the electronic document ID (IDtxt)) to the server 3, which in turn stores the tag file TF in the database 3a.

At this stage, the process in Case 1 is completed.

After that, in step F405, the controller 72 transmits a message (completion notification Icp shown in FIG. 44) to the document provider 4 to notify it that the tag file TF has been stored in the database 3a.

Then in step F406, the controller 72 performs an accounting process (denoted by KM in FIG. 44) associated with the authoring fee to the document provider 4. More specifically, the electronic document ID (IDtxt) of the electronic document which has been subjected to the authoring process is internally stored for the future administrative and accounting process.

Thus, the whole processing sequence is completed.

In the case where the authoring request command received from the document provider 4 includes only the electronic document ID (IDtxt), the controller 72 advances the process from step F402 to step F407 and requests the server 3 to search the database 3*a* for the received electronic document ID (IDtxt) (by transmitting a database retrieval request command Isc shown in FIG. 44).

In response, the server 3 searches the database 3*a* for the electronic document ID (IDtxt), as described above, and transmits the retrieval result (database retrieval result notification Asc shown in FIG. 44) to the authoring apparatus 2. In step F408, the controller 72 receives the retrieval result.

The controller 72 checks the received retrieval result to determine, in step F409, whether the tag file TF corresponding to the electronic document ID (IDtxt) is stored in the database 3*a* and further, in step S410, determine whether the corresponding plain text PT is stored in the database 3*a*.

In the case where it is determined in step F409 that the database 3*a* includes the corresponding tag file TF, the controller 72 advances the process to step F415 to notify the document provider 4 that the tag file TF corresponding to the electronic document ID (IDtxt) requested in terms of the authoring are already present in the database 3*a* (by transmitting a tag file presence notification Itf shown in FIG. 44). Thus, the whole process is completed.

The process described above corresponds to the process in Case 2. In this case, the accounting process is not performed because authoring is not performed.

In the case where it is determined in step F409 that the corresponding tag file TF is not stored in the database 13*a* and if it is further determined in step F410 that the corresponding plain text PT is not stored in the database 3*a*, the controller 72 advances the process to step F413 and requests the document provider 4 to transmit the plain text PT specified by the electronic document ID (IDtxt) (by transmitting a plain text request command Ipt shown in FIG. 44).

In response, the document provider 4 transmits the plain text PT corresponding to the electronic document ID (IDtxt) (together with the electronic document ID(IDtxt)) to the authoring apparatus 2. In step F414, the controller 72 receives the plain text PT and the electronic document ID (IDtxt).

Thus, the authoring apparatus 2 acquires the plain text PT to be authored. The controller 72 advances the process to step F403 and performs authoring upon the received plain text PT. That is, the process described earlier with reference to FIG. 28 is performed and a tag file TF is generated.

After generating the tag file TF, the controller 72 advances the process to step F404 and transmits the tag file TF (together with the electronic document ID (IDtxt)) to the server 3, which in turn stores the tag file TF in the database 3*a*.

At this stage, the process in Case 3 is completed.

In step F405, the controller 72 notifies the document provider 4 that the tag file TF has been stored in the database 3*a* (by transmitting a completion notification Icp shown in FIG. 44). Then in step F406, the controller 72 performs an accounting process (denoted by KM in FIG. 44) associated with the authoring fee to the document provider 4.

Thus, the whole processing sequence is completed.

In the case where it is determined in F409 that the tag file TF is not stored in the database 3*a* but it is determined in step F410 that the corresponding plain text PT is stored in the database 3*a*, the controller 72 advances the process to step F411.

In this case, the controller 72 requests the server 3 to transmits the plain text PT specified by the electronic document ID (IDtxt) (by transmitting a plain text request command Ipt shown in FIG. 44).

In response, the server 3 reads the plain text PT specified by the electronic document ID (IDtxt) from the database 3*a* and transmits it to the authoring apparatus 2. In step F412, the controller 72 receives the plain text PT and the electronic document ID (IDtxt).

Thus, the authoring apparatus 2 acquires the plain text PT to be authored. The controller 72 advances the process to step F403 and performs authoring upon the received plain text PT to generate a tag file TF.

After that, the controller 72 advances the process to step F404 and transmits the tag file TF (together with the electronic document ID (IDtxt)) to the server 3, which in turn stores the tag file TF in the database 3*a*.

At this stage, the process in Case 4 is completed.

In step F405, the controller 72 notifies the document provider 4 that the tag file TF has been stored in the database 3*a* (by transmitting a completion notification Icp shown in FIG. 44). Then in step F406, the controller 72 performs an accounting process (denoted by KM in FIG. 44) associated with the authoring fee to the document provider 4.

Thus, the whole processing sequence is completed.

As described above, the authoring process is performed by the authoring apparatus 2 in one of manners in Cases 1 to 4 described above with reference to FIG. 46. As a result, the tag file TF of the plain text PT is produced in response to the authoring request issued by the document provider 4 and the resultant tag file TF is stored in the database 3*a*.

That is, tag files are produced from plain texts PT provided by the document provider 4 in an efficient fashion depending upon the situation, and the resultant tag files are stored in the database 3*a*. This makes it possible for the document processing apparatus 1 (user terminal) to easily acquire tagged electronic documents stored in the database 3*a*.

For example, when the authoring apparatus 2 receives a plain text PT together with an electronic document ID (IDtxt) from the document provider 4, the authoring apparatus 2 generates a tag file TF by adding tags to the plain text and transmits the resultant tag file TF to the server 3, which in turn stores the received tag file TF into the database 3*a*.

On the other hand, when the authoring apparatus 2 receives only an electronic document ID (IDtxt) from the document provider 4, the authoring apparatus 2 determines whether the tag file TF specified by the electronic document ID (IDtxt) is stored in the database 3*a*. If the tag file TF is found in the database 3*a*, the authoring apparatus 2 does not perform a useless authoring process. If the corresponding plain text PT is stored in the database 3*a*, the authoring apparatus 2 acquires it and performs authoring upon it. If neither the tag file TF nor the plain text PT is stored in the database 3*a*, the authoring apparatus 2 requests the document provider 4 to transmit the plain text and performs authoring the received plain text.

Furthermore, as described above, when the authoring apparatus 2 has performed the authoring process, the accounting process associated with the authoring fee to the document provider 4 is performed. This makes it possible to correctly charge the fee for the authoring service. This contributes to the establishment, development, and widespread use of the system.

Furthermore, it is possible to easily provide the storage medium 32 such as a disk-shaped storage medium, tape-shaped storage medium, a memory card, or a memory chip on which the program for executing the authoring process shown in FIG. 28 or the program for executing the process of controlling the authoring process shown in FIG. 46 is stored.

Using such a storage medium, it is possible to supply a program for implementing the above-described document processing method and authoring method. This makes it possible to build the authoring apparatus 2 on a general-purpose computer or the like.

The program for implementing the authoring process or the authoring control process according to the present embodiment may also be supplied via a communication network such as the Internet. This means that the present invention may also be applied to a storage medium used in a program server or used in a communication process.

II Second Embodiment

11. Configuration of Document Processing System

A document processing system according to a second embodiment is described below. The various kinds of document processing performed by the document processing I'm apparatus 1 and the authoring process performed by the authoring apparatus 2 according to the first embodiment described above are also performed in this second embodiment.

Figure 47:
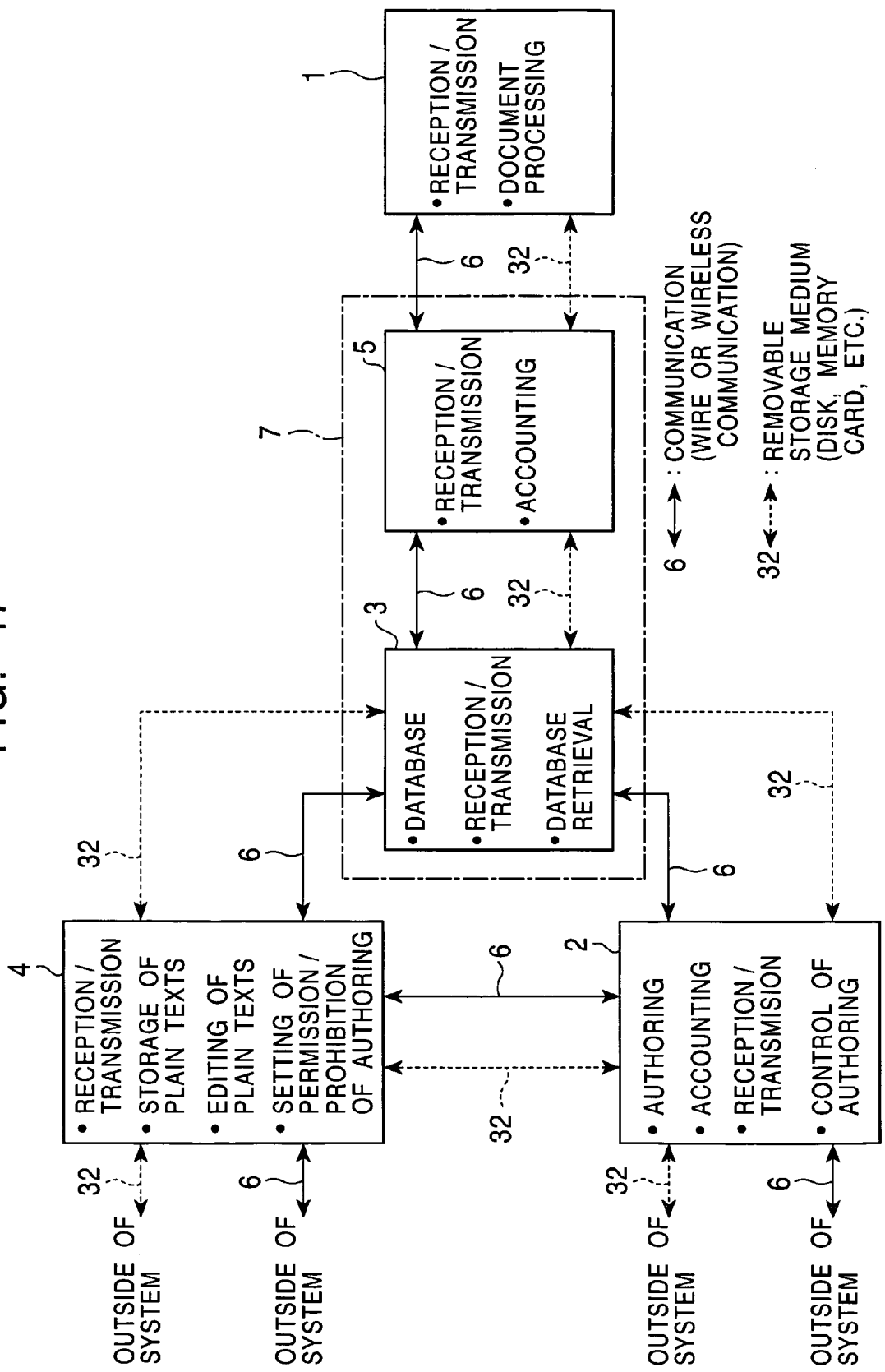
FIG. 47 is a block diagram illustrating another embodiment of a document processing system according to the present invention.

FIG. 47 schematically illustrates, in a similar manner to FIG. 1, the system configuration of the document processing system according to the second embodiment.

The difference of the document processing system according to the second embodiment from that according to the first embodiment is that it further includes a service provider 5 having the receiving/transmitting capability and the capability of accounting to a user terminal. This service provider 5 and a server 3 form a service providing unit 7 for providing a tag file to the document processing apparatus 1.

The document provider 4, the authoring apparatus 2, and the server 3 have similar capabilities to those shown in FIG. 1 except that the document provider 4 further has the capability of adding a flag (an authoring permission/prohibition ID (IDa) which will be described later) to a plain text PT when the plain text PT is stored in the database 3*a* of the serer 3, thereby setting the plain text PT to have permission/prohibition for the authoring.

As in the first embodiment described above with reference to FIG. 1, each part can transmit and receive data to and from another part via a communication line 6 or a storage medium 32.

Although in this specific example, the service provider 5 and the server 3 are separately disposed, the system may also be configured in a similar manner to that shown in FIG. 1 if the functions of the service provider 5 are included in the server 3.

12. Operation of the Document Processing System (Authoring Process Performed In Response to a Request from the Document Processing Apparatus)

The operation of the document processing system according to the second embodiment is described below. In the first embodiment described above, the operation is performed in response to an authoring request issued by the document provider 4. In this second embodiment, the operation is performed in response to an authoring request issued by the document processing apparatus 1, that is by the user.

Also in this embodiment, as in the first embodiment, a plain text PT provided by the document provider 4 is converted to a tag file TF by the authoring apparatus 2 and stored in the database 3*a* of the server 3.

Plain texts PT may also be supplied directly to the server 3 from the document provider 4. In this case, data is stored in the form of plain texts PT in the database 3*a*.

Thus, the database 3*a* includes various plain texts and tag files stored therein. In the present embodiment, the user of the document processing apparatus 1 can select any one of document data (plain texts PT or tag files TF) stored in the database 3*a* and can issue a request for transmission of the tag file of the selected document data.

More specifically, when the user issues a request for a certain tag file TF stored in the database 3*a*, the service providing unit 7 reads the requested tag file TF from the database 3*a* and transmits it to the document processing apparatus 1.

On the other hand, when the user issues a request for a certain plain text PT stored in the database 3*a*, the service providing unit 7 converts the plain text PT to a tag file TF using the authoring apparatus 2 and transmits the resultant tag file TF to the document processing apparatus 1.

The capability of providing tag files TF requested by the user to the document processing apparatus 1 makes it possible for the user to acquire desired document data and perform various kinds of processing upon it, such as the categorization, reading, generation/reading of a summary, and reading aloud.

In the present embodiment, a document (plain text) generated by the user using the document processing apparatus 1 may be transmitted to the service providing unit 7 to request the authoring of the plain text using the authoring apparatus 2. That is, the user can obtain a tag file TF converted from the plain text PT produced by the user.

Figure 48:
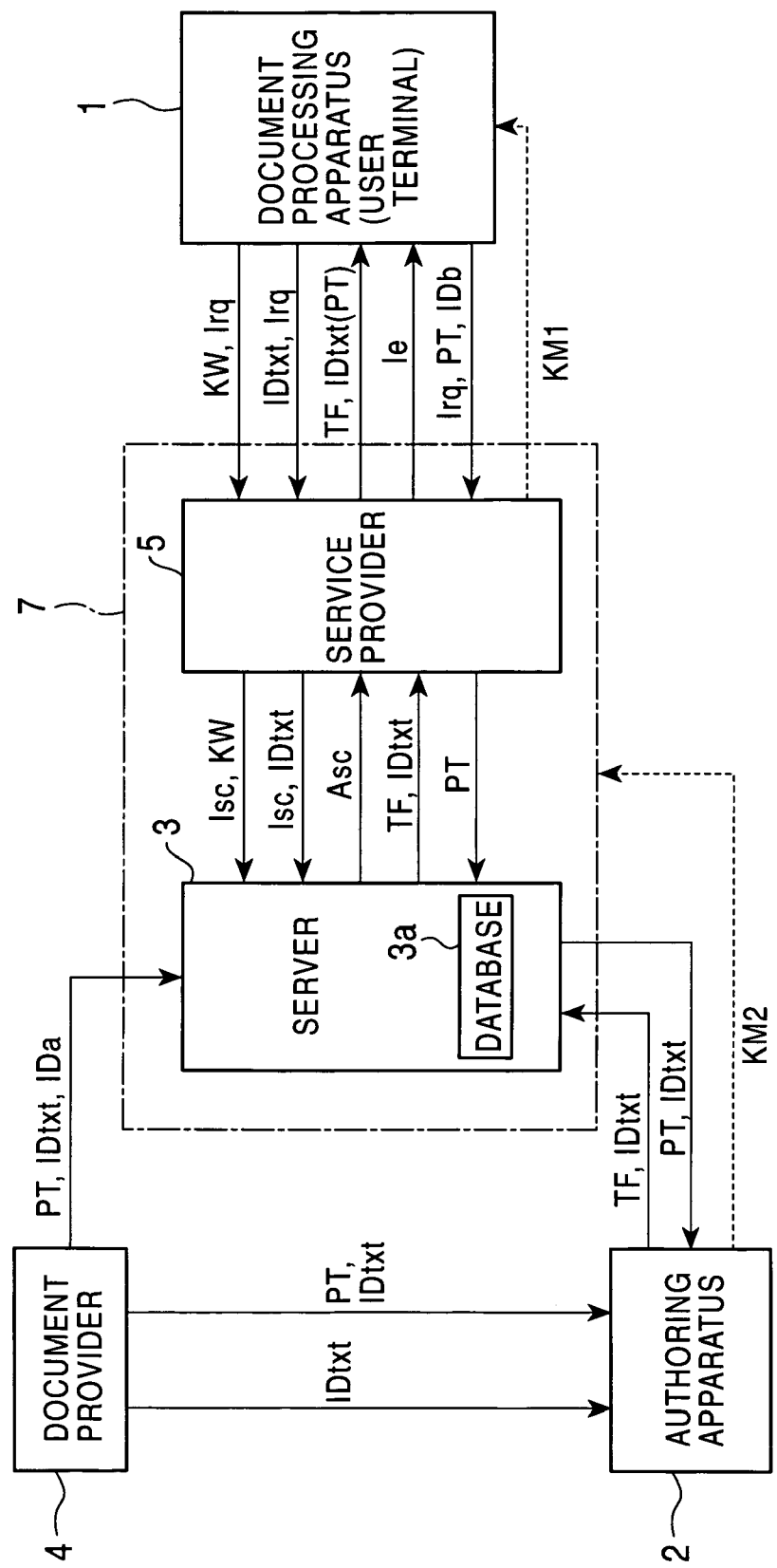
FIG. 48 is a schematic diagram illustrating communication data transmitted in the document processing system according to the embodiment of the present invention.

FIG. 48 schematically illustrates various kinds of data, which are transmitted, to achieve the above-described capability of providing documents, among the respective parts of the document processing system shown in FIG. 47.

The document provider 4 has the capability of transmitting a plain text PT to the authoring apparatus 2 or the server 3.

When the document provider 4 transmits a plain text PT, it also transmits, together with the plain text PT, an electronic document ID (IDtxt) serving as an identifier uniquely assigned to the plain text.

When the document provider 4 transmits a plain text PT to the serer 3 so as to store it in the database 3*a*, the document provider 4 may add an authoring permission/prohibition ID (IDa) to the plain text PT.

In some cases, it is desired to prohibit providing of a tag file to general users, in accordance with the intention of the author of the document or for other reasons. Thus, the document provider 4 sets the permission/prohibition of authoring of each electronic document, that is, the permission/prohibition of providing the tag file thereof, using the authoring permission/prohibition Id (IDa).

When the server 3 receives from the document provider 4 a plain text PT, an electronic document ID (IDtxt), and an authoring permission/prohibition ID (IDa), the server 3 stores the received plain text PT, electronic document ID (IDtxt) and authoring permission/prohibition ID (IDa) in the database 3*a*.

Transmission of a plain text PT and an electronic document ID (IDtxt) from the document provider 4 to the authoring apparatus 2 or transmission of only an electronic document ID (IDtxt) from the document provider 4 to the authoring apparatus 2 is performed when the document provider 4 requests the authoring of the plain text PT.

In this case, the operation is performed in the same manner as in the first embodiment described earlier. More specifically, the authoring apparatus 2 performs one of processes in Cases 1 to 4.

In the present embodiment, the server 3 may request the authoring apparatus 2 to perform an authoring process in response to an authoring request issued by the user.

That is, when the server 3 transmits a plain text PT and the associated electronic document ID (IDtxt) to the authoring apparatus 2, the authoring apparatus 2 produces a tag file by performing an authoring process upon the received plain text. The authoring apparatus 2 transmits the resultant tag file TF and the electronic document ID (IDtxt) to the server 3.

The server 3 stores the received tag file TF in the database 3a such that the tag file TF is linked to the electronic document ID (IDtxt) and the plain text which are already present in the database 3a.

When the user requests a desired tag file, a tag file request command Irq and a keyword KW for retrieval are transmitted from the document processing apparatus 1 to the service provider 5.

Or the document processing apparatus 1 may transmit a tag file request command Irq and an electronic document ID (IDtxt) specifying a particular document to the service provider 5.

The transmission of a keyword is performed when the user cannot specify a particular document, while an electronic document ID (IDtxt) is transmitted when the user can specify a particular document.

In order to make it possible for the user to specify document data the user does not have yet by an electronic document ID (IDtxt), it is desirable that information about document data stored in the database 3a, such as a list of document data, be transmitted periodically from the service providing unit 7 to the document processing apparatus 1. Instead of transmitting data in the form of a list, information may also be provided to users via newspaper or direct mail. That is, any method or medium may be employed to provide the information to users, as long as it is possible to inform the users of the available document data.

When the service provider 5 receives a tag file request command Irq and a keyword KW or an electronic document ID (IDtxt) from the document processing apparatus 1, the service provider 5 transmits to the server 3a a database retrieval request command Isc together with the keyword KW for retrieval or the electronic document ID (IDtxt).

In response to the database retrieval request command Isc, the server 3 searches the database 3a in accordance with the keyword KW or the electronic document ID (IDtxt). That is, the server 3 determines whether a tag file TF or a plain text PT corresponding to the keyword KW or the electronic document ID (IDtxt) is stored in the database 3a.

If a corresponding tag file TF is found in the database 3a, the serer 3 transmits a database retrieval result notification Asc together with the tag file F (and the electronic document ID (IDtxt)) to the service provider 5.

In the case where no corresponding tag file TF is found but a corresponding plain text PT is found, the server 3 transmits the plain text PT (together with the electronic document ID (IDtxt)) to the authoring apparatus 2 and requests it to perform authoring upon the plain text PT. If the server 3 receives a tag file TF obtained as a result of the authoring process (together with the electronic document ID (IDtxt)) from the authoring apparatus 2, the server 3 stores the received tag file TF in the database 3a. The server 3 then transmits a database retrieval result notification Asc together with the tag file TF (and the electronic document ID (IDtxt)) to the service provider 5.

In the case neither a corresponding tag file TF nor a corresponding plain text PT is found in the database 3a, the server 3 transmits a database retrieval result notification Asc to the service provider 5.

If the service provider 5 receives the tag file TF from the server, the service provider 5 transmits the tag file TF (together with the electronic document ID (IDtxt)) to the document processing apparatus 1.

On the other hand, when the database retrieval result notification Asc indicates that neither a corresponding tag file TF nor a corresponding plain text PT is stored in the database 3a, the service provider 5 transmits an error notification Ie to the document processing apparatus 1.

The document processing apparatus 1 may also transmit a plain text PT produced by the user to the service provider 5 and may request the authoring of the plain text PT. In this case, the document processing apparatus 1 transmits, to the service provider 5, tag file request command Irq, the plain text PT and a produced-document ID (IDb) indicating that the plain text PT has been produced by the user.

In response, the service provider 5 and the serer 3 transfer the plain text PT to the authoring apparatus 2 and request the authoring thereof. When a tag file TF obtained as a result of the authoring is received from the authoring apparatus 2, the service provider 5 transfers the tag file TF to the service provider 5.

The document providing process via communication, in which the document processing apparatus 1 requests the service providing unit 7 to provide a tag file associated with a certain electronic document and, in response, the service providing unit 7 provides the requested tag file TF to the document processing apparatus 1, is performed in one of four manners described-below in Cases 11 to 14.

In the following description, the operations of the server 3 and the service provider 5 are described collectively as the operation of the service providing unit 7.

Case 11: A tag file TF requested as document data by the document processing apparatus 1 is included in the database 3a.

Step 1: The document processing apparatus 1 requests the service providing unit 7 to provide a tag file TF corresponding to a keyword KW or an electronic document ID (IDtxt).

Step 2: The service providing unit 7 searches the database 3a to extract the requested tag file TF.

Step 3: The service providing unit 7 transmits the tag file TF to the document processing apparatus 1.

Case 12: A pain text PT requested as document data by the document processing apparatus 1 is included in the database 3a.

Step 1: The document processing apparatus 1 requests the service providing unit 7 to provide a tag file TF corresponding to a keyword KW or an electronic document ID (IDtxt).

Step 2: The service providing unit 7 searches the database 3a to extract a plain text PT corresponding to the requested tag file TF.

Step 3: The service providing unit 7 transmits the plain text PT and the electronic document ID (IDtxt) to the authoring apparatus 2 and requests the authoring thereof.

Step 4: The authoring apparatus 2 performs authoring upon the received plain text PT and produces a tag file TF.

Step 5: The authoring apparatus 2 transmits the resultant tag file TF and the associated electronic document ID (IDtxt) to the service providing unit 7.

Step 6: The service providing unit 7 stores the received tag file TF in the database 3a in such a manner that the tag file TF is linked to the corresponding electronic document ID (IDtxt) and the corresponding plain text PT which are already present in the database 3a.

Step 7: The service providing unit 7 transmits the tag file TF to the document processing apparatus 1.

Case 13: Neither a tag file TF nor a plain text requested as document data by the document processing apparatus 1 is included in the database 3a, or the authoring of a plain text PT is prohibited although the plain text PT is included in the database 3a.

Step 1: The document processing apparatus 1 requests the service providing unit 7 to provide a tag file TF corresponding to a keyword KW or an electronic document ID (IDtxt).

Step 2: The service providing unit 7 searches the database 3a and concludes, as a retrieval result, that neither a tag file TF nor a plain text requested as document data is included in the database 3a, or concludes that authoring of a plain text PT extracted via the retrieval is prohibited.

Step 3: The service providing unit 7 transmits an error notification to the document processing apparatus 1.

Case 14: The document processing apparatus 1 produces document data in the form of a plain text and requests production of a tag file thereof.

Step 1: The document processing apparatus 1 transmits the plain text PT and a produced document ID (IDb) to the service providing unit 7 and requests it to produce a tag file TF.

Step 2: The service providing unit 7 transfers the plain text PT to the authoring apparatus 2 and requests authoring thereof.

Step 3: The authoring apparatus 2 performs authoring upon the received plain text PT and produces a tag file TF.

Step 4: The authoring apparatus 2 transmits the produced tag file TF to the service providing unit 7.

Step 5: The service providing unit 7 transfers the received tag file TF to the document processing apparatus 1.

If the process in one of the four cases described above is performed, the document processing apparatus 1 acquires the tag file TF requested by the user (or the process is terminated with an error).

In the document processing system according to the present embodiment, the authoring apparatus 2 performs accounting associated with the authoring fee to the service providing unit 7 (accounting process KM2 in FIG. 48). More specifically, the accounting process is performed in Case 12 or 14.

Furthermore, the service providing unit 7 performs accounting associated with the electronic providing fee and/or the authoring fee to the user when the service providing unit 7 provides the tag file TF (accounting process KM1 in FIG. 48). In Case 12, the electronic document providing fee and the authoring fee are charged to the user. On the other hand, in Case 11, only the electronic document providing fee is charged to the user, and only the authoring fee is charged in Case 14.

The processes in Cases 1 to 4 are examples which are performed when the system is configured in the manner shown in FIG. 44. When the document processing system is configured in another fashion, the process may be performed in different manners.

When electronic documents are stored in the database 3a, they have, for example, one of formats shown in FIGS. 49A, 49B, 49C, 49D and 49E.

Figure 49A:
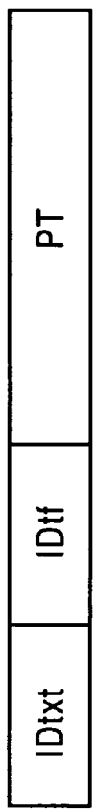
FIGS. 49A, 49B, 49C, 49D, and 49E are schematic diagrams illustrating formats in which data is stored in a database of the document processing system according to the embodiment of the present invention.
Figure 49B:
Figure 49C:
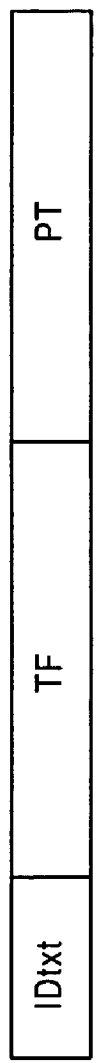
Figure 49D:
Figure 49E:

The formats shown in FIGS. 49B to 49E are similar to those shown in FIGS. 4B to 45E, and thus they are not described here in further detail. When no tag file is present, the format shown in FIG. 49A is used to store an electronic document ID (IDtxt), an authoring permission/prohibition ID (IDa), and a plain text PT such that they are linked to each other.

The authoring permission/prohibition ID (IDa) is used to indicate whether the authoring of the associated plain text PT to produce a tag file is permitted or prohibited.

Figure 50:
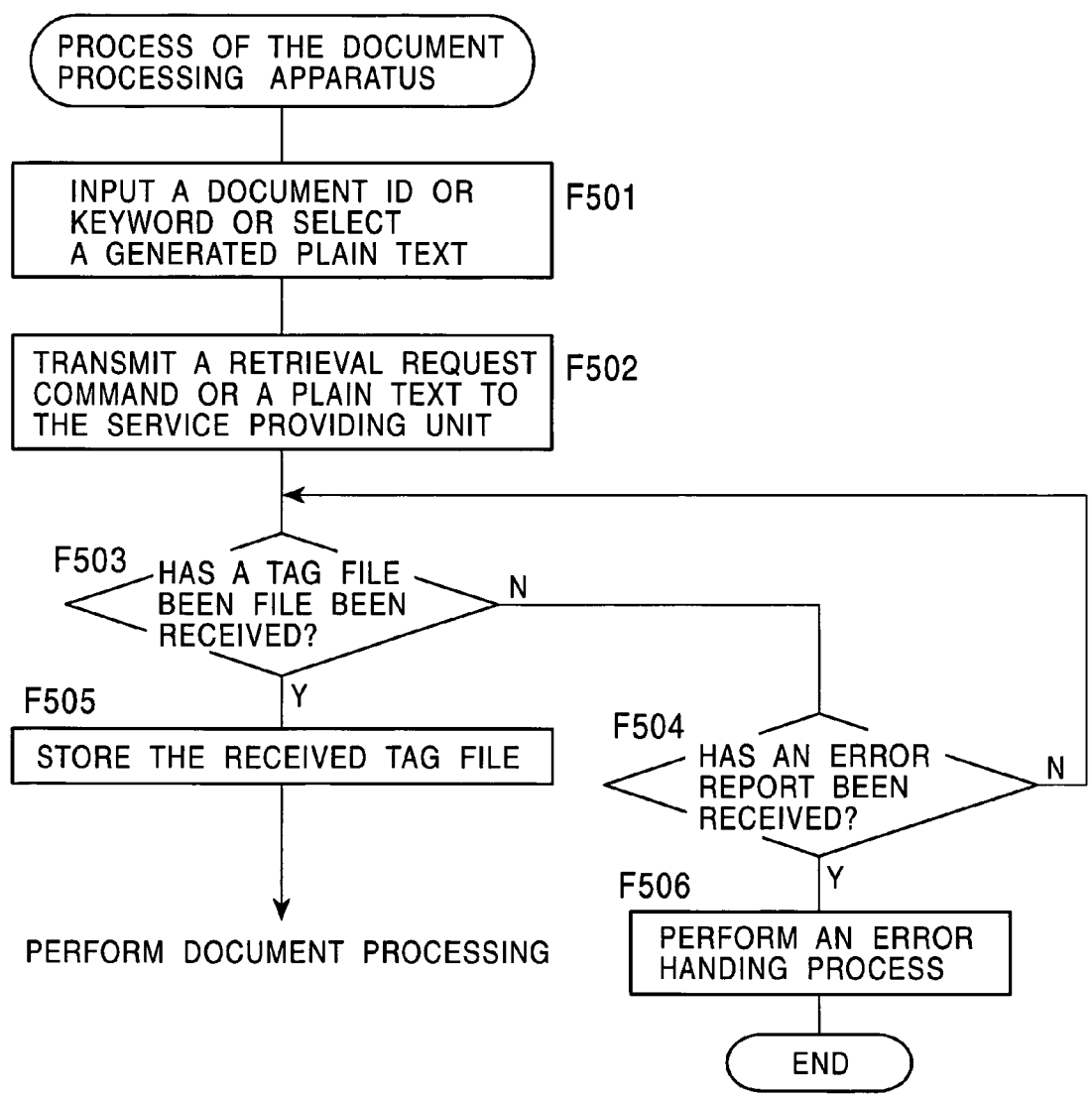
FIG. 50 is a flow chart illustrating the process performed by a document processing apparatus according to the embodiment of the present invention.
Figure 51:
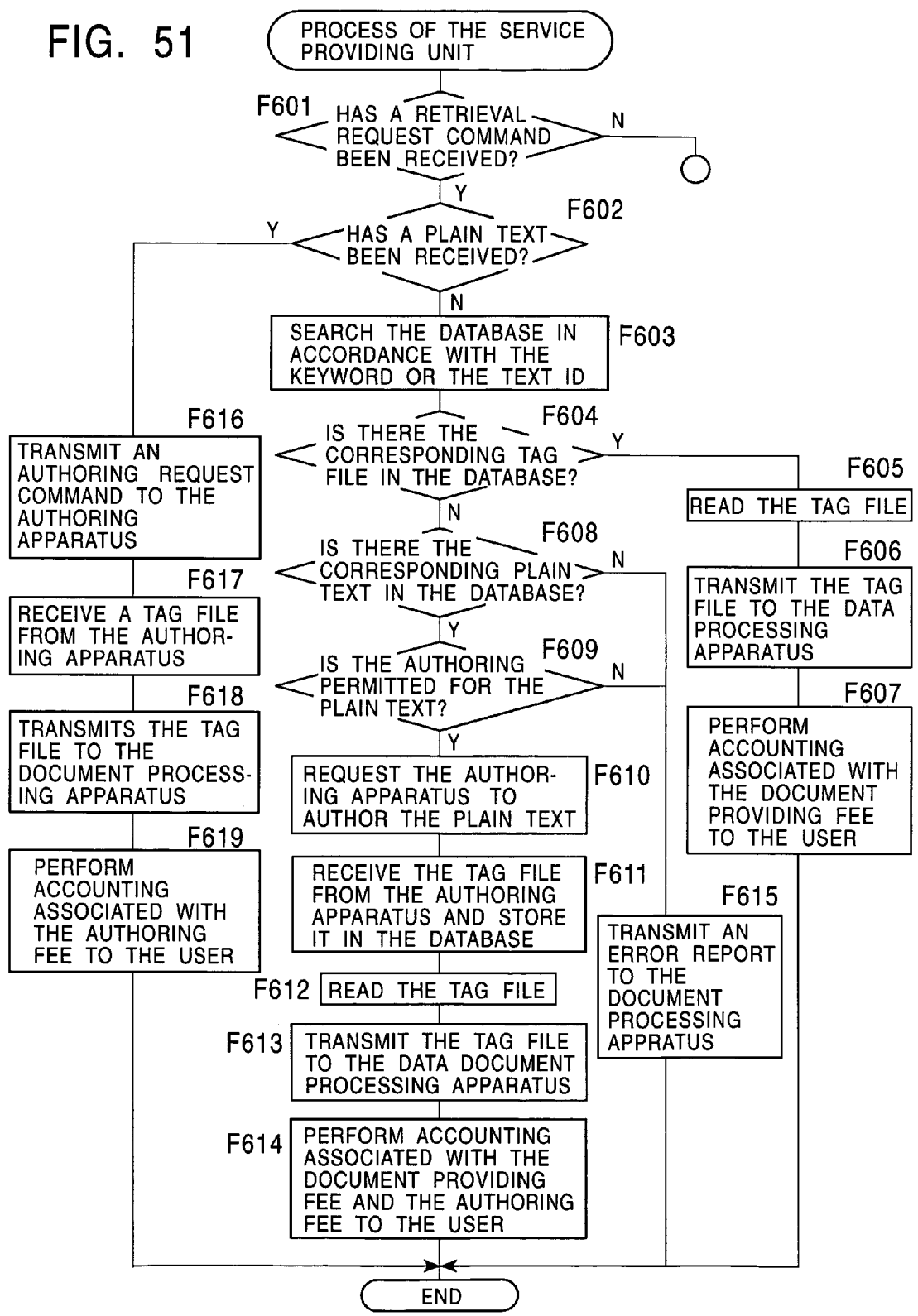
FIG. 51 is a flow chart illustrating the process performed by a service providing unit according to the embodiment of the present invention.
Figure 52:
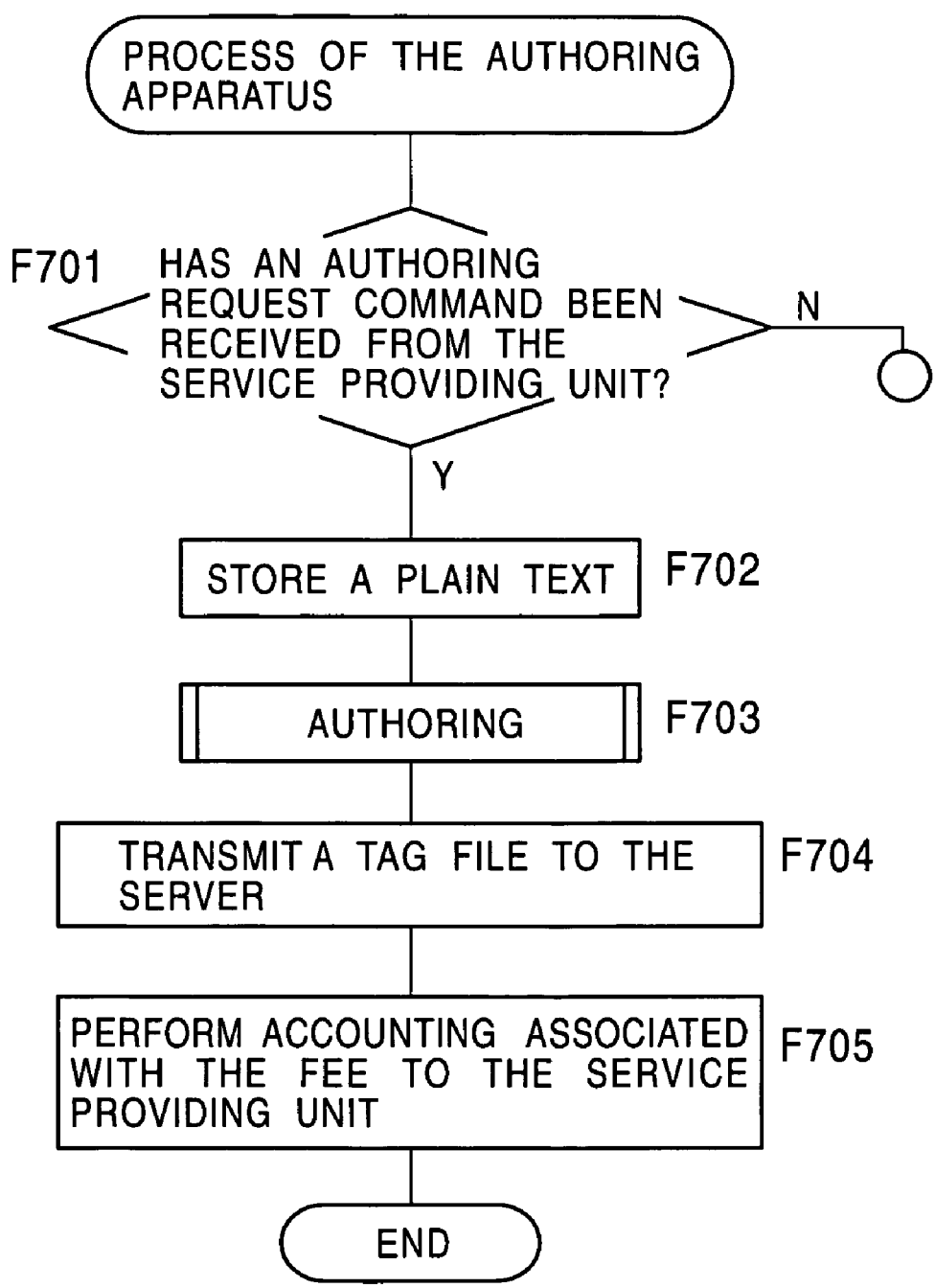
FIG. 52 is a flow chart illustrating the process performed by an authoring apparatus according to the embodiment of the present invention.

The operations of the respective parts performed in the process in each Case 11 to 14 described above with reference to FIG. 48 are now described below with reference to FIGS. 50 to 52. FIG. 50 illustrates the operation of the document processing apparatus 1, and FIGS. 51 and 52 illustrate the operations of the service providing unit 7 and the authoring apparatus 2.

Figure 53:
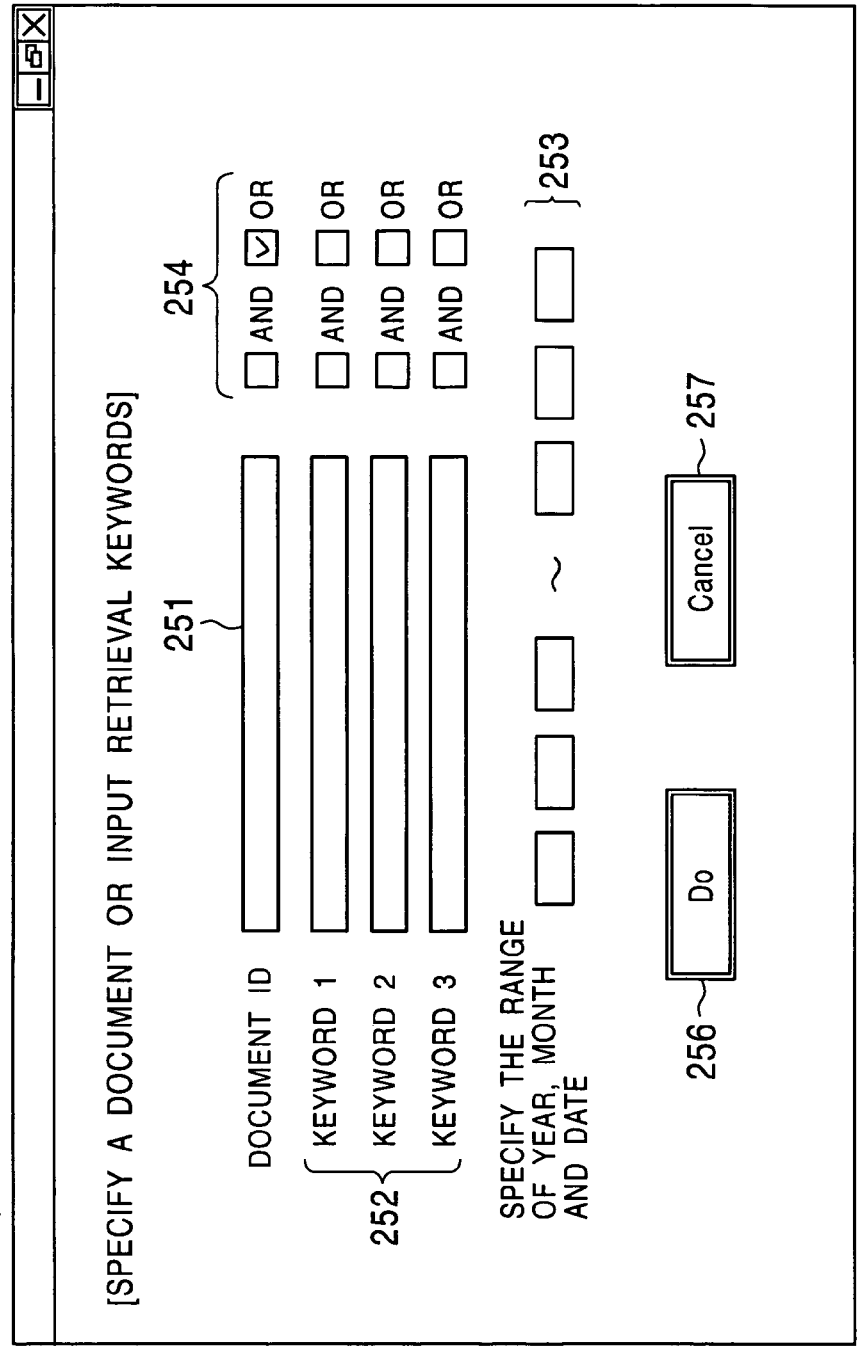
FIG. 53 is a schematic diagram illustrating a file request window according to the embodiment of the invention.
Figure 54:
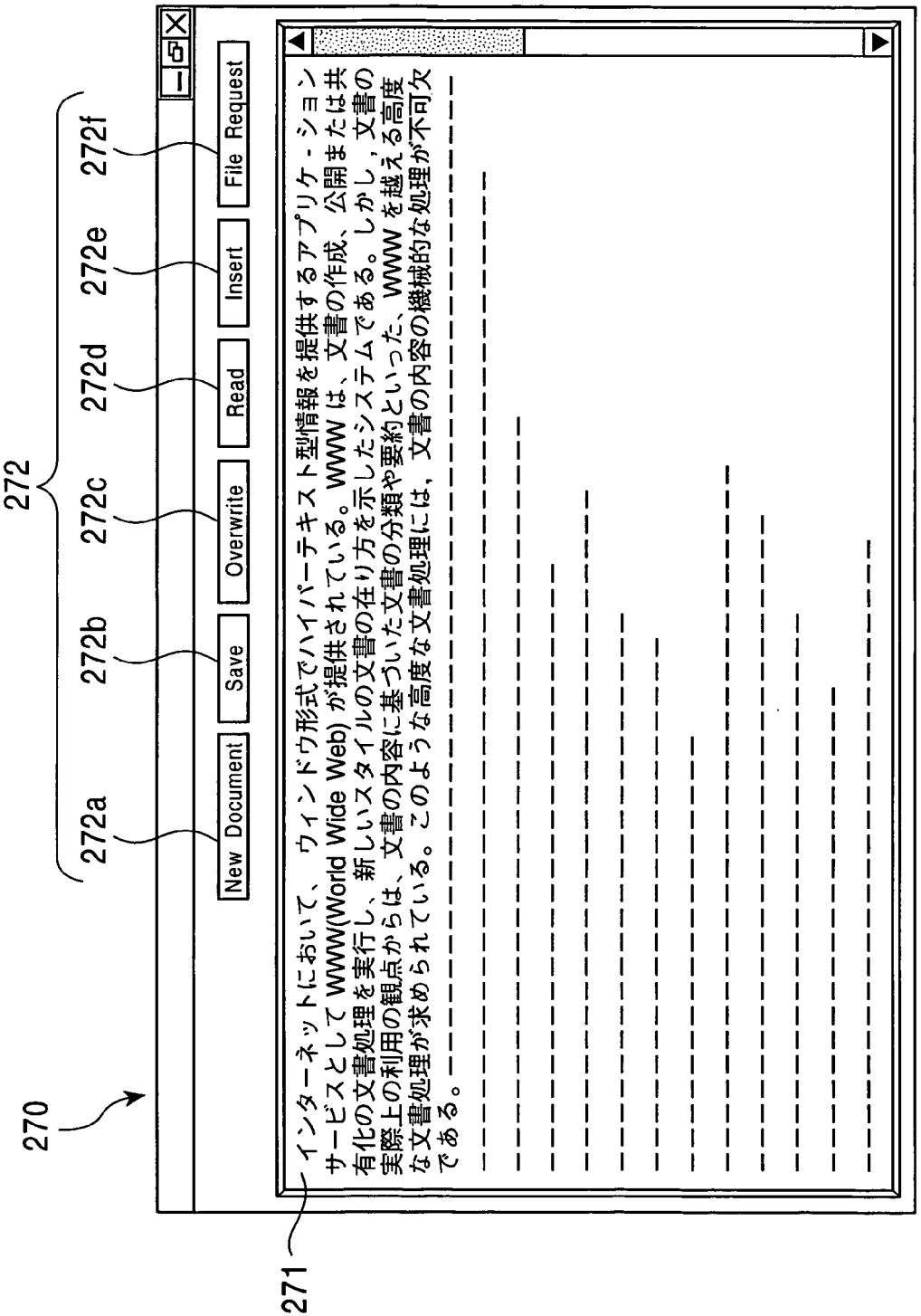
FIG. 54 is a schematic diagram illustrating a document editor window according to the embodiment of the invention.
Figure 55:
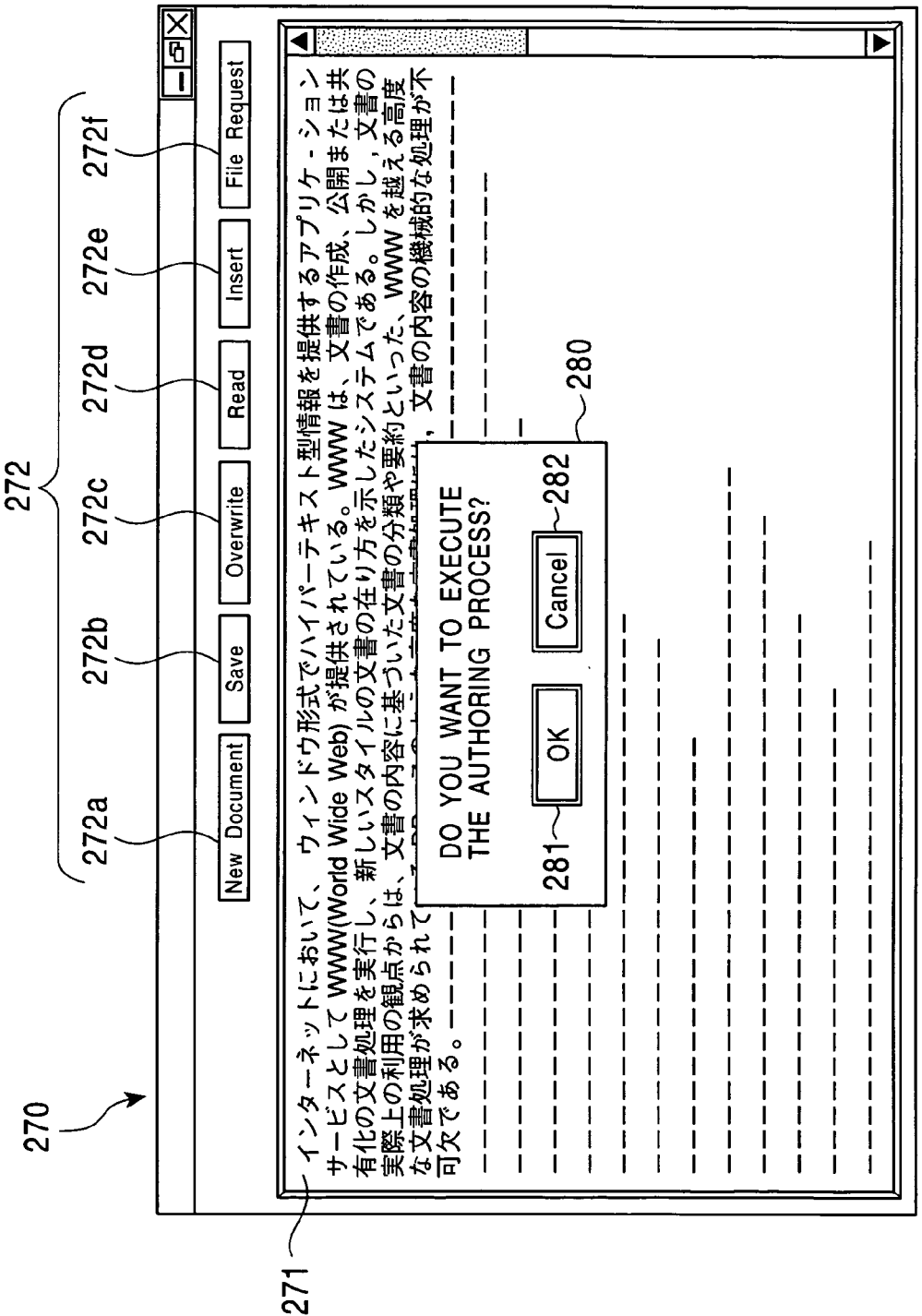
FIG. 55 is a schematic diagram illustrating an example of a confirmation window displayed over the document editor window, according to the embodiment of the invention.

FIGS. 53, 54, and 55 illustrate examples of screens which are displayed on the display 30 when the user issues a request for a tag file via the document processing apparatus 1.

When the user wants to request the service providing unit 7 to provide a certain tag file TF, the user first inputs the electronic document ID (IDtxt) of a desired tag file TF or inputs a keyword KW via the document processing apparatus 1 and then issues a retrieval request to the service providing unit 7.

Or the user may transmit a plain text PT produced using the document processing apparatus 1 to the service providing unit 7 to request transmission of a tag file TF converted from that plain text PT by means of authoring.

This is performed in steps F501 and F502 shown in FIG. 50 under the control of the controller 11 of the document processing apparatus 1.

A specific example of the process is as follows.

When the categorization window 201 shown in FIG. 10 is opened on the display 30 of the document processing apparatus 1, the user clicks the file request button 202d.

In response, the controller 11 opens a file request window 205 on the display 30, as shown in FIG. 53.

The file request window 205 includes, for example, a document ID input box 251, keyword input boxes 252, retrieval range input boxes 253, retrieval condition specifying buttons 254, an execute button 256, and a cancel button 257.

The user can specify particular document data by inputting an electronic document ID (IDtxt) in the document ID input box 251. In order to make it possible for the user to input the electronic document ID (IDtxt), it is desirable that information about document data, such as a list of electronic document IDs (IDtxt) be provided from the service providing unit 7.

Alternatively, although not shown in FIGS. 50, 51, and 53, a list of document data stored in the database 3a may be transmitted to the document processing apparatus 1 in response to a request issued by the user, and titles of the document data may be displayed in the form of a list on the display 30 so that the user can select desired document data. In this case, it is not necessary for the user to input the electronic document ID (IDtxt).

When the user cannot specify particular document data, the user may request retrieval of a desired document by specifying a keyword.

In this case, the user inputs one or more keywords in the keyword input boxes 252.

In addition to keywords, the user may specify a particular range of date (date when document data was produced) by inputting data into the retrieval range input boxes 253 and may specify AND or OR conditions by the retrieval condition specifying buttons 254.

If the user clicks the execute button 256 after inputting an electronic document ID (IDtxt) or keywords in the file request window 250, the controller 11 advances the process from step F501 to F502. In the case where the cancel button 257 is clicked, the process is cancelled and the window status returns, for example to the categorization window 201 shown in FIG. 10.

In the case where the controller 11 advances the process to step F502 in response to the clicking of the execute button 256, the controller 11 transmits to the service providing unit 7 a tag file request command Irq together with the electronic document ID (IDtxt) or the keywords KW input via the file request window 250.

After that, the controller 11 waits for arrival of a result from the service providing unit 7, in step F503 or F504. More specifically, the controller 11 waits for arrival of a requested tag file TF or an error notification Ie.

When the user wants to request authoring of a plain text produced using the document processing apparatus 1, the user clicks the edit button 202*f* in the categorization window 201.

In response, the controller 11 displays a document editor window 270 such as that shown in FIG. 54 on the display 30.

The document editor window 270 includes a text editing box 271 and various kinds of control buttons 272. The control buttons 272 includes a new document button 272*a*, a save button 272*b*, a overwrite button 272*c*, a read button 272*d*, an insert button 272*e*, and a file request button 272*f*.

In this document editor window 270, the user may perform various kinds of processing upon a plain text PT, such as writing, modifying, editing, and saving.

More specifically, the user may create a new document or read an existing document from the storage medium 32 or the HDD 34 and edit it, by operating the keyboard or the mouse of the input unit 20.

When the user wants to request authoring of a plain text PT displayed in the text editing box 271, the user clicks the file request button 272*f*.

In response, the controller 22 opens a confirmation window 280 over the document editor window 270 as shown in FIG. 55. If the user wants to execute the authoring process, the user clicks the OK button 281 in the confirmation window 280. If the user does not want to execute the authoring process, the user clicks the cancel button 282.

If the OK button 281 is clicked, the controller 11 advances the process from step F501 to F502. The controller 11 transmits, to the service providing unit 7, a tag file request command Irq together with the plain text PT displayed in the document editor window 270 and also a produced document ID (IDb) indicating that the plain text PT has been produced by the user.

After that, the controller 11 waits for arrival of a result, that is, a requested tag file TF or an error notification Ie, from the service providing unit 7.

If the service providing unit 7 receives the tag file request command Irq from the document processing apparatus 1, the process goes from step F601 to 602 shown in FIG. 51, and it is determined whether a plain text PT and a produced document ID (IDb) have been received together with the tag file request command Irq.

In the case where an electronic document ID (IDtxt) or a keyword KW has been received together with the tag file request command Irq, the service providing unit 7 advances the process to step F603 and searches the database 3*a* in accordance with the electronic document ID (IDtxt) or the keyword KW.

In the case of retrieval according to the electronic document ID (IDtxt), a particular tag file TF or a plain text PT having an associated electronic document ID (IDtxt) attached therewith as shown in FIGS. 49A, 49B, 49C, 49D and 49E is searched for.

In the case of retrieval according to the keyword KW, a tag file TF or a plain text PT which has the same keyword as KW and which satisfies the retrieval conditions specified by the user is extracted from the tag files TF and plain texts PT stored in the database 3*a*.

If a tag file TF is obtained as a result of the retrieval, the service providing unit 7 advances the process from step F604 to F605 and reads that tag file TF from the database 3*a*. Then in step F606, the service providing unit 7 transmits the tag file TF and the associated electronic document ID (IDtxt) to the document processing apparatus 1.

If the document processing apparatus 1 receives the tag file TF, the controller advances the process from F503 to F505 shown in FIG. 50 and stores the received tag file TF in the RAM 14 or on the HDD 34.

At this stage, the process in Case 11 is completed.

In the document processing apparatus 1, the acquired tag tile TF is subsequently subjected to the manual categorization process shown in FIG. 5 or the automatic categorization process shown in FIG. 13. Thus, it becomes possible to perform various kinds of document processing such as reading, generation and displaying of a summary, and reading aloud.

In the service providing unit 7, in step F607 after the transmission in step F606, accounting to the user of the document processing apparatus 1 (accounting process KM1 in FIG. 48) is performed. In this case, only the electronic document providing fee is charged because the authoring process is not performed.

Thus, the whole processing sequence is completed.

In the case where the result of the retrieval in F603 according to the electronic document ID (IDtxt) or the keyword KW indicates that a plain text PT is included in the database 3*a* although the requested tag file TF is not included in the database 3*a*, the service providing unit 7 advances the process from F604 to F608 and further to F609 to determine whether authoring of the plain text is permitted.

When document data includes only a plain text PT, an authoring permission/prohibition ID (IDa) determined by the document provider 4 is attached to the document data as shown in FIG. 49A so as to indicate whether authoring is permitted or prohibited.

In the case where it is determined in step F609 that authoring is permitted, the service providing unit 7 advances the process to step F610 and reads the retrieved plain text PT and the associated electronic document ID (IDtxt) from the database 3*a*. The service providing unit 7 transmits them to the authoring apparatus 2 and requests authoring thereof.

If the authoring apparatus 2 receives the authoring request command from the service providing unit 7, the controller 72 of the authoring apparatus 2 executes the process shown in FIG. 52. That is, in response to the authoring request command, the controller 72 advances the process from step 701 to F702 and stores the plain text PT and the associated electronic document ID (IDtxt) received from the service providing unit 7.

Then in step F703, the controller 72 performs the authoring process shown in FIG. 28 upon the received plain text PT thereby producing a tag file TF. In step F704, the controller 72 transmits the produced tag file TF (together with the associated electronic document ID (IDtxt)) to the service providing nit 7.

Furthermore, in step F705, the controller 72 performs accounting (KM2 in FIG. 48) associated with the authoring fee to the service providing unit 7.

In step F611 in FIG. 51, the service providing unit 7 receives the tag file TF and the associated electronic document ID (IDtxt) from the authoring apparatus 2 and stores it in the database 3a. That is, the tag file IT is stored in the database 3a in such a manner that it is linked with the corresponding plain text PT which is already present in the database 3a.

After that, the service providing unit 7 advances the process to step F612 and reads the tag file TF from the database 3a. In the next step F613, the service providing unit 7 transmits the tag file TF and the associated electronic document ID (IDtxt) to the document processing apparatus 1.

If the document processing apparatus 1 receives the tag file TF, the controller 11 advances the process from step F503 to F505 in FIG. 50 and stores the received tag file TF in the RAM 14 or on the HDD 34.

At this stage, the process in Case 12 is completed.

In the document processing apparatus 1, the acquired tag tile TF is subsequently subjected to the manual categorization process shown in FIG. 5 or the automatic categorization process shown in FIG. 13. Thus, it becomes possible to perform various kinds of document processing such as reading, generation and displaying of a summary, and reading aloud.

In the service providing unit 7, in step F614 after the transmission in step F613, accounting to the user of the document processing apparatus 1 (accounting process KM1 in FIG. 48) is performed. In this specific case in which the authoring is performed, accounting is performed for the sum of the electronic document providing fee and the authoring fee.

Thus, the whole processing sequence is completed.

When retrieval according to the electronic document ID (IDtxt) or the keyword KW is performed in step F603 in the above-described process, there is a possibility that neither a tag file TF nor a plain text PT is found (steps F608 to F615).

Even when a plain text PT is extracted via the retrieval, there is a possibility that it turns out in step F609 that authoring of the plain text PT is prohibited by the associated authoring permission/prohibition ID (IDa) (steps F609 to F615).

In these cases, it is impossible/prohibited to provide the tag file TF to the user, and thus the service providing unit 7 transmits, in step F615, an error notification Ie to the document processing apparatus 1.

If the document processing apparatus 1 receives the error notification Ie, the controller 11 advances the process from step F504 to F506 in FIG. 50. After performing an error handling process in step F506, the process is terminated. In the error handling process, for example, a message is displayed to notify the user that acquisition of the requested tag file TF has failed.

At this stage, the process in Case 13 is completed.

In some cases, as described above, the document processing apparatus 1 transmits a plain text PT produced by the user to the service providing unit 7 to request authoring thereof. This can occur when it is determined in step F602 that a plain text PT has been received.

In this case, the service providing unit 7 advances the process to step F616 and transfers the received plain text PT to the authoring apparatus 2 to request authoring thereof.

If the authoring apparatus receives the authoring request from the service providing unit 7, the controller 72 of the authoring apparatus 2 performs the process described earlier with reference to FIG. 52. That is, in response to the authoring request, the controller advances the process from step F701 to F702 and stores the plain text PT received from the service providing unit 7.

In the next step F703, the controller 72 performs the authoring process, described earlier with reference to FIG. 28, upon the received plain text PT thereby producing a tag file TF. In step F704, the produced tag file TF is transmitted to the service providing unit 7.

Furthermore, in step F705, the controller 72 performs accounting (KM2 in FIG. 48) associated with the authoring fee to the service providing unit 7.

In step F617 shown in FIG. 51, the service providing unit 7 receives the tag file TF transmitted from the authoring apparatus 2. In this case, because the received tag file TF has been produced on the basis of the document data produced by the user, the tag file TF is not stored in the database 3a. However, if the user wants to bring the document into public view, a step for storing it in the database 3a may be added to the process.

The service providing unit 7 then advances the process to step F618 and transfers the tag file TF received from the authoring apparatus 2 to the document processing apparatus 1.

If the document processing apparatus 1 receives the tag file TF, the controller 11 advances the process from step F503 to F505 in FIG. 50 and stores the tag file TF in the RAM 14 or on the HDD 34.

At this stage, the process in Case 14 is completed.

In the document processing apparatus 1, the acquired tag tile TF is subsequently subjected to the manual categorization process shown in FIG. 5 or the automatic categorization process shown in FIG. 13. Thus, it becomes possible to perform various kinds of document processing such as reading, generation and displaying of a summary, and reading aloud.

In the service providing unit 7, in step F619 after the transmission in step F618, accounting to the user of the document processing apparatus 1 (accounting process KM1 in FIG. 48) is performed. In this case, the authoring process has been performed for the document data produced by the user, only the authoring fee is charged.

Thus, the whole processing sequence is completed.

As described above, when a request for a tag file TF is issued from the document processing apparatus 1, the authoring process is performed in one of manners in Cases 1 to 4 described above with reference to FIGS. 50, 51, and 52. As a result, the tag file TF is supplied to the document processing apparatus 1, or the process is error-terminated.

Thus, it becomes possible to build a system which allows the user to easily acquire a desired tag file TF.

Furthermore, it becomes possible to acquire a tag file TF of a plain text PT produced by the user. That is, the user can perform various kinds of processes in desired manners effectively using the document processing apparatus 1.

Furthermore, as described above, when the authoring apparatus 2 has performed the authoring process, the accounting process associated with the authoring fee to the document provider 4 is performed. This makes it possible to correctly charge the fee for the authoring service. This contributes to the establishment, development, and widespread use of the system.

Similarly, as described above, when the service providing unit 7 has provided a tag file to the user, the accounting process associated with the document providing fee to the user is performed. This makes it possible to correctly charge the fee for the document providing service. This also contributes to the establishment, development, and widespread use of the system.

When the user requests particular document data, if a tag file TF corresponding to the request is already present in the database 3a, the authoring is not necessary, and thus the authoring fee is not charged. Conversely, if only a plain text PT corresponding to the request is included in the database 3a, authoring is necessary and thus the authoring fee is charged. Thus, the accounting is performed differently depending upon whether the authoring is performed or not. This is reasonable for both the system and the user.

In the case where a plain text PT is supplied from the user, only the authoring fee is correctly charged to the user.

Furthermore, it is possible to easily provide the storage medium 32 such as a disk-shaped storage medium, tape-shaped storage medium, a memory card, or a memory chip, on which the program for process, shown in FIG. 50, performed by the document processing apparatus 1 or the program for the process, shown in FIG. 52, performed by the service providing unit 7, is stored.

Using such a storage medium, it is possible to supply a program for implementing the above-described document processing method. This makes it possible to realize the document processing apparatus 1, the service providing unit 7, and the authoring apparatus 2 on general-purpose computers or the like.

The program for executing the operation of the document processing system of the present embodiment may also be supplied via a communication network such as the Internet. That is, the present invention may also be applied to a storage medium used in a program server or used in a communication process.

In the case where the database 3a is searched in accordance with a keyword KW, there is a possibility that a plurality of plain texts PT or tag files TF are extracted.

In such a case, although not described in the above examples, information indicating that a plurality of document data are extracted and a list of extracted document data may be transmitted from the service providing unit 7 to the document processing apparatus 1 so that the user can select a desired document data from the list. Selection information indicating the selection made by the user is transmitted from the document processing apparatus 1 to the service providing unit 7. If a tag file TF is selected, the service providing unit 7 transmits the selected tag file TF to the document processing apparatus 1. On the other hand, in the case where the selected document data is a plain text PT, the service providing unit 7 requests the authoring apparatus 2 to perform authoring thereof, and the service providing unit 7 transmits the resultant tag file TF to the document processing apparatus 1.

When the service providing unit 7 requests the authoring apparatus 2 to perform authoring in step F610 or F617 shown in FIG. 51, the service providing unit 7 cannot always acquire the tag file TF immediately after issuing the authoring request.

Therefore, in practice, after issuing the authoring request in step F610 or F617, the service providing unit 7 notifies the user of the document processing apparatus 1 that the authoring request has been issued, and suspends the communication and the process. When the tag file TF has been received from the authoring apparatus 2, the service providing unit 7 restarts the process and transmits the received tag file TF to the document processing apparatus 1.

In the example described above, a plain text PT produced by the user using the document processing apparatus 1 may be transmitted to the service providing unit 7 to obtain a tag file TF of that plain text PT. However, the plain text PT is not necessarily needed to be produced by the user using the document editing capability of the document processing apparatus 1. For example, a plain text PT acquired via the storage medium 32 or the communication line 6 may be called into the document editor window 270 and may be directly transmitted to the service providing unit 7 to acquire a tag file thereof.

III Third Embodiment

13. Configuration of Document Processing System

A document processing system according to a third embodiment is described below.

In this third embodiment, the user of the document processing apparatus 1 specifies a particular category or a particular document data and requests the service providing unit 7 to retrieve tag files related to the specified category or document data thereby acquiring the desired tag files. Herein, such a process is referred to as inverse retrieval.

That is, the user can acquire tag files related to a particular document data which is already present in the document processing apparatus 1 or related to a particular category by requesting the inverse retrieval according to the particular document data or category.

Herein, the term "categories" refers to categories according to the categorization model described earlier with reference to FIG. 12, and they are displayed in the categorization window 201 shown in FIG. 10.

The various kinds of document processing performed by the document processing apparatus 1 and the authoring process performed by the authoring apparatus 2 according to the first embodiment described above are performed in the same manner also in this third embodiment.

Figure 56:
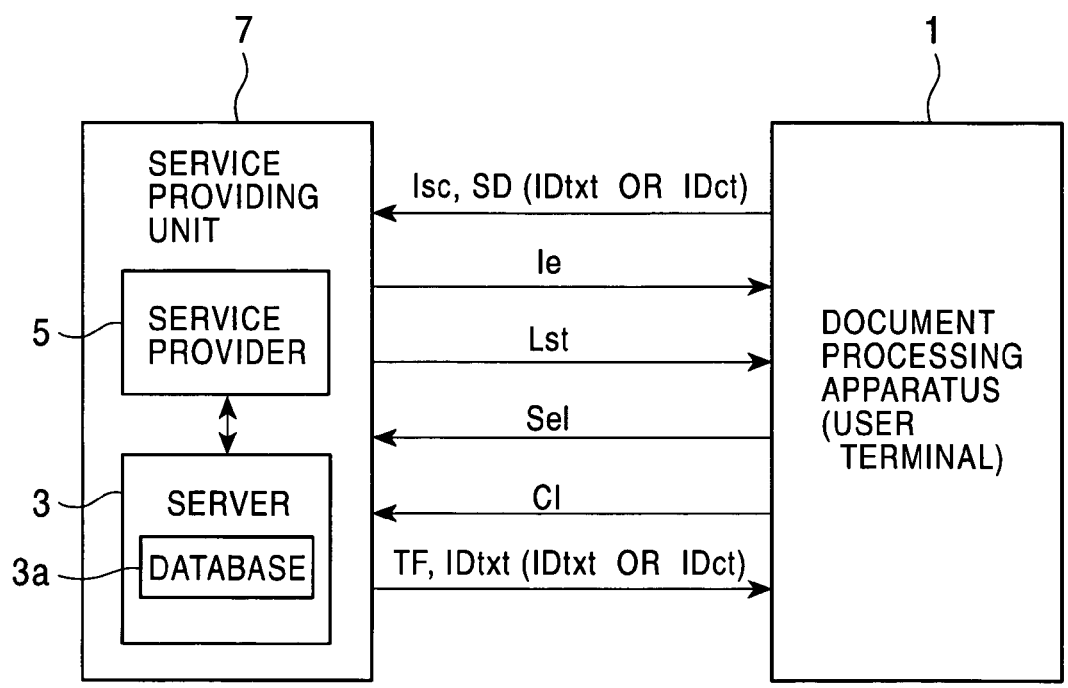
FIG. 56 is a schematic diagram illustrating communication data transmitted during an inverse retrieval process in the document processing system according to the embodiment of the present invention.

FIG. 56 schematically illustrates the system configuration of the document processing system according to the third embodiment. Although not shown in FIG. 56, the system also includes an authoring unit 2 and a document provider 4 similar to those shown in FIG. 44 or 48.

As is the system shown in FIG. 48, a service providing unit 7 includes a service provider 5 and a server 3 disposed in separate fashions. However, in this embodiment, the service provider 5 of the service providing unit 7 is not necessarily needed to be disposed in the separate fashion. That is, the service provider 5 may be configured in a similar manner as is shown in FIG. 44.

Although not shown in FIG. 56, the authoring apparatus 2 and the document provider 4 operate in a similar manner and communicate with the service providing unit 7 in a similar manner as in the first and second embodiments. Via such communication, plain texts PT and tag files TF are stored in the database 3a of the server 3.

When the document provider 4 stores a plain text PT in the database 3a, an authoring permission/prohibition ID (IDa) may be stored together with the plain text PT.

Although the communication method is not described, data communication between the document processing apparatus 1 and the service providing unit 7 and data communication with the authoring apparatus 2 and the document provider 4 which are not shown in FIG. 56 may be performed via the communication line 6 or the storage medium 32.

14. Operation of the Document Processing System (Inverse Retrieving Process Performed In Response to a Request from the Document Processing Apparatus (#1))

A first example (#1) of the inverse retrieval process performed in response to a request issued by the document processing apparatus in the document processing system according to the third embodiment is described below. In this first example of the inverse retrieval process, the authoring by the authoring apparatus 2 is not performed, and thus the system operation is basically performed cooperatively by the document processing apparatus 1 and the service providing unit 7.

The operation in which the authoring by the authoring apparatus 2 is required will be described later in the second example (#2) of the inverse retrieval process.

As is described above with reference to the systems according to the first and second embodiments, the database 3a of the server 3 includes various plain texts PT and tag files TF stored therein. In the present embodiment, the user of the document processing apparatus 1 specify a particular document data or category and requests retrieval of tag files TF related to the specified document data or category from the database 3a. The tag files TF extracted via the retrieval are supplied to the user.

The providing of the tag files TF requested by the user to the document processing apparatus 1 allows the user to acquire new tag files TF related to the specified document data or category and perform various kinds of processing upon the acquired tag files TF, such as categorization, reading, generation/displaying of a summary, and reading aloud.

FIG. 56 schematically illustrates various kinds of data, which are transmitted, to achieve the above-described capability of inverse retrieval, among the respective parts of the document processing system.

The user of the document processing apparatus 1 specifies a particular category or document data for use in the inverse retrieval and issues an inverse retrieval execution command.

In response, the document processing apparatus 1 transmits to the service providing unit 7 a database retrieval request command Isc and characteristic data SD for use in the inverse retrieval. In this case, the ID (IDct) of the specified category or the electronic document ID (IDtxt) of the specified document data is also transmitted.

Herein, the characteristic data SD refers to information indicating the characteristics of the specified category or document data. A specific example of the characteristic data SD is the index described earlier with reference to FIGS. 6 and 12.

If the service providing unit 7 receives a database retrieval request command Isc from the document processing apparatus 1, the service providing unit 7 searches the database 3a in accordance with the characteristic data SD. In this first example of the inverse retrieval process, only tag files TF are retrieved from the database 3a and plain texts PT are not retrieved.

If one or more tag files TF which match the characteristic data SD are founded, the service providing unit 7 produces a list Lst representing the result of the retrieval and transmits it to the document processing apparatus 1.

The list Lst may include only file names (and electronic document IDs (IDtxt)) corresponding to the extracted tag files or may further include information such as short summaries of documents, part of documents, or relevance values with respect to the characteristic data SD.

In the case where no tag files TF are found in the retrieving process, the service providing unit 7 transmits an error notification Ie to the document processing apparatus 1. In this case, in the document processing apparatus 1, the inverse retrieving process is error-terminated.

If the document processing apparatus 1 receives the list Lst, the document processing apparatus 1 presents it as a retrieval result list to the user so that the user can make a selection.

If the user selects a certain tag file TF from the list Lst, the document processing apparatus 1 transmits document selection information Sel indicating the tag file selected by the user to the service providing unit 7.

When the user has determined that the retrieval result list does not include a desired tag file TF, the user performs a canceling operation. In this case, the document providing apparatus 1 transmits a cancellation notification Cl to the service providing unit 7.

If the service providing unit 7 receives the document selection information Sel, the service providing unit 7 reads one or more tag files TF (and associated electronic document IDs (IDtxt)) specified by the document selection information Sel from the database 3a and transmits the tag files TF to the document processing apparatus 1. In this case, the ID (IDct) of the category or the electronic document ID according to which the inverse retrieval was performed is also transmitted.

If the cancellation notification Cl is received, the service providing unit 7 terminates the inverse retrieving process.

Via the above-described communication between the document processing apparatus 1 and the service providing unit 7, the document processing apparatus 1 acquires a list of tag files TF related to a certain electronic document or a certain category, as a result of the inverse retrieval. Furthermore, a particular tag file TF selected by the user from the list is provided to the document processing apparatus 1.

Figure 57:
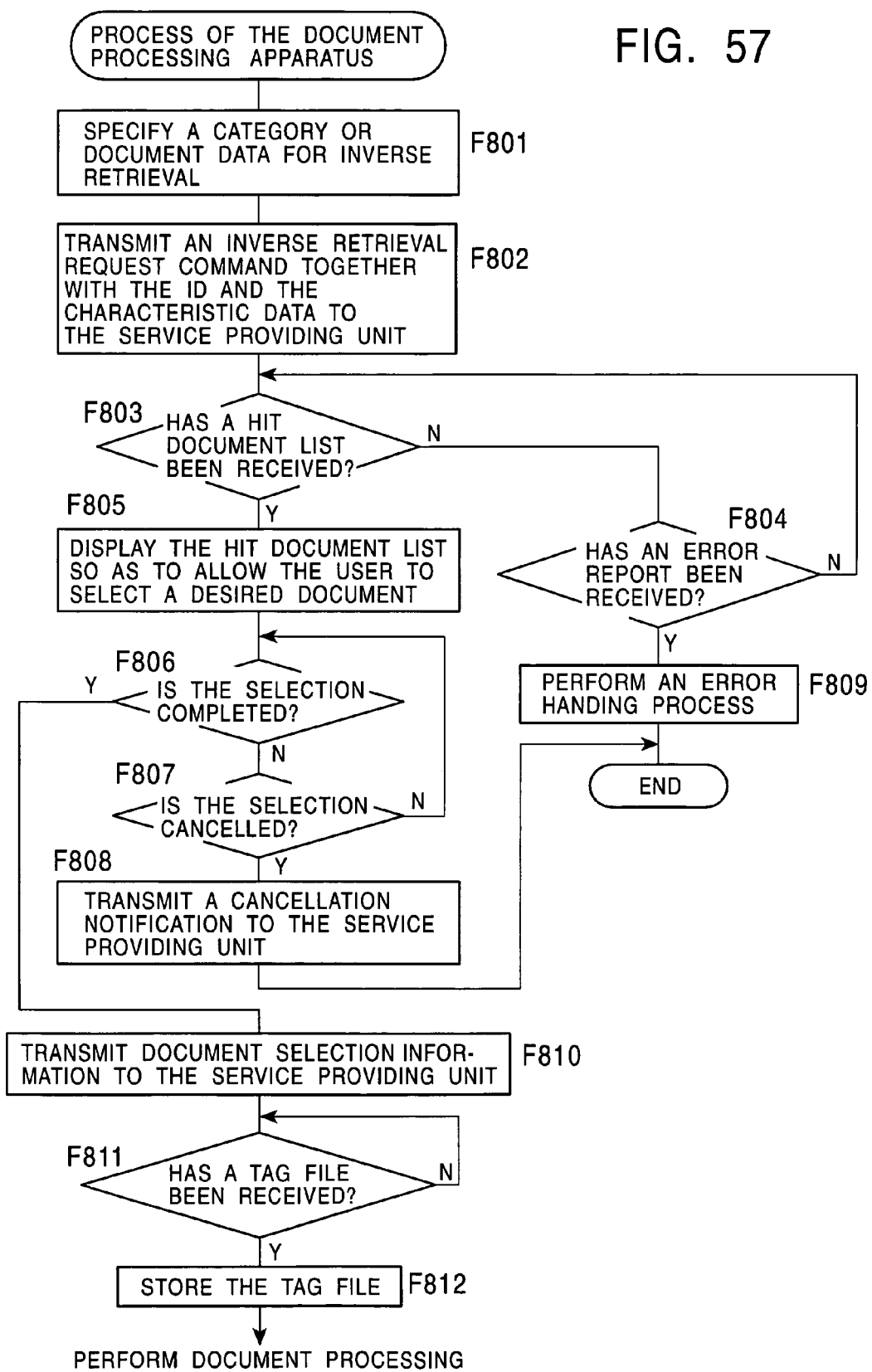
FIG. 57 is a flow chart illustrating the process performed by the document processing apparatus during the inverse retrieval, according to the embodiment of the present invention.
Figure 58:
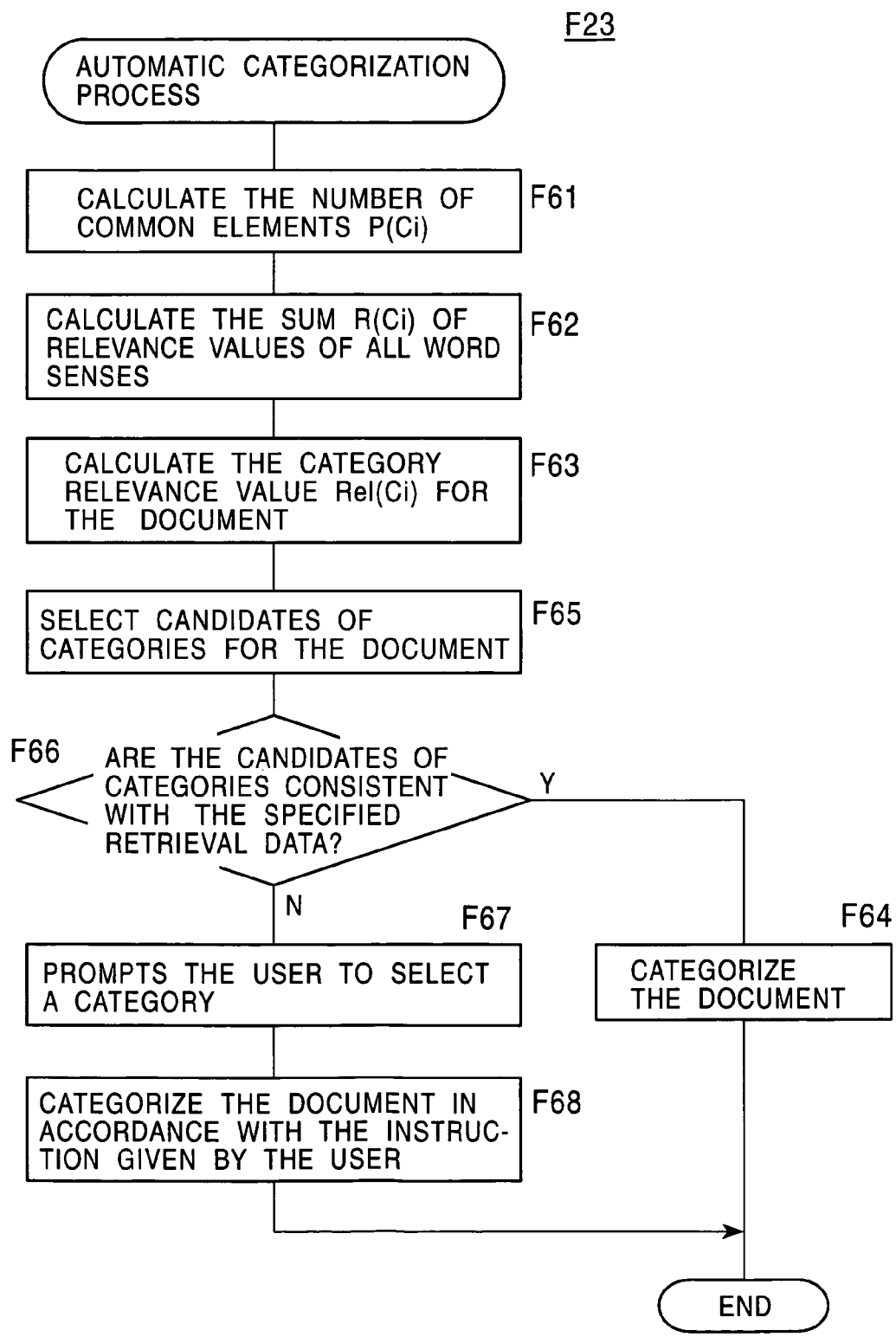
FIG. 58 is a flow chart illustrating an automatic categorization step during the inverse retrieval process, according to the embodiment of the invention.
Figure 59:
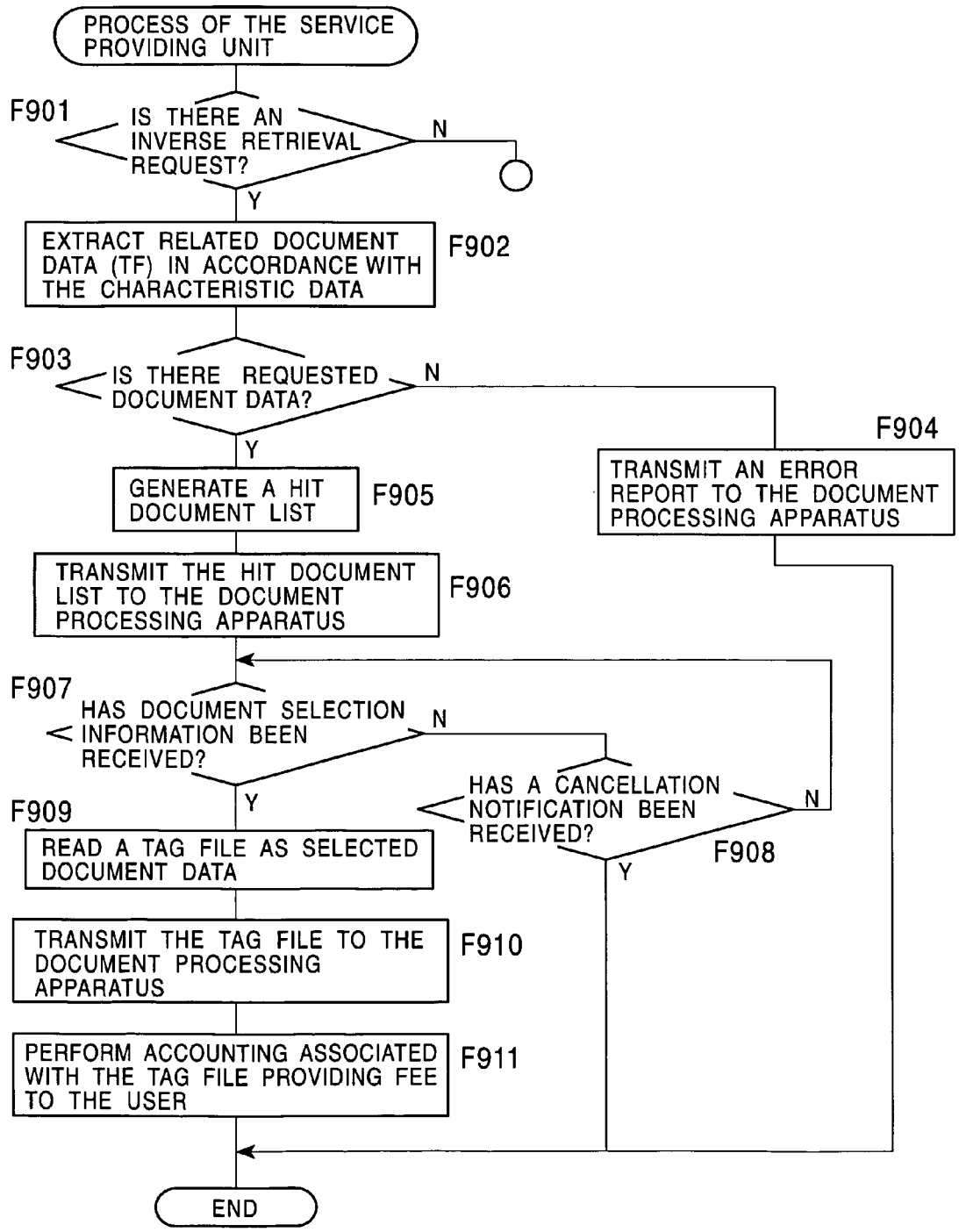
FIG. 59 is a flow chart illustrating the process performed by the service providing unit during the inverse retrieval, according to the embodiment of the present invention.

FIG. 57 illustrates the process associated with the document processing apparatus 1 in the inverse retrieval, and FIG. 59 illustrates the process associated with the service providing unit 7. FIG. 58 illustrates the categorization process performed by the document processing apparatus 1 upon the tag files TF obtained via the inverse retrieval. This categorization process will be described later in detail.

Figure 60:
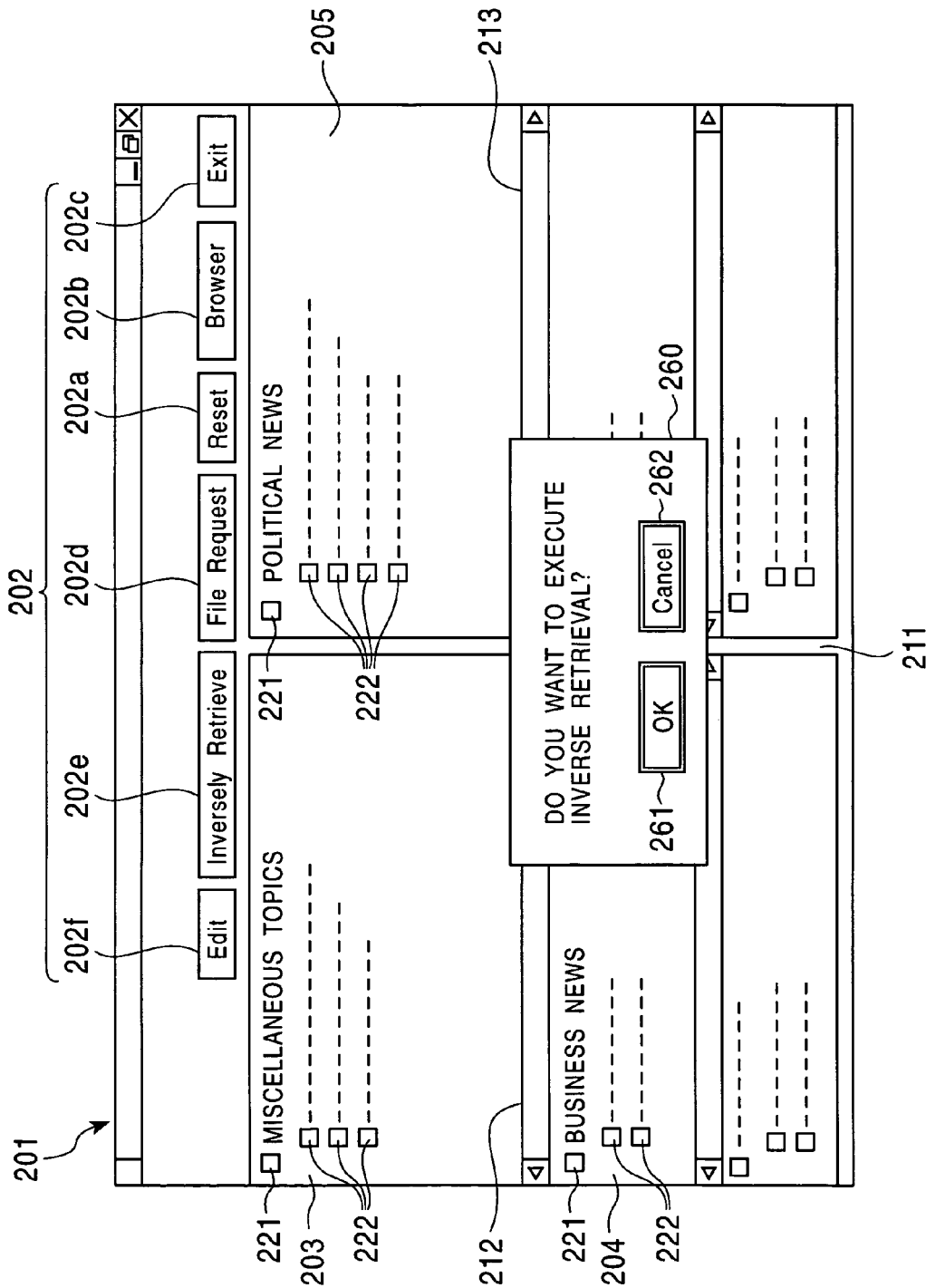
FIG. 60 is a schematic diagram illustrating an execution confirming window displayed in the inverse retrieval process, according to the embodiment of the invention.
Figure 61:
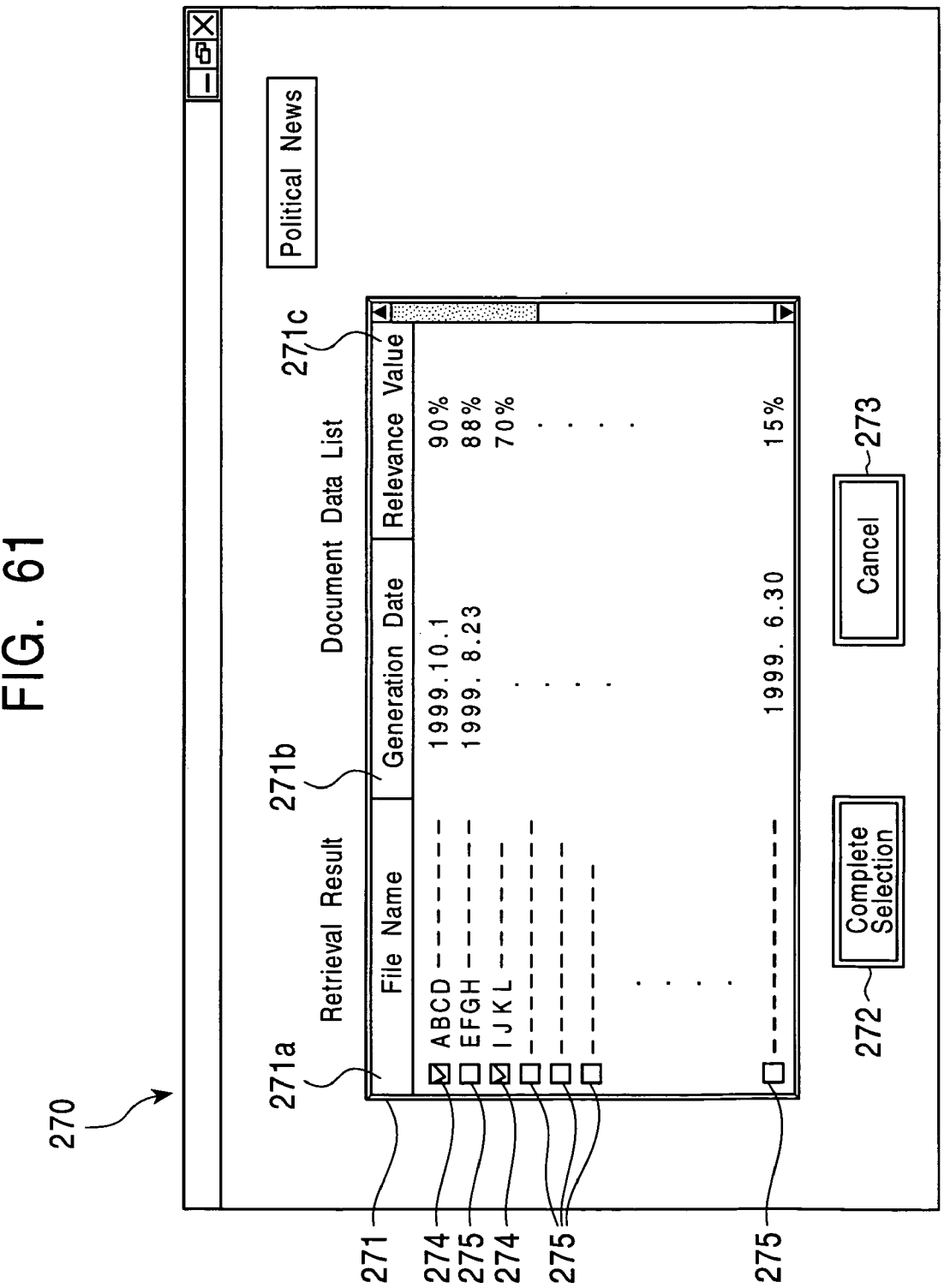
FIG. 61 is a schematic diagram illustrating a list window according to the embodiment of the invention.

FIGS. 60 and 61 illustrate examples of screens which are displayed on the display 30 of the document processing apparatus 1 in the inverse retrieval.

When the user wants to request the service providing unit 7 to provide tag files TF via the inverse retrieval, the user first specifies, via the document processing apparatus 1, a category or document data according to which the inverse retrieval is to be performed.

This is performed in step F801 shown in FIG. 57 under the control of the controller 11 of the document processing apparatus 1.

A specific example of the process is as follows.

When the categorization window 201 shown in FIG. 10 is opened on the display 30 of the document processing apparatus 1, the user can view categories and document data categorized in various categories.

Using the categorization window 201, the user can r3F easily specify a desired category or document data.

In the example shown in FIG. 10, "Business News" and "Political News" are displayed as categories. Furthermore, category check boxes 221 are displayed for the respective categories. Similarly, document data check boxes 222 are displayed for the respective document data.

If the user clicks a particular category check box 221, the corresponding category is specified.

Similarly, if the user clicks a particular category check box 222, the corresponding document data is selected.

After selecting a desired category or document data, the user clicks the inversely retrieve button 202*e*.

In response, the controller 11 displays an inverse retrieval confirmation window 260 on the display 30 as shown in FIG. 60.

In this specific example, the user checks a category checking box 221 to specify the "political new" as the category. When a check mark 220 is displayed as shown in FIG. 60, the user clicks the inversely retrieve button 202*e*.

If the user clicks the OK button 261 in the execution confirming window 260 as shown in FIG. 60, the controller 11 advances the process from step F801 to F802 in FIG. 57. On the other hand, if the cancel button 262 is clicked, the process is cancelled, and the window status returns, for b example to the categorization window 201 shown in FIG. 10.

If the process goes to step F802 in response to the clicking of the OK button 261, the controller 11 transmits a database retrieval request command Isc to the service providing unit 7 together with the characteristic data SD associated with the specified category or document data. Herein, the characteristic data SD refers to one or more elements of the index defined for the specified category or document data (FIGS. 6 and 12).

Furthermore, the ID (IDct) identifying the specified category or the electronic document ID (IDtxt) of the specified document data is also transmitted together with the above data.

After that, the controller 11 waits for arrival of a result from the service providing unit 7, in step F803 or F804. More specifically, the controller 11 waits for arrival of a list Lst or an error notification Ie.

If the service providing unit 7 receives the inverse retrieval request from the document processing unit 1, the process goes from step F901 to F902 in FIG. 59 the database 3*a* is searched in accordance with the characteristic data SD. In this specific example, tag files TF are searched for. That is, tag files TF related to the category or the document data specified by the user are searched for in accordance with the characteristic data SD.

More specifically, because the retrieval is performed on the basis of the index serving as the characteristic data SD, the "related tag files" are documents of the same theme, ° F. similar documents, documents in the same field, other documents of a series of documents in which the document specified by the user is included, or documents in the same category.

If one or more tag files TF which match the characteristic data SD are obtained as a result of the retrieval, the service providing unit 7 advances the process from step F903 to F905 and produces a list Lst of the one or more tag files TF.

The produced list Lst can include various kinds of contents. For example, the list Lst may include only the file names (and the electronic document IDs (IDtxt) of the extracted tag files or may further include, in addition to the file names, short summaries or parts of the documents, the degree of relevance with respect to the characteristic data SD, the dates when the documents were produced (the dates when the documents were stored in the database 3*a*). The degree of relevance may be calculated on the basis of the word sense relevance values described earlier with reference to FIGS. 15 and 16, or may be calculated from the frequency of occurrence of one or more elements of the index employed as keywords in the retrieval, in the extracted tag files.

In step F906 after producing the list Lst, the service providing unit 7 transmits the produced list Lst to the document processing apparatus 1.

The service providing unit 7 may sort the list Lst of extracted tag files TF with respect to the file names or the degrees of relevance.

In the case where a very large number of tag files TF are extracted, the list Lst to be transmitted to the document processing apparatus 1 may be produced so as to include only a partial set of the extracted tag files TF such as those having high degrees of relevance.

The number of tag files included in the list Lst may be specified by the user. For example, when the inverse retrieval request is issued, the document processing apparatus 1 may transmit information specifying the number of files to be included in the list. The service providing unit 7 may produce the list Lst in accordance with the it.

After transmitting the list Lst to the document processing apparatus 1, the service providing unit 7 waits, in step F907 or 908, for arrival of the document selection information Sel or the cancellation notification Cl transmitted from the document processing apparatus 1.

In the case where no tag file TF is obtained as a result of the retrieval in step F902, the service providing unit 7 advances the process from step F903 to F904 and transmits an error notification Ie to the document processing apparatus 1. After that the process is terminated.

If the document processing apparatus 1 receives the error notification Ie, the controller 11 advances the process from step F804 to F809 in FIG. 57 and performs error handling. In the error handling process, for example, a message is displayed to notify the user that the database 3*a* includes no tag file which matches the given inverse retrieving conditions.

When the document processing apparatus 1 receives the list Lst from the service providing unit 7, the controller 11 advances the process from step F803 to F805 in FIG. 57 and displays a list window 270 on the display 30 as shown in FIG. 61 to present the list Lst to the user. After that, the controller 11 waits in steps F806 or 807 until the user has made a selection or has cancelled the process.

In the example shown in FIG. 61, the list data Lst includes at least the file names (and the electronic document IDs (IDtxt)), the dates when the documents were produced, and the degrees of relevance of the extracted tag files TF, and thus the list displayed in the list displaying box 271 includes a file name displaying part 272*a*, a document production data displaying part-271*b*, and a relevance degree displaying part 271*c*, in which information of the extracted tag files is displayed.

In the case where the list data Lst has been sorted in order of decreasing degree of relevance, information of tag files TF is displayed in order of decreasing degree of relevance as shown in FIG. 61.

Instead of arranging, in the service providing unit-7, the list Lst such that only n tag files TF having the highest relevance degrees are included in the list Lst or such that the list is sorted, the user of the document processing apparatus 1 may performing sorting or extraction in a desired fashion.

More specifically, the service providing unit 7 transmits a list Lst including all tag files TF extracted via the retrieval to the document processing apparatus 1, and the document processing apparatus 1 performs sorting in accordance with an instruction given by the user via the list window 270. In the specific example shown in FIG. 61, sorting may be performed by the file names, the dates when the documents were produced, or the degrees of relevance in accordance with the instruction given by the user. Furthermore, the tag files displayed may be limited to a particular range with respect to the dates when the tag files were produced or with respect to the degrees of relevance specified by the user.

When the list is displayed as shown in FIG. 61, the user may select a desired tag file from the list.

In the case where check boxes 275 are provided for the respective tag files as shown in FIG. 61, the user may click the check box 275 of a desired tag file TF. As a result, a check mark 274 is displayed.

After clicking one or more tag files TF so that the clicked tag files TF have check marks 274, if the complete selection button 272 is clicked, the selection operation is completed.

When the user has determined that the list includes no desired tag file, the user clicks the cancel button 273.

If the selection operation is cancelled, the controller 11 advances the process from step F807 to F808 and transmits a cancellation notification Cl to the service providing unit 7. In this case, the controller 11 terminates the inverse retrieval process.

If the service providing unit 7 receives the cancellation notification Cl in step F908 in FIG. 59, the service providing unit 7 terminates the process.

In the case where the complete selection button 272 in the list window 270 is clicked, the controller 11 advances the process from step F806 to F810 and transmits document selection information Sel to the service providing unit 7.

The document selection information Sel includes the electronic document IDs (IDtxt) of the tag files TF checked in the list window 270.

After transmitting the document selection information Sel, the controller 11 waits in step F811 until the tag files TF have been received.

If the service providing unit 7 receives the document selection information Sel, the service providing unit 7 advances the process from step F907 to F909 and reads from the database 3*a* one or more tag files TF corresponding to the electronic document IDs (IDtxt) included in the document selection information Sel. In step F910, the file TF (and the associated electronic document ID (IDtxt)) is transmitted to the document processing apparatus 1. Herein, the ID (IDct) identifying the specified category or the electronic document ID (IDtxt) of the specified document data is also transmitted together with the above data.

If the document processing apparatus receives the tag files TF, the controller 11 advances the process from step F811 to F812 n FIG. 57 and stores the received tag files TF in the RAM 14 or the HDD 34.

Thus, tag files TF requested via the inverse retrieval have been obtained.

Subsequently, the document processing apparatus 1 categorizes the acquired tag files TF according to the categorization model as will be described later with reference to FIG. 58. As a result of the categorization according to the categorization model, the titles of the tag files are displayed in the categorization window 201 so that the user can perform various kinds of document processing such as reading, generation and displaying of a summary, and reading aloud.

In the service providing unit 7, in step F911 after the transmission in step F910, accounting with respect to the electronic document providing fee to the user of the document processing apparatus 1 is performed.

Thus, the whole processing sequence is completed.

When the inverse retrieval request is issued by the document processing apparatus 1, if the processes shown in FIGS. 57 and 59 have been performed by the document processing apparatus 1 and the service providing unit 7 as described above, the tag files TF requested by the user have been acquired in the document processing apparatus 1, or the processes are terminated by an error or cancellation.

Thus, the system constructed according to the present embodiment allows the user to easily acquire tag files TF related to certain document data or category. That is, the system can provide quickly provide a wide variety of document information requested by the user.

Furthermore, when the service providing unit 7 has provided a tag file to the user, the accounting process associated with the document providing fee to the user is performed. This makes it possible to correctly charge the fee for the document providing service. This contributes to the establishment, development, and widespread use of the system.

15. Categorization after Inverse Retrieval

After the inverse retrieval process, the document processing apparatus 1 first performs categorization of acquired tag files TF according to the categorization model.

The categorization is performed automatically according to the procedure described earlier with reference to FIG. 13.

However, in this case, the automatic categorization process performed for the tag files TF obtained via the inverse retrieval has some difference from that described earlier, because the obtained tag files TF have relevance to the particular category or the document data which has been already categorized in a particular category.

That is, although the reception/storage operation in step F21 and the indexing operation in step F22 shown in FIG. 13 are performed in the same manner as those described earlier, the automatic categorization in step F23 is performed not as shown in FIG. 14 but as shown in FIG. 58.

In FIG. 58, similar steps to those in FIG. 14 are denoted by similar step numbers, and they are not described in further detail here.

The process shown in FIG. 58 is different from the that shown in FIG. 14 in that the controller 11 performs steps F65 to F68 after step F63.

In the process shown in FIG. 14, as described earlier, the category of a tag file TF is selected via the process from steps F61 to F63. However, in the process shown in FIG. 58, the category selected via the process from steps F61 to F63 is not immediately employed.

That is, in accordance with the document category relevance value obtained in step F63, the controller 11 presents, in step F65, a candidate for the category into which the tag file TF acquired via the inverse retrieval is to be categorized.

Subsequently, in step F66, the controller 11 determines whether the candidate for the category presented in sep F65 is the same as the category used in the inverse retrieval.

Herein, the term "category used in the inverse retrieval" is used in the following sense. In the case where a category is specified by the user in the inverse retrieval process, the "category used in the inverse retrieval" is the category specified by the user. On the other hand, in the case where certain document data is specified by the user in the inverse retrieval process, the "category used in the inverse retrieval" is the category to which that document data belongs.

As described above, when a tag file TF is received as a result of the inverse retrieval, the category ID (IDct) indicating the category specified by the user at the start of the inverse retrieval process or the electronic document ID (IDtxt) of the document data specified by the user at the start of the inverse retrieval process is also received together with the tag file TF.

Therefore, in step F66, it is determined whether the category ID (IDct) of the category selected as the candidate in step F65 is the same as the category ID (IDct) received together with the tag file TF or it is determined whether the category ID (IDct) of the category selected as the candidate in step F65 is the same as the category ID (IDct) of the category to which the electronic document ID (IDtxt) received together with the tag file TF belong.

If both categories are the same, the process goes to step F64 in which the tag file TF acquired via the inverse retrieval is categorized into the category presented as the candidate.

However, when the categories are different from each other, if the tag file TF acquired via the inverse retrieval is categorized into the category presented as the candidate, the user will be confused.

For example, when "political news" is specified as the category by the user in the inverse retrieval process, if the obtained tag file TF is categorized into "business news" by the automatic categorization process, it becomes difficult (or impossible) for the user to find the acquired tag file TF in the categorization window 201.

To avoid the above problem, when the category of the acquired tag file TF presented as the candidate in step F63 is different from the category used in the inverse retrieval, the controller 11 advances the process to step F67 and displays the candidate for the category on the display 30 so that the user can replace the candidate with an arbitrary another category and so that the user designates the category.

If the user designates the category of the tag file TF, the controller 11 advances the process to step F68 and categorized the tag file TF into the category designated by the user.

After completion of the categorization in step F64 or F68 shown in FIG. 58, that is, after completion of step F23 in FIG. 13, the categorization model (refer to FIG. 12) is updated in the following step F24 in FIG. 24. That is, in step F24, the categorization model is updated such that the categorization in step F64 or F68 is reflected. In the next step F25, the updated categorization model is stored, for example, in the RAM 14.

Thus, the tag file TF acquired via the inverse retrieval is categorized in the correct category, and the user will not be confused.

16. Operation of the Document Processing System (Inverse Retrieving Process Performed In Response to a Request from the Document Processing Apparatus (#2))

A second example of the inverse retrieval process is now described. In this second example, the operation is basically performed cooperatively by the document processing apparatus 1 and the service providing unit 7. However, the operation of the authoring apparatus 2 is also necessary depending upon the situation, and thus the operation of the authoring apparatus 2 is also described.

In this second example, the system configuration and transmitted information are similar to those described above with reference to FIGS. 56 and 48. That is, the document processing apparatus 1 and the service providing unit 7 communicate with each other as shown in FIG. 56. When the authoring process is also performed, the service providing unit 7 and the authoring apparatus 2 communicate with each other as shown in FIG. 48.

The authoring process by the authoring apparatus 2 is performed when a plain text PT is extracted from the database 3a as a result of the inverse retrieval and when the user requests transmission of that plain text PT.

That is, in this second example of the inverse retrieval, the service providing unit 7 retrieves not only tag files TF from the database 3a but also plain texts PT having no corresponding tag files TF. That is, document data stored in the form shown in FIG. 49A is also retrieved.

Figure 62:
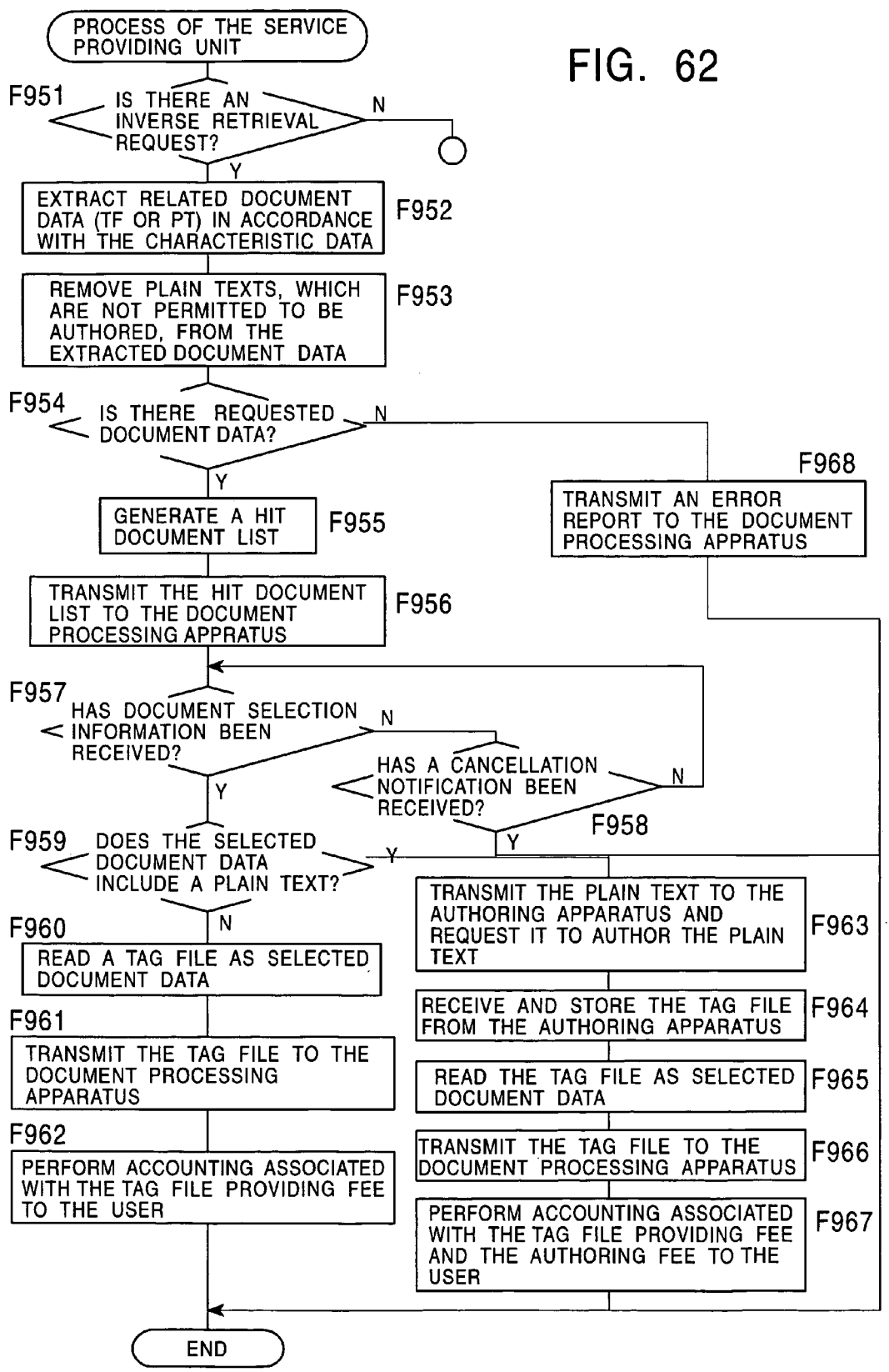
FIG. 62 is a flow chart illustrating the process performed by the service providing unit during the inverse retrieval, according to the embodiment of the present invention.

FIG. 62 illustrates the process associated with the service providing unit 7 in the second example of the inverse retrieval. The process associated with the document processing apparatus 1 is similar to that described above with reference to FIG. 57 and FIG. 58, and thus it is not described herein.

As in the first example of the inverse retrieval described above, when the user wants to request the service providing unit 7 to provide tag files TF via the inverse retrieval, the user designates, via the document processing apparatus 1, the category or the document data according to which the inverse retrieval is to be performed.

In response, the document processing apparatus 1 transmits to the service providing unit 7 a database retrieval request command Isc, characteristic data SD of the specified category or document data, and the category ID (IDct) of the specified category or the electronic document ID (IDtxt) of the specified document data.

If the service providing unit 7 receives the inverse retrieval request together with the above-described data from the document processing apparatus 1, the service providing unit 7 advances the process from step F951 to F952 in FIG. 62 and searches the database 3a in accordance with the characteristic data SD. In the present example, as described earlier, both tag files TF and plain texts PT are retrieved.

That is, tag files TF and plain texts PT related to the category or the document data specified by the user are retrieved in accordance with the characteristic data SD.

If one or more tag files TF or plain texts PT which match the characteristic data SD are obtained as a result of the retrieval, the service providing unit 7 advances the process to step F953 and removes plain texts which are not permitted to be authored from the extracted plain texts. That is, when one or more plain texts PT are included in the document data extracted via the retrieval, the authoring permission/prohibition ID (IDa) of the respective plain texts PT are checked.

If one or more document data (tag files TF or plain texts PT) are extracted as a result of the retrieval process in step F952 and the removal process in step F953, the service providing unit 7 advances the process from step F954 to F955 and produces a list Lst of the one or more document data.

Herein, it is desirable that the list Lst include, in addition to the above-described data, information indicating whether the respective document data are tag files TF or plain texts PT which need the authoring process.

In step F956 after producing the list Lst, the service providing unit 7 transmits the produced list Lst to the document processing apparatus 1.

Subsequently, in steps F957 or F958, the service providing unit 7 waits for arrival of document selection information Sel or a cancellation notification Cl from the document processing apparatus 1.

In the case where no document data is extracted as a result of the retrieval process in step F952 and the removal process in step F953, the service providing unit 7 advances the process from F954 to F968 and transmits an error notification Ie to the document processing apparatus 1. After that, the process is terminated.

As described above with reference to FIG. 57, if the document processing apparatus 1 receives the error notification Ie, the document processing apparatus 1 performs the error handling and terminates the process.

If the document processing apparatus 1 receives the list Lst from the service providing unit 7, the document processing apparatus 1 displays the list window 270 on the display 30 to prompt the user to compete or cancel the selection.

Depending upon the operation performed by the user, the document processing apparatus 1 transmits to the service providing unit 7 a cancellation notification Cl or document selection in formation Sel.

If the cancellation notification Cl is received, the service providing unit 7 terminates the process after step F958 in FIG. 62.

If the service providing unit 7 receives the document selection information Sel, the service providing unit 7 advances the process from F957 to F959 and checks whether a plain text PT is included in the document data specified by the document selection information Sel.

If no plain text PT is included, then, in step F960, one or more tag files TF specified by the document selection information Sel are read from the database 3a. In the next step F961, the tag file TF read in step F960, the associated electronic document ID (IDtxt), and the ID (IDct) of the category or the electronic document ID (IDtxt) of the document data which has been first specified are transmitted to the document processing apparatus 1.

As described earlier with reference to FIG. 57, when the document processing apparatus 1 receives the tag file TF, the document processing apparatus 1 stores the received tag file TF into the RAM 14 or th HDD 34 and performs the categorization as described above with reference to FIG. 58.

In the service providing unit 7, in step F962 after the transmission in step F961, accounting with respect to the electronic document providing fee to the user of the document processing apparatus 1 is performed.

If it is determined in step F959 that the database 3a includes the plain text PT as the document data specified by the document selection information Sel, the service providing unit 7 advances the process to step F963 and reads the plain text PT and the associated electronic document ID (IDtxt) from the database 3a. The service providing unit 7 then transmits them to the authoring apparatus 2 to request the authoring thereof.

If the authoring apparatus 2 receives the authoring request from the service providing unit 7, the controller 72 of the authoring apparatus 2 performs the process described earlier with reference to FIG. 52.

That is, in steps F701 to 705 shown in FIG. 52, a tag file TF is produced by performing the authoring process shown in FIG. 28 upon the received plain text PT. The produced tag file TF (and the associated electronic document ID (IDtxt)) is then transmitted to the service providing unit 7, and accounting associated with the authoring fee to the service providing unit 7 is performed.

In step F964, the service providing unit 7 receives the tag file TF and the associated electronic document ID (IDtxt) from the authoring apparatus 2 and stores it in the database 3a. That is, the tag file IT is stored in the database 3a in such a manner that it is linked with the corresponding plain text PT which is already present in the database 3a.

The service providing unit 7 advances the process to step F965 and reads, from the database 3a, one or more tag files TF specified by the document selection information Sel received from the document processing apparatus 1. That is, in this specific case, the tag file TF of the plain text PT specified by the document selection information Sel is included in the database 3a.

In step F966, the tag file TF read in step F965, the associated electronic document ID (IDtxt), and the ID (IDct) of the category or the electronic document ID (IDtxt) of the document data which has been first specified are transmitted to the document processing apparatus 1.

If the document processing apparatus 1 receives the tag file TF, the document processing apparatus 1 stores the received tag file TF into the RAM 14 or the HDD 34 and performs the categorization described earlier with reference to FIG. 58.

In the service providing unit 7, in step F967 after the transmission in step F966, accounting to the user of the document processing apparatus 1 is performed. In this case, the electronic document providing fee for all tag files TF and the authoring fee for those tag files TF produced from the plain texts PT are charged.

As described above, the second example of the inverse retrieval is achieved via the cooperative operations of the document processing apparatus 1 and the service providing unit 7, and also of the authoring apparatus 2 when authoring is necessary.

This allows the user to easily acquire a wide range of tag files TF related to particular document data or category.

As in the second embodiment described earlier, when the service providing unit 7 requests the authoring apparatus 2 to perform authoring, the service providing unit 7 cannot always acquire the tag file TF immediately after issuing the authoring request.

Therefore, in practice, after issuing the authoring request in step F963, the service providing unit 7 notifies the user of the document processing apparatus 1 that the authoring request has been issued, and suspends the communication and the process. When the tag file TF has been received from the authoring apparatus 2, the service providing unit 7 restarts the process and transmits the received tag file TF to the document processing apparatus 1.

In the first and second examples of inverse retrieval process, list information Lst representing the result of searching the database 3a is first presented to the user, and the user selects desired document data from the list. Alternatively, all tag files extracted via the retrieval may be directly transmitted to the document processing apparatus 1 without transmitting the list.

It is possible to easily provide the storage medium 32 such as a disk-shaped storage medium, tape-shaped storage medium, a memory card, or a memory chip, on which the program for executing the process of the service providing unit 7 described above with reference to FIG. 59 or 62 is stored.

Using such a storage medium, it is possible to supply a program for implementing the above-described inverse retrieval. This makes it possible to realize the service providing unit 7 on a general-purpose computer or the like.

The program implementing the inverse retrieval according to the present embodiment may also be supplied via a communication network such as the Internet. That is, the present invention may also be applied to a storage medium used in a program server or used in a communication process.

Although the present invention has been described above with reference to the specific embodiments, the invention is not limited to the embodiments described above. The document processing system and various parts thereof may be configured in various manners.

Furthermore, the respective parts of the document processing apparatus 1 and the authoring apparatus 2, such as the main unit 10 or 71, the display 30 or 79, the input device 20 or 78, the communication device 21 or 77, the write/read unit 31 or 80, and the HD 34 or 82, may also be configured in various manners, and they may be connected to one another in various manners. For example, as for the input devices 20 and 78, not only the keyboard and the mouse, but also other devices such as a tablet, a light pen, and a wireless command inputting device using a infrared ray may be employed.

Furthermore, the document processing apparatus 1 and the authoring apparatus 2 may include a plural number of similar devices such as write/read units. The document processing apparatus 1 and the authoring apparatus 2 may further include other types of devices such as a printer.

The document processing apparatus 1 and the authoring apparatus 2 may be realized in the form of a dedicated apparatus or may be implemented on a general-purpose information processing apparatus such as a desk-top personal computer, a portable personal computer, and a workstation.

In the embodiment described above, some examples of manners of tagging a document have been described. However, the present invention is not limited to such examples.

In the embodiments described above, a document written in Japanese and a document written in English have been taken as examples. However, the present invention is not limited to those languages.

Furthermore, in the present invention, document data may include attached video data such as a moving image or a still image.

Although in the embodiments described above, the authoring and the providing of document data are charged by a particular part to another part, authoring and document data may be provided without being charged.

That is, various modifications and changes are possible without departing from the scope and spirit of the present invention.

As can be understood from the above description, the present invention has great advantages as described below.

That is, the present invention provides the system having the inverse retrieving capability which allows the user of the terminal device to easily obtain an electronic document related to a particular category or particular document data simply by specifying the category or the document data. This allows the user to easily obtain a wide variety of desired document information.

An advantage from the viewpoint of the document providing device is that the capability of retrieving an electronic document in accordance with the conditions specified by the user makes it possible to efficiently provide the electronic document.

Furthermore, the identifier of an electronic document or a category together with characteristic information indicating the characteristics of the electronic document of the category is transmitted from the terminal device to the document providing device, and the above identifier is returned together with the electronic document obtained as a result of the retrieval, thereby allowing the electronic document to be easily categorized.

The document providing device can quickly provide an electronic document desired by the user by transmitting an electronic document itself extracted by retrieval, as information associated with the retrieved electronic document, to the terminal device. via the communication means.

Furthermore, a list of electronic documents extracted via the retrieval is transmitted from the document providing device to the terminal device, and the user at the terminal device specifies a particular electronic document from the list. In response, the document providing device transmits the specified electronic document to the terminal device. This makes it possible to provide an electronic document which is really needed by the user. Thus, the system according to the present invention is very convenient for the user, and the efficiency of the operation of providing electronic documents is improved.

In particular, when a very large number of electronic documents are extracted via the retrieval, the use of the list information is very advantageous.

If list information is produced such that all electronic document retrieved from the database is included in the list information, the user can make a selection from a wide range of candidates.

Conversely, if list information is produced such that a partial set of retrieved electronic documents is included in the list information, it becomes easy for the user to make a selection.

The list information including the full or partial set of retrieved electronic documents may be sorted so that the user can make a selection easily.

When an electronic document is received from the document providing device, the category of the electronic document is determined in accordance with the characteristic thereof. If the determined category is the same as the category specified in the inverse retrieval or as the category of the specified electronic document, the category is finally employed as the category of the received electronic document. This allows the electronic document to be automatically categorized.

On the other hand, if the category determined is different from the category specified in the inverse retrieval request or from the category to which the specified electronic document belongs, the electronic document is categorized into a category in accordance with an instruction given by a user.

When the document providing device transmits the electronic document to the terminal device, the document providing device performs an accounting process associated with the fee to the terminal device. This makes it possible to correctly charge the fee for the document providing service to the user. This contributes the establishment, development, and widespread use of the system.

What is claimed is:

1. A terminal device comprising:
   categorizing means for categorizing electronic documents, wherein each electronic document is categorized into one of a plurality of categories according to a characteristic of said each electronic document;
   communication means for communicating with a document providing device;
   specification information input means for specifying one of the electronic documents categorized in one of said categories or specifying one of said categories; and
   control means for controlling said communication means so as to transmit, to said document providing device, the electronic document specified by said specification information input means or characteristic information indicating the characteristic of the category specified by said specification information input means.

2. A terminal device according to claim 1, wherein said control means transmits an electronic document specified by said specification information input means or characteristic information indicating the characteristic of a category specified by said specification information input means together with an identifier of the specified electronic document or category to said document providing device via said communication means.

3. A terminal device according to claim 1, further comprising electronic document specifying means for, when a list of electronic documents retrieved in accordance with said characteristic information is received from said document providing device via said communication means, inputting electronic document specifying information to specify a particular electronic document of those included in said list,
  wherein said control means transmits the electronic document specifying information input via said electronic document specifying means to said document providing device via said communication means.

4. A terminal device according to claim 1, wherein said categorizing means temporarily determines a category in which the electronic document received from said document providing device is to be categorized in accordance with the characteristic of said electronic document,
  if said category determined is the same as the category specified by said specification information input means or as the category to which the specified electronic document belongs, said categorizing means categorizes said electronic document received from said document providing device into said category, and
  if said category determined is different from the category specified by said specification information input means or from the category to which the specified electronic document belongs, said categorizing means categorizes said electronic document received from said document providing device into a category in accordance with an instruction given by a user.

5. A terminal device according to claim 1, wherein when said categorizing means categories the electronic document received from said document providing device into a category, said categorizing means updates category information.

6. A document processing system comprising a terminal device and a document providing device,
  said terminal device comprising:
    categorizing means for categorizing electronic documents, wherein each electronic document is categorized into one of a plurality of categories according to a characteristic of said each electronic document;
    communication means for communicating with said document providing device;
    specification information input means for specifying one of the electronic documents categorized in one of said categories or specifying one of said categories; and
    control means for controlling said communication means so as to transmit, to said document providing device, the electronic document specified by said specification information input means or characteristic information indicating the characteristic of the category specified by said specification information input means,
  said document providing device comprising:
    a database for storing a plurality of electronic documents;
    retrieval means for retrieving a desired electronic document from the electronic documents stored in said database;
    communication means for communicating with said terminal device; and
    control means for controlling said communication means and said retrieval means such that when said communication means receives said characteristic information, said retrieval means retrieves the electronic document related to said characteristic information from the electronic documents stored in said database, and said communication means transmits information associated with the retrieved electronic document to said terminal device.

7. A document processing system accord to claim 6, wherein said control means of said terminal device transmits the electronic document specified by said specification information input means or characteristic information indicating the characteristic of a category specified by said specification information input means together with an identifier of the specified electronic document or category to said document providing device via said communication means.

8. A document processing system according to claim 7, wherein said categorizing means temporarily determines a category in which the electronic document received from said document providing device is to be categorized, in accordance with the characteristic of said electronic document,
  if said category determined is the same as the category specified by said specification information input means or as the category to which the specified electronic document belongs, said categorizing means categorizes said electronic document received from said document providing device into said category, and
  if said category determined is different from the category specified by said specification information input means or from the category to which the specified electronic document belongs, said categorizing means categorizes said electronic document received from said document providing device into a category in accordance with an instruction given by a user.

9. A document processing system according to claim 6, wherein said control means of said document providing device transits the electronic document extracted by retrieval, as said information associated with the retrieved electronic document, to said terminal device via said communication means.

10. A document processing system according to claim 6, wherein said control means of said document providing device transmits a list of electronic documents extracted by retrieval, as said information associated with the retrieved electronic document, to said terminal device via said communication means.

11. A document processing system according to claim 10, wherein sad terminal device further comprises electronic document specifying means for, when said list is received via said communication means, inputting electronic document specifying information to specify a particular electronic document of those included in said list, and
  said control means of said terminal device transmits the electronic document specifying information input via said electronic document specifying means to said document providing device via said communication means.

12. A document processing system according to claim 11, wherein said control means of said document providing device transmits an electronic document specified by said electronic document specifying information received from said terminal device to said terminal device via said communication means.

13. A document processing system according to claim 10, wherein said control means of said document providing device produces said list such that electronic documents retrieved by said retrieval means from said database ate all included in said list, and said control means transmits said list to said terminal device via said communication means.

14. A document processing system according to claim 10, wherein said control means of said document providing device produces said list such that electronic documents retrieved by said retrieval means from said database are partially included in said list, and said control means transmits said list to said terminal device via said communication means.

15. A document processing system according to claim 10, wherein said control means of said document providing device produces said list such that a full or partial set of electronic documents retrieved by said retrieval means from said database is sorted and the resultant sorted set of electronic documents is included in said list and said control means transmits said list to said terminal device via said communication means.

16. A document processing system according to claim 6, wherein when said categorizing means categories the electronic document received from said document providing device into a category, said categorizing means updates category information.

17. A document processing system according to claim 6, wherein said document providing device further comprises accounting means for, when said document providing device transmits the electronic document to said tonal device, performing an accounting process associated with the fee to said terminal device.

\* \* \* \* \*